US007846514B2

(12) United States Patent
Shimada

(10) Patent No.: US 7,846,514 B2
(45) **Date of Patent: *Dec. 7, 2010**

(54) LIQUID CRYSTAL COMPOUND, LIQUID CRYSTAL COMPOSITION AND, LIQUID CRYSTAL DISPLAY DEVICE

(75) Inventor: Teru Shimada, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/524,358

(22) PCT Filed: Jan. 15, 2008

(86) PCT No.: PCT/JP2008/050353

§ 371 (c)(1), (2), (4) Date: Jul. 23, 2009

(87) PCT Pub. No.: WO2008/090780

PCT Pub. Date: Jul. 31, 2008

(65) Prior Publication Data

US 2010/0073621 A1 Mar. 25, 2010

(30) Foreign Application Priority Data

Jan. 24, 2007 (JP) ............................ 2007-013706

(51) Int. Cl.

| | |
|---|---|
| ***C09K 19/12*** | (2006.01) |
| ***C09K 19/30*** | (2006.01) |
| ***C09K 19/34*** | (2006.01) |
| ***C09K 19/32*** | (2006.01) |
| ***C07C 25/24*** | (2006.01) |
| ***C07C 43/225*** | (2006.01) |
| ***C07D 319/06*** | (2006.01) |
| ***C07D 309/16*** | (2006.01) |
| ***C07D 239/02*** | (2006.01) |

(52) U.S. Cl. .............. 428/1.1; 252/299.61; 252/299.62; 252/299.63; 252/299.66; 544/242; 544/335; 549/369; 549/428; 570/128; 568/647; 568/661

(58) Field of Classification Search .................. 428/1.1; 252/299.61, 299.62, 299.63, 299.66; 570/128; 544/242, 335; 549/369, 428; 568/647, 661
See application file for complete search history.

(56) References Cited

U.S. PATENT DOCUMENTS

| | | | | |
|---|---|---|---|---|
| 5,308,542 | A | 5/1994 | Poetsch et al. | |
| 5,403,512 | A * | 4/1995 | Bartmann et al. | 252/299.01 |
| 6,159,393 | A * | 12/2000 | Tarumi et al. | 252/299.63 |
| 7,732,023 | B2 * | 6/2010 | Saito | 428/1.1 |
| 2009/0147210 | A1 * | 6/2009 | Saito | 349/182 |

FOREIGN PATENT DOCUMENTS

| | | |
|---|---|---|
| CA | 2088771 | 5/1992 |
| DE | 4245036 | 8/2007 |
| EP | 0082252 | 6/1983 |
| EP | 0387032 | 9/1990 |
| EP | 0420987 | 4/1991 |
| EP | 0781827 | 7/1997 |
| EP | 1477546 | 11/2004 |
| JP | 57-054124 | 3/1982 |
| JP | 07-138196 | 5/1995 |
| JP | 2005-281223 | 10/2005 |
| WO | 90/13610 | 11/1990 |
| WO | 2004/058723 | 7/2004 |

OTHER PUBLICATIONS

English translation by computer' for DE 4211694, http://v3.espacenet.com/publicationDetails/biblio?CC=DE&NR=4211694A1&KC=A1&FT=D&date=19931104&DB=EPODOC&locale=en_EP, 1993.*

Article Titled "Facile Synthesis of Trifluoromethyl-substituted Enynes: Remarkable Reactivity and Stereoselectivity of Tributyl (3,3,3-trifluoropropynyl) stannane in Carbostannylation of Alkynes" jointly authored by Shimizu et al, in Chemistry Letters (2005), vol. 34, No. 12, pp. 1700-1701.

Article Titled "A first regioselective synthesis of 3-fluoroalkylated benzofurans via palladium-catalyzed annulation of fluorine-containing internal alkynes with variously substituted 2-iodophenol" jointly authored by Konno et al., in Tetrahedron (2004), 60 (51), pp. 11695-11700.

Article Titled "Facile syntheses of various per- or polyfluoroalkylated internal acetylene derivative" jointly authored by Konno et al., in Tetrahedron (2003), 59 (38), pp. 7571-7580.

Article Titled "A Facile synthesis of trans-β-Trifluoromethylstyrene, trans-2,3,4,5,6-Pentafluorostilbene and their Derivatives" jointly authored by Fuchikami et al., in Synthesis, May of 1981, pp. 365-366.

Article Titled "A Facile Synthesis of Trifluoromethyl-and 3,3,3-Trifluropropenyl-Substituted Aromatic Compounds by the Oxidative Desulfurization-Fluorination of the Corresponding Carbodithioates" jointly authored by Furuta et al., in Bulletin of the Chemical Society of Japan, (1999), 72 (4), pp. 805-819.

Article Titled "A Facile and Practical Synthesis of 1-Aryl-3,3,3-trifluoropropynes" jointly authored by Hiyama et al., in Bulletin of the Chemical Society of Japan (1989), 62 (4), pp. 1352-1354.

International Search Report of PCT/JP2008/050353, Form PCT/ISA/210, dated Apr. 8, 2008.

* cited by examiner

*Primary Examiner*—Shean C Wu
(74) *Attorney, Agent, or Firm*—J.C. Patents

(57) ABSTRACT

The invention provides a liquid crystal compound which has stability to heat, light and so forth, shows liquid crystal phases in a wide temperature range, and has a small viscosity, an appropriate optical anisotropy, a large dielectric anisotropy, and an excellent compatibility with other liquid crystal compounds. The invention provides a liquid crystal composition which has an appropriate optical anisotropy, an appropriate dielectric anisotropy, a low threshold voltage, and a high maximum temperature and a low minimum temperature of a nematic phase. The invention provides a liquid crystal display device which has a short response time, a small power consumption, a small driving voltage, and a large contrast, and can be used in a wide temperature range.

The liquid crystal compound is a halogeno-benzene derivative having a trifluoropropenyl group or trifluoropropynyl group at a side chain, such as, for example, trans-4'-[3,5-difluoro-4-(3,3,3-trifluoropropenyl)phenyl]-trans-4-propyl-bicyclohexyl. The liquid crystal composition contains a compound which is this derivative. The liquid crystal display device uses this liquid crystal composition.

29 Claims, No Drawings

LIQUID CRYSTAL COMPOUND, LIQUID CRYSTAL COMPOSITION AND, LIQUID CRYSTAL DISPLAY DEVICE

BACKGROUND OF THE INVENTION

1. Field of the Invention

The invention relates to a new liquid crystal compound useful as a material for a liquid crystal display device, and a liquid crystal composition comprising the compound. More specifically, the invention relates to a new liquid crystal compound having a low viscosity, a good compatibility with other liquid crystal compounds, an appropriate refractive index anisotropy value and dielectric anisotropy value, and capable of obtaining a steep electrooptical characteristic when used for a liquid crystal display device, and to a liquid crystal composition comprising the compound and a liquid crystal display device comprising the liquid crystal composition.

2. Related Art

In liquid crystal display devices, a classification based on the operation mode of liquid crystals includes phase change (PC), twisted nematic (TN), super twisted nematic (STN), bistable twisted nematic (BTN), electrically controlled birefringence (ECB), optically compensated bend (OCB), in-plane switching (IPS), vertical alignment (VA) and so forth. A classification based on the driving modes of devices includes a passive matrix (PM) and an active matrix (AM). The PM is further classified into static, multiplex or the like, and the AM is classified into a thin film transistor (TFT), metal-insulator-metal (MIM) or the like.

These liquid crystal display devices comprise liquid crystal compositions having appropriate physical properties. The liquid crystal compositions preferably have appropriate physical properties for improving the characteristics of the liquid crystal display devices. General physical properties necessary for a liquid crystal compound which is a component of the liquid crystal compositions are as follows:

(1) being chemically stable and physically stable;

(2) having a high clearing point (the phase transition temperature of a liquid crystal phase to an isotropic phase);

(b 3) being low in the minimum temperature of liquid crystal phases (a nematic phase, a smectic phase and so forth), especially in the minimum temperature of the nematic phase;

(4) having a low viscosity;

(5) having an appropriate optical anisotropy;

(6) having an appropriate dielectric anisotropy; and (7) having an excellent compatibility with other liquid crystal compounds.

A voltage holding ratio can be increased by using a composition containing a chemically and physically stable liquid crystal compound as described in item (1) for a display device.

The temperature range of a nematic phase can be widened by using a composition containing a liquid crystal compound having a high clearing point or the low minimum temperature of liquid crystal phases as described in items (2) and (3), and thus a display device can be used in a wide temperature range.

Response speed can be improved by using a composition containing a compound having a small viscosity as described in item (4) for a display device. The contrast of a display device can be improved in the case of the display device using a composition containing a compound having an appropriate optical anisotropy as described in item (5).

Further, when a liquid crystal compound having a large dielectric anisotropy is used, the threshold voltage of a liquid crystal composition containing this compound can be decreased, the driving voltage of a display device can be decreased, and power consumption can be reduced.

A liquid crystal compound is generally used as a composition prepared by being mixed with many other liquid crystal compounds in order to exhibit characteristics which can be hardly achieved with a single compound. Thus, the liquid crystal compound used for a display device preferably has a good compatibility with other liquid crystal compounds and so forth, as described in item (7).

Conventionally, various compounds having a trifluoroalkyl, trifluoroalkenyl, and trifluoroalkynyl group at side chains have been synthesized as liquid crystal compounds which can be used preferably for liquid crystal display devices such as TN, STN, and TFT, and some of them are used practically.

For example, Patent document 1 discloses a compound represented by formula (ω-1) as a compound having a trifluoroalkyl group at the side chain. However, the compound (S-1) has a small dielectric anisotropy when mixed into a liquid crystal composition.

Patent documents 1, 2, and 3 disclose compounds represented by formulas (S-2) to (S-4) as compounds having a trifluoroalkenyl group at the side chains. However, none of the compounds has a sufficiently large dielectric anisotropy when mixed into a liquid crystal composition. The compound (S-3) does not have a sufficient stability to heat or light. The clearing point of the compound (S-4) is low when mixed into the liquid crystal composition.

Patent document 1 further discloses a compound represented by formula (S-5) as a compound having a trifluoroalkynyl group at the side chain. However, this compound neither has a sufficiently large dielectric anisotropy when mixed into a liquid crystal composition.

Patent document 4 discloses a compound represented by formula (S-6) as a compound having a styrene skeleton. However, the compound (S-6) does not have a large dielectric anisotropy when mixed into a liquid crystal composition.

Patent document 5 discloses a compound represented by formula (S-7) as a compound having a fluorine-substituted styrene skeleton. However, the compound (S-7) has a narrow range (mesophase range) for exhibiting liquid crystallinity, and a low clearing point when mixed into a liquid crystal composition.

Patent documents 6 and 7 disclose compounds represented by formulas (S-8), (S-9), and (S-10) as trifluorobenzene derivatives. However, all the compounds have a narrow range (mesophase range) for exhibiting liquid crystallinity, and a low clearing point and a insufficiently large dielectric anisotropy when mixed into liquid crystal compositions.

Further, Patent documents 8 to 11 and Non-patent documents 1 to 6 describe methods of forming a trifluoroalkenyl group or trifluoroalkynyl group, or reactions employing the groups as a precursor. However, none of the documents aim at use as a liquid crystal compound, and disclose the structure and characteristics of such compounds.

(S-1)

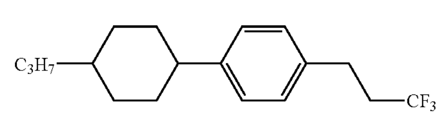

-continued (S-2)

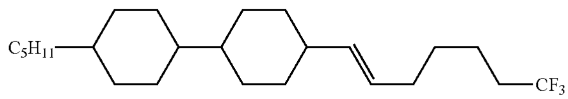

(S-3)

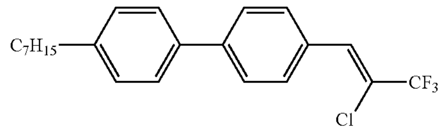

(S-4)

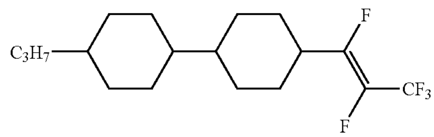

(S-5)

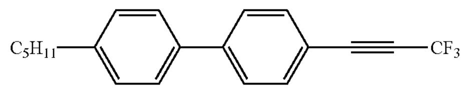

(S-6)

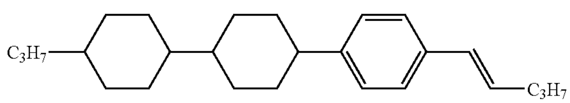

(S-7)

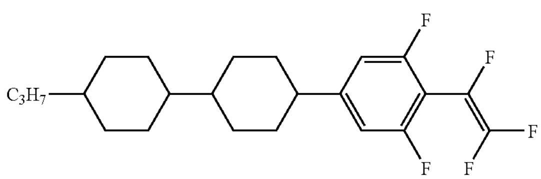

(S-8)

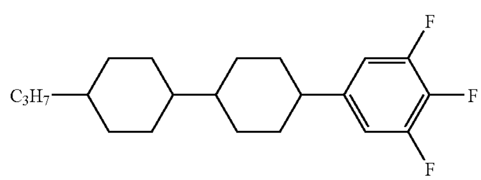

(S-9)

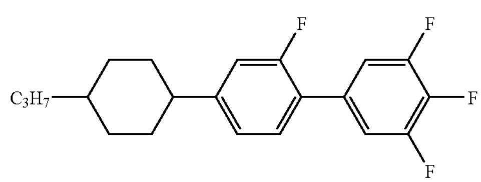

(S-10)

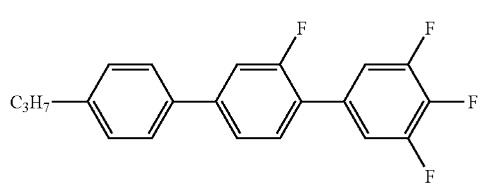

Patent documents cited are No. 1: WO 1990/013610 A; No. 2: JP H7-138196 A/1995; No. 3, JP 2005-298466 A; No. 4: JP H10-95977 A/1998; No. 5: WO 1992/021734 A; No. 6: JP H2-233626 A/1990; No. 7: WO 1991/013850 A; No. 8: JP S58-92627 A/1983; No. 9: WO 2004/058723 A; No. 10: JP S57-54124 A/1982; and No. 11: WO 1990/09972 A.

Non-patent documents cited are No. 1: Chemistry Letters (2005), 34 (12), 1700-1701; No. 2: Tetrahedron (2004), 60 (51), 11695-11700; No. 3: Tetrahedron (2003), 59 (38), 7571-7580; No. 4: Synthesis (1981), (5), 365-366; No. 5: Bulletin of the Chemical Society of Japan (1999), 72 (4), 805-819; and No. 6: Bulletin of the Chemical Society of Japan (1989), 62 (4), 1352-1354.

The invention concerns a compound represented by formula (1):

(1)

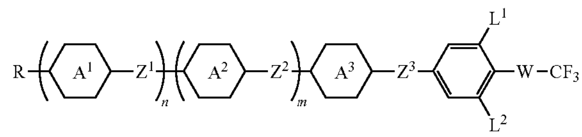

wherein R is hydrogen, alkyl having 1 to 12 carbons, alkenyl having 2 to 12 carbons, alkoxy having 1 to 11 carbons, or alkenyloxy having 2 to 11 carbons;

ring $A^1$, ring $A^2$, and ring $A^3$ are each independently 1,4-cyclohexylene, 1,4-phenylene, 1,4-cyclohexenylene, 1,3-dioxane-2,5-diyl, tetrahydropyran-2,5-diyl, pyrimidine-2,5-diyl, pyridine-2,5-diyl, naphthalene-2,6-diyl, decahydronaphthalene-2,6-diyl, or 1,2,3,4-tetrahydronaphthalene-2,6-diyl, and in these rings, hydrogen may be replaced by halogen;

$Z^1$, $Z^2$, and $Z^3$ are each independently a single bond, —$CH_2CH_2$—, —CH═CH—, —C≡C—, —COO—, —OCO—, —$CF_2O$—, —$OCF_2$—, —$CH_2O$—, —$OCH_2$— —CF═CF—, —$(CH_2)4$-, —$(CH_2)_2CF_2O$—, —$OCF_2(CH_2)_2$—, —CH═CH$(CH_2)_2$—, or —$(CH_2)_2$CH═CH—;

$L^1$ and $L^2$ are each independently hydrogen or halogen, and at least one of $L^1$ and $L^2$ is halogen;

W is —CH═CH— or —C≡C—; and n and m are each independently an integer of 0 to 2, and the sum of n and m is an integer of 0 to 3.

The invention also concerns a liquid crystal composition comprising at least one compound. The invention also concerns a liquid crystal display device comprising the liquid crystal composition, and so forth.

SUMMARY OF THE INVENTION

One of the purposes of the invention is to provide a liquid crystal compound having stability to heat, light and so forth, showing liquid crystal phases (a nematic phase or a smectic phase) in a wide temperature range, and having a small viscosity, an appropriate optical anisotropy, a large dielectric anisotropy, and an excellent compatibility with other liquid crystal compounds.

Another purpose of the invention is to provide a liquid crystal composition comprising this liquid crystal compound, having stability to heat, light and so forth, a small viscosity, an appropriate optical anisotropy, an appropriate dielectric anisotropy, a low threshold voltage, a high maximum temperature of a nematic phase (the phase transition temperature of a nematic phase to an isotropic phase), and a low minimum temperature of the nematic phase.

Another purpose of the invention is to provide a liquid crystal display device comprising this liquid crystal composition, having a short response time, a small power consumption, a small driving voltage, and a large contrast, and usable in a wide temperature range.

The present inventors had studied the above subjects wholeheartedly, and found, as a result, that a halogeno-benzene derivative having a trifluoropropenyl group or a trifluoropropynyl group at the side chain exhibited a large dielectric anisotropy value, a low viscosity, a high chemical stability, a wide temperature range of liquid crystal phases, and an appropriate refractive index anisotropy value, and especially the large dielectric constant anisotropy value. Further, the inventors found that a clearing point could be increased by using a liquid crystal composition comprising the compound of this derivative, and it is possible to prepare a liquid crystal display device having a steep electrooptical characteristic, a short response time, a wide operating temperature range, and a small driving electric power. Therefore, the inventors found that this compound is suitable for a liquid crystal display device, and particularly suitable for liquid crystal display devices of modes, such as TN, STN, and TFT which are used widely, and completed the invention.

The invention has the following features:

1. A compound represented by formula (1):

(1)

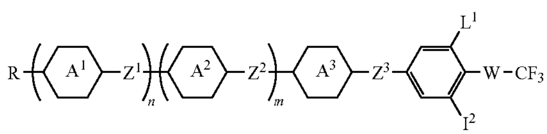

wherein R is hydrogen, alkyl having 1 to 12 carbons, alkenyl having 2 to 12 carbons, alkoxy having 1 to 11 carbons, or alkenyloxy having 2 to 11 carbons;

ring $A^1$, ring $A^2$, and ring $A^3$ are each independently 1,4-cyclohexylene, 1,4-phenylene, 1,4-cyclohexenylene, 1,3-dioxane-2,5-diyl, tetrahydropyran-2,5-diyl, pyrimidine-2,5-diyl, pyridine-2,5-diyl, naphthalene-2,6-diyl, decahydronaphthalene-2,6-diyl, or 1,2,3,4-tetrahydronaphthalene-2,6-diyl, and in these rings, hydrogen may be replaced by halogen;

$Z^1$, $Z^2$, and $Z^3$ are each independently a single bond, —$CH_2CH_2$—, —CH═CH—, —C≡C—, —COO—, —OCO—, —$CF_2O$—, —$OCF_2$—, —$CH_2O$—, —$OCH_2$— —CF═CF—, —$(CH_2)$4-, —$(CH_2)_2CF_2O$—, —$OCF_2(CH_2)_2$—, —CH═CH$(CH_2)_2$—, or —$(CH_2)_2$CH═CH—;

$L^1$ and $L^2$ are each independently hydrogen or halogen, and at least one of $L^1$ and $L^2$ is halogen;

W is —CH═CH— or —C≡C—; and n and m are each independently an integer of 0 to 2, and the sum of n and m is an integer of 0 to 3.

2. The compound according to item 1, wherein ring $A^1$, ring $A^2$, and ring $A^3$ are independently 1,4-cyclohexylene, 1,4-phenylene, 1,4-cyclohexenylene, 1,3-dioxane-2,5-diyl, tetrahydropyran-2,5-diyl, pyrimidine-2,5-diyl, or 1,4-phenylene in which arbitrary hydrogen is replaced by fluorine.

3. The compound according to item 2, wherein $Z^1$, $Z^2$, and $Z^3$ are each independently a single bond, —$CH_2CH_2$—, —CH═CH—, —C≡C—, —COO—, —OCO—, —$CF_2O$—, —$OCF_2$—, —$CH_2O$—, —$OCH_2$—, or —CF═CF—.

4. A compound represented by formula (1-1):

(1-1)

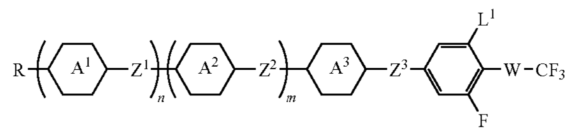

wherein R is hydrogen, alkyl having 1 to 12 carbons, alkenyl having 2 to 12 carbons, or alkoxy having 1 to 11 carbons;

ring $A^1$, ring $A^2$, and ring $A^3$ are each independently 1,4-cyclohexylene, 1,4-phenylene, 1,4-cyclohexenylene, 1,3-dioxane-2,5-diyl, tetrahydropyran-2,5-diyl, pyrimidine-2,5-diyl, or 1,4-phenylene in which arbitrary hydrogen is replaced by fluorine;

$Z^1$, $Z^2$, and $Z^3$ are each independently a single bond, —$CH_2CH_2$—, —CH═CH—, —C≡C—, —COO—, —OCO—, —$CF_2O$—, —$OCF_2$—, —$CH_2O$—, —$OCH_2$—, or —CF═CF—;

W is —CH═CH— or —C≡C—;

$L^1$ is hydrogen, fluorine, or chlorine; and n and m are each independently an integer of 0 to 2, and the sum of n and m is an integer of 0 to 3.

5. The compound according to item 4, wherein ring A1, ring A2, and ring A3 are each independently 1,4-cyclohexylene, 1,4-phenylene, or 1,4-phenylene in which arbitrary hydrogen is replaced by fluorine.

6. The compound according to item 4, wherein at least one of ring $A^1$, ring $A^2$, and ring $A^3$ is 1,3-dioxane-2,5-diyl.

7. The compound according to item 4, wherein at least one of ring $A^1$, ring A2, and ring A3 is tetrahydropyran-2,5-diyl.

8. The compound according to item 4, wherein at least one of ring $A^1$, ring $A^1$, and ring $A^3$ is pyrimidine-2,5-diyl.

9. The compound according to item 5, wherein $Z^1$, $Z^2$, and $Z^3$ are each independently a single bond, —$CH_2CH_2$—, —CH═CH—, —C≡C—, —COO—, —$CF_{20}$—, or —$CH_2O$—.

10. The compound according to item 5, wherein $Z^1$, $Z^2$, and $Z^3$ are a single bond.

11. A compound represented by any one of formulas (1-2) to (1-10):

(1-2)

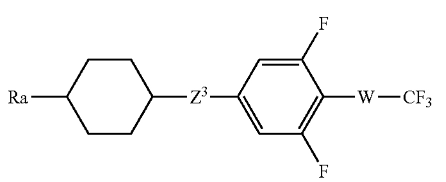

(1-3)

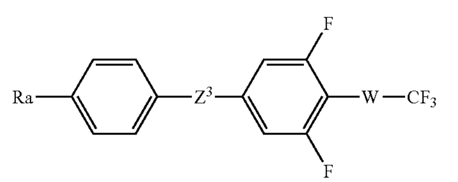

(1-4)

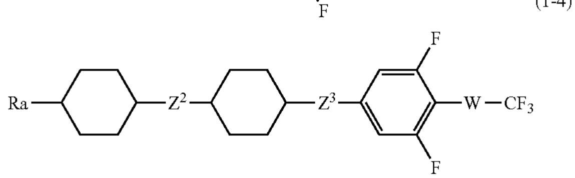

(1-5)

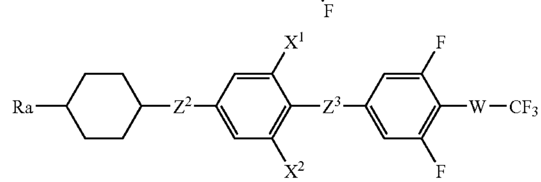

-continued (1-6)

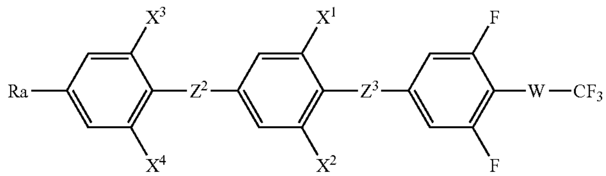

(1-7)

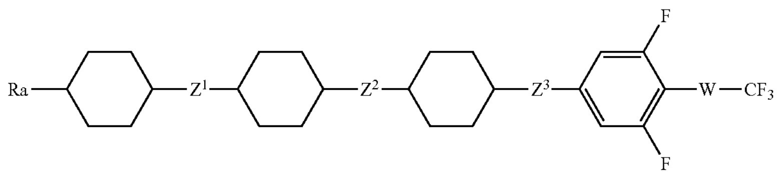

(1-8)

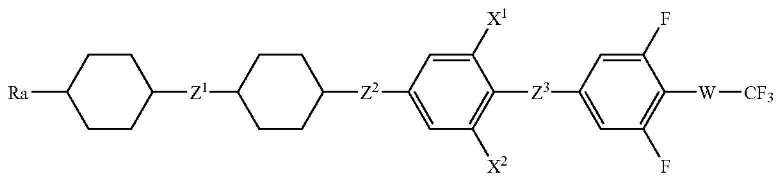

(1-9)

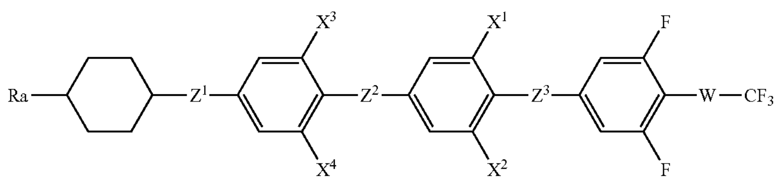

(1-10)

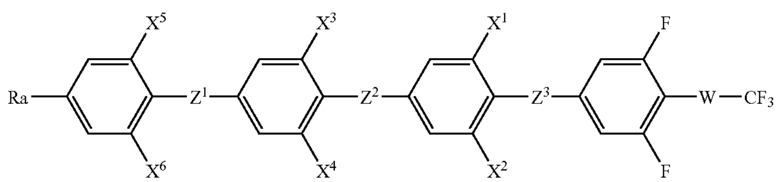

wherein Ra is independently hydrogen, alkyl having 1 to 12 carbons, alkenyl having 2 to 12 carbons, or alkoxy having 1 to 11 carbons;

$Z^1$, $Z^2$, and $Z^3$ are each independently a single bond, —$CH_2CH_2$—, —CH═CH—, —COO—, or —$CF_2O$—;

$X^1$, $X^2$, $X^3$, $X^4$, $X^5$, and $X^6$ are each independently hydrogen or fluorine; and W is independently —CH═CH— or —C≡C—.

12. The compound according to item 11, wherein $Z^1$, $Z^2$, and $Z^3$ area single bond in formulas (1-2) to (1-10).

13. The compound according to item 12, wherein $X^1$ is fluorine, and $X^2$, $X^3$, $X^4$, $X^5$, and $X^6$ are hydrogen in formulas (1-2) to (1-10).

14. The compound according to item 12, wherein $X^1$ and $X^2$ are fluorine, and $X^3$, $X^4$, $X^5$, and $X^6$ are hydrogen in formulas (1-2) to (1-10).

15. The compound according to item 12, wherein $X^1$ and $X^3$ are fluorine, and $X^2$, $X^4$, $X^5$, and $X^6$ are hydrogen in formulas (1-2) to (1-10).

16. The compound according to item 12, wherein $X^1$, $X^2$, and $X^3$ are fluorine, and $X^4$, $X^5$, and $X^6$ are hydrogen in formulas (1-2) to (1-10).

17. The compound according to item 12, wherein W is —CH═CH— in formulas (1-2) to (1-10).

18. A liquid crystal composition comprising at least one compound according to any one of items 1 to 17.

19. The liquid crystal composition according to item 18, further comprising at least one compound selected from the group of compounds each represented by formulas (2), (3), and (4):

(2)

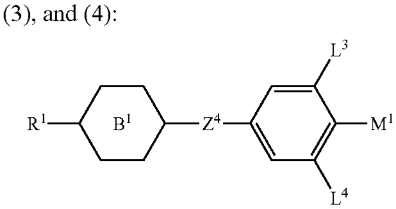

(3)

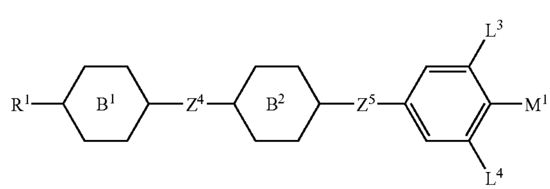

(4)

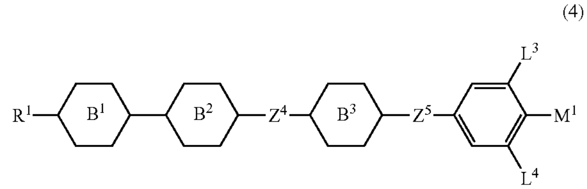

wherein $R^1$ is independently alkyl having 1 to 10 carbons or alkenyl having 2 to 10 carbons, and in the alkyl and alkenyl, arbitrary hydrogen may be replaced by fluorine, and arbitrary —$CH_2$— may be replaced by —O—;

$M^1$ is independently fluorine, chlorine, —$OCF_3$, —$OCHF_2$, —$CF_3$, —$CHF_2$, —$CH_2F$, —$OCF_2CHF_2$, or —$OCF_2CHFCF_3$;

ring $B^1$, ring $B^2$, and ring $B^3$ are each independently 1,4-cyclohexylene, 1,4-phenylene, 1,3-dioxane-2,5-diyl, pyrimidine-2,5-diyl, tetrahydropyran-2,5-diyl, or 1,4-phenylene in which arbitrary hydrogen is replaced by fluorine;

$Z^4$ and $Z^5$ are each independently —$(CH_2)_2$—, —$(CH_2)_4$—, —COO—, —$CF_2O$—, —$OCF_2$—, —CH═CH—, or a single bond; and $L^3$ and $L^4$ are each independently hydrogen or fluorine.

20. The liquid crystal composition according to item 18, further comprising at least one compound selected from the group of compounds represented by formula (5):

(5)

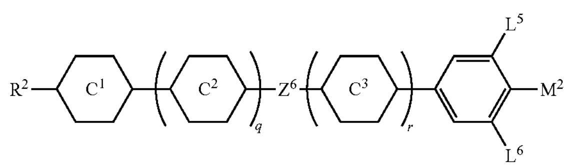

wherein $R^2$ is alkyl having 1 to 10 carbons or alkenyl having 2 to 10 carbons, and in the alkyl and alkenyl, arbitrary hydrogen may be replaced by fluorine, and arbitrary —$CH_2$— may be replaced by —O—;

$M^2$ is —C≡N or —C≡C—C≡N;

ring $C^1$, ring $C^2$, and ring $C^3$ are each independently 1,4-cyclohexylene, 1,4-phenylene, 1,3-dioxane-2,5-diyl, pyrimidine-2,5-diyl, tetrahydropyran-2,5-diyl, or 1,4-phenylene in which arbitrary hydrogen is replaced by fluorine;

$Z^6$ is —$(CH_2)_2$—, —COO—, —$CF_2O$—, —$OCF_2$—, —C≡C—, —$CH_2O$—, or a single bond;

$L^5$ and $L^6$ are each independently hydrogen or fluorine; and q is an integer of 0 to 2 and r is 0 or 1.

21. The liquid crystal composition according to item 18, further comprising at least one compound selected from the group of compounds each represented by formulas (6), (7), (8), (9), and (10):

(6)

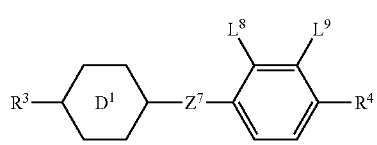

(7)

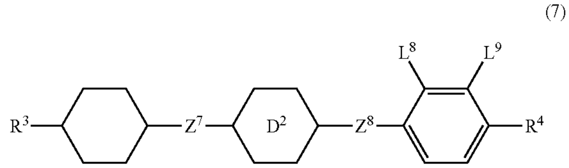

-continued (8)

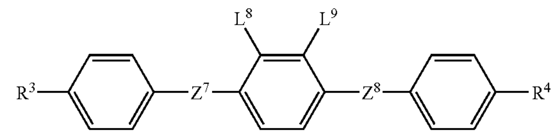

(9)

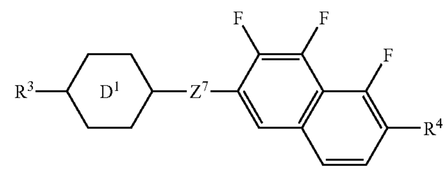

(10)

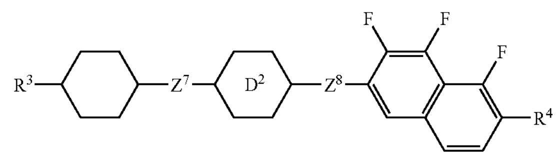

wherein $R^3$ and $R^4$ are each independently alkyl having 1 to 10 carbons or alkenyl having 2 to 10 carbons, and in the alkyl and alkenyl, arbitrary hydrogen may be replaced by fluorine, and arbitrary —$CH_2$— may be replaced by —O—;

ring $D^1$ and ring $D^2$ are each independently 1,4-cyclohexylene, 1,4-phenylene, 1,4-cyclohexenylene, tetrahydropyran-2,5-diyl, decahydronaphthalene-2,6-diyl, or 1,4-phenylene in which arbitrary hydrogen is replaced by fluorine;

$Z^7$ and $Z^8$ are each independently —$(CH_2)_2$—, —COO—, —$CH_2O$—, —$OCH_2$—, —$CF_2O$—, —$OCF_2$—, —$(CH_2)_2CF_2O$—, —$OCF_2(CH_2)_2$—, or a single bond; and $L^8$ and $L^9$ are each independently chlorine or fluorine.

22. The liquid crystal composition according to item 18, further comprising at least one compound selected from the group of compounds each represented by formulas (11), (12), and (13):

(11)

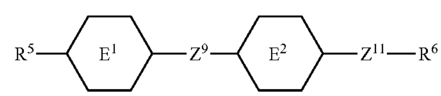

(12)

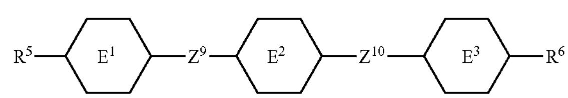

(13)

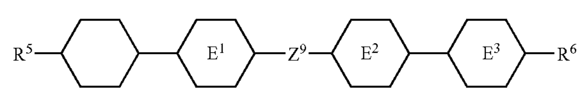

wherein $R^5$ and $R^6$ are each independently alkyl having 1 to 10 carbons or alkenyl having 2 to 10 carbons, and in the alkyl, arbitrary hydrogen may be replaced by fluorine, and arbitrary —$CH_2$— may be replaced by —O—;

ring $E^1$, ring $E^2$, and ring $E^3$ are each independently 1,4-cyclohexylene, pyrimidine-2,5-diyl, 1,4-phenylene, 2-fluoro-1,4-phenylene, 3-fluoro-1,4-phenylene, or 2,5-difluoro-1,4-phenylene; and $Z^9$ and $Z^{10}$ are each independently —C≡C—, —COO—, —$(CH_2)_2$—, —CH═CH—, or a single bond, and $Z^{11}$ is —COO— or a single bond.

23. The liquid crystal composition according to item 19, further comprising at least one compound selected from the group of compounds represented by formula (5) according to item 20.
24. The liquid crystal composition according to item 19, further comprising at least one compound selected from the group of compounds each represented by formulas (11), (12), and (13) according to item 22.
25. The liquid crystal composition according to item 20, further comprising at least one compound selected from the group of compounds each represented by formulas (11), (12), and (13) according to item 22.
26. The liquid crystal composition according to item 21, further comprising at least one compound selected from the group of compounds each represented by formulas (11), (12), and (13) according to item 22.
27. The liquid crystal composition according to any one of items 18 to 26, further comprising at least one optically active compound.
28. The liquid crystal composition according to any one of items 18 to 27, further comprising at least one antioxidant and/or ultraviolet absorber.

transition temperature of a nematic phase-isotropic phase, and may simply be abbreviated to a maximum temperature. The minimum temperature of the nematic phase may simply be abbreviated to a minimum temperature. The compound represented by formula (1) may be abbreviated to compound (1). These abbreviations may also apply to compounds represented by formula (2) and so forth. In formulas (1) to (13), the symbols $A^1$, $B^1$, $C^1$, $D^1$, $E^1$ and so forth surrounded by a hexagonal shape correspond to ring $A^1$, ring $B^1$, ring $C^1$, ring $D^1$, ring $E^1$ and so forth, respectively. The amount of compound expressed by a percentage means a percentage by mass (% by mass) based on the total mass of composition. The invention will be further explained below.

First, the compound (1) of the invention will be more specifically explained. Hereinafter, the present invention will be explained in more detail. In the following description, the amount of compound expressed by a percentage means a percentage by mass (% by mass) based on the total mass of composition unless otherwise noted.

[Liquid Crystal Compound (a)]

A liquid crystal compound (a) of the invention has a structure represented by the following formula (1) (Hereinafter, the following compounds are also called "compound (1)".).

(1)

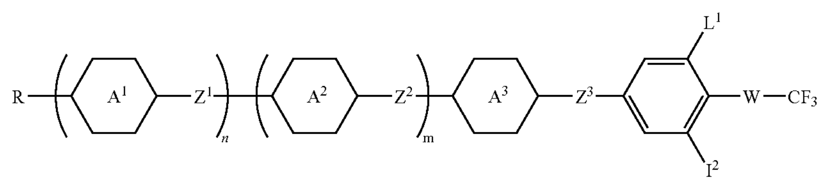

29. A liquid crystal display device comprising the liquid crystal composition according to any one of items 18 to 28.

The compounds of the invention have general physical properties required for liquid crystal compounds, stability to heat, light and so forth, a small viscosity, an appropriate optical anisotropy, a large dielectric anisotropy, and an excellent compatibility with other liquid crystal compounds. The liquid crystal composition of the invention comprises at least one of these compounds, and has a high maximum temperature of a nematic phase, a low minimum temperature of the nematic phase, a small viscosity, an appropriate optical anisotropy, and a low threshold voltage. The liquid crystal display device of the invention comprises this composition, and has a large temperature range usable, a short response time, a small power consumption, a large contrast ratio, and a low driving voltage. Accordingly, the compounds of the invention can be used suitably for liquid crystal display devices of display modes, such as a PC, TN, STN, ECB, OCB, IPS, and VA mode.

Terms are used in this specification as follows. A liquid crystal compound is a generic term for a compound having liquid crystal phases, such as a nematic phase and a smectic phase, and a compound having no liquid crystal phases but useful as a component for a liquid crystal composition. The terms of a liquid crystal compound, a liquid crystal composition, and a liquid crystal display device may be abbreviated to a compound, a composition and a device, respectively. A liquid crystal display device is a generic term for a liquid crystal display panel and a liquid crystal display module. The maximum temperature of a nematic phase means a phase In formula (1), R is hydrogen, alkyl having 1 to 12 carbons, alkenyl having 2 to 12 carbons, alkoxy having 1 to 11 carbons, or alkenyloxy having 2 to 11 carbons.

Ring $A^1$, ring $A^2$, and ring $A^3$ are each independently, 4-cyclohexylene, 1,4-phenylene, 1,4-cyclohexenylene, 1,3-dioxane-2,5-diyl, tetrahydropyran-2,5-diyl, pyrimidine-2,5-diyl, pyridine-2,5-diyl, naphthalene-2,6-diyl, decahydronaphthalene-2,6-diyl, or 1,2,3,4-tetrahydronaphthalene-2,6-diyl, and in these rings, hydrogen may be replaced by halogen.

$Z^1$, $Z^2$, and $Z^3$ are each independently a single bond, —$CH_2CH_2$—, —CH═CH—, —C≡C—, —COO— —OCO—, —$CF_2O$—, —$OCF_2$—, —$CH_2O$—, —$OCH_2$—, —CF═CF—, —$(CH_2)_4$—, —$(CH_2)_2CF_2O$—, —$OCF_2(CH_2)_2$—, —CH═CH$(CH_2)_2$—, or —$(CH_2)_2$CH═CH—.

$L^1$ and $L^2$ are each independently hydrogen or halogen, and at least one of $L^1$ and $L^2$ is halogen.

W is —CH═CH— or —C≡C—.

The symbols n and m are each independently an integer of 0 to 2, and the sum of n and m is an integer of 0 to 3.

As mentioned above, the compound (1) has a benzene ring in which any one of hydrogen or all the hydrogen in positions 3 and 5, are replaced by halogen, and hydrogen in position 4 is replaced by trifluoropropenyl or trifluoropropynyl. Such structure demonstrates liquid crystal phases in a wide temperature range, and a small viscosity, an appropriate optical anisotropy, an appropriate dielectric anisotropy, and an excellent compatibility with other liquid crystal compounds. In particular, the compound (1) is excellent in terms of a high maximum temperature of a nematic phase and a large dielectric anisotropy.

Physical properties, such as optical anisotropy and dielectric anisotropy, can be arbitrarily adjusted by appropriately selecting R, ring $A^1$ to ring $A^3$, and $Z^1$ to $Z^3$ of the compound (1). The effect of preferable R, ring $A^1$, ring $A^2$, ring $A^3$, $Z^7$, $Z^2$, and $Z^3$ in the compound (1), and their kinds on the physical properties of the compound (1) will be explained below.

When R in the compound (1) is a straight chain, the temperature range of liquid crystal phases is wide and the viscosity is small. When R is a branched chain, compatibility with other liquid crystal compounds is good. A compound in which R is an optically active group is useful as a chiral dopant. A reverse twisted domain which may occur in a device can be prevented by adding this compound to a composition. A compound in which R is not an optically active group is useful as a component of a composition. When R is alkenyl, a preferable configuration depends on the position of a double bond. An alkenyl compound having the preferable configuration has a high maximum temperature or a wide temperature range of liquid crystal phases. The relationship between the preferable configuration of alkenyl, and the maximum temperature or the temperature range of liquid crystal phases are explained in detail in Mol. Cryst. Liq. Cryst., 1985, 131, 109 and Mol. Cryst. Liq. Cryst., 1985, 131, 327.

In formula (1), R is hydrogen, alkyl having 1 to 12 carbons, alkenyl having 2 to 12 carbons, alkoxy having 1 to 11 carbons, or alkenyloxy having 2 to 11 carbons. Alkenyl is a group in which arbitrary —$(CH_2)_2$— in alkyl is replaced by —$CH=CH$— or the like, and an example thereof is shown below. The examples of the group in which arbitrary —$(CH_2)_2$— in $CH_3$ $(CH_2)_3$— is replaced by —$CH=CH$— are $H_2C=CH$— $(CH_2)_2$—, $CH_3$—$CH=CH$—$CH_2$—, and so forth. Thus, the term "arbitrary" means "at least one selected without distinction". When the stability of the compound is taken into consideration, $CH_2=CH$—$CH_2$—$CH_2$—$CH=CH$— having double bonds unadjacent to each other is preferable to $CH_2=CH$—$CH=CH$—$CH_2$—$CH_2$— having double bonds adjacent to each other.

A preferable configuration of —$CH=CH$— in alkenyl depends on the position of a double bond. A trans configuration is preferable in alkenyl having a double bond in an odd-numbered position, such as $CH=CHCH_3$, —$CH=CHC_3H_7$, —$(CH_2)_2CH=CHCH_3$, and —$(CH_2)_4$—$CH=CHC_3H_7$. A cis configuration is preferable in alkenyl having a double bond in an even-numbered position, such as —$CH_2CH=CHCH_3$, —$(CH_2)_3CH=CHC_2H_5$, and —$(CH_2)_5$ $CH=CHCH_3$.

Examples of alkyl in R in formula (1) are —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$, —$C_{10}H_{21}$, and so forth.

Examples of alkenyl are —$CH=CH_2$, —$CH=CHCH_3$, —$CH_2CH=CH_2$, —$CH=CHC_2H_5$, —$CH_2CH=CHCH_3$, —$(CH_2)_2CH=CH_2$, —$CH=CHC_3H_7$, —$CH_2CH=CHC_2H_5$, —$(CH_2)_2CH=CHCH_3$, —$(CH_2)_3$ $CH=CH_2$, —$(CH_2)_3CH=CHC_2H_5$, —$(CH_2)_5CH=CH_2$, and so forth.

Examples of alkoxy are —$OCH_3$, —$OC_2H_5$, —$OC_3H_7$, —$OC_4H_9$, —$OC_5H_{11}$, —$OC_6H_{13}$, —$OC_7H_{15}$, —$OC_8H_{17}$, —$OC_9H_{19}$, and so forth.

Examples of alkenyloxy are —$OCH_2CH=CH_2$, —$OCH_2CH=CHCH_3$, —$OC_2H_4$—$CH=CH_2$, —$OC_2H_4$—$CH=CHCH_3$, —$OC_3H_6CH=CH_2$, —$OC_3H_6CH=CHCH_3$, —$OCH_2CH=CHC_2H_5$, —$OCH_2CH=CHC_3H_7$, and so forth.

Preferable examples of R are —$CH_3$, —$C_2H_5$, —$C_3H_7$, —$C_4H_9$, —$C_5H_{11}$, —$C_6H_{13}$, —$C_7H_{15}$, —$CH=CH_2$, —$CH=CHCH_3$, —$CH_2CH=CH_2$, —$CH=CHC_2H_5$, —$CH_2CH=CHCH_3$, —$(CH_2)_2CH=CH_2$, —$CH=CHC_3H_7$, —$CH_2CH=CHC_2H_5$—, —$(CH_2)_2$ $CH=CHCH_3$, —$(CH_2)_3CH=CH_2$, —$OCH_3$, —$OC_2H_5$, —$OC_3H_7$, —$OC_4H_9$, —$OC_5H_{11}$, —$OC_6H_{13}$, —$OCH_2CH=CH_2$, —$OCH_2CH=CHCH_3$, —$OC_2H_4$—$CH=CH_2$, —$OC_2H_4$—$CH=CHCH_3$, —$OC_3H_6CH=CH_2$, and —$OC_3H_6CH=CHCH_3$.

More preferable examples of R are —$CH_3$, —$C_2H_5$, —$C_3H_7$, —$C_4H_9$, —$C_5H_1$, —$CH=CH_2$, —$CH=CHCH_3$, —$(CH_2)_2CH=CH_2$, —$CH=CHC_3H_7$, —$(CH_2)_2$ $CH=CHCH_3$, —$OCH_3$, —$OC_2H_5$, —$OC_3H_7$, —$OC_4H_9$, —$OCH_2CH=CH_2$, —$OCH_2CH=CHCH_3$, and —$OC_3H_6CH\_CHCH_3$.

The most preferable examples of R are —$CH_3$, —$C_2H_5$, —$C_3H_7$, —$C_4H_9$, —$C_5H_{11}$, —$CH=CH_2$, —$CH=CHCH_3$, —$(CH_2)_2CH=CH_2$, —$CH=CHC_3H_7$, —$(CH_2)_2$ $CH=CHCH_3$, —$OC_2H_5$, and —$OC_4H_9$.

In formula (1), ring $A^1$, ring $A^2$, and ring $A^3$ are each independently 1,4-cyclohexylene, 1,4-phenylene, 1,4-cyclohexenylene, 1,3-dioxane-2,5-diyl, tetrahydropyran-2,5-diyl, pyrimidine-2,5-diyl, pyridine-2,5-diyl, naphthalene-2,6-diyl, decahydronaphthalene-2,6-diyl, or 1,2,3,4-tetrahydronaphthalene-2,6-diyl, and in these rings, hydrogen may be replaced by halogen.

Preferable examples of ring $A^1$, ring $A^2$, and ring $A^3$ are the following rings (15-1) to (15-36) and so forth. More preferable examples of ring $A^1$, ring $A^2$, and ring $A^3$ are rings (15-1), (15-3), (15-5), (15-8), (15-10), (15-11), (15-18), (15-23), (15-28), (15-29), (15-30), (15-32), (15-33), (15-34), (15-35), and (15-36).

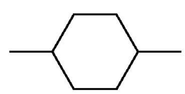
(15-1)

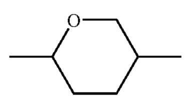

(15-2)

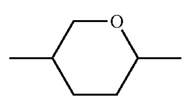

(15-3)

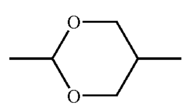

(15-4)

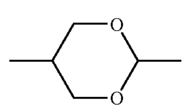

(15-5)

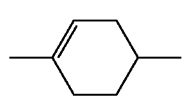
(15-6)

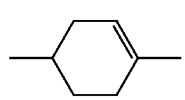
(15-7)

-continued
(15-8)
(15-9)
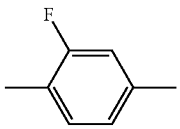
(15-10)
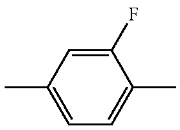
(15-11)
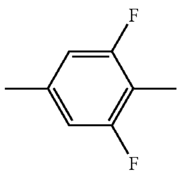
(15-12)
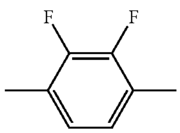
(15-13)
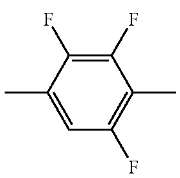
(15-14)
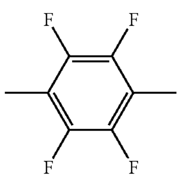
(15-15)
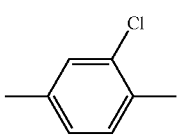
(15-16)
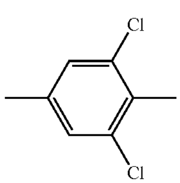
(15-17)
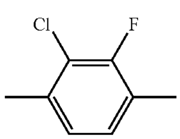
-continued
(15-18)
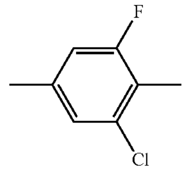
(15-19)
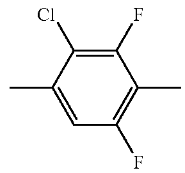
(15-20)
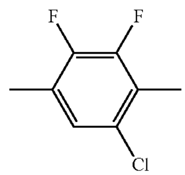
(15-21)
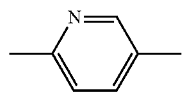
(15-22)
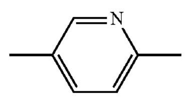
(15-23)
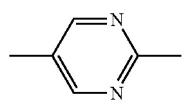
(15-24)
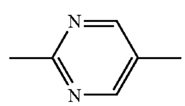
(15-25)
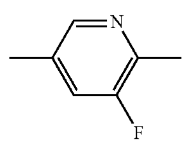
(15-26)
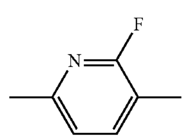
(15-27)
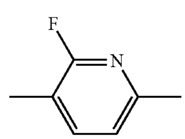
(15-28)
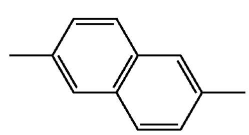

-continued (15-29)

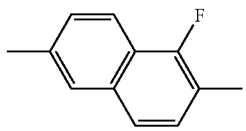

(15-30)

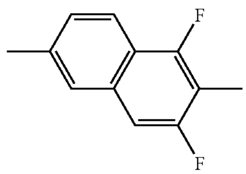

(15-31)

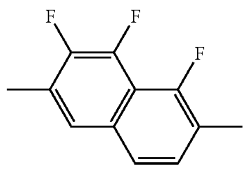

(15-32)

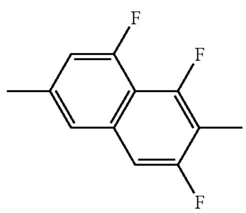

(15-33)

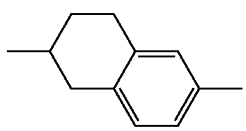

(15-34)

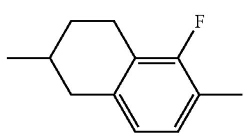

(15-35)

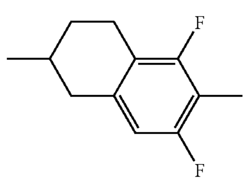

(15-36)

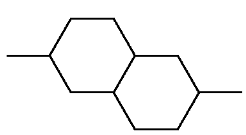

The most preferable examples of ring $A^1$, ring $A^2$, and ring $A^3$ are the rings (15-1), (15-8), (15-10), and (15-11).

Although a trans isomer and a cis isomer exist in the rings (15-1) to (15-5) and (15-33) to (15-36) as a stereoisomer, the trans isomer is preferable from the viewpoint of capability of increasing the maximum temperature.

Dielectric anisotropy is large when any one or all of ring $A^1$, ring $A^2$, and ring $A^3$ are the rings (15-5), (15-10), (15-11), (15-16), (15-18), (15-30), or (15-35).

Optical anisotropy is large when any one or all of ring $A^1$, ring $A^2$, and ring $A^3$ are 1,4-phenylene in which arbitrary hydrogen may be replaced by halogen, pyrimidine-2,5-diyl, or pyridine-2,5-diyl. Optical anisotropy is small when any one or all of rings ring $A^1$, ring $A^2$, and ring $A^3$ are 1,4-cyclohexylene, 1,4-cyclohexenylene, or 1,3-dioxane-2,5-diyl.

When at least two rings are 1,4-cyclohexylene, the maximum temperature is high, optical anisotropy is small, and viscosity is small. When at least one ring is 1,4-phenylene, optical anisotropy is relatively large, and an orientational order parameter is large. When at least two rings are 1,4-phenylene, optical anisotropy is large, the temperature range of liquid crystal phases is wide, and the maximum temperature is high.

In formula (1), $Z^1$, $Z^2$, and $Z^3$ are each independently a single bond, —$CH_2CH_2$—, —CH═CH—, —C≡C—, —COO—, —OCO—, —$CF_2O$—, —$OCF_2$—, —$CH_2O$—, —$OCH_2$—, —CF═CF—, —$(CH_2)_4$—, —$(CH_2)_2CF_2O$—, —$OCF_2$ $(CH_2)_2$—, —CH═CH$(CH_2)_2$—, or —$(CH_2)_2$ CH═CH—.

Preferable $Z^1$, $Z^2$, and $Z^3$ are a single bond, —$CH_2CH_2$—, —COO—, —OCO—, —$CH_2O$—, —$OCH_2$—, —$CF_2O$—, —$OCF_2$—, —CH═CH—, and —C≡C—.

More preferable $Z^1$, $Z^2$, and $Z^3$ are a single bond, —$CH_2CH_2$—, —COO—, —$CH_2O$—, and —$CF_2O$—.

The most preferable $Z^1$, $Z^2$, and $Z^3$ are a single bonds.

Viscosity is small when any one or all of $Z^1$, $Z^2$, and $Z^3$ are a single bond, —$(CH_2)_2$—, —$CH_2O$—, —$OCH_2$—, —$CF_2O$—, —$OCF_2$—, —CH═CH—, —CF═CF—, —$(CH_2)_2CF_2O$—, —$OCF_2$ $(CH_2)_2$—, or —$(CH_2)_4$—. Viscosity is smaller when any one or all of bonding groups are a single bond, —$(CH_2)_2$—, —$CF_2O$—, —$OCF_2$—, or —CH═CH—. Heat resistance or light resistance is excellent when any one or all of bonding groups are a single bond or —$(CH_2)_2$—. The temperature range of liquid crystal phases is wide and elastic constant ratios $K_{33}/K_{11}$ ($K_{33}$: bend elastic constant; $K_{11}$: spray elastic constant) are large when any one or all of bonding groups are —CH═CH—. Optical anisotropy is large when any one or all of bonding groups are —CH═CH—, —CF═CF—, —C≡C—, —CH═CH$(CH_2)_2$—, or —$(CH_2)_2$CH═CH—.

The configuration of a double bond such as —CH═CH— is preferably a trans isomer from the viewpoint of capability of widening a mesophase range and increasing the maximum temperature.

In formula (1), $L^1$ and $L^2$ are each independently hydrogen or halogen, and at least one of $L^1$ and $L^2$ is halogen. Dielectric anisotropy can be enlarged when one or all of $L^1$ and $L^2$ are halogen. Halogen includes fluorine, chlorine, and bromine. Fluorine and chlorine are preferable in terms of a dielectric constant, and fluorine is preferable in terms of stability. One of $L^1$ and $L^2$ is preferably fluorine, because dielectric anisotropy is further enlarged and stability is increased without increasing viscosity. Both of $L^1$ and $L^2$ are more preferably fluorine, because dielectric anisotropy is furthermore enlarged, and stability is further increased without increasing viscosity.

In formula (1), n and m are each independently an integer of 0 to 2, and the sum of n and m is an integer of 0 to 3. Viscosity is small when the sum of n and m is 0 or 1, and the maximum temperature is high when the sum of n and m is 1 or 2.

As mentioned above, a compound having objective physical properties can be obtained by appropriately selecting a kind of terminal groups, ring structures and bonding groups, and the number of rings. Therefore, the compound (1) is useful as a component of compositions used for devices, such as PC, TN, STN, ECB, OCB, IPS, and VA.

A preferable example of compound (1) is represented by formula (1-1) shown below. The compound having such structure shows liquid crystal phases in a wide temperature range, a high clearing point, a small viscosity, a large optical anisotropy, a large dielectric anisotropy, and an excellent compatibility with other liquid crystal compounds.

(1-1)

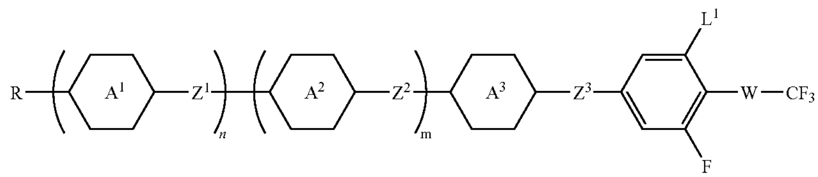

In the formula, R is hydrogen, alkyl having 1 to 12 carbons, alkenyl having 2 to 12 carbons, or alkoxy having 1 to 11 carbons;

ring $A^1$, ring $A^2$, and ring $A^3$ are each independently 1,4-cyclohexylene, 1,4-phenylene, 1,4-cyclohexenylene, 1,3-dioxane-2,5-diyl, tetrahydropyran-2,5-diyl, pyrimidine-2,5-diyl, or 1,4-phenylene in which arbitrary hydrogen is replaced by fluorine;

$Z^1$, $Z^2$, and $Z^3$ are each independently a single bond, —$CH_2CH_2$—, —CH═CH—, —C≡C—, —COO—, —OCO—, —$CF_2O$—, —$OCF_2$—, —$CH_2O$—, —$OCH_2$—, or —CF═CF—;

W is —CH═CH— or —C≡C—;

$L^1$ is hydrogen, fluorine, or chlorine; and n and m are each independently an integer of 0 to 2, and the sum of n and m is an integer of 0 to 3.

R in formula (1-1) is preferably hydrogen, alkyl having 1 to 12 carbons, alkenyl having 2 to 12 carbons, or alkoxy having 1 to 11 carbons from the aspect of stability, and R is more preferably hydrogen or alkyl having 1 to 12 carbons from the aspect of stability.

A compound in which any one or all of ring $A^1$, ring $A^2$, and ring $A^3$ in formula (1-1) are 1,4-cyclohexylene is particularly preferable in terms of an excellent stability, a wide range of liquid crystal phases, a high clearing point, and a small viscosity. The compound has a small optical anisotropy, and thus is effective for devices having a large cell gap.

A compound in which any one or all of ring $A^1$, ring $A^2$, and ring $A^3$ in formula (1-1) are 1,4-phenylene is particularly preferable in terms of an excellent stability, a high clearing point, and a small viscosity. The compound has a large optical anisotropy, and thus is effective for devices having a small cell gap.

A compound in which any one or all of ring $A^1$, ring $A^2$, and ring $A^3$ in formula (1-1) are 1,4-cyclohexenylene is particularly preferable in terms of a wide range of liquid crystal phases, a high clearing point, and a small viscosity.

A compound in which at least one of ring $A^1$, ring $A^2$, and ring $A^3$ in formula (1-1) is 1,3-dioxane-2,5-diyl is particularly preferable in terms of a large dielectric anisotropy.

A compound in which at least one of ring $A^1$, ring $A^2$, and ring $A^3$ in formula (1-1) is tetrahydropyran-2,5-diyl is particularly preferable in terms of a large dielectric anisotropy and an excellent compatibility with other liquid crystal compounds.

A compound in which at least one of ring $A^1$, ring $A^2$, and ring $A^3$ is pyrimidine-2,5-diyl has a large optical anisotropy, and thus is effective for devices having a small cell gap.

A compound in which any one or all of ring $A^1$, ring $A^2$, and ring $A^3$ in formula (1-1) are fluorine-substituted 1,4-phenylene is particularly preferable in terms of an excellent compatibility with other liquid crystal compounds. Further, the compound has a large optical anisotropy, and is effective for devices having a small cell gap.

More preferable examples of compound (1) are compounds (1-2) to (1-10) shown below. The compound having such structure shows an excellent stability, liquid crystal phases in a wide temperature range, without increasing viscosity, a higher clearing point, an appropriate optical anisotropy, a larger dielectric anisotropy, and an excellent compatibility with other liquid crystal compounds.

(1-2)

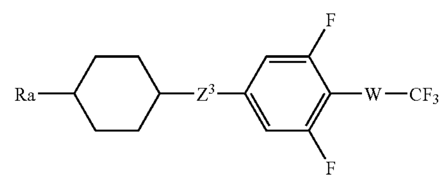

(1-3)

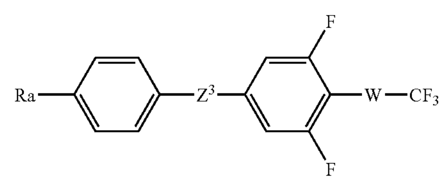

(1-4)

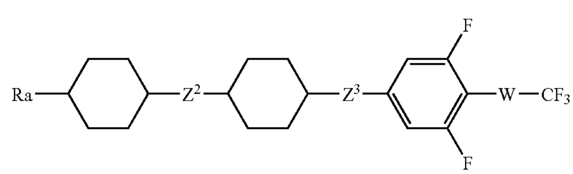

(1-5)

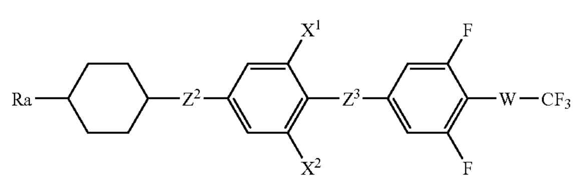

(1-6)

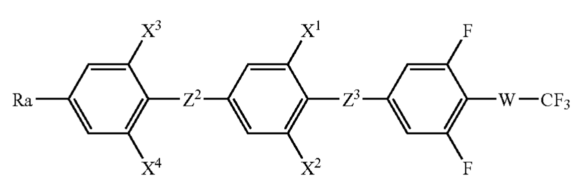

-continued (1-7)

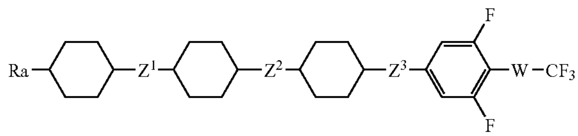

(1-8)

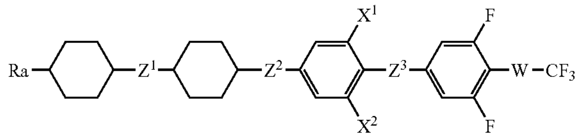

(1-9)

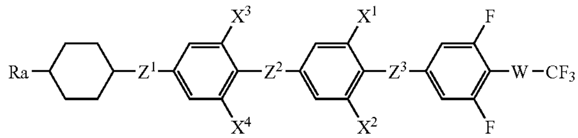

(1-10)

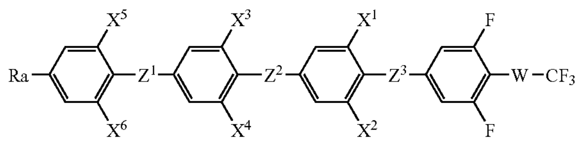

In the formulas, R is independently hydrogen, alkyl having 1 to 12 carbons, alkenyl having 2 to 12 carbons, or alkoxy having 1 to 11 carbons;

$Z^1$, $Z^2$, and $Z^3$ are each independently a single bond, —$CH_2CH_2$—, —CH═CH—, —COO—, or —$CF_2O$—;

$X^1$, $X^2$, $X^3$, $X^4$, $X^5$, and $X^6$ are each independently hydrogen or fluorine; and W is independently —CH═CH— or —C≡C—.

Among the compounds (1-2) to (1-10), a compound in which all of $Z^1$, $Z^2$, and $Z^3$ are a single bond is excellent from the aspect of stability, liquid crystal phases in a wide temperature range, a higher clearing point, and a large dielectric anisotropy.

Among the compounds (1-2) to (1-10), a compound in which $X^1$ is fluorine and $X^2$, $X^3$, $X^4$, $X^5$, and $X^6$ are hydrogen, a compound in which $X^1$ and $X^2$ are fluorine and $X^3$, $X^4$, $X^5$, and $X^6$ are hydrogen, a compound in which $X^1$ and $X^3$ are fluorine and $X^2$, $X^4$, $X^5$, and $X^6$ are hydrogen, and a compound in which $X^1$, $X^2$, and $X^3$ are fluorine and $X^4$, $X^5$, and $X^6$ are hydrogen, are particularly excellent from the aspect of a large dielectric anisotropy and a good compatibility with other liquid crystal compounds.

Among the compounds (1-2) to (1-10), a compound in which W is —CH═CH— is particularly excellent from the aspect of a high clearing point, and a good compatibility with other liquid crystal compounds.

The compound (1) whose structure is disclosed in this specification can be synthesized by appropriately combining methods in synthetic organic chemistry. Methods of introducing objective terminal groups, ring structures, and bonding groups into starting materials are described in Organic Syntheses (John Wiley & Sons, Inc), Organic Reactions (John Wiley & Sons, Inc), Comprehensive Organic Synthesis (Pergamon Press), New Experimental Chemistry Course (Shin Jikken Kagaku Kouza) (Maruzen), and so forth.

<Formation of Bonding Group $Z^1$, $Z^2$, or $Z^3$>

One example of methods of forming a bonding group $Z^1$, $Z^2$, or $Z^3$ will be shown. A scheme of forming the bonding groups are shown below. In this scheme, $MSG^1$ or $MSG^2$ is a monovalent organic group. A plurality of $MSG^1$ (or $MSG^2$) used in the scheme may be the same or different.

Compounds (1A) to (1K) Correspond to the Liquid Crystal Ccompound (1).

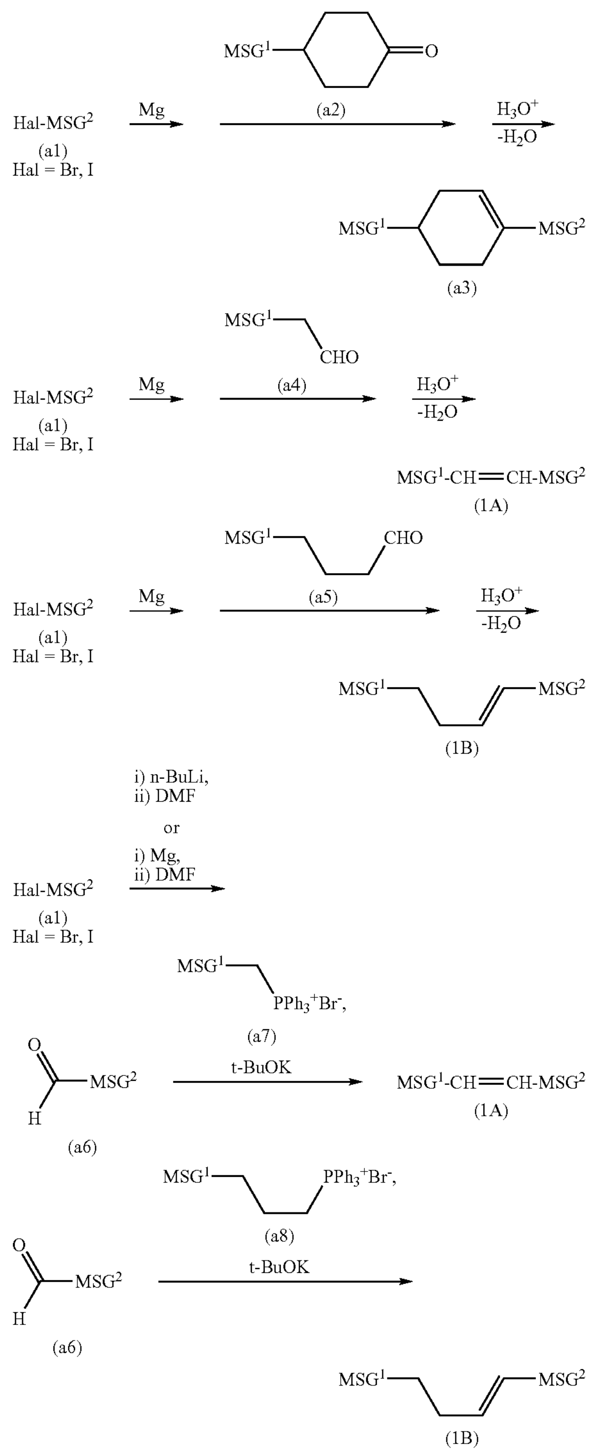

-continued

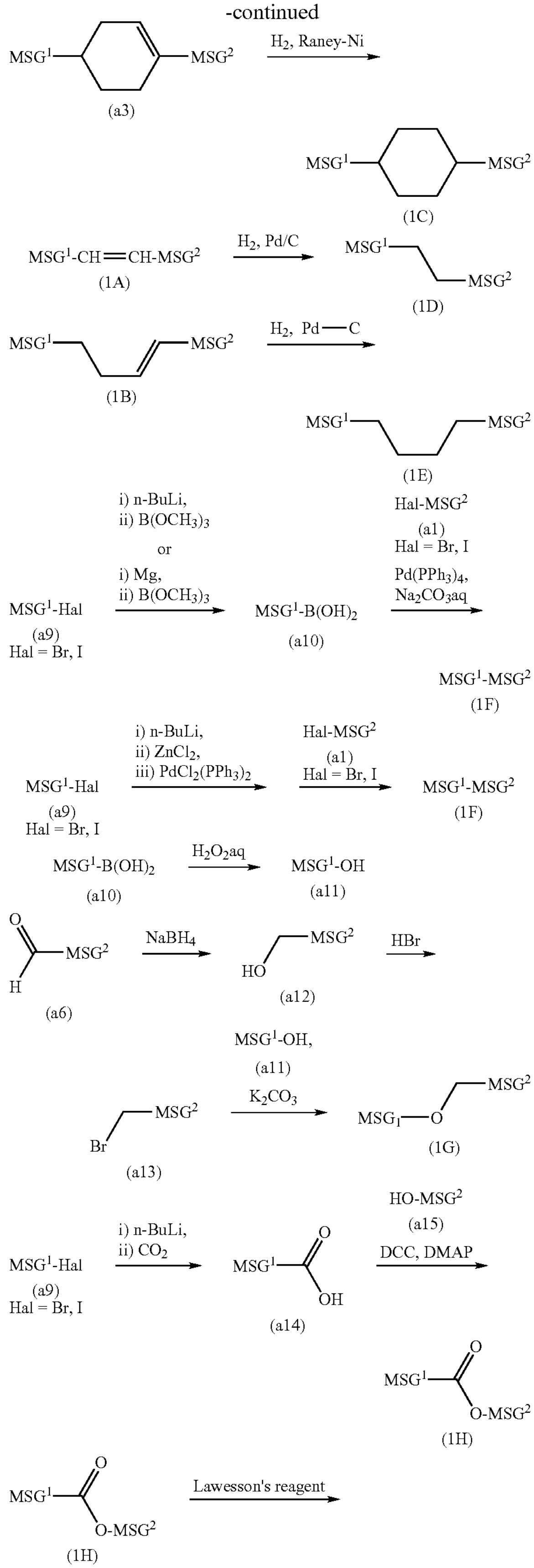

-continued

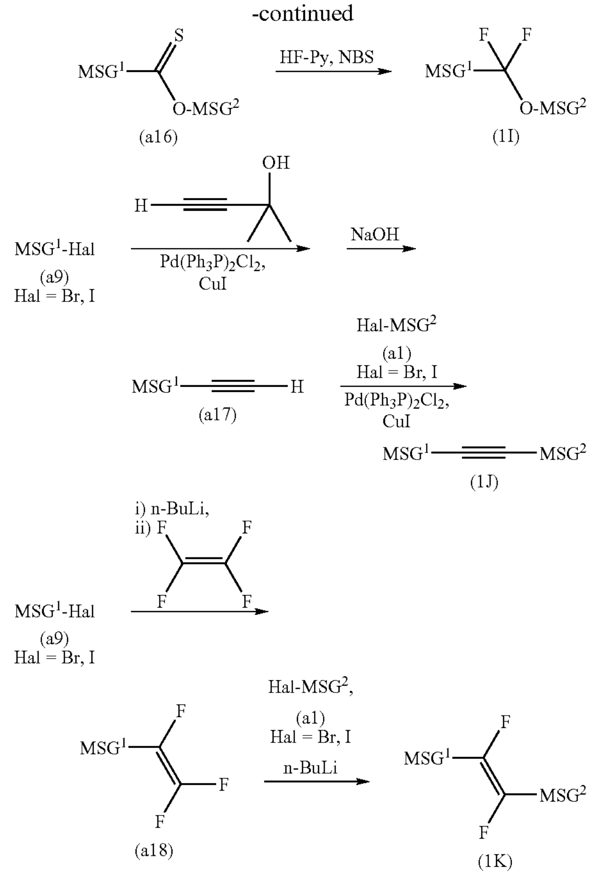

<Formation of Double Bond -1>

A Grignard reagent is prepared by reacting the organic halogenated compound (a1) having a monovalent organic group $MSG^2$ with magnesium. A corresponding alcohol derivative is synthesized by reacting the resulting Grignard reagent with the aldehyde derivative (a4) or (a5)

Then, the corresponding compound (1A) or (1B) having a double bond can be synthesized by dehydrating the resulting alcohol derivative using an acid catalyst such as p-toluenesulfonic acid.

<Formation of Double Bond -2)>

A compound obtained by treating the organic halogenated compound (a1) with butyl lithium or magnesium is reacted with formamide such as N,N-dimethylformamide (DMF), giving the aldehyde (a6). Then, the resulting aldehyde (a6) is reacted with phosphorus ylide obtained by treating phosphonium salt (a7) or (a8) with a base such as potassium t-butoxide (t-BuOK), whereby the corresponding compound (1A) or (1B) having the double bond can be synthesized. In the above reaction, a cis isomer may be produced depending on reaction conditions. When it is necessary to obtain a trans isomer, the cis isomer is isomerized to the trans isomer by a well known method if required.

<Formation of Single Bond -1>

A Grignard reagent is prepared by reacting the organic halogenated compound (a1) with magnesium. The corresponding alcohol derivative can be synthesized by reacting the resulting Grignard reagent with the cyclohexanone derivative (a2). Then, the corresponding compound (a3) having a double bond is synthesized by dehydrating the resulting alcohol derivative using an acid catalyst such as p-toluenesulfonic acid. The compound (1C) can be synthesized by hydrogenating the resulting compound (a3) in the presence of a catalyst such as Raney-Ni. The cyclohexanone derivative (a2) can be synthesized, for example, in accordance with the method described in JP S59-7122 A/1984.

<Formation of Single Bond -2>

A compound obtained by treating the organic halogenated compound (a9) having a monovalent organic group $MSG^1$ with butyl lithium or magnesium is reacted with a boric acid ester such as trimethyl borate, and then hydrolyzed with an acid such as hydrochloric acid, whereby the dihydroxy borane derivative (a10) is obtained. Next, the compound (1F) can be synthesized by reacting the resulting derivative (a10) with the organic halogenated compound (a1) in the presence of a catalyst composed of, for example, an aqueous solution of a carbonate and tetrakis(triphenylphosphine)palladium ($Pd(PPh_3)_4$).

The compound (1F) can also be synthesized by reacting the organic halogenated compound (a9) with butyl lithium, further reacting the reaction product with zinc chloride, and then reacting the resulting compound with the compound (a1) in the presence of, for example, a bistriphenylphosphinedichloropalladium ($Pd(PPh_3)_2Cl_2$) catalyst.

<Formation of —$(CH_2)_2$—>

The compound (1D) can be synthesized by hydrogenating the compound (1A) in the presence of a catalyst such as carbon-supported palladium (Pd/C).

<Formation of —$(CH_2)_4$—>

The compound (1E) can be synthesized by hydrogenating the compound (1B) in the presence of a catalyst such as Pd/C.

<Formation of —$CH_2O$— or —$OCH_2$—>

The alcohol derivative (a11) is obtained by oxidizing the dihydroxyborane derivative (a10) with an oxidizing agent such as hydrogen peroxide. Separately, the compound (a12) is obtained by reducing the aldehyde derivative (a6) with a reducing agent such as sodium borohydride. The organic halogenated compound (a13) is obtained by halogenating the resulting compound (a12) with hydrobromic acid or the like. The compound (1G) can be synthesized by reacting the compound (all) thus obtained with the compound (a13) in the presence of potassium carbonate or the like.

<Formation of —COO— and —OCO—>

The carboxylic acid derivative (a14) is obtained by reacting the compound (a9) with n-butyl lithium and then with carbon dioxide. The compound (1H) having —COO— can be synthesized by dehydrating the carboxylic acid derivative (a14) and the alcohol derivative (a15) obtained by the similar method for the compound (all), in the presence of 1,3-dicyclohexylcarbodiimide (DCC) and 4-dimethylaminopyridine (DMAP). A compound having —OCO— can also be synthesized by this method.

<Formation of —$CF_2O$— and —$OCF_2$—>

The compound (a16) is obtained by treating the compound (TH) with a thionating agent such as a Lawson reagent. The compound (1I) having —$CF_2O$— can be synthesized by fluorinating the compound (a16) with a hydrogen fluoride-pyridine complex and N-bromosuccinimide (NBS). Refer to M. Kuroboshi, et al., Chem. Lett., 1992, 827. The compound (1I) can also be synthesized by fluorinating the compound (a16) with (diethylamino) sulfur trifluoride (DAST). Refer to W. H. Bunnelle, et al., J. Org. Chem. 1990, 55, 768. A compound having —$OCF_2$— is also synthesized by this method. These bonding groups can also be formed by the method described in Peer. Kirsch, et al., Angew. Chem. Int. Ed. 2001, 40, 1480.

<Formation of —C≡C—>

The compound (a17) is obtained by reacting the compound (a9) with 2-methyl-3-butyne-2-ol in the presence of a catalyst composed of $Pd(Ph_3P)_2Cl_2$ and copper halide, and then deprotecting the reaction product under a basic condition. A compound (1J) can be synthesized by reacting the compound (a17) with the compound (a1) in the presence of a catalyst composed of $Pd(Ph_3P)_2Cl_2$ and copper halide.

<Formation of —CF═CF—>

The compound (a9) is treated with butyl lithium, and then reacted with tetrafluoroethylene, giving a compound (a18). The compound (a1) is treated with butyl lithium, and then reacted with the compound (a18), whereby the compound (1K) can be synthesized.

[Method of Preparing Liquid Crystal Compound (a)]

The following shows an example of preparing the liquid crystal compound (a), i.e., a liquid crystal compound (b6) which is represented by formula (1) and in which W is —CH═CH—. In the following reaction path, R, ring $A^1$, ring $A^2$, ring $A^3$, $Z^1$, $Z^2$, $Z^3$, $L^1$, $L^2$, n, and m have the same meanings as above.

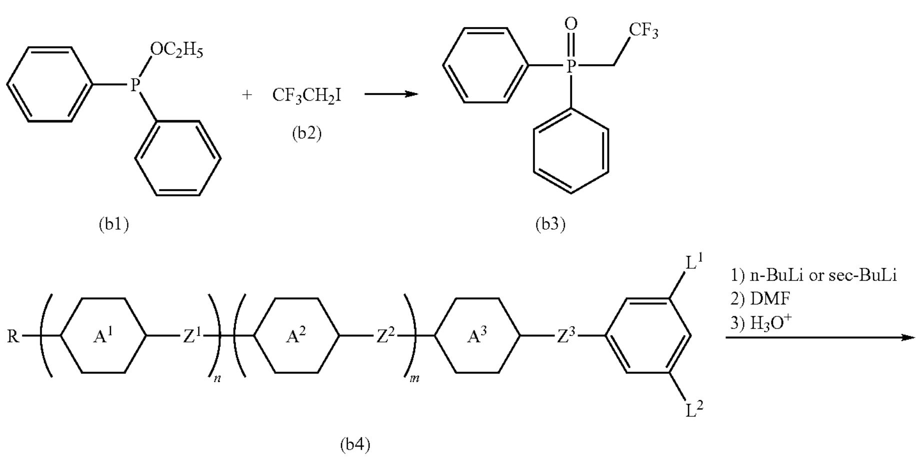

-continued

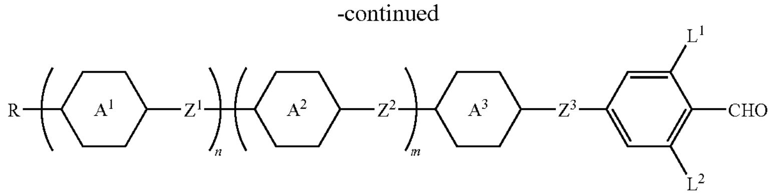

(b5)

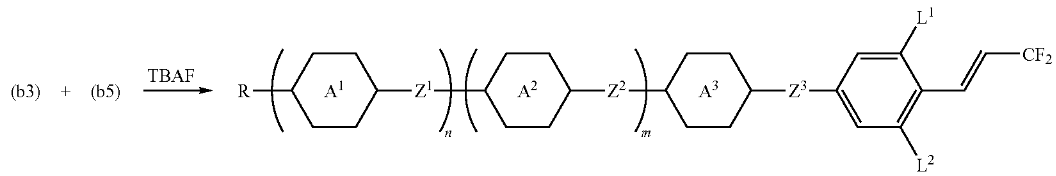

(b6)

2,2,2-Trifluoroethyldiphenylphosphine oxide (b3) is obtained by reacting ethyl diphenylphosphinite (b1) with 1,1,1-trifluoro-2-iodoethane (b2). Separately, the compound (b4) is lithiated with butyl lithium, and then reacted with N,N-dimethylformamide (DMF), giving the aldehyde derivative (b5). The compound (b6) having a trifluoropropenyl group, which is one example of the liquid crystal compound (a) of the invention can be prepared by reacting the compound (b3)eb;;j and the compound (b5) in the presence of tetrabutylammonium fluoride (TBAF).

Further, an example of preparing the liquid crystal compound (a), i.e., the liquid crystal compound (b9) which is represented by formula (1) and in which W is —C≡C—, will be shown. In the following reaction path, R, ring $A^1$, ring $A^2$, ring $A^3$, $Z^1$, $Z^2$, $Z^3$, $L^1$, $L^2$, n, and m have the same meanings as above.

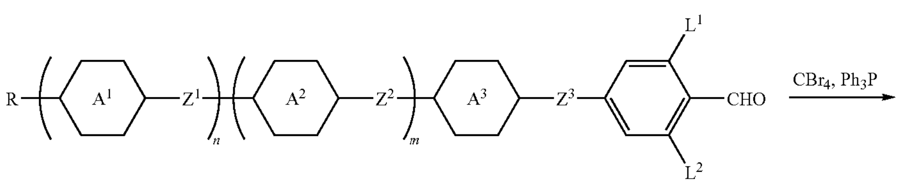

(b5)

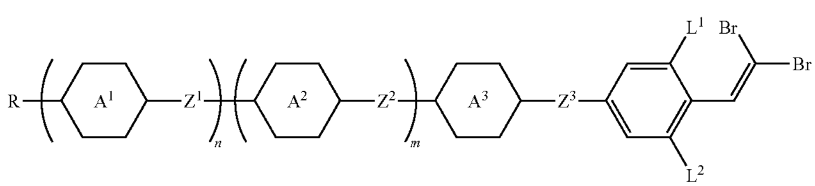

(b7)

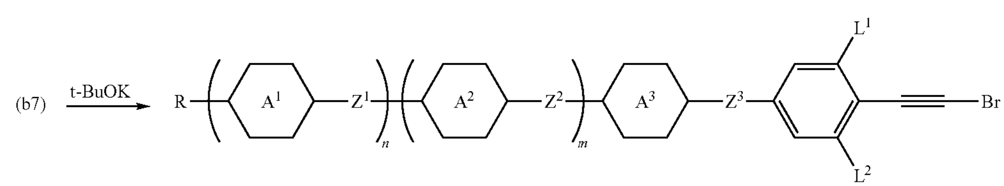

(b8)

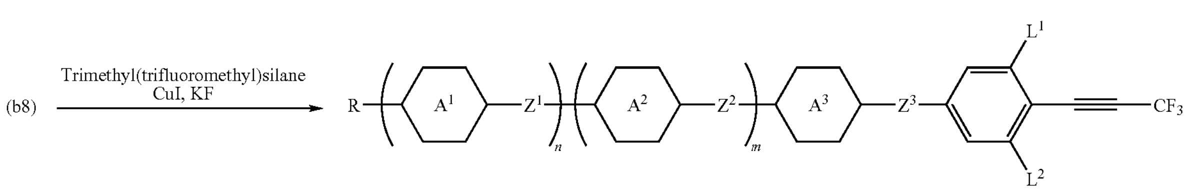

(b9)

The aldehyde derivative (b5) is converted into the styrene derivative (b7) with carbon tetrabromide ($CBr_4$) and triphenylphosphine ($Ph_3P$). The compound (b8) is obtained by dehydrobrominating the resulting compound (b7) with a base such as t-BuOK. The compound (b9) having a trifluoropropynyl group which is one example of the liquid crystal compound (a) of the invention can be prepared by reacting the compound (b8) with trimethyl(trifluoromethyl)silane in the presence of copper iodide and potassium fluoride.

Second, the composition of the invention will be further explained. The components of the composition may be only two or more kinds of a plurality of compounds selected from compound (1). A preferable composition comprises at least one compound selected from the compound (1) at a ratio of 1 to 99%. Further, the composition can comprise components selected from the group of compounds (2) to (13). For preparing the composition, the components are selected in consideration of the dielectric anisotropy of compound (1).

A preferable composition comprising compound (1) having a positively large dielectric anisotropy is as follows. The preferable composition comprises at least one compound selected from the group of compounds (2), (3), and (4). Another preferable composition comprises at least one compound selected from the group of compound (5). Still another preferable composition comprises at least two compounds selected from each of the two groups. These compositions may further comprise at least one compound selected from the group of compounds (11), (12), and (13), for adjusting the temperature range of liquid crystal phases, viscosity, optical anisotropy, dielectric anisotropy, threshold voltage, and so forth. These compositions may further comprise at least one compound selected from the group of compounds (6) to (10) for further adjusting physical properties. These compositions may further comprise compounds, such as other liquid crystal compounds and additives, for adaptation to AM-TN devices, STN devices, and so forth.

Another preferable composition comprises at least one compound selected from the group of compounds (11), (12), and (13). The composition may further comprise at least one compound selected from the group of compounds (2), (3), and (4) for further adjusting physical properties. The composition may further comprise compounds, such as other liquid crystal compounds and additives, for adaptation to AM-TN devices, STN devices, and so forth.

Another preferable composition comprises at least one compound selected from the group of compounds (11), (12), and (13). The composition may further comprise at least one compound selected from the group of compound (5) for further adjusting physical properties. The composition may further comprise compounds, such as other liquid crystal compounds and additives, for adaptation to AM-TN devices, STN devices, and so forth.

Another preferable composition comprises at least one compound selected from the group of compounds (6) to (10). The composition may further comprise at least one compound selected from the group of compounds (11), (12), and (13). The composition may further comprise at least one compound selected from the group of compounds (2) to (5) for further adjusting physical properties. The composition may further comprise compounds, such as other liquid crystal compounds and additives, for adaptation to VA devices and so forth.

The compounds (2), (3), and (4) have a positively large dielectric anisotropy, and are mainly used in compositions for AM-TN devices. In the compositions, the ratio of these compounds is in the range of 1% to 99%. A preferable ratio is in the range of 10% to 97%. A more preferable ratio is in the range of 20% to 60%. When the compound (11), (12), or (13) is further added to the composition, a preferable ratio of the compound is 60% or less. A more preferable ratio is 40% or less.

The compound (5) has a positively large dielectric anisotropy and is mainly used in compositions for STN devices. In the composition, the ratio of these compounds is in the range of 1% to 99%. A preferable ratio is in the range of 10% to 97%. A more preferable ratio is in the range of 40% to 95%. When the compound (11), (12), or (13) is further added to the composition, a preferable ratio of the compound is 60% or less. A more preferable ratio is 40% or less.

The compounds (6) to (10) have a negative dielectric anisotropy, and are mainly used in compositions for VA devices. A preferable ratio of these compounds is 80% or less. A more preferable ratio is 40% to 80%. When the compound (11), (12), or (13) is further added to the composition, a preferable ratio of the compound is 60% or less. A more preferable ratio is 40% or less.

The compounds (11), (12), and (13) have a small dielectric anisotropy. The compound (11) is mainly used for adjusting viscosity or optical anisotropy. The compounds (12) and (13) are used for increasing the maximum temperature to widen the temperature range of liquid crystal phases or adjusting optical anisotropy. When the ratio of the compounds (11), (12), and (13) is increased, the threshold voltage of the composition is increased and viscosity is reduced. Therefore, the compounds may be used at a large ratio as long as a desired value of threshold voltage of the composition is satisfied.

Preferable compounds (2) are the compounds (2-1) to (2-16), preferable compounds (3) are the compounds (3-1) to (3-112), preferable compounds (4) are the compounds (4-1) to (4-52), preferable compounds (5) are the compounds (5-1) to (5-62), preferable compounds (6) are the compounds (6-1) to (6-6), preferable compounds (7) are the compounds (7-1) to (7-16), preferable compounds (8) are the compounds (8-1) to (8-3), preferable compounds (9) are the compounds (9-1) to (9-3), preferable compounds (10) are the compounds (10-1) to (10-3), preferable compounds (11) are the compounds (11-1) to (11-11), preferable compounds (12) are the compounds (12-1) to (12-18), and preferable compounds (13) are the compounds (13-1) to (13-6).

In these compounds, the meanings of symbols $R^1$, $R^2$, $R^3$, $R^4$, $R^5$, $R^6$, $M^1$, and $M^2$ are identical to the meanings of symbols in the compounds (2) to (13).

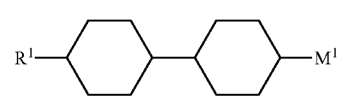

(2-1)

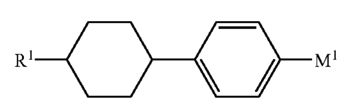

(2-2)

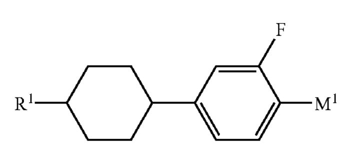

(2-3)

-continued
(2-4)
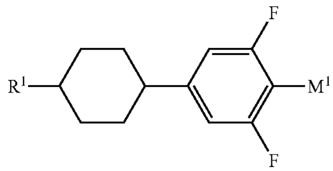
(2-5)
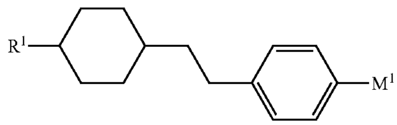
(2-6)
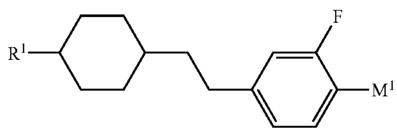
(2-7)
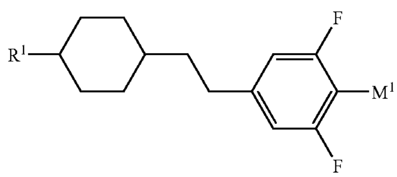
(2-8)
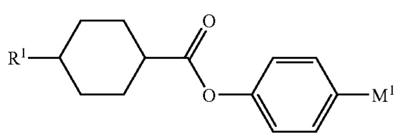
(2-9)
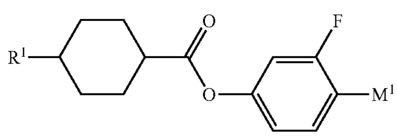
(2-10)
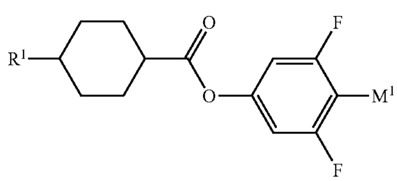
(2-11)
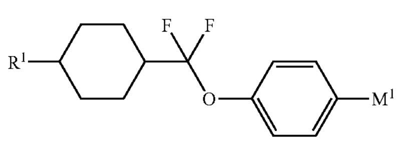
(2-12)
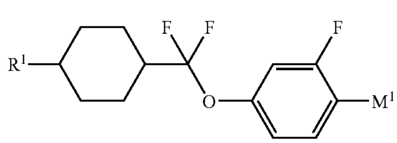
(2-13)
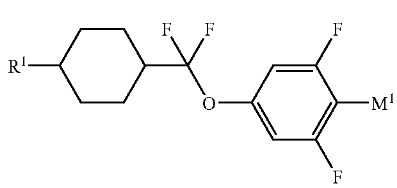
-continued
(2-14)
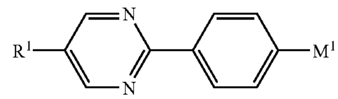
(2-15)
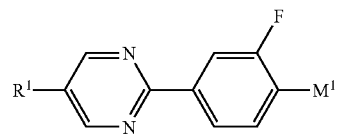
(2-16)
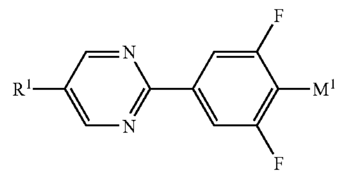
(3-1)
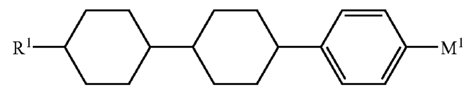
(3-2)
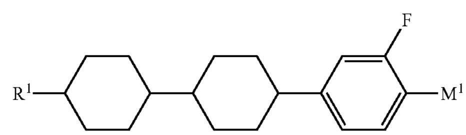
(3-3)
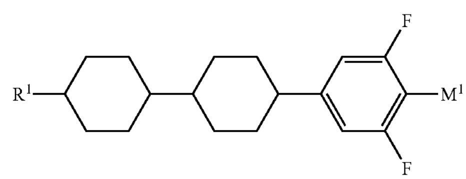
(3-4)
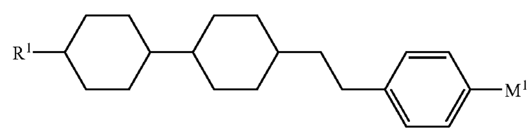
(3-5)
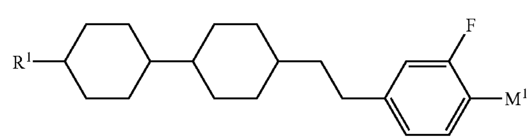
(3-6)
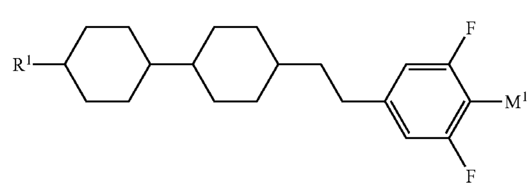
(3-7)
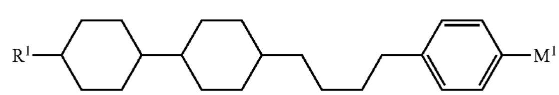
(3-8)
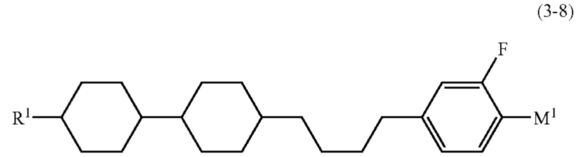

-continued
(3-9)
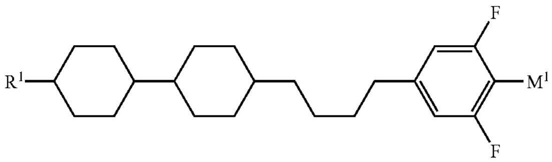
(3-10)
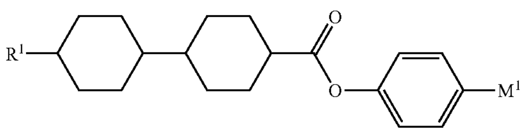
(3-11)
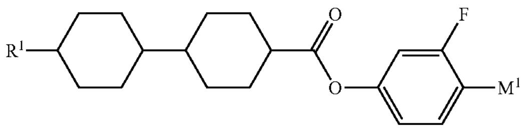
(3-12)
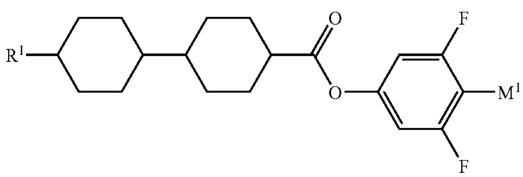
(3-13)
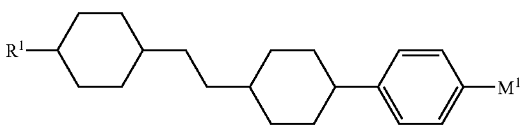
(3-14)
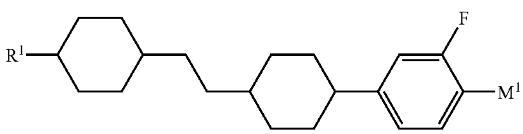
(3-15)
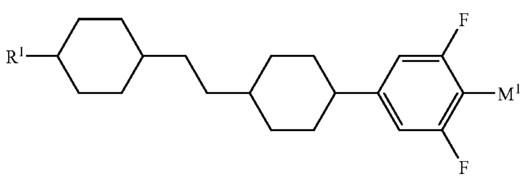
(3-16)
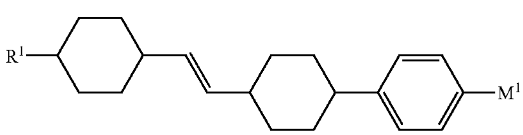
(3-17)
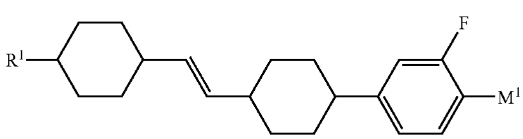
-continued
(3-18)
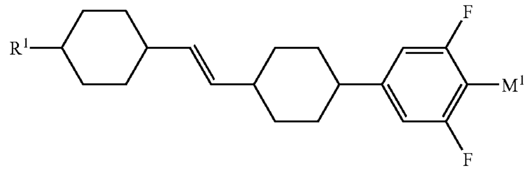
(3-19)
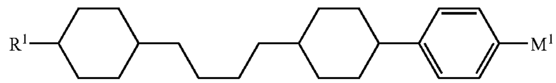
(3-20)
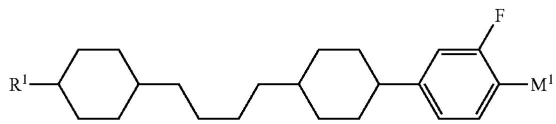
(3-21)
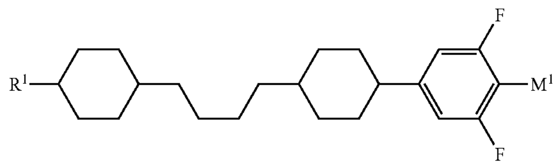
(3-22)
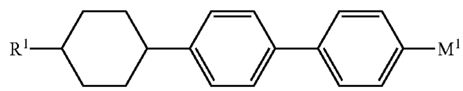
(3-23)
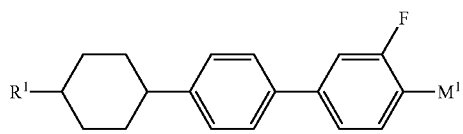
(3-24)
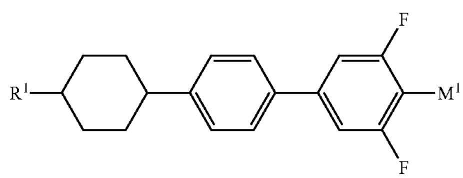
(3-25)
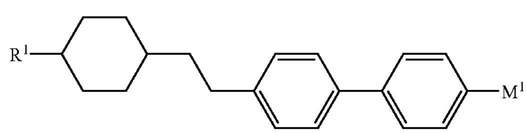
(3-26)
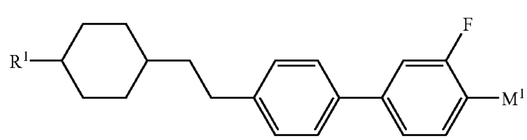
(3-27)
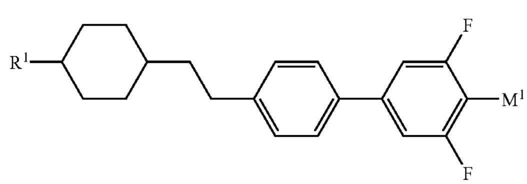

-continued
(3-28)
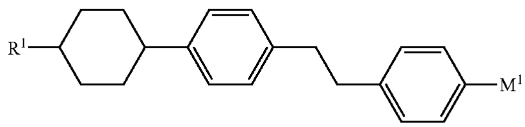
(3-29)
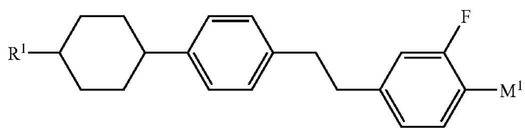
(3-30)
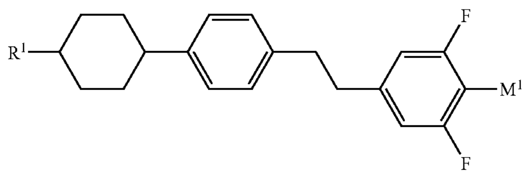
(3-31)
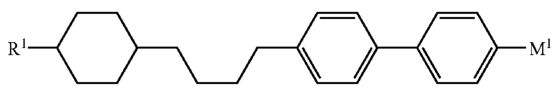
(3-32)
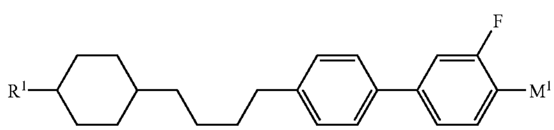
(3-33)
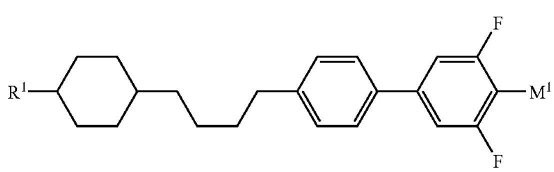
(3-34)
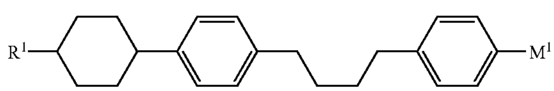
(3-35)
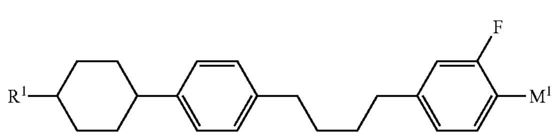
(3-36)
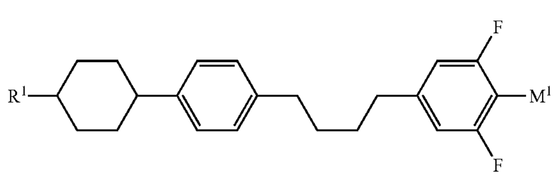
(3-37)
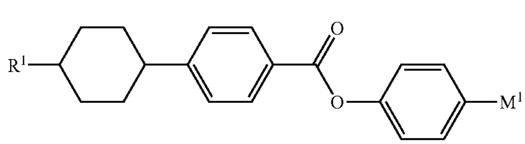
-continued
(3-38)
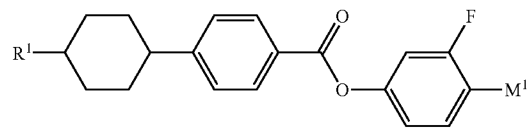
(3-39)
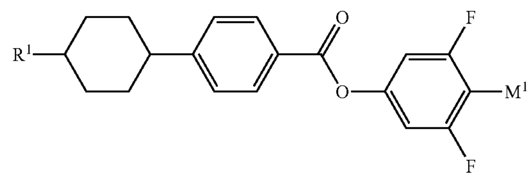
(3-40)
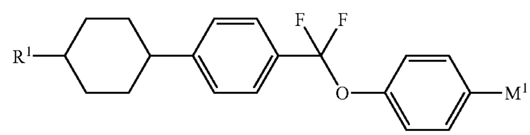
(3-41)
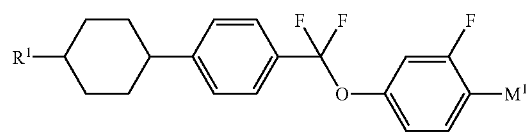
(3-42)
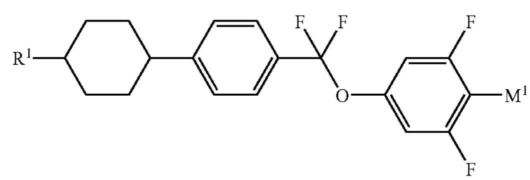
(3-43)
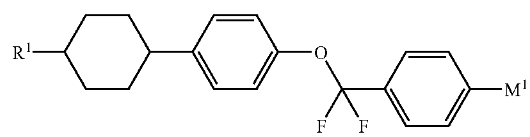
(3-44)
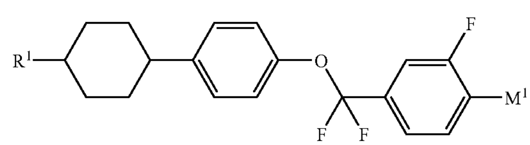
(3-45)
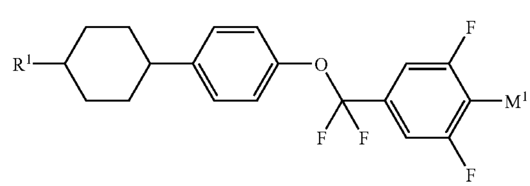
(3-46)
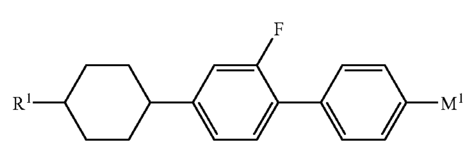

-continued
(3-47)
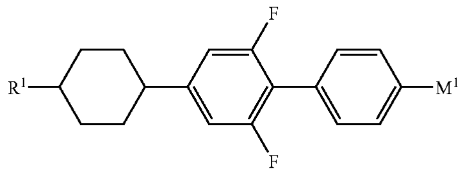
(3-48)
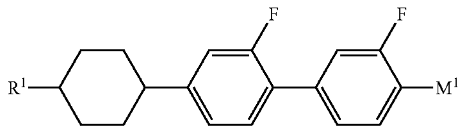
(3-49)
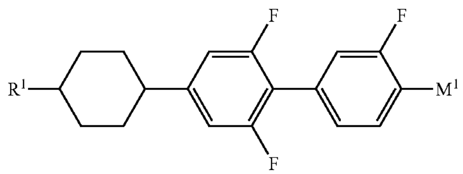
(3-50)
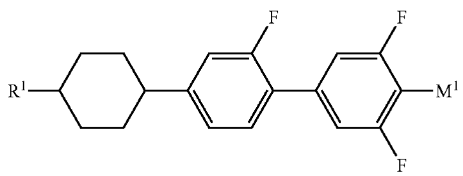
(3-51)
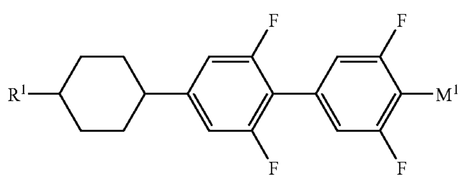
(3-52)
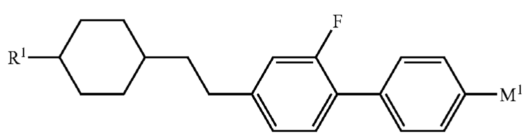
(3-53)
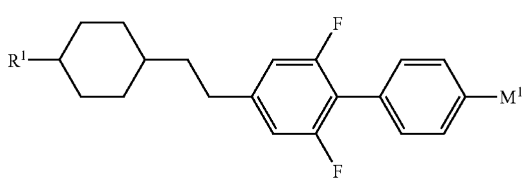
(3-54)
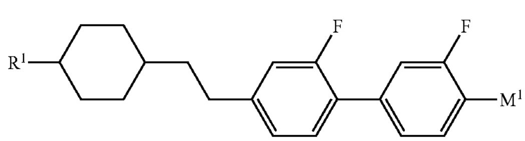
(3-55)
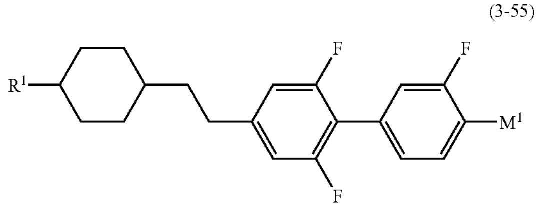
-continued
(3-56)
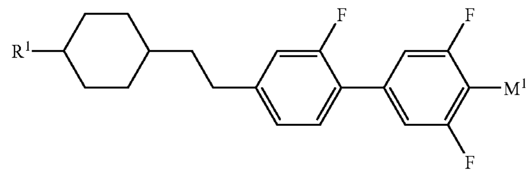
(3-57)
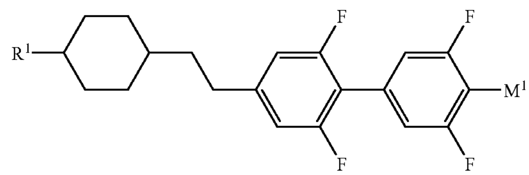
(3-58)
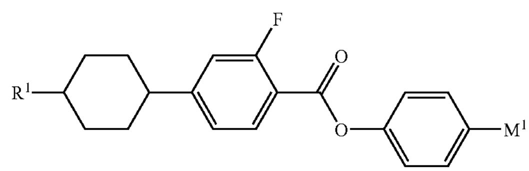
(3-59)
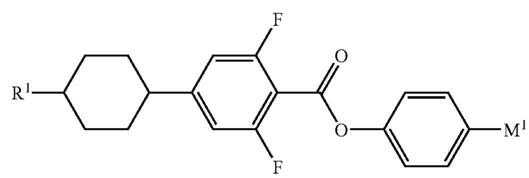
(3-60)
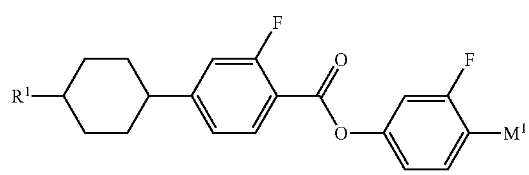
(3-61)
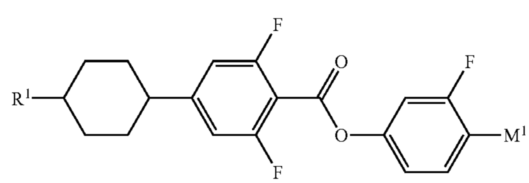
(3-62)
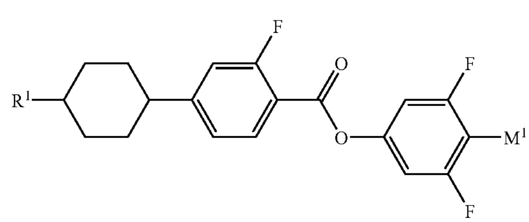

-continued
(3-63)
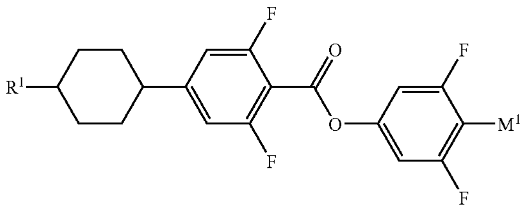
(3-64)
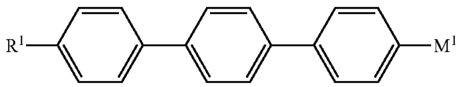
(3-65)
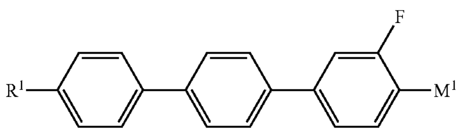
(3-66)
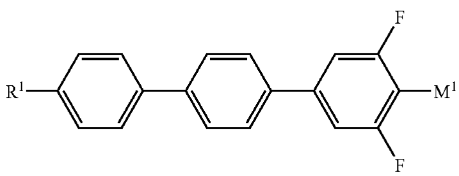
(3-67)
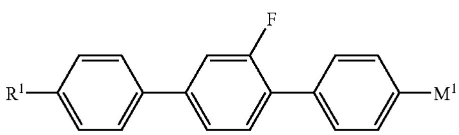
(3-68)
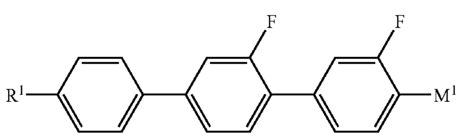
(3-69)
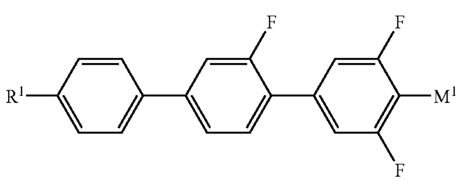
(3-70)
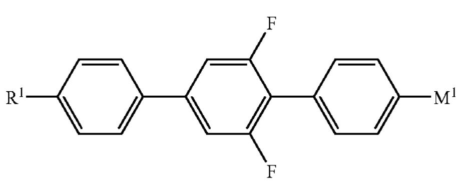
(3-71)
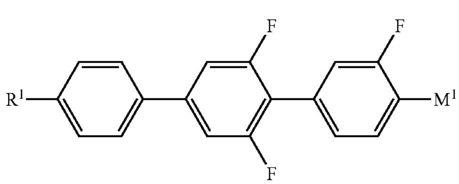
(3-72)
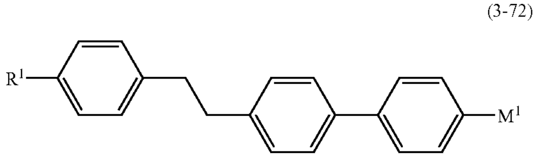
-continued
(3-73)
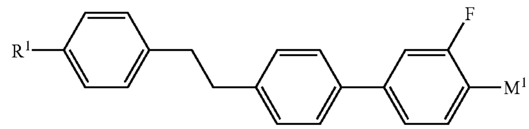
(3-74)
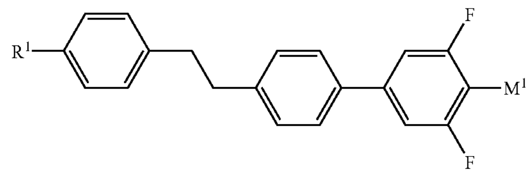
(3-75)
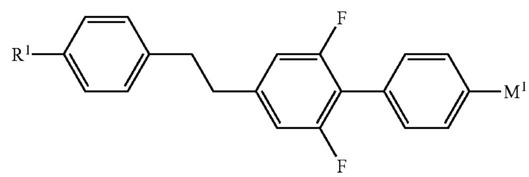
(3-76)
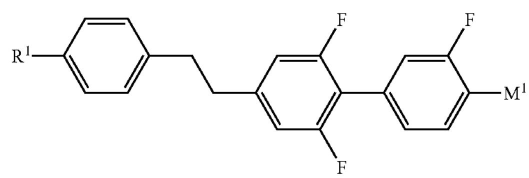
(3-77)
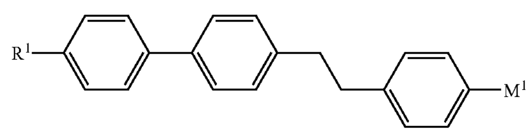
(3-78)
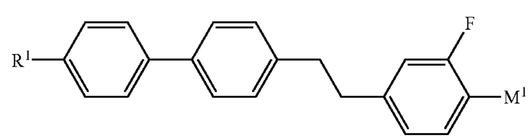
(3-79)
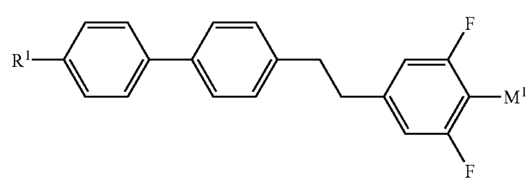
(3-80)
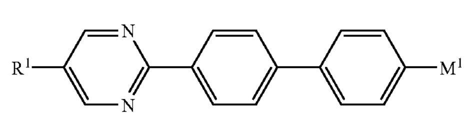
(3-81)
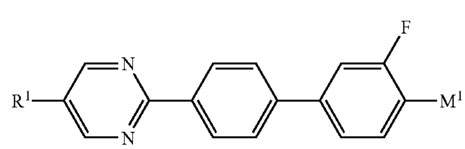

-continued
(3-82)
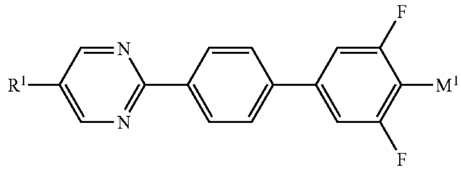
(3-83)
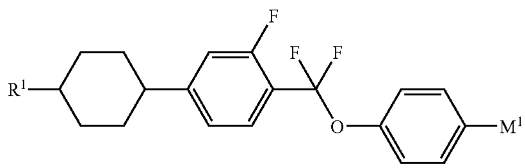
(3-84)
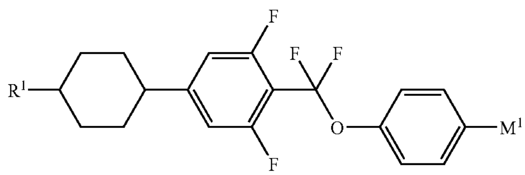
(3-85)
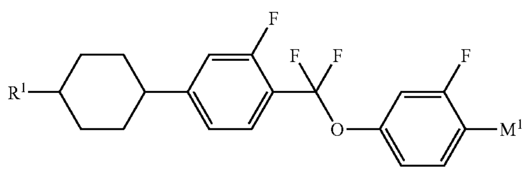
(3-86)
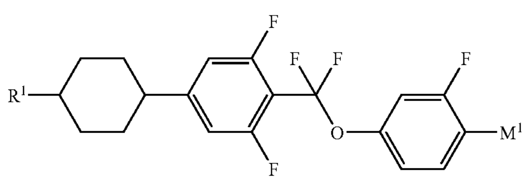
(3-87)
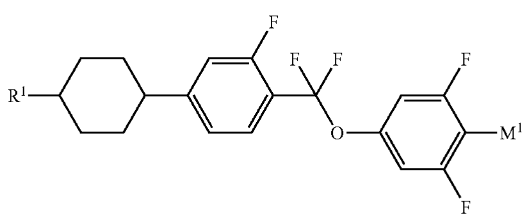
(3-88)
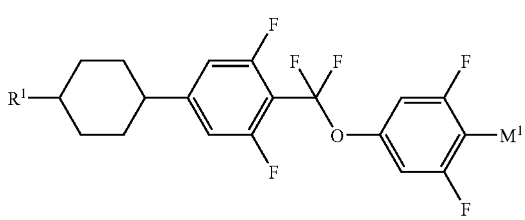
(3-89)
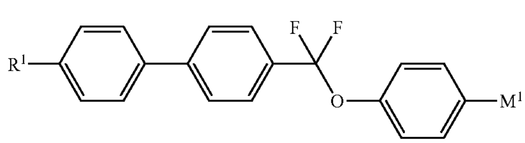
-continued
(3-90)
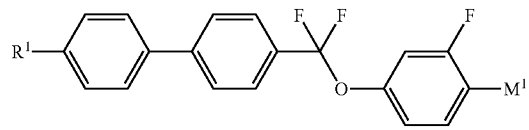
(3-91)
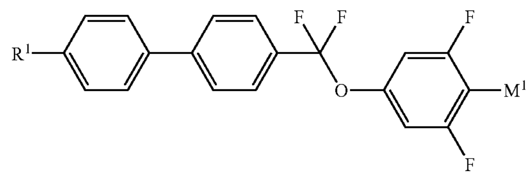
(3-92)
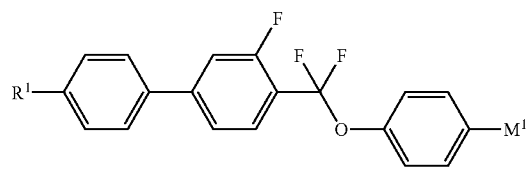
(3-93)
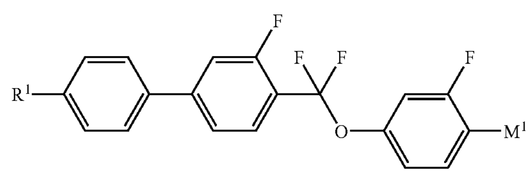
(3-94)
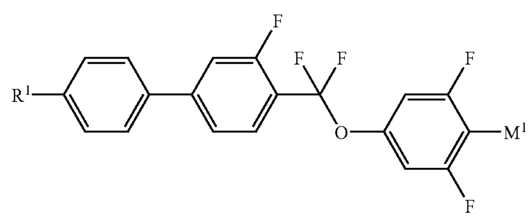
(3-95)
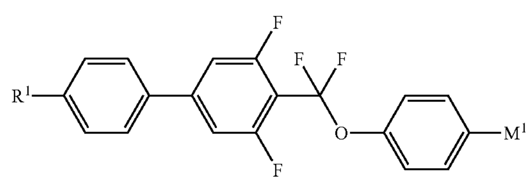
(3-96)
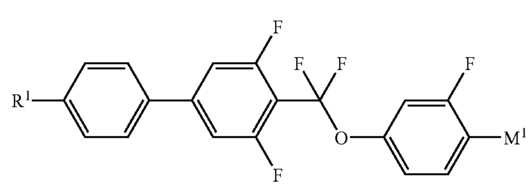
(3-97)
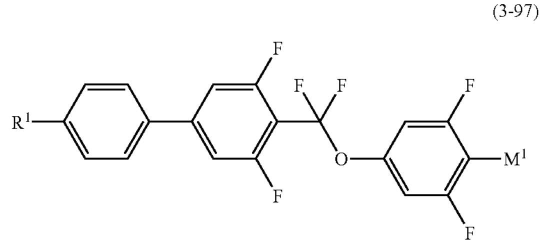

-continued
(3-98)
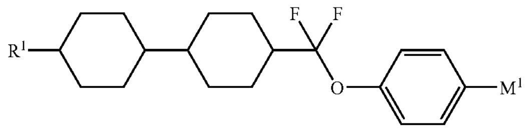
(3-99)
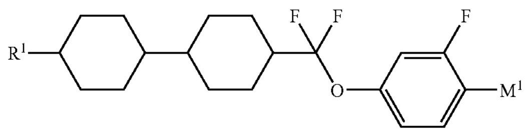
(3-100)
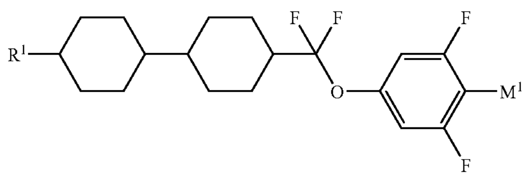
(3-101)
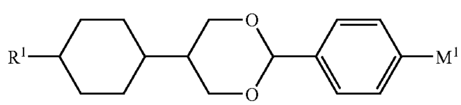
(3-102)
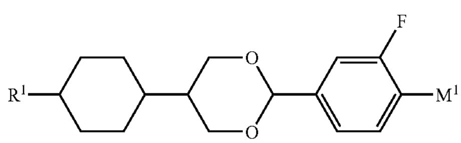
(3-103)
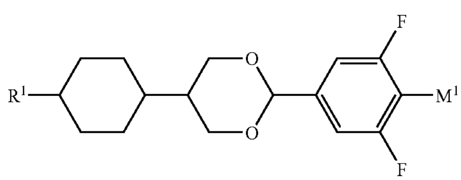
(3-104)
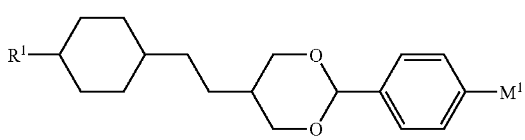
(3-105)
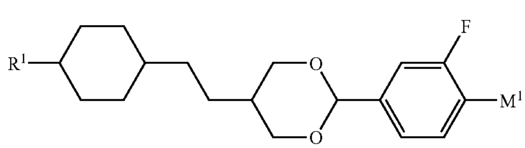
(3-106)
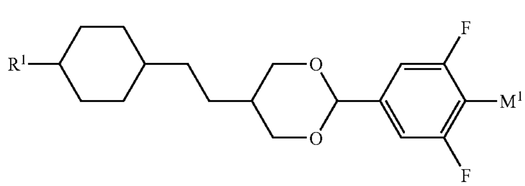
-continued
(3-107)
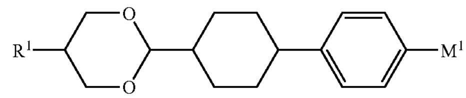
(3-108)
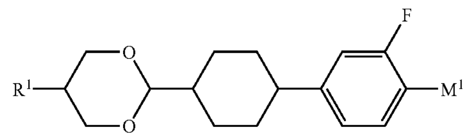
(3-109)
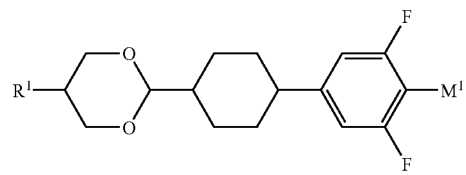
(3-110)
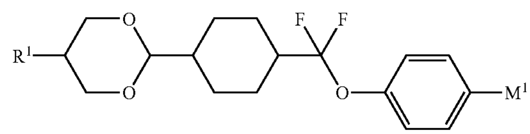
(3-111)
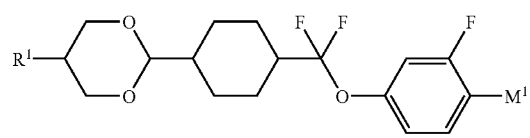
(3-112)
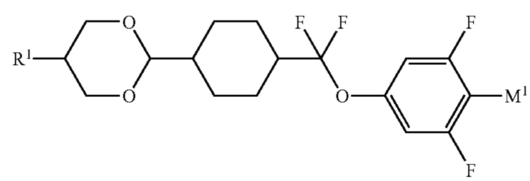
(4-1)
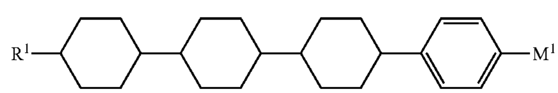
(4-2)
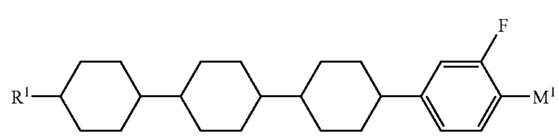
(4-3)
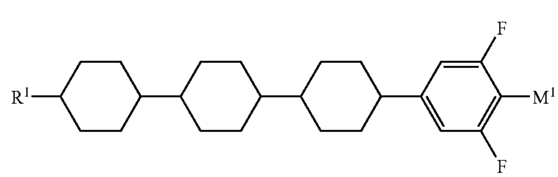
(4-4)
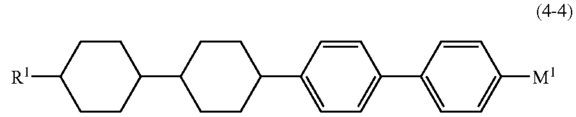

-continued
(4-5)
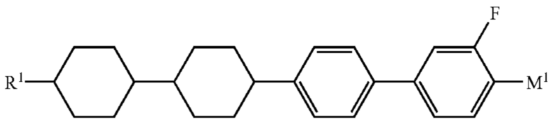
(4-6)
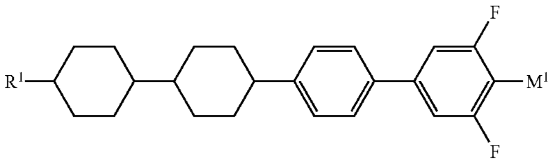
(4-7)
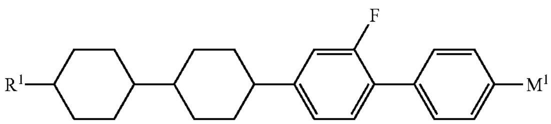
(4-8)
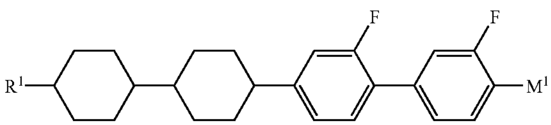
(4-9)
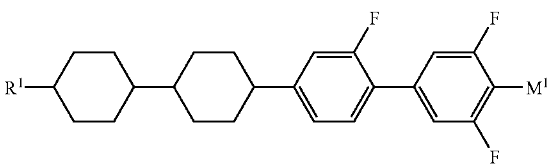
(4-10)
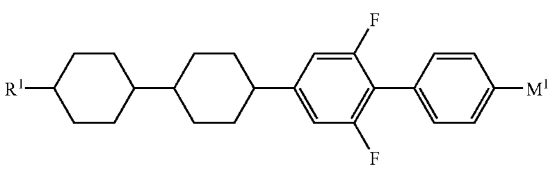
(4-11)
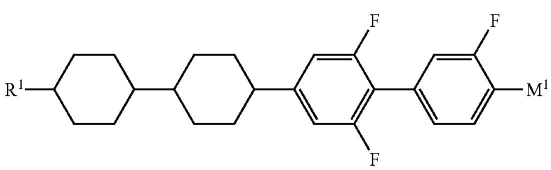
(4-12)
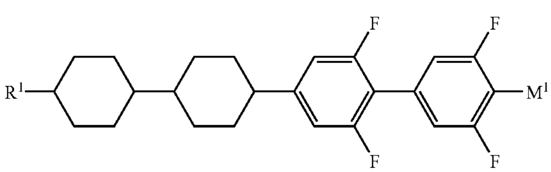
(4-13)
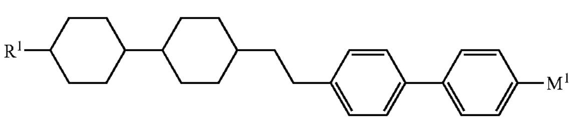
-continued
(4-14)
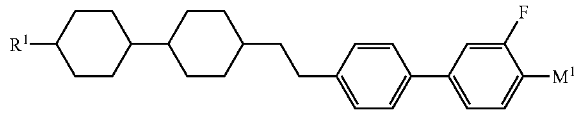
(4-15)
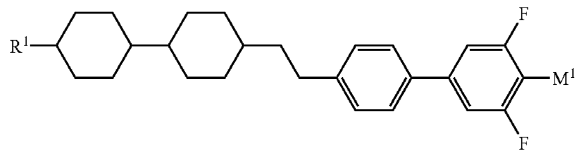
(4-16)
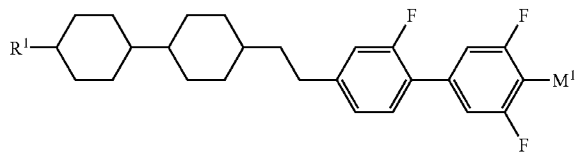
(4-17)
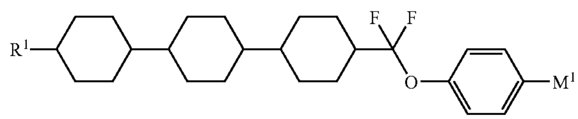
(4-18)
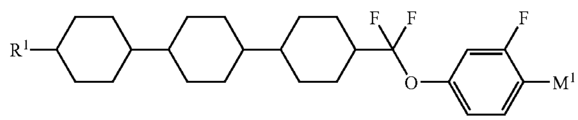
(4-19)
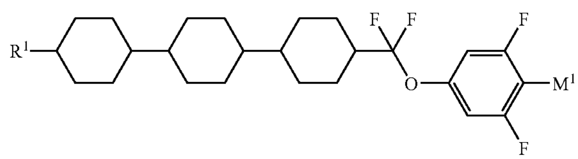
(4-20)
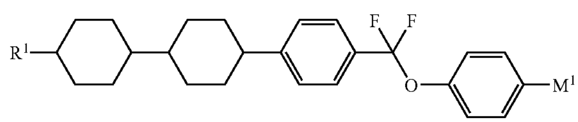
(4-21)
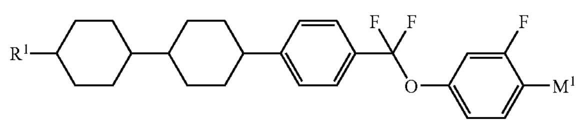
(4-22)
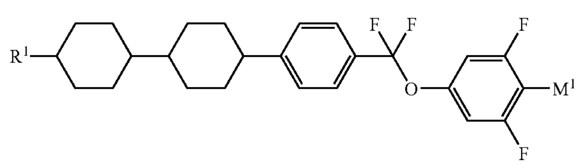
(4-23)
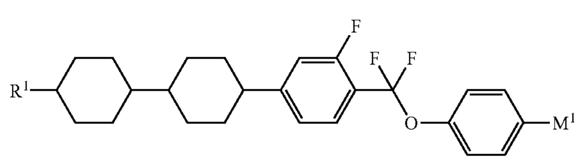

-continued
(4-24)
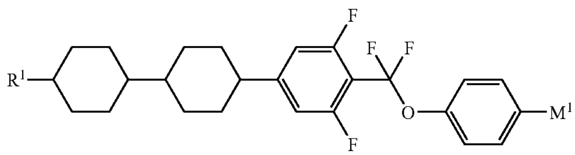
(4-25)
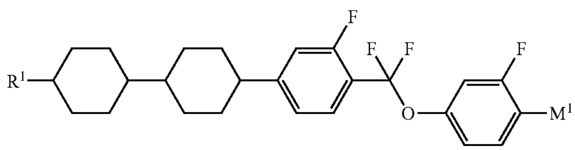
(4-26)
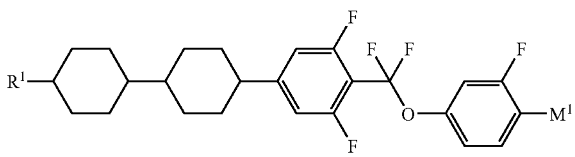
(4-27)
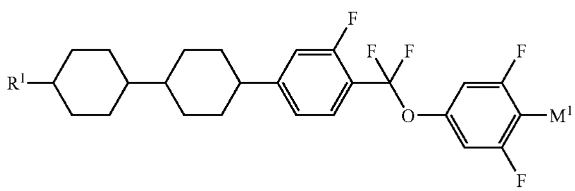
(4-28)
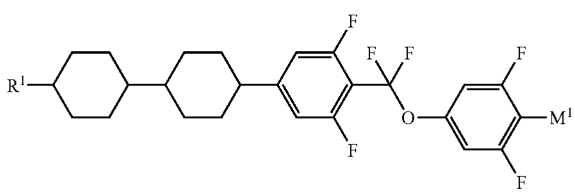
(4-29)
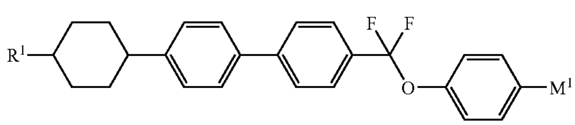
(4-30)
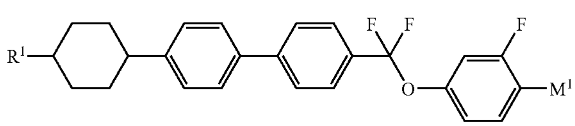
(4-31)
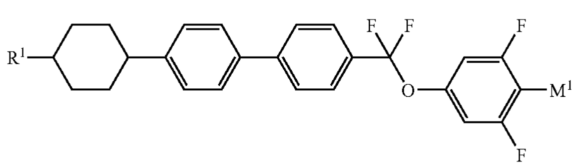
(4-32)
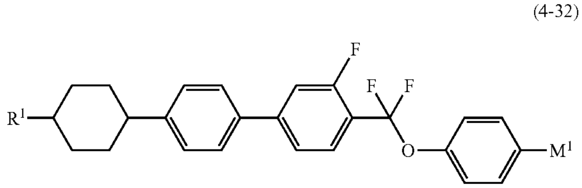
-continued
(4-33)
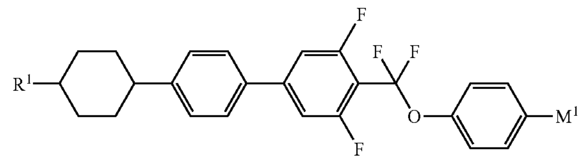
(4-34)
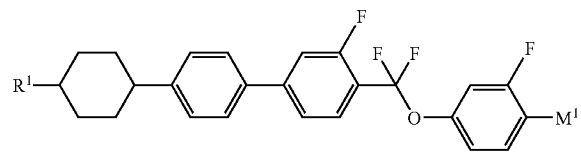
(4-35)
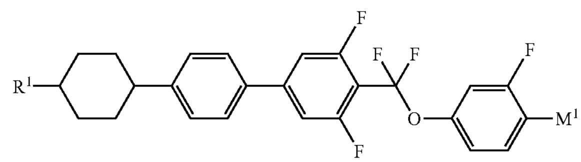
(4-36)
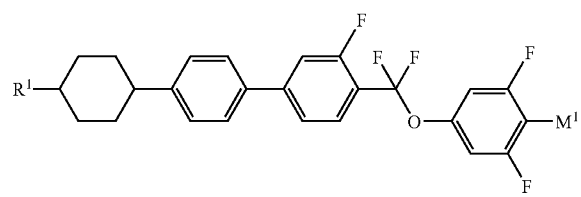
(4-37)
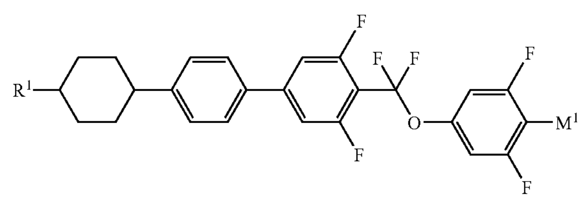
(4-38)
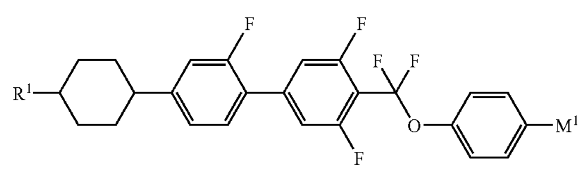
(4-39)
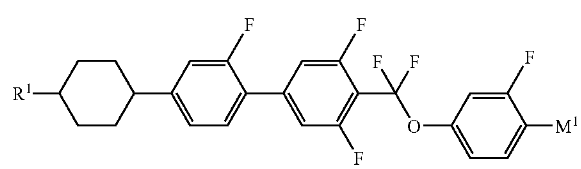
(4-40)
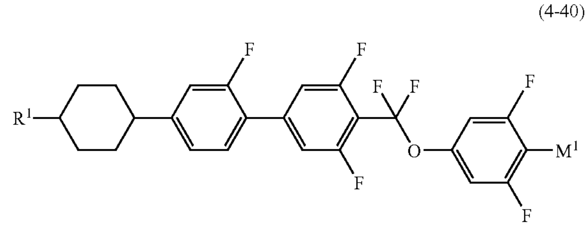

-continued
(4-41)
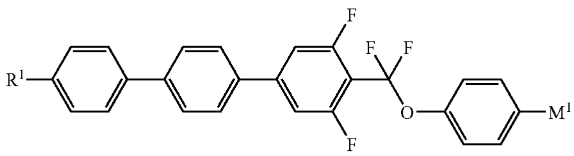
(4-42)
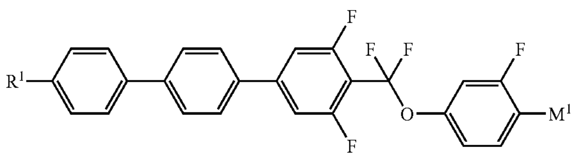
(4-43)
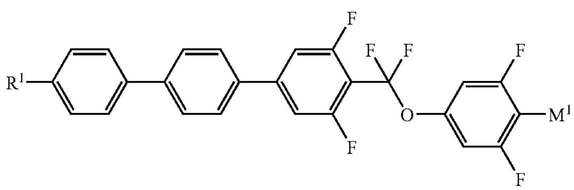
(4-44)
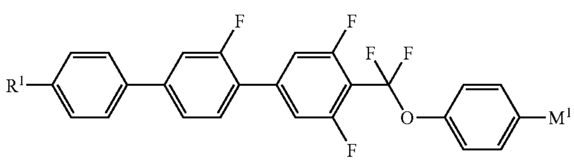
(4-45)
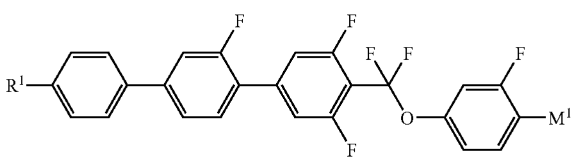
(4-46)
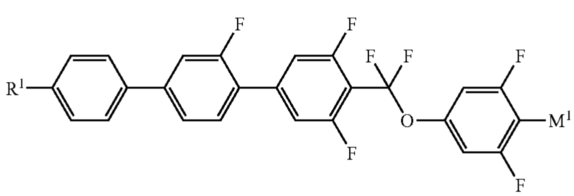
(4-47)
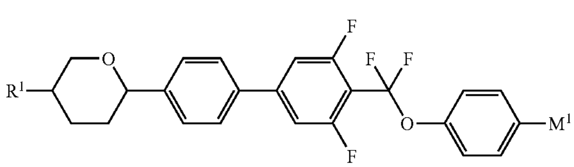
(4-48)
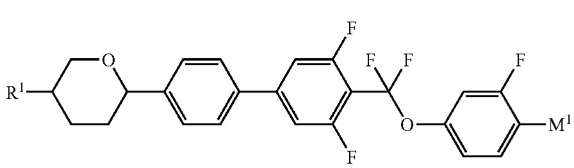
-continued
(4-49)
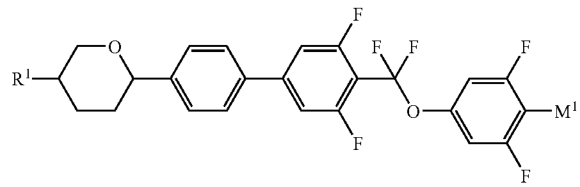
(4-50)
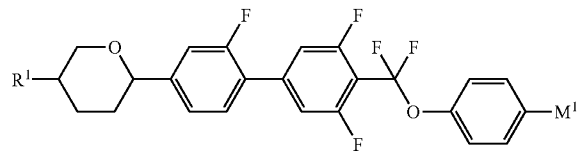
(4-51)
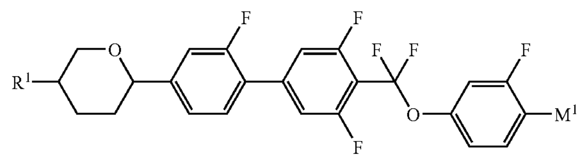
(4-52)
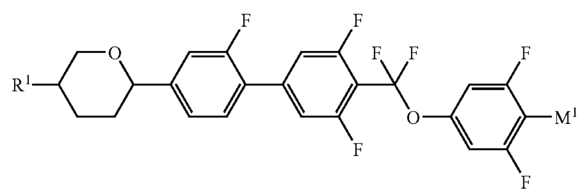
(5-1)
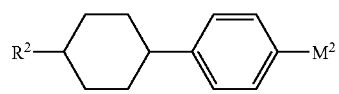
(5-2)
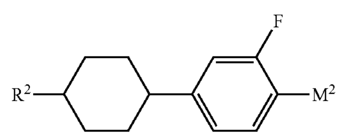
(5-3)
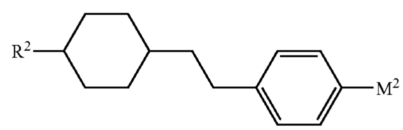
(5-4)
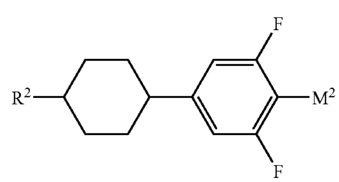
(5-5)
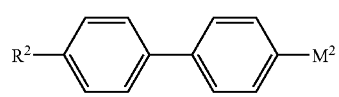
(5-6)
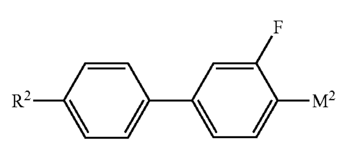

-continued
(5-7)
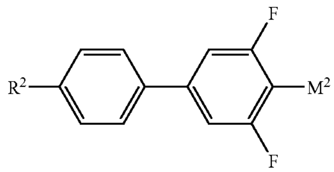
(5-8)
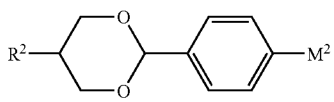
(5-9)
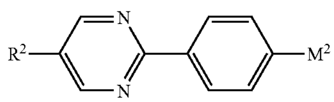
(5-10)
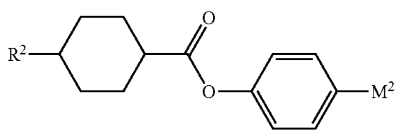
(5-11)
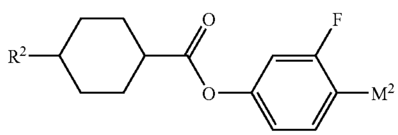
(5-12)
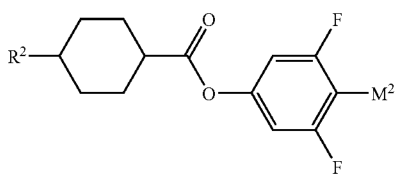
(5-13)
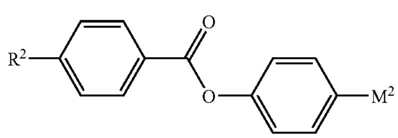
(5-14)
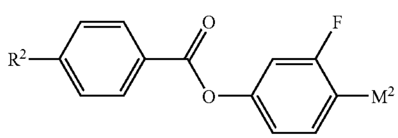
(5-15)
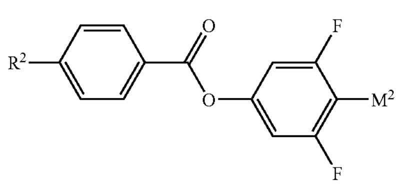
(5-16)
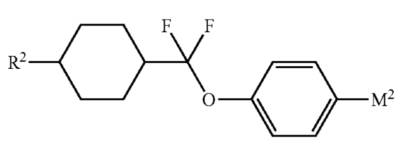
(5-17)
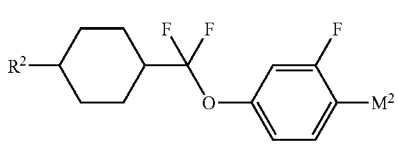
-continued
(5-18)
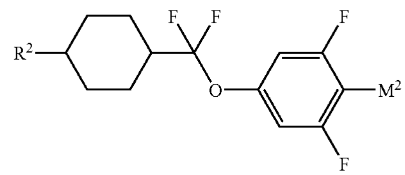
(5-19)
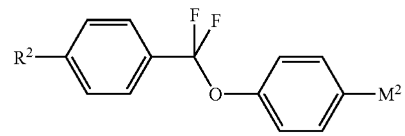
(5-20)
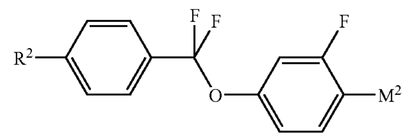
(5-21)
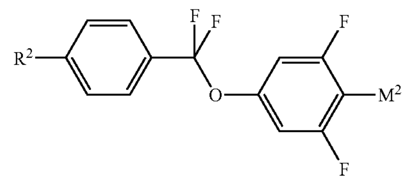
(5-22)
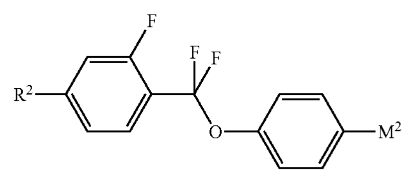
(5-23)
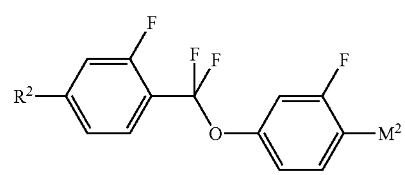
(5-24)
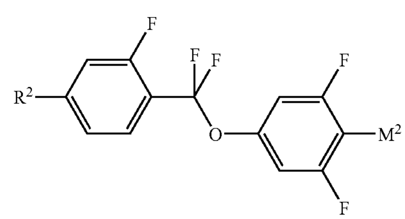
(5-25)
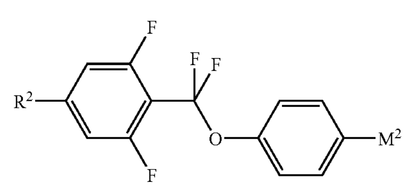
(5-26)
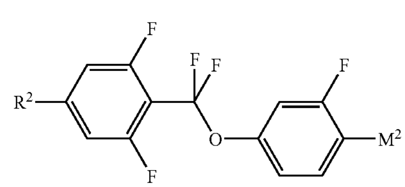

-continued
(5-27)
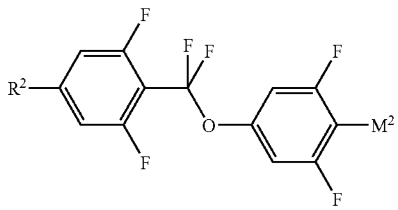
(5-28)
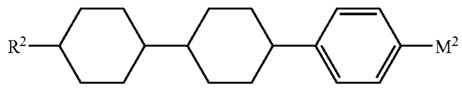
(5-29)
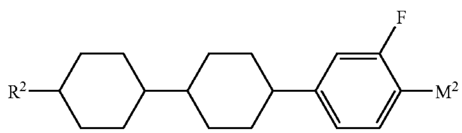
(5-30)
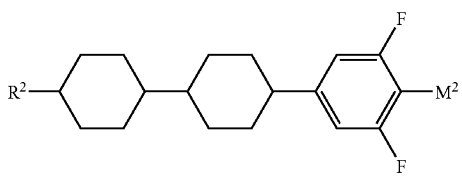
(5-31)
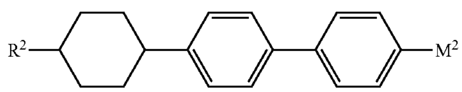
(5-32)
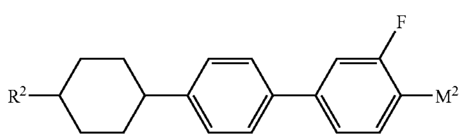
(5-33)
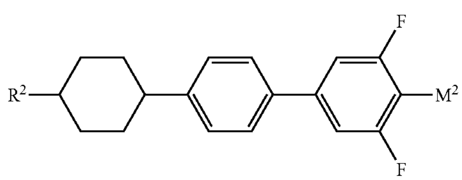
(5-34)
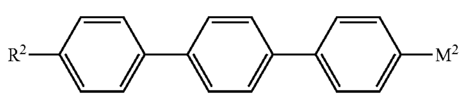
(5-35)
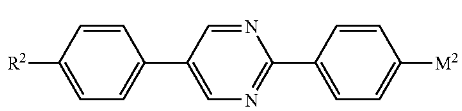
(5-36)
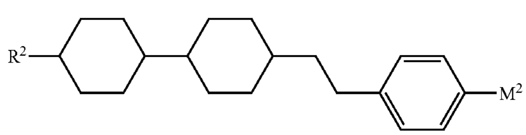
(5-37)
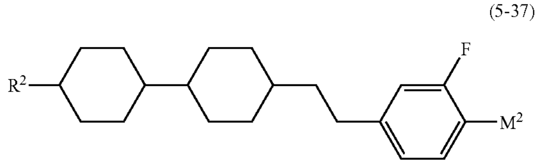
-continued
(5-38)
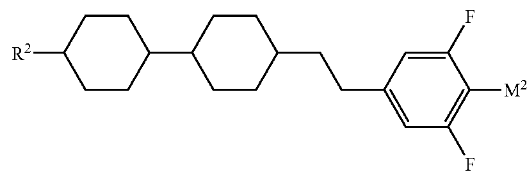
(5-39)
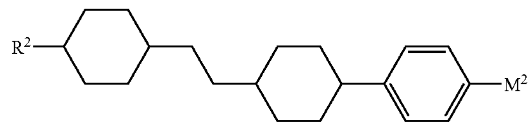
(5-40)
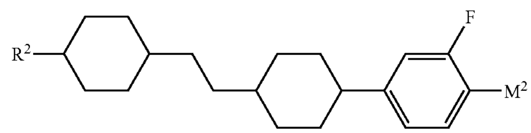
(5-41)
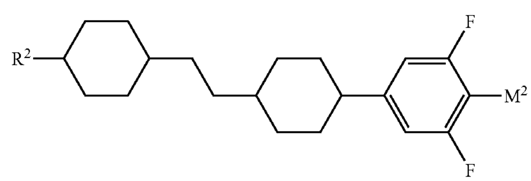
(5-42)
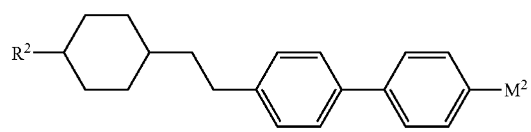
(5-43)
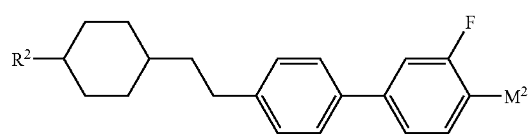
(5-44)
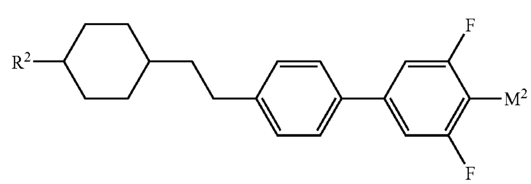
(5-45)
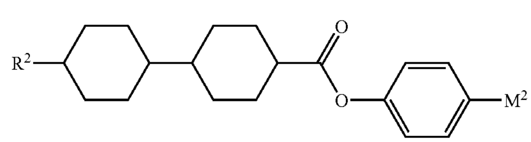
(5-46)
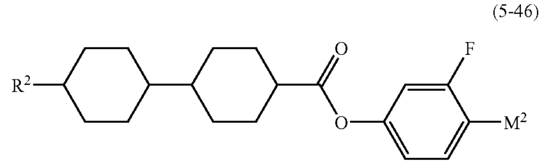

-continued
(5-47)
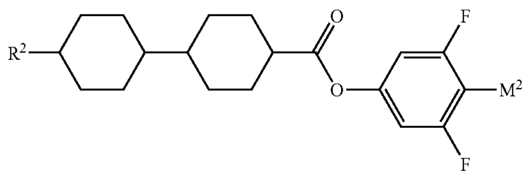
(5-48)
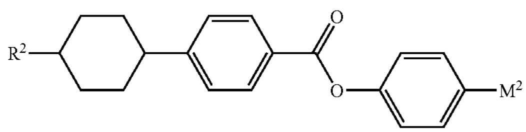
(5-49)
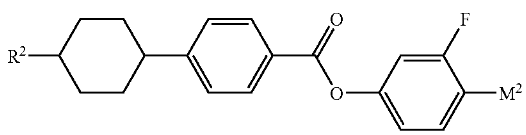
(5-50)
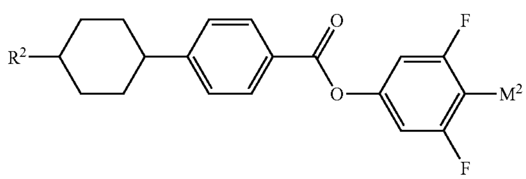
(5-51)
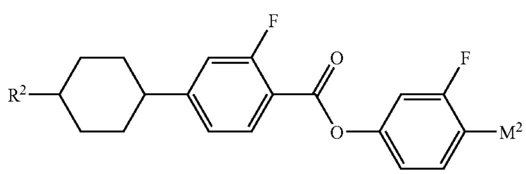
(5-52)
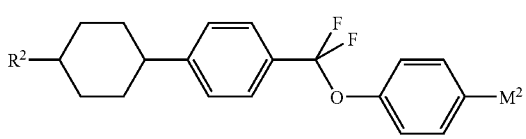
(5-53)
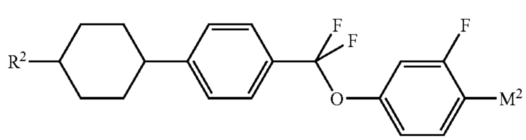
(5-54)
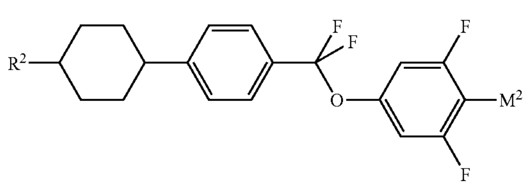
(5-55)
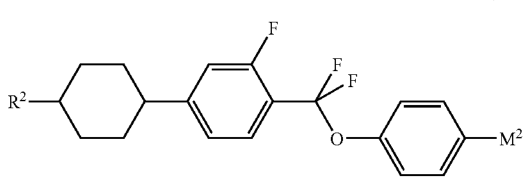
-continued
(5-56)
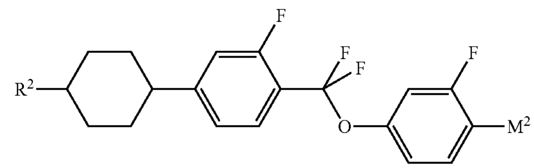
(5-57)
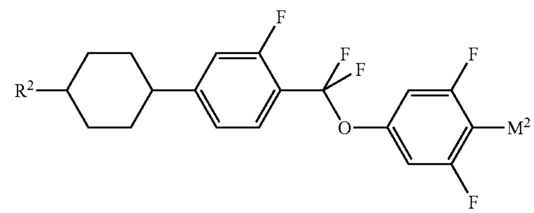
(5-58)
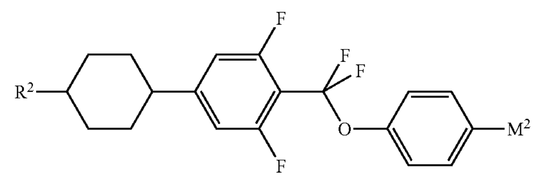
(5-59)
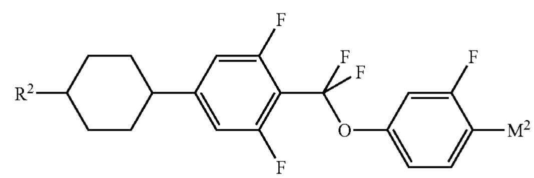
(5-60)
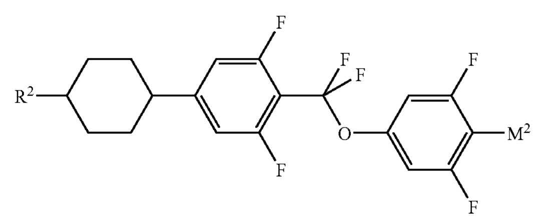
(5-61)
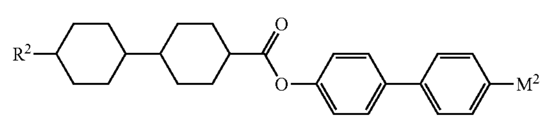
(5-62)
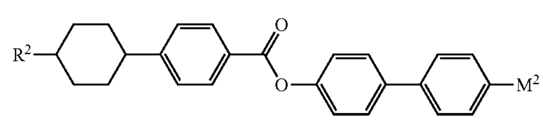
(6-1)
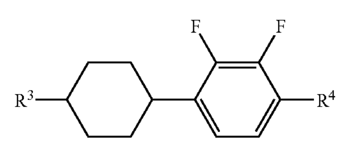
(6-2)
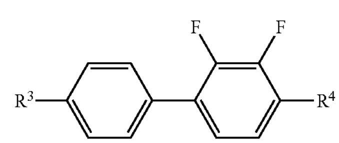

-continued
(6-3)
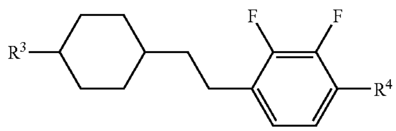
(6-4)
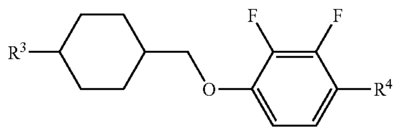
(6-5)
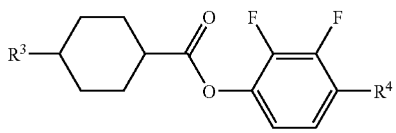
(6-6)
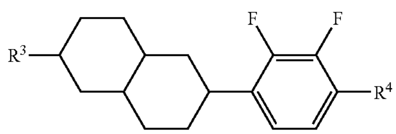
(7-1)
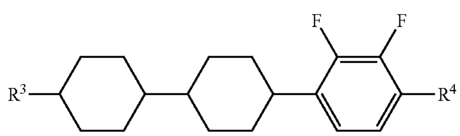
(7-2)
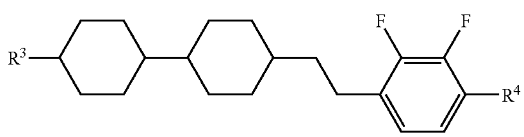
(7-3)
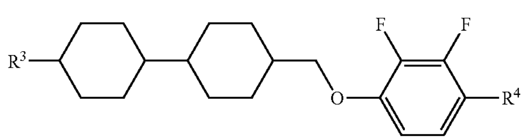
(7-4)
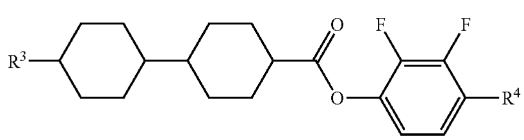
(7-5)
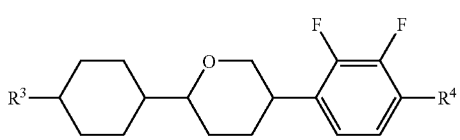
(7-6)
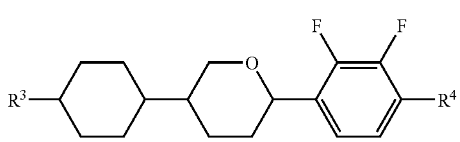
(7-7)
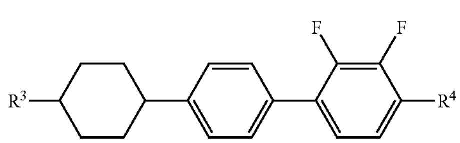
-continued
(7-8)
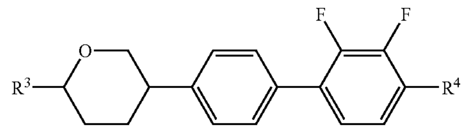
(7-9)
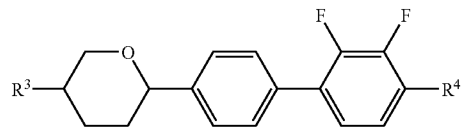
(7-10)
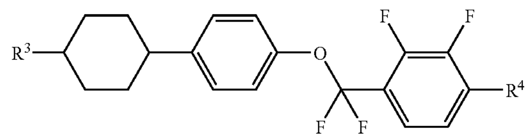
(7-11)
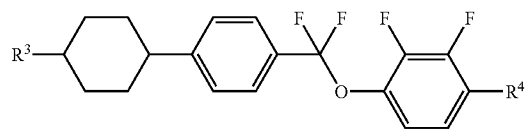
(7-12)
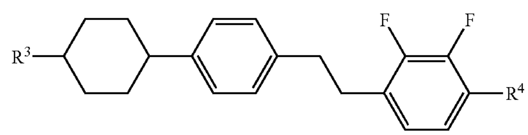
(7-13)
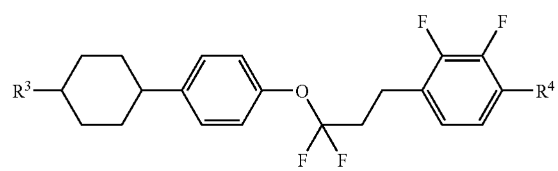
(7-14)
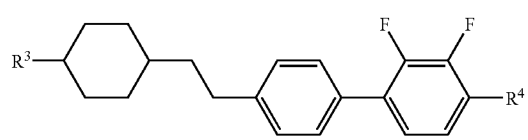
(7-15)
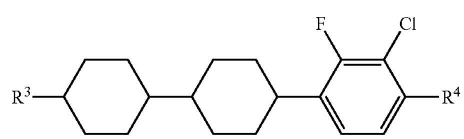
(7-16)
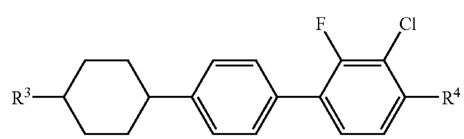
(8-1)
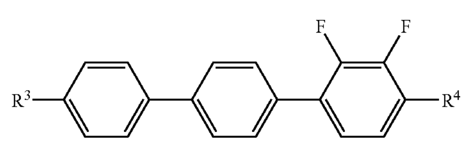

-continued
(8-2)
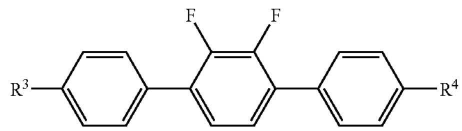
(8-3)
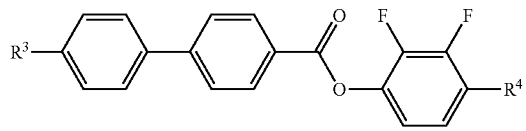
(9-1)
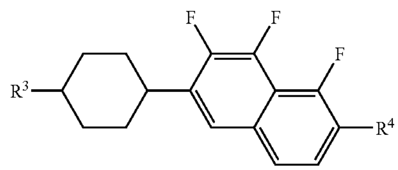
(9-2)
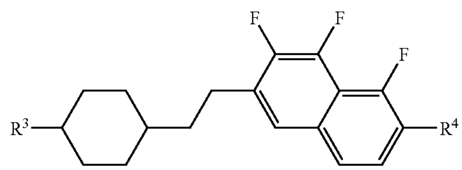
(9-3)
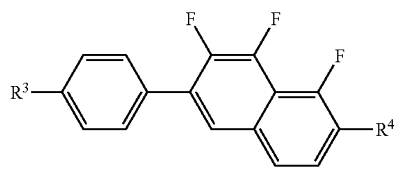
(10-1)
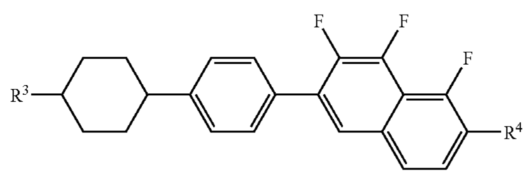
(10-2)
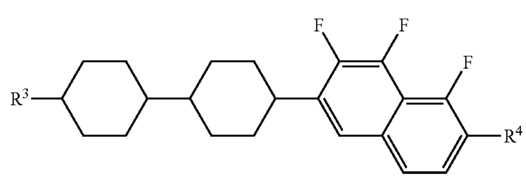
(10-3)
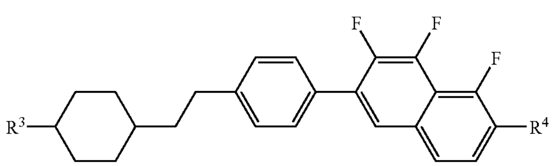
(11-1)
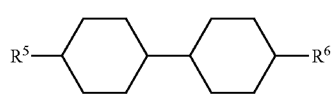
(11-2)
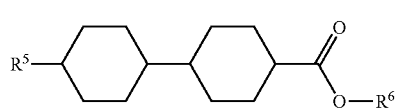
-continued
(11-3)
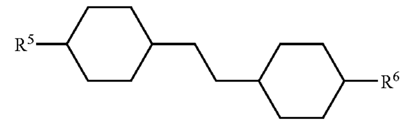
(11-4)
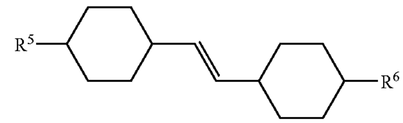
(11-5)
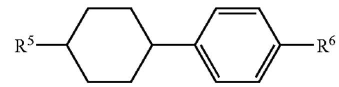
(11-6)
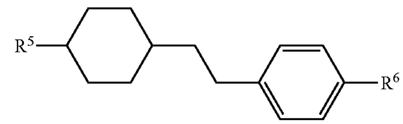
(11-7)
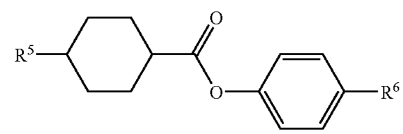
(11-8)
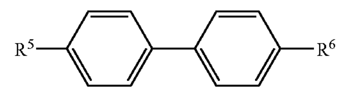
(11-9)
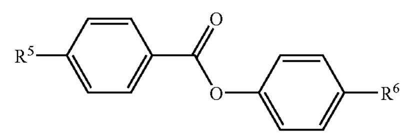
(11-10)
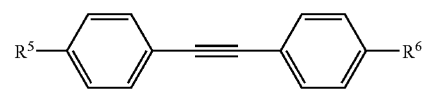
(11-11)
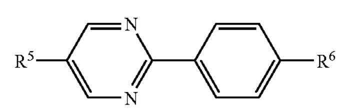
(12-1)
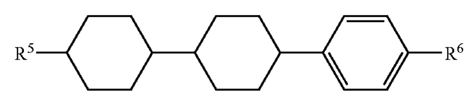
(12-2)
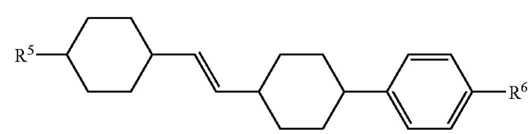
(12-3)
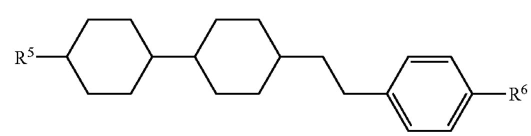
(12-4)
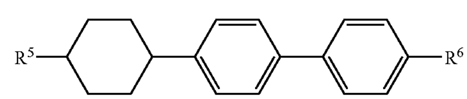

-continued (12-5)

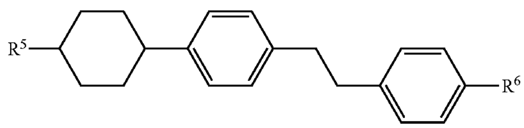

(12-6)

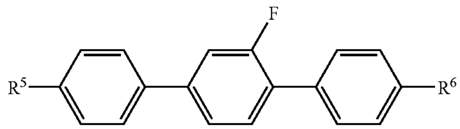

(12-7)

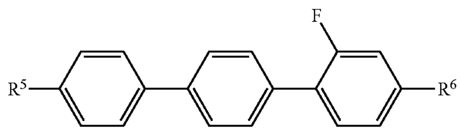

(12-8)

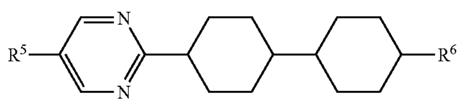

(12-9)

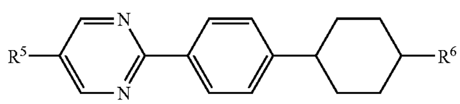

(12-10)

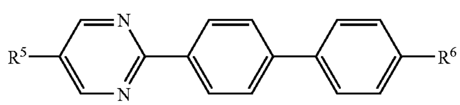

(12-11)

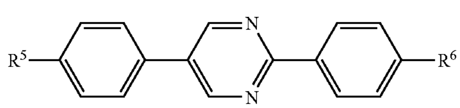

(12-12)

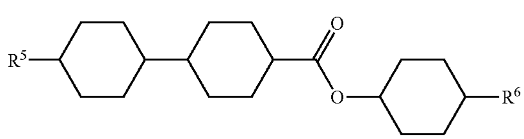

(12-13)

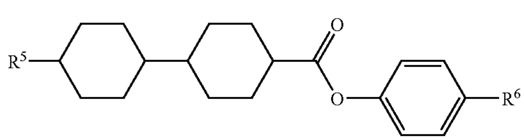

(12-14)

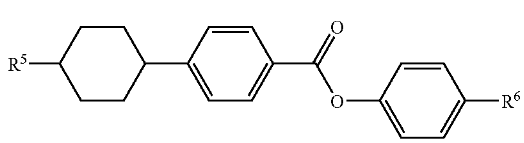

(12-15)

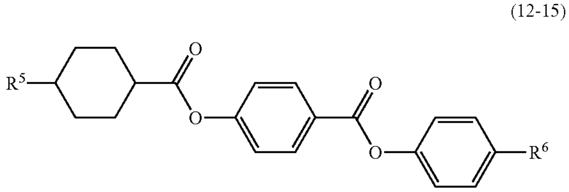

-continued (12-16)

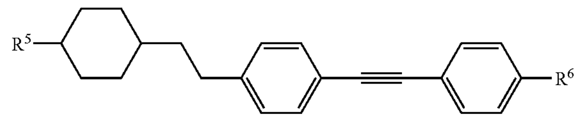

(12-17)

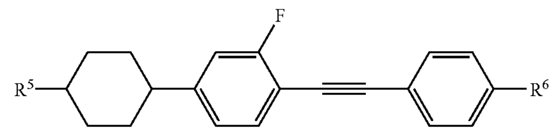

(12-18)

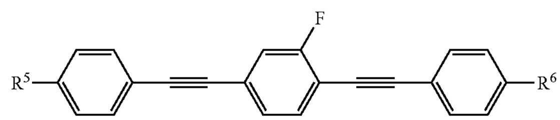

(13-1)

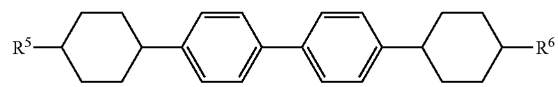

(13-2)

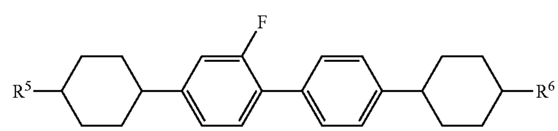

(13-3)

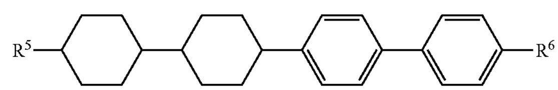

(13-4)

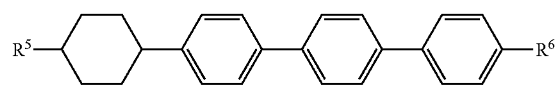

(13-5)

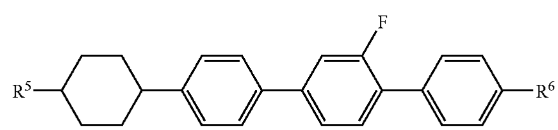

(13-6)

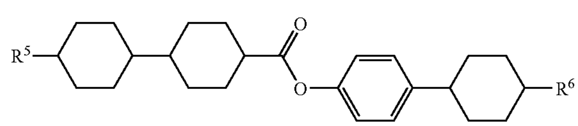

The composition of the invention is prepared by well known methods. For example, compounds as components are mixed and dissolved mutually by heating. An appropriate additive may be added to the composition to adjust the physical properties of the composition. Such additives are well known to those skilled in the art. Compositions for GH devices may be prepared by adding a dichroic dye, such as merocyanine, styryl, azo, azomethine, azoxy, quinophthalone, anthraquinone, and tetrazine compounds. On the other hand, a chiral dopant is added for the purpose of inducing the helical structure of liquid crystals to give a necessary twist angle. Examples of chiral dopants are, for example, the optically active compounds (Op-1) to (Op-13) shown below.

(Op-1)
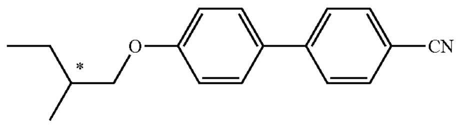
(Op-2)
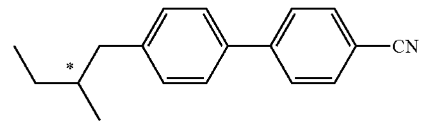
(Op-3)
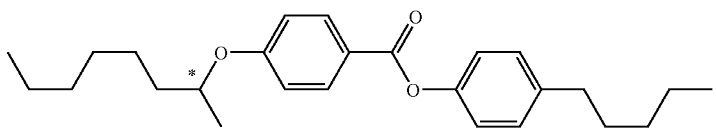
(Op-4)
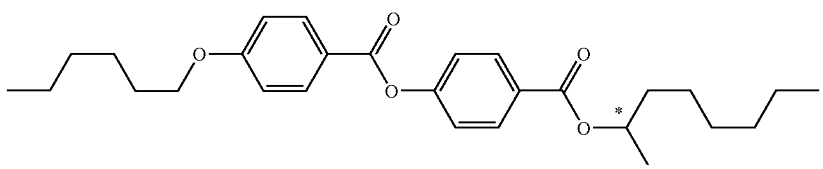
(Op-5)
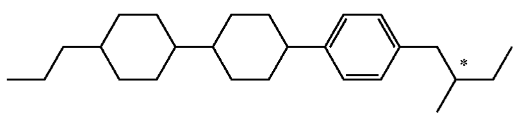
(Op-6)
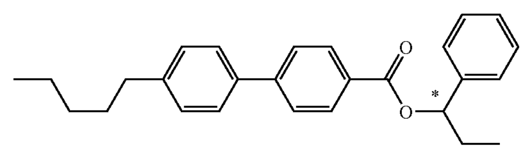
(Op-7)
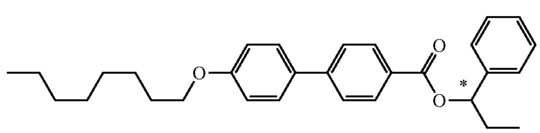
(Op-8)
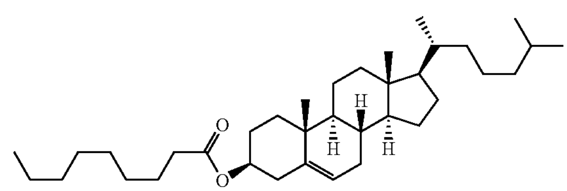
(Op-9)
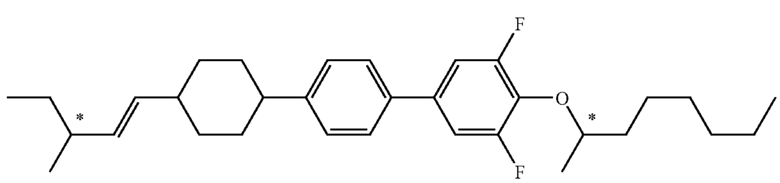
(Op-10)
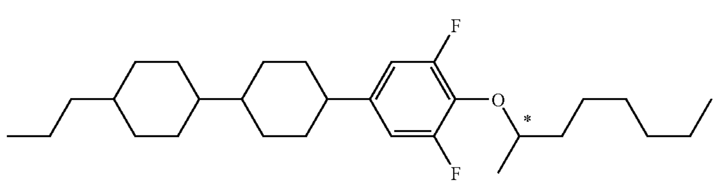
(Op-11)
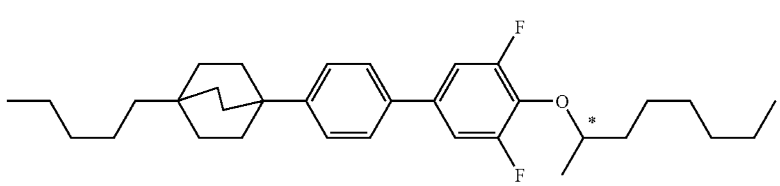
(Op-12)
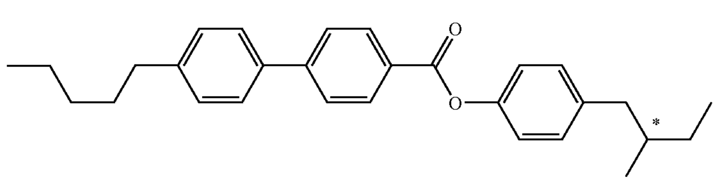

-continued (Op-13)

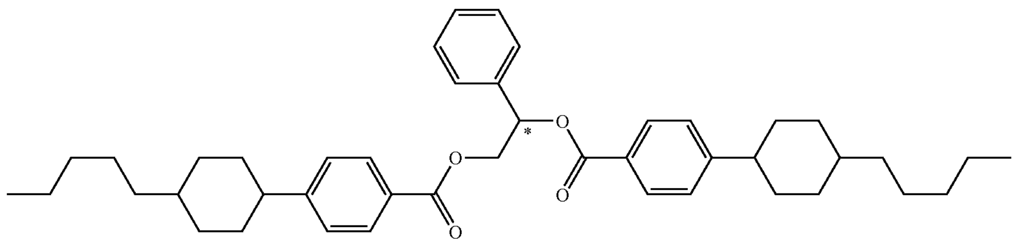

The chiral dopant is added to the composition to adjust the pitch of a twist. Preferable pitches for TN devices and TN-TFT devices are in the range of 40 micrometers to 200 micrometers. Preferable pitches for STN devices are in the range of 6 micrometers to 20 micrometers. Preferable pitches for BTN devices are in the range of 1.5 micrometers to 4 micrometers. The chiral dopant is added to compositions for PC devices in a relatively large amount. At least two chiral dopants may be added for adjusting the temperature dependence of the pitch.

Additives, such as a defoaming agent, an ultraviolet absorber, and an antioxidant may be added further to the liquid crystal composition related to the invention.

When the defoaming agent is added to the liquid crystal composition related to the invention, foaming can be suppressed during the transportation of the liquid crystal composition or production processes from the liquid crystal composition to a liquid crystal display device.

When the ultraviolet absorber or the antioxidant is added to the liquid crystal composition related to the invention, it is possible to prevent the deterioration of the liquid crystal composition and the liquid crystal display device containing the liquid crystal composition. For example, the antioxidant can suppress the decrease of resistivity when the liquid crystal composition is heated.

Examples of ultraviolet absorbers are a benzophenone-based ultraviolet absorber, a benzoate-based ultraviolet absorber, a triazole-based ultraviolet absorber, and so forth.

An example of the benzophenone-based ultraviolet absorber is 2-hydroxy-4-n-octoxybenzophenone.

An example of the benzoate-based ultraviolet absorber is 2,4-di-t-buthylphenyl-3,5-di-t-butyl-4-hydroxybenzoate.

Examples of the triazole-based ultraviolet absorber are 2-(2-hydroxy-5-methylphenyl)benzotriazole, 2-[2-hydroxy-3-(3,4,5,6-tetrahydroxyphthalimido-methyl)-5-methylphenyl]benzotriazole, and 2-(3-t-butyl-2-hydroxy-5-methylphenyl)-5-chlorobenzotriazole.

Examples of antioxidants are a phenolic antioxidant, an organic sulfur-based antioxidant, and so forth.

Examples of the phenolic antioxidants are 2,6-di-t-butyl-4-methyl phenol, 2,6-di-t-butyl-4-ethylphenol, 2,6-di-t-butyl-4-propylphenol, 2,6-di-t-butyl-4-butylphenol, 2,6-di-t-butyl-4-pentylphenol, 2,6-di-t-butyl-4-hexylphenol, 2,6-di-t-butyl-4-heptylphenol, 2,6-di-t-butyl-4-octylphenol, 2,6-di-t-butyl-4-nonylphenol, 2,6-di-t-butyl-4-decylphenol, 2,6-di-t-butyl-4-undecylphenol, 2,6-di-t-butyl-4-dodecylphenol, 2,6-di-t-butyl-4-tridecylphenol, 2,6-di-t-butyl-4-tetradecylphenol, 2,6-di-t-butyl-4-pentadecylphenol, 2,2'-methylenebis(6-t-butyl-4-methylphenol), 4,4'-butylidenebis (6-t-butyl-3-methylphenol), 2,6-di-t-butyl-4-(2-octadecyloxycarbonyl)ethylphenol, and pentaerythritol tetrakis[3-(3,5-di-t-butyl-4-hydroxyphenyl)propionate].

Examples of the organic sulfur-based antioxidants are dilauryl-3,3'-thiopropionate, dimyristyl-3,3'-thiopropionate, distearyl-3,3'-thiopropionate, pentaerythritol tetrakis(3-laurylthiopropionate), and 2-mercaptobenzimidazole.

The amount of additives represented by the ultraviolet absorber, the antioxidant, and so forth can be selected in the range of amounts which does not deviate from the purpose of the invention and can achieve the purpose of adding the additives.

For example, when an ultraviolet absorber or an antioxidant is added, the additive amount is normally in the range of 10 ppm to 500 ppm, preferably in the range of 30 ppm to 300 ppm, and more preferably in the range of 40 ppm to 200 ppm based on the total mass of a liquid crystal composition concerning the invention.

[Method of Preparing Liquid Crystal Compositions]

The liquid crystal compositions related to the invention can be prepared, for example, when each compound composing each component is a liquid, by mixing and shaking each compound, and when solids are contained, by mixing each compound and liquefying each compound by heating and dissolving, and then shaking. The liquid crystal compositions related to the invention can also be prepared by other well known methods.

[Liquid Crystal Display Devices]

The liquid crystal compositions related to the invention have operation modes, such as a PC, TN, STN, and OCB mode, and can be used not only for a liquid crystal display device driven by a AM mode but also for liquid crystal display devices having operation modes, such as a PC, TN, STN, OCB, VA, and IPS mode, and being driven by a passive matrix (PM) mode.

The liquid crystal display devices based on the AM mode and the PM mode can be applied to any liquid crystal displays of a reflection type, a transmission type, and a semi-transmission type.

The liquid crystal compositions related to the invention can also be used for a dynamic scattering (DS) mode device using a liquid crystal composition to which a conducting agent is added, a nematic curvilinear aligned phase (NCAP) device using a microencapsulated liquid crystal composition, and a polymer dispersed (PD) device having a three-dimensional network polymer formed in a liquid crystal composition, for example, a polymer network (PN) device.

In the liquid crystal display devices driven by a TN mode, a VA mode, or the like, the direction of an electric field is perpendicular to a liquid crystal layer. On the other hand, in the liquid crystal display devices driven by a IPS mode or the like, the direction of an electric field is parallel to a liquid crystal layer. The structure of the liquid crystal display device driven by the VA mode is reported in K. Ohmuro, S. Kataoka, T. Sasaki and Y. Koike, SID '97 Digest of Technical Papers, 28, 845 (1997), and the structure of the liquid crystal display device driven by the IPS mode is reported in WO 1991/10936 A (patent family: U.S. Pat. No. 5,576,867).

Since the liquid crystal compounds having stability to light and so forth, showing liquid crystal phases in a wide temperature range, and having a small viscosity, an appropriate optical anisotropy, a large dielectric anisotropy, and an excellent compatibility with other liquid crystal compounds have been obtained, they can be used for liquid crystal display devices which have a short response time, a small power consumption, a small driving voltage, and a large contrast, and can be used in a wide temperature range, by using liquid crystal compositions comprising these compounds.

EXAMPLES

Examples of Liquid Crystal Compound (a)

In the following examples, the invention will be explained in more detail, but the invention is not limited to these examples. Not otherwise noted, "%" means "% by mass".

Compounds obtained were identified by means of nuclear magnetic resonance spectra obtained from $^1$H-NMR analyses, gas chromatograms obtained from gas chromatography (GC) analyses and so forth, and first of all, methods for analyses will be explained.

$^1$H-NMR analysis: A model DRX-500 (Bruker BioSpin Corporation) was used for measurement. Samples prepared in Examples or the like were dissolved in deuterated solvents such as $CDCl_3$ in which the samples were soluble, and measured under the conditions of room temperature, 500 MHz, and 24 cumulated numbers. In the explanation of the NMR spectra obtained, s, d, t, q, and m stand for singlet, doublet, triplet, quartet, and multiplet, respectively. Tetramethylsilane (TMS) was used as a zero-point standard material of chemical shifts (δvalues).

GC analysis: A gas chromatograph model GC-14B made by Shimadzu Corporation was used for measurement. A used column is a capillary column CBP1-M25-025 (length 25 m, bore 0.25 mm, film thickness 0.25 μm; dimethylpolysiloxane as a stationary phase; nonpolar) made by Shimadzu Corporation. Helium was used as a carrier gas and the flow rate was adjusted to 1 milliliter per minute. The temperature of the injector for samples was set to 300° C. and the temperature of the detector (FID) part was set to 300° C.

A sample was dissolved in toluene and adjusted to be a solution of 1% by mass. The resulting solution (1 microliter) was injected into the injector.

A Chromatopac model C-R6A made by Shimadzu Corporation or its equivalent was used as a recorder. Gas chromatograms obtained show the retention time of peaks and the area values of the peaks corresponding to component compounds.

Solvents for diluting the samples may also be chloroform or hexane, for example. The following capillary columns may also be used: DB-1 made by Agilent Technologies Inc. (length 30 m, bore 0.25 mm, film thickness 0.25 μm), HP-1 made by Agilent Technologies Inc. (length 30 m, bore 0.32 mm, film thickness 0.25 μm), Rtx-1 made by Restek Corporation (length 30 m, bore 0.32 mm, film thickness 0.25 μm), BP-1 made by SGE International Pty. Ltd (length 30 m, bore 0.32 mm, film thickness 0.25 μm), and so forth.

The area ratio of a peak in a gas chromatogram corresponds to the ratio of a component compound. In general, a percentage by mass of a component compound in an analytical sample is not completely identical to the area ratio of each peak of the analytical sample. According to the invention, however, the percentage by mass of the component compound in the analytical sample essentially corresponds to the area ratio of each peak in the analytical sample when the columns mentioned above are used, because the correction coefficient is essentially 1. There is no significant difference in the correction coefficient of the component in the liquid crystal compound. Gas chromatograms using the internal standard method were used for determining more accurately the composition ratio of the liquid crystal compound in the liquid crystal composition by the gas chromatogram. A fixed amount of each liquid crystal compound component (test component) weighed accurately and a liquid crystal compound (a standard material) used as a reference were simultaneously measured with the gas chromatograph, and the obtained relative intensity of the area ratio of the peak of the test component to the peak of the standard material was calculated in advance. The composition ratio of the liquid crystal compound in the liquid crystal composition can be determined more accurately from a gas-chromatographic analysis when corrected using the relative intensity of the peak area of each component to the reference material.

[Samples for Measuring Physical Property-Values of Liquid Crystal Compounds and So Forth]

Two kinds of samples were used for measuring the physical property-values of liquid crystal compounds: one was a compound itself and the other was a mixture of the compound and mother liquid crystals.

When a sample was a mixture of the compound and the mother liquid crystals, which is the latter case, measurement was made in the following manner. The sample was prepared by mixing 15% by mass of the liquid crystal compound and 85% by mass of the mother liquid crystals. An extrapolated value is calculated based on a measured value obtained from the sample, in accordance with the extrapolation method shown in the following equation. The extrapolated value is used as the physical property-value of the compound.

[Extrapolated value]=(100×[measured value of sample]−[% by mass of mother liquid crystals]×[measured value of mother liquid crystals])/[% by mass of liquid crystal compound]

When a smectic phase or crystals separated out at 25° C. even at this ratio of the liquid crystal compound to the mother liquid crystals, the ratio was changed in order of (10% by mass/90% by mass), (5% by mass/95% by mass), and (1% by mass/99% by mass). The physical property-values of the sample was measured when the smectic phase or the crystals stopped separating out at 25° C., and an extrapolated value was calculated in accordance with the above equation. The value thus obtained was used as the physical property-values of the liquid crystal compound.

There are various kinds of mother liquid crystals used for measurement, and a composition of mother liquid crystals A (% by mass) is shown as follows, for example.

Mother Liquid Crystals A:

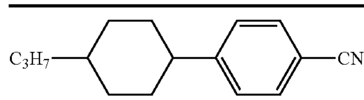

24%

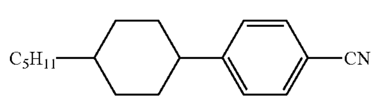

36%

-continued

| | |
|---|---|
| 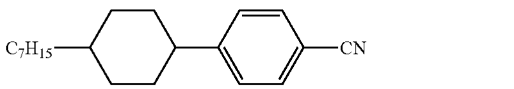 | 25% |
| 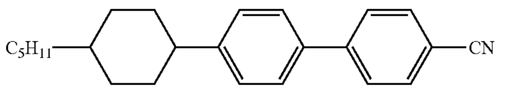 | 15% |

[Method of Measuring Physical Property-Values of Liquid Crystal Compounds and So Forth]

The physical property-values were measured according to the methods to be described later. Most methods are described in the Standard of Electronic Industries Association of Japan, EIAJ·ED-2521 A, or methods with some modifications. No TFT was attached to TN devices used for measurement.

Regarding physical property-values, measured values were described herein as experimental data when a liquid crystal compound itself was a sample. When a sample was a mixture of a liquid crystal compound and mother liquid crystals, values calculated from measured values according to the extrapolation method were described herein as experimental data.

Phase structure and phase transition temperature (° C.): The following methods (1) and (2) were used for measurement.

(1) A sample (a compound) was placed on a hot plate in a melting point apparatus, Hot Stage Model FP-52 made by Mettler Toledo International Inc., equipped with a polarizing microscope, and then heated at a rate of 3° C. per minute. Phase conditions and their changes were observed with the polarizing microscope, and kinds of liquid crystal phases were specified.

(2) A sample was heated and then cooled at a rate of 3° C. per minute using a Perkin-Elmer differential scanning calorimeter, DSC-7 system or Diamond DSC system. The starting point of an endothermic peak or an exothermic peak caused by the phase change of the sample was calculated based on the extrapolation, and the phase transition temperature was determined.

In the following description, the symbol C stands for crystals, which were expressed as $C_1$ or $C_2$ when kinds of crystals were distinguishable. The symbols S, N, and Iso stand for a smectic phase, a nematic phase, and a liquid (isotropic), respectively. When a smectic B phase or a smectic A phase was distinguishable in the smectic phase, each was expressed as $S_B$ or $S_A$. Phase transition temperatures were expressed as "C 50.0 N 100.0 Iso", for example, which means that a phase transition temperature (CN) from crystals to a nematic phase was 50.0° C., and a phase transition temperature (NI) from the nematic phase to a liquid was 100.0° C.

Maximum temperature of nematic phase ($T_{NI}$; ° C.): A sample (a mixture of a liquid crystal compound and mother liquid crystals) was placed on a hot plate in a melting point apparatus (Hot Stage Model FP-52 made by Mettler Toledo International Inc.) equipped with a polarizing microscope, and observed during heating at a rate of 1° C. per minute. Temperature was measured when part of the sample began to change from a nematic phase into an isotropic liquid. The maximum temperature of the nematic phase may simply be abbreviated to "a maximum temperature".

Low-temperature compatibility: Samples were prepared by mixing a liquid crystal compound and mother liquid crystals so as to obtain liquid crystal compound in the ratios of 20% by mass, 15% by mass, 10% by mass, 5% by mass, 3% by mass, and 1% by mass, and then put into glass vials. After these glass vials had been kept in a freezer at −10° C. or −20° C. for a certain period, it was observed whether or not crystals or a smectic phase has been separated out.

Viscosity (η; measured at 20° C.; mPa·s): The viscosity of a mixture of a liquid crystal compound and mother liquid crystals was measured using an E-type viscometer.

Optical anisotropy (refractive index anisotropy; measured at 25° C.; Δn): Measurement was made at 25° C. using light at a wavelength of 589 nm by means of an Abbe refractometer equipped with a polarizing plate on an ocular. The surface of a main prism was rubbed in one direction, and then a sample (a mixture of a liquid crystal compound and mother liquid crystals) was dropped on the main prism. A refractive index (n∥) was measured when the direction of the polarized light was parallel to the direction of the rubbing. A refractive index (n⊥) was measured when the direction of polarized light was perpendicular to the direction of the rubbing. The value of optical anisotropy (Δn) was calculated according to the equation: $\Delta n = n\| - n\perp$.

Dielectric anisotropy (Δε; measured at 25° C.): A sample (a mixture of a liquid crystal compound and mother liquid crystals) was put into a liquid crystal cell having a distance (cell gap) between two glass plates of about 9 micrometers and a twist angle of 80 degrees. A voltage of 20 V was applied to the cell and a dielectric constant (ε∥) in the major axis direction of liquid crystal molecules was measured. A voltage of 0.5 V was applied and a dielectric constant (ε⊥) in the minor axis direction of the liquid crystal molecules was measured. The value of dielectric anisotropy was calculated according to the equation: $\Delta\epsilon = \epsilon\| - \epsilon\perp$.

Example 1

Synthesis of trans-4'-[3,5-difluoro-4-(3,3,3-trifluoropropenyl)phenyl]-trans-4-propylbicyclohexyl (No. 2.23)

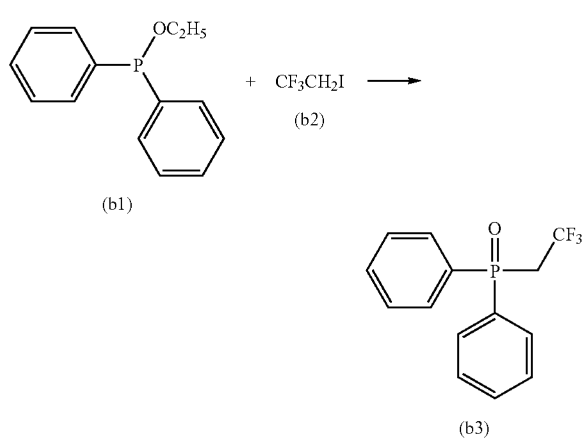

-continued

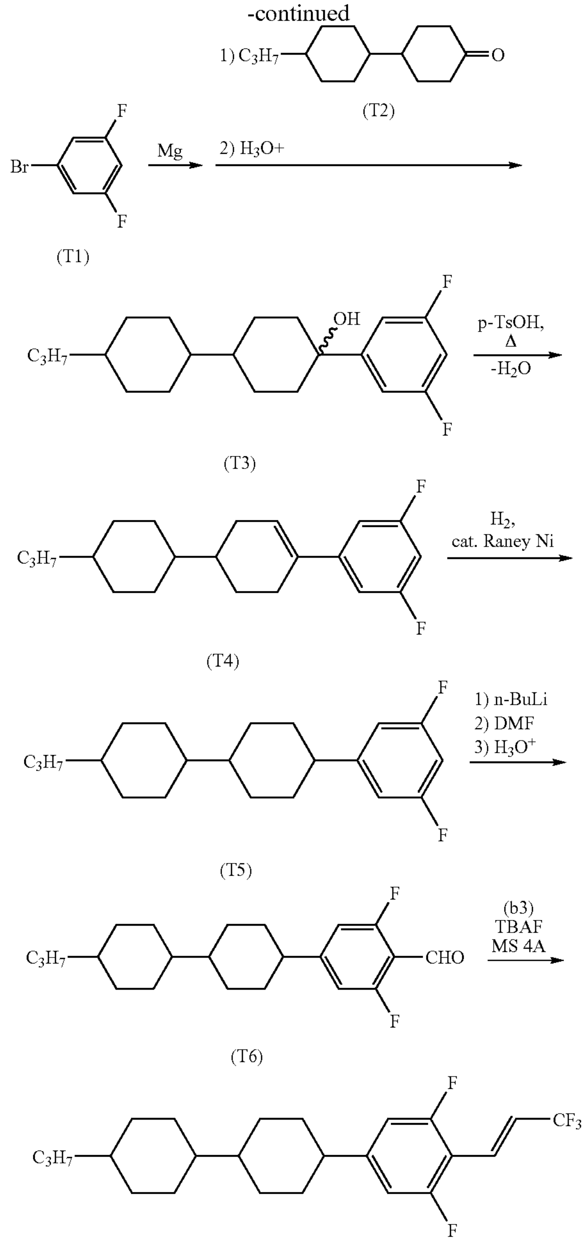

(No. 2.23)

First Step:

Ethyl diphenylphosphinite (b1; 20.0 g) and 1,1,1-trifluoro-2-iodoethane (b2; 36.5 g) were put into a reaction vessel under an argon atmosphere, and stirred at room temperature for 4 days. The resulting mixture was purified by means of fraction-collecting column chromatography using ethyl acetate as the eluent and silica gel as the stationary phase powder, and further purified by recrystallization from a mixed solvent of toluene and heptane (volume ratio of toluene:heptane=1:1), and then dried, whereby 12.6 g of 2,2,2-trifluoroethyl diphenylphosphine oxide (b3) was obtained. The yield based on the compound (b1) was 51.2%.

Second Step:

Well-dried magnesium (11.5 g) and THF (100 ml) were put into a reaction vessel under an atmosphere of nitrogen and heated to 52° C. Next, 1-bromo-3,5-difluorobenzene (T1; 91.3 g) dissolved in THF (300 ml) was slowly added dropwise thereto in the temperature range of 43° C. to 48° C., and the stirring was continued for additional 120 minutes. Subsequently, trans-4'-propylbicyclohexyl-4-one (T2; 100.0 g) dissolved in THF (100 ml) was slowly added dropwise in the temperature range of 35° C. to 45 CC, and the stirring was continued for additional 30 minutes. The resulting reaction mixture was cooled to 30° C., and then added to a vessel containing 1 N-hydrochloric acid (900 ml) and toluene (800 ml) which had been chilled at 0° C., and mixed. The mixture was then allowed to stand to be separated into an organic layer and an aqueous layer, and an extracting operation was carried out. The resulting organic layer was fractionated, washed with water, with an aqueous solution of 2 N-sodium hydroxide, with a saturated aqueous solution of sodium bicarbonate and with water, and dried over anhydrous magnesium sulfate. Then, the solvent was distilled off under reduced pressure, whereby 142.0 g of 4-(3,5-difluorophenyl)-trans-4'-propylbicyclohexyl-4-ol (T3) was obtained. The resulting compound (T3) was a yellow solid.

Third Step:

The compound (T3; 131.0 g), p-toluenesulfonic acid (p-TsOH; 2.6 g), and toluene (400 ml) were mixed, and the mixture was heated under reflux for 2 hours while water being distilled was removed. After the reaction mixture had been cooled to 30° C., water (300 ml) and toluene (200 ml) were added to the resulting solution, and mixed. Then, the solution was allowed to stand to be separated into two layers of an organic layer and an aqueous layer. Extraction into an organic layer was carried out and the resulting organic layer was fractionated. The extracts were washed with an aqueous solution of 2 N-sodium hydroxide, with a saturated aqueous solution of sodium bicarbonate and with water, and dried over anhydrous magnesium sulfate. Then, the solvent was distilled off under reduced pressure. The resulting residue was purified by means of fraction-collecting column chromatography using heptane as the eluent and silica gel as the stationary phase powder. The residue was further purified by recrystallization from a mixed solvent of ethyl acetate and heptane (volume ratio of ethyl acetate:heptane=1:3) and dried, whereby 87.4 g of 4-(3,5-difluorophenyl)-trans-4'-propylbicyclohexyl-3-ene (T4) was obtained. The yield based on the compound (T2) was 66.2%.

Fourth step:

The compound (T4; 62.9 g), toluene (180 ml), Solmix A-11 (180 ml; made by Japan Alcohol Trading Co., Ltd.), and Raney nickel (3.0 g) were mixed and stirred under an atmosphere of hydrogen for 48 hours. After the Raney nickel had been removed by filtration, the resulting filtrate was concentrated under reduced pressure. The resulting residue was purified by means of fraction-collecting column chromatography using heptane as the eluent and silica gel as the stationary phase powder. The residue was further purified by recrystallization from a mixed solvent of Solmix A-11 and heptane (volume ratio of Solmix A-11: heptane=1:2) and dried, whereby 40.9 g of trans-4'-(3,5-difluorophenyl)-trans-4-propylbicyclohexyl (T5) was obtained. The yield based on the compound (T4) was 64.6%.

Fifth Step:

The compound (T4; 9.0 g) and THF (60 ml) were mixed under an atmosphere of nitrogen, and chilled to −65° C. Then, a n-butyl lithium solution (1.6 M in n-hexane; 21.1 ml) were added dropwise in the temperature range of −65° C. to −55° C., and the stirring was continued at −70° C. for additional 90 minutes. Subsequently, DMF (4.1 g) was added dropwise in the temperature range of −60° C. to −52° C., and the stirring was continued at −10° C. for additional 30 minutes. Then, the reaction mixture was poured into a mixture of 1 N-hydrochloric acid (100 ml) and toluene (200 ml) which had been chilled at 0° C., and mixed. The mixture was then allowed to stand to be separated into two layers of an organic layer and an aqueous layer. Extraction into an organic layer was carried out and the resulting organic layer was fractionated. The extracts were washed with a saturated aqueous solution of sodium bicarbonate and with water, and dried over anhydrous magnesium sulfate. The resulting solution was concentrated under reduced pressure, and the resulting residue was purified by recrystallization from heptane and dried, whereby 9.5 g of 2,6-difluoro-trans-4-(trans-4'-propylbicyclohexyl-4-yl)benzaldehyde (T6) was obtained. The yield based on the compound (T5) was 87.6%.

Sixth Step:

Molecular sieves 4A (MS 4A; 61.6 g) and a tetrabutylammonium fluoride solution (TBAF; 1.0 M in THF; 77.2 g) were put into a reaction vessel under an atmosphere of nitrogen, and stirred at room temperature for 20 hours. Then, a THF solution (100 ml) in which the compound (T6; 3.2 g) and the compound (b3; 4.4 g) were dissolved was added dropwise in the temperature range of 20° C. to 27° C., and the stirring was continued at room temperature for additional 1 hour. The MS 4A was removed from the resulting reaction mixture, and water (500 ml) and toluene (300 ml) were added to the filtrate, and mixed. The mixture was then allowed to stand to be separated into two layers of an organic layer and an aqueous layer. Extraction into an organic layer was carried out and the resulting organic layer was fractionated. The extracts were washed with water, with a saturated aqueous solution of sodium bicarbonate and with water, and dried over anhydrous magnesium sulfate. Then, the solvent was distilled off under reduced pressure, and a light yellow solid (4.3 g) was obtained. The resulting residue was purified by means of fraction-collecting column chromatography using heptane as the eluent and silica gel as the stationary phase powder, and further purified by recrystallization from a mixed solvent of Solmix A-11 and heptane (volume ratio of Solmix A-11: heptane=1:2) and dried, whereby 1.7 g of trans-4'-[3,5-difluoro-4-(3,3,3-trifluoropropenyl)phenyl]-trans-4-propylbicyclohexyl (No. 2.23) was obtained. The yield based on the compound (T6) was 48.1%.

The phase transition temperature of the resulting compound (No. 2.23) was as follows.

Phase transition temperature: C 106.9 N 170.6 Iso.

The chemical shift δ (ppm) of $^{1}H$-NMR analysis was as indicated below, and the resulting compound was identified as trans-4'-[3,5-difluoro-4-(3,3,3-trifluoropropenyl)phenyl]-trans-4-propylbicyclohexyl. The solvent for measurement was $CDCl_3$.

Chemical shift δ (ppm); 7.21-7.17 (m, 1H), 6.69 (d, 2H), 6.54-6.47 (m, 1H), 2.43 (tt, 1H), 1.91-1.84 (m, 4H), 1.78-1.71 (m, 4H), 1.40-1.23 (m, 4H), 1.19-0.95 (m, 9H), and 0.89-0.82 (m, 5H).

Example 2

Physical Properties of Liquid Crystal Compound (No. 2.23)

The mother liquid crystals A having a nematic phase was prepared by mixing five compounds described above as mother liquid crystals A. The physical properties of the mother liquid crystals A were as follows.

Maximum temperature ($T_{NI}$)=71.7° C.; optical anisotropy (Δn)=0.137; dielectric anisotropy (Δε)=11.0.

A liquid crystal composition B consisting of the mother liquid crystals A (85% by mass) and trans-4'-[3,5-difluoro-4-(3,3,3-trifluoropropenyl)phenyl]-trans-4-propylbicyclohexyl (No. 2.23; 15% by mass) obtained in Example 1 was prepared. The physical property-values of the resulting liquid crystal composition B were measured, and the extrapolated values of the physical properties of the liquid crystal compound (No. 2.23) were calculated by extrapolating the measured values. The values were as follows.

Maximum temperature ($T_{NI}$)=127.0° C.; optical anisotropy (Δn)=0.150; dielectric anisotropy (Δε)=19.4.

This proved that the liquid crystal compound (No. 2.23) is a compound having a high maximum temperature ($T_{NI}$), a large optical anisotropy (Δn), and a large dielectric anisotropy (Δε).

Example 3

Synthesis of 3,5,2'-trifluoro-4'-(trans-4-propylcyclohexyl)-4-(3,3,3-trifluoropropenyl)biphenyl (No. 2.47)

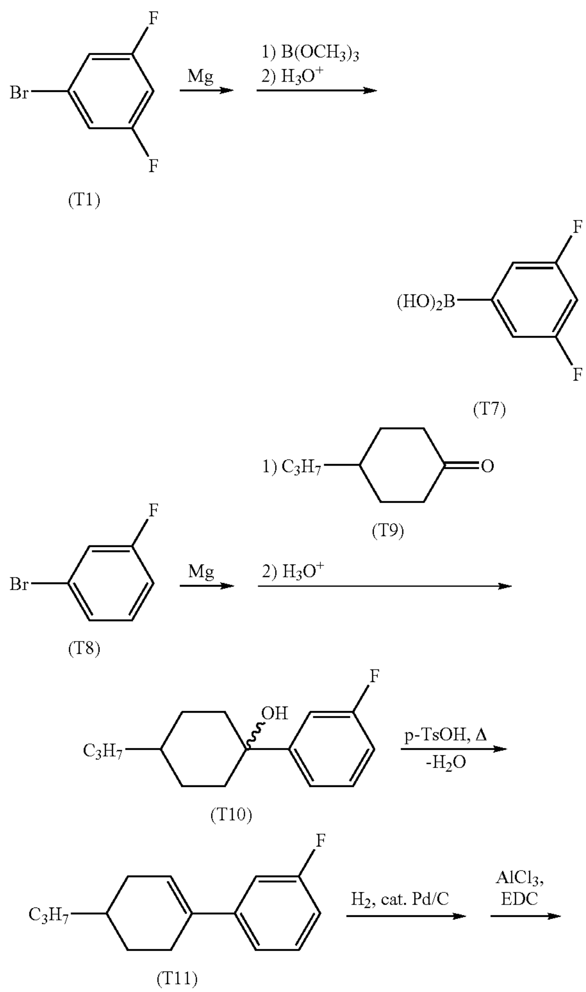

-continued

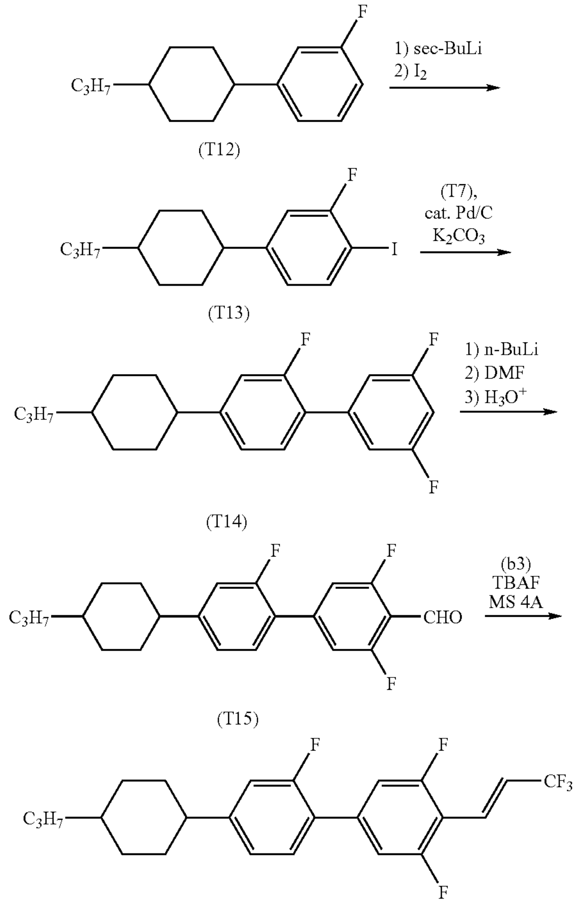

(T12)

(T13)

(T14)

(T15)

(No. 2.47)

First Step:

Well-dried magnesium (12.6 g) and THF (100 ml) were put into a reaction vessel under an atmosphere of nitrogen and heated to 48° C. Next, the compound (T1; 100.0 g) dissolved in THF (500 ml) was slowly added dropwise in the temperature range of 45° C. to 55° C., and the stirring was continued for additional 120 minutes. THF (300 ml) and trimethyl borate (80.8 g) were put into another reaction vessel and stirred at −70° C. The THF solution of the previously obtained Grignard reagent was slowly added dropwise thereto in the temperature range of −70° C. to −60° C., and the stirring was continued at 0° C. for additional 120 minutes. The resulting reaction mixture was poured into a vessel containing 1 N-hydrochloric acid (3,000 ml) and ethyl acetate (3,000 ml) which had been chilled at 0° C., and mixed. The mixture was then allowed to stand to be separated into an organic layer and an aqueous layer. Extraction carried out and the resulting organic layer was fractionated. The extracts were washed with brine, and dried over anhydrous magnesium sulfate. Then, the solvent was distilled off under reduced pressure, whereby 52.5 g 3,5-difluorophenylboronic acid (T7) was obtained. The resulting compound (T7) was a yellow solid.

Second Step:

Well-dried magnesium (20.8 g) and THF (200 ml) were put into a reaction vessel under an atmosphere of nitrogen, and heated to 55° C. Next, 1-bromo-3-fluorobenzene (T8; 149.8 g) dissolved in THF (400 ml) was slowly added dropwise thereto in the temperature range of 47° C. to 58° C., and the stirring was continued for additional 60 minutes. Then, 4-propylcyclohexanone (T9; 100.0 g) dissolved in THF (100 ml) was slowly added dropwise in the temperature range of 55° C. to 59° C., and the stirring was continued for additional 30 minutes. After the resulting reaction mixture had been cooled to 30° C., the mixture was poured into a vessel containing 1 N-hydrochloric acid (2,000 ml) and toluene (1,500 ml) which had been chilled at 0° C., and mixed. The mixture was then allowed to stand to be separated into an organic layer and an aqueous layer. Extraction was carried out and the resulting organic layer was fractionated. The extracts were washed with water, with an aqueous solution of 2 N-sodium hydroxide, with a saturated aqueous solution of sodium bicarbonate and with water, and dried over anhydrous magnesium sulfate. Then, the solvent was distilled off under reduced pressure, whereby 171.6 g of 1-(3-fluorophenyl)-4-propylcyclohexanol (T10) was obtained.

Third Step:

The compound (T10; 171.6 g), p-toluenesulfonic acid (p-TsOH; 2.0 g) and toluene (800 ml) were mixed, and the mixture was heated under reflux for 2 hours while water being distilled was removed. After the reaction mixture had been cooled to 30° C., water (700 ml) and toluene (200 ml) were added to the resulting solution and mixed. The mixture was then allowed to stand to be separated into two layers of an organic layer and an aqueous layer. Extraction was carried out and the resulting organic layer was fractionated. The extracts were washed with an aqueous solution of 2 N-sodium hydroxide, with a saturated aqueous solution of sodium bicarbonate and with water, and dried over anhydrous magnesium sulfate. Then, the solvent was distilled off under reduced pressure, and the resulting residue was purified by means of fraction-collecting column chromatography using heptane as the eluent and silica gel as the stationary phase powder and dried, whereby 108.0 g of 1-fluoro-3-(4-propylcyclohexa-1-enyl) benzene (T11) was obtained. The yield based on the compound (T9) was 69.4%.

Fourth Step:

The compound (T11; 108.0 g), toluene (300 ml), Solmix A-11 (300 ml), and 5% Pd/C (2.0 g) were mixed, and stirred under atmosphere of hydrogen for 24 hours. After the 5% Pd/C had been removed by filtration, the resulting filtrate was concentrated under reduced pressure. The resulting residue was purified by means of fraction-collecting column chromatography using heptane as the eluent and silica gel as the stationary phase powder, whereby a clear and colorless liquid (106.5 g) was obtained. The liquid (106.5 g) and 1,2-dichloroethane (EDC; 400 ml) were mixed and stirred at 10° C. Aluminum chloride (19.3 g) was added thereto and stirred for 60 minutes. The reaction mixture was poured into a vessel containing 1 N-hydrochloric acid (1,000 ml) and EDC (400 ml), and mixed. The mixture was then allowed to stand to be separated into an organic layer and an aqueous layer. Extraction was carried out and the resulting organic layer was fractionated. The extracts were washed with water, with an aqueous solution of 2 N-sodium hydroxide, with a saturated aqueous solution of sodium bicarbonate and with water, and dried over anhydrous magnesium sulfate. Then, the solvent was distilled off under reduced pressure, and the resulting residue was purified by means of fraction-collecting column chromatography using heptane as the eluent and silica gel as the stationary phase powder and dried, whereby 76.5 g of 1-fluoro-3-(trans-4-propylcyclohexyl)benzene (T12) was obtained. The yield based on the compound (T11) was 70.3%.

Fifth Step:

The compound (T11; 76.5 g) and THF (500 ml) was mixed under an atmosphere of nitrogen, and chilled to −73° C. Then, a sec-butyl lithium solution (1.0 M in cyclohexane and n-hexane; 382 ml) was added dropwise in the temperature range of −73° C. to −65° C., and the stirring was continued at −70° C. for additional 120 minutes. Subsequently, iodine (114.6 g) dissolved in THF (200 ml) was added dropwise in the temperature range of −75° C. to −58° C., and the stirring was continued at −10° C. for additional 60 minutes. Then, the reaction mixture was poured into a mixture of water (1,500 ml) and toluene (1,000 ml) which had been chilled at 0° C., and mixed. Then, the mixture was allowed to stand to be separated into two layers of an organic layer and an aqueous layer. Extraction into an organic layer was carried out and the resulting organic layer was fractionated. The extracts were washed with an aqueous solution of 5% sodium thiosulfate and with water, and dried over anhydrous magnesium sulfate. The resulting solution was concentrated under reduced pressure, and the residue was purified by means of fraction-collecting column chromatography using heptane as the eluent and silica gel as the stationary phase powder and then dried, whereby 2-fluoro-1-iodo-4-(trans-4-propylcyclohexyl)benzene (T13; 63.8 g) was obtained. The yield based on the compound (T12) was 53.0%.

Sixth Step:

The compound (T13; 50.0 g), potassium carbonate (39.9 g), 5% Pd/C (0.6 g), and Solmix A-11 (200 ml) were put into a reaction vessel under an atmosphere of nitrogen, and stirred at 63° C. The compound (T7) dissolved in Solmix A-11 (100 ml) was added dropwise thereto, and heated under reflux in the temperature range of 63° C. to 73° C. for 2 hours. After the reaction mixture was cooled to 25° C., the potassium carbonate and 5% Pd/C were removed by filtration, and toluene (500 ml) and water (500 ml) were added to the filtrate and mixed. The mixture was then allowed to stand to be separated into two layers of an organic layer. Extraction into an organic layer was carried out and the resulting organic layer was fractionated. The extracts were washed with water, and dried over anhydrous magnesium sulfate. The resulting solution was concentrated under reduced pressure, and the residue was purified by means of fraction-collecting column chromatography using heptane as the eluent and silica gel as the stationary phase powder. The solution was further purified by recrystallization from a mixed solvent of Solmix A-11 and heptane (volume ratio of Solmix A-11:heptane=1:2) and then dried, whereby 35.3 g of 2,3',5'-trifluoro-4-(trans-4-propylcyclohexyl)biphenyl (T14) was obtained. The yield based on the compound (T13) was 73.6%.

The phase transition temperature of the resulting compound (T14) was as follows.

Phase transition temperature: C 60.2 Iso.

Seventh Step:

The compound (T14; 15.0 g) and THF (100 ml) were mixed under an atmosphere of nitrogen, and chilled to −65° C. Then, a n-butyl lithium solution (1.6 M in n-hexane; 34.5 ml) was added dropwise in the temperature range of −65° C. to −55° C., and the stirring was continued at −65° C. for additional 60 minutes. Subsequently, DMF (6.6 g) was added dropwise in the temperature range of −60° C. to −55° C., and the stirring was continued at 0° C. for additional 60 minutes. The reaction mixture was poured into a mixture of 1 N-hydrochloric acid (200 ml) and toluene (200 ml) which had been chilled at 0° C., and mixed. The mixture was then allowed to stand to be separated into two layers of an organic layer. Extraction into an organic layer was carried out and the resulting organic layer was fractionated. The extracts were washed with a saturated aqueous solution of sodium bicarbonate and with water, and dried over anhydrous magnesium sulfate. The resulting solution was concentrated under reduced pressure, and the resulting residue was purified by recrystallization from a mixed solvent of heptane and THF (volume ratio of heptane:THF=3:1) and then dried, whereby 10.6 g of 3,5,2'-trifluoro-4'-(trans-4-propylcyclohexyl)biphenyl-4-carboaldehyde (T15) was obtained. The yield based on the compound (T14) was 65.3%.

The phase transition temperature of the resulting compound (T15) was as follows.

Phase transition temperature: C 113.7 Iso.

Eighth Step:

Molecular sieves 4A (MS 4A; 112.4 g) and a tetrabutylammonium fluoride solution (TBAF; 1.0 M in THF; 140 ml) were put into a reaction vessel under an atmosphere of nitrogen, and stirred at room temperature for 20 hours. Then, a THF solution (90 ml) in which the compound (T15; 5.1 g) and the compound (b3; 6.0 g) were dissolved was added dropwise in the temperature range of 10° C. to 17° C., and the stirring was continued at room temperature for additional 1 hour. The MS 4A was removed by filtration from the resulting reaction mixture, and water (500 ml) and toluene (500 ml) were added to the filtrate and mixed. The mixture was then allowed to stand to be separated into two layers of an organic layer and an aqueous layer. Extraction into an organic layer was carried out and the resulting organic layer was fractionated. The extracts were washed with water, with a saturated aqueous solution of sodium bicarbonate and with water, and dried over anhydrous magnesium sulfate. Then, the solvent was distilled off under reduced pressure, and the resulting residue was purified by means of fraction-collecting column chromatography using heptane as the eluent and silica gel as the stationary phase powder. The residue was further purified by recrystallization from a mixed solvent of Solmix A-11 and heptane (volume ratio of Solmix A-11: heptane=1:2) and then dried, whereby 3.1 g of 3,5,2'-trifluoro-4'-(trans-4-propylcyclohexyl)-4-(3,3,3-trifluoropropenyl) biphenyl (No. 2.47) was obtained. The yield based on the compound (T15) was 51.6%.

The phase transition temperature of the resulting compound (No. 2.47) was as follows.

Phase transition temperature: $C_1$ 45.8 $C_2$ 82.3 N 123.8 Iso.

The chemical shift δ (ppm) of $^1$H-NMR analysis was as indicated below, and the resulting compound was identified as 3,5,2'-trifluoro-4'-(trans 4-propylcyclohexyl)-4-(3,3,3-trifluoropropenyl)biphenyl. The solvent for measurement was $CDCl_3$.

Chemical shift δ (ppm); 7.33 (t, 1H), 7.24 (dd, 1H), 6.17 (d, 2H), 7.09-7.01 (m, 2H) 6.63-6.56 (m, 1H), 2.53-2.48 (m, 1H), 1.93-1.87 (m, 4H), 1.54-1.20 (m, 7H), 1.10-1.01 (m, 2H), and 0.90 (t, 3H)

Example 4

A liquid crystal composition C consisting of the mother liquid crystals A (85% by mass) and 3,5,2'-trifluoro-4'-(trans-4-propylcyclohexyl)-4-(3,3,3-trifluoropropenyl)biphenyl (No. 2.47; 15% by mass) obtained in Example 3 was prepared. The physical property-values of the resulting liquid crystal composition C were measured, and the extrapolated values of the physical properties of the liquid crystal compound (No. 2.47) were calculated by extrapolating the measured values. The values were as follows.

Maximum temperature ($T_{NI}$)=94.4° C.; optical anisotropy (Δn)=0.190; dielectric anisotropy (Δε)=24.3.

This proved that the liquid crystal compound (No. 2.47) is a compound having a high maximum temperature ($T_{NI}$), a large optical anisotropy (Δn), and a large dielectric anisotropy (Δε).

Example 5

Synthesis of 3,5,2'-trifluoro-4"-propyl-4-(3,3,3-trifluoropropenyl)-[1',1'; 4',1"]terphenyl (No. 2.108)

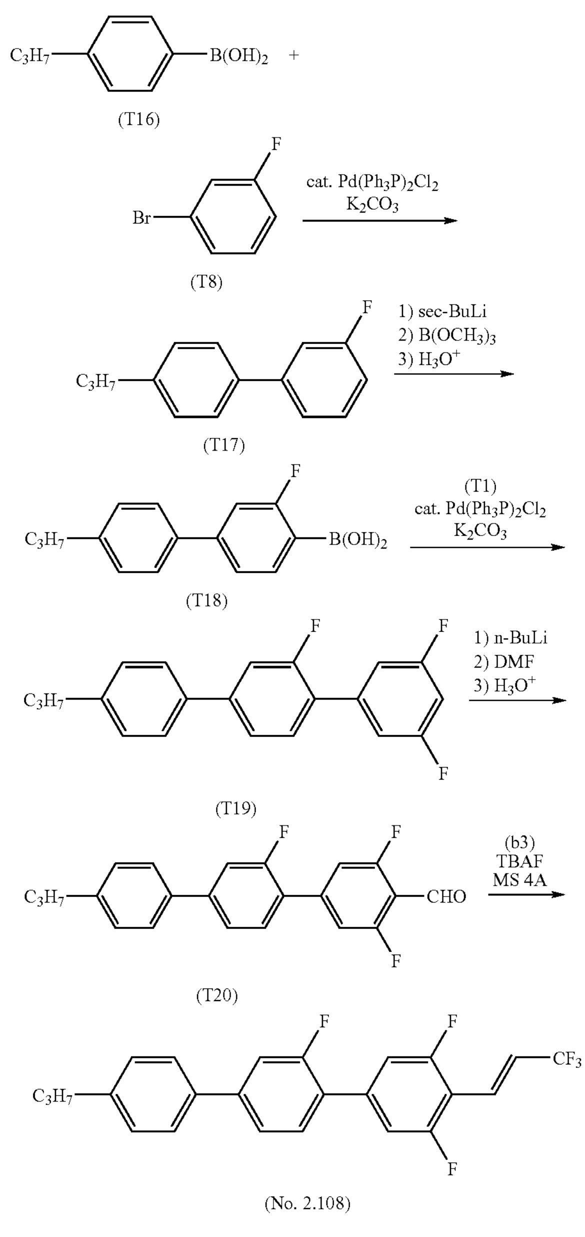

First Step:

Into a reaction vessel under an atmosphere of nitrogen, 4-propyl phenylboronic acid (T16; 200.0 g), 1-bromo-3-fluorobenzene (T8; 177.8 g), potassium carbonate (281.9 g), $Pd(Ph_3P)_2Cl_2$ (7.2 g), toluene (600 ml), and Solmix A-11 (600 ml) were put and heated under reflux for 2 hours. After the reaction mixture had been cooled to 25° C., the solution was poured into water (2,000 ml) and toluene (1,000 ml), and mixed. The mixture was then allowed to stand to be separated into two layers of an organic layer and an aqueous layer. Extraction into an organic layer was carried out and the resulting organic layer was fractionated. The extracts were washed with water, and dried over anhydrous magnesium sulfate. The resulting solution was concentrated under reduced pressure, and the residue was purified by means of fraction-collecting column chromatography using heptane as the eluent and silica gel as the stationary phase powder. The solution was further purified by recrystallization from Solmix A-11 and then dried, whereby 175.5 g of 3-fluoro-4'-propylbiphenyl (T17) was obtained. The yield based on the compound (T8) was 80.3%.

Second Step:

The compound (T17) and THF (1,000 ml) were put into a reaction vessel under an atmosphere of nitrogen, and chilled to −71° C. Then, a sec-butyl lithium solution (1.0 M in cyclohexane and n-hexane; 1,000 ml) were added dropwise thereto in the temperature range of −71° C. to −62° C., and the stirring was continued for additional 120 minutes. Subsequently, trimethyl borate (127.6 g) was added dropwise in the temperature range of −70° C. to −59° C., and the stirring was continued for additional 180 minutes. The resulting reaction mixture was allowed to come to 0° C., and then poured into a vessel containing 1N-hydrochloric acid (3,000 ml) and ethyl acetate (3,000 ml) which had been chilled at 0° C. and mixed. The mixture was then allowed to stand to be separated into an organic layer and an aqueous layer. Extraction was carried out and the resulting organic layer was fractionated. The extracts were washed with brine, and dried over anhydrous magnesium sulfate. Then, the solvent was distilled off under reduced pressure, whereby 115.9 g of phenylboronic acid derivative (T18) was obtained.

Third Step:

1-Bromo-3,5-difluorobenzene (T1; 74.8 g), potassium carbonate (107.1 g), and $Pd(Ph_3P)_2Cl_2$ (1.4 g), and Solmix A-11 (400 ml) were put into a reaction vessel under an atmosphere of nitrogen, and stirred at 60° C. The compound (T18) dissolved in Solmix A11 (500 ml) was added dropwise thereto in the temperature range of 63° C. to 65° C., and heated under reflux for 2 hours. After the reaction mixture had been cooled to 25° C., the solution was poured into a mixture of toluene (1,000 ml) and water (1,000 ml), and mixed. The mixture was then allowed to stand to be separated into two layers of an organic layer and an aqueous layer. Extraction was carried out and the resulting organic layer was fractionated. The extracts were washed with water, and dried over anhydrous magnesium sulfate. The resulting solution was concentrated under reduced pressure, and the residue was purified by means of fraction-collecting column chromatography using a mixed solvent of heptane and toluene (volume ratio of heptane: toluene=4:1) as the eluent and silica gel as the stationary phase powder. The residue was further purified by recrystallization from a mixed solvent of Solmix A-11 and heptane (volume ratio of Solmix A-11: heptane=1:2) and then dried, whereby 72.7 g of 3,5,2'-trifluoro-4"-propyl-[1,1'; 4',1"]terphenyl (T19) was obtained. The yield based on the compound (T18) was 57.5%.

The phase transition temperature of the obtained compound (T19) was as follows.

Phase transition temperature: C 57.7 $S_A$ 62.4 Iso.

Fourth Step:

The compound (T19; 26.1 g) and THF (200 ml) were mixed under an atmosphere of nitrogen and chilled to −70° C. Then, a n-butyl lithium solution (1.6 M in n-hexane; 60 ml)

was added dropwise in the temperature range of −70° C. to −63° C., and the stirring was continued at −65° C. for additional 120 minutes. Subsequently, DMF (11.7 g) was added dropwise in the temperature range of −65° C. to −55° C., and the stirring was continued at 0° C. for additional 60 minutes. Then, the mixture was poured into a mixture of 1 N-hydrochloric acid (400 ml) and toluene (300 ml) which had been chilled at 0° C. The mixture was then allowed to stand to be separated into two layers of an organic layer. Extraction into an organic layer was carried out and the resulting organic layer was fractionated. The extracts were washed with a saturated aqueous solution of sodium bicarbonate and with water, and dried over anhydrous magnesium sulfate. The resulting solution was concentrated under reduced pressure. The resulting residue was further purified by recrystallization from a mixed solvent of heptane and THF (volume ratio of heptane:THF=1:1) and then dried, whereby 19.5 g of 3,5,2'-trifluoro-4"-propyl-[1,1'; 4',1"]terphenyl-4-carboaldehyde (T20) was obtained. The yield based the compound (T19) was 68.9%.

Fifth Step:

Molecular sieves 4A (MS 4A; 116.4 g) and a tetrabutylammonium fluoride solution (TBAF; 1.0 M in THF; 145 ml) was put into a reaction vessel under an atmosphere of nitrogen, and stirred at room temperature for 20 hours. Then, a THF solution (90 ml) in which the compound (T20; 5.2 g) and the compound (b3; 6.0 g) were dissolved was added dropwise in the temperature range of 5° C. to 10° C., and the stirring was continued at room temperature for additional 1 hour. The MS 4A was removed by filtration from the resulting reaction mixture, and water (500 ml) and toluene (500 ml) were added to the filtrate and mixed. The mixture was then allowed to stand to be separated into two layers of an organic layer. Extraction into an organic layer was carried out and the resulting organic layer was fractionated. The extracts were washed with water, with a saturated aqueous solution of sodium bicarbonate and with water, and dried over anhydrous magnesium sulfate. Subsequently, the solvent was distilled off under reduced pressure. The resulting residue was purified by means of fraction-collecting column chromatography using a mixed solvent of heptane and toluene (volume ratio of heptane:toluene 4:1) as the eluent and silica gel as the stationary phase powder. The residue was further purified by recrystallization from a mixed solvent of Solmix A-11 and ethyl acetate (volume ratio of Solmix A-11 ethyl acetate=1:2) and then dried, whereby 3.8 g of 3,5,2'-trifluoro-4"-propyl-4-(3,3,3-trifluoropropenyl)-[1,1'; 4',1"]terphenyl (No. 2.108) was obtained. The yield based on the compound (T20) was 62.2%.

The phase transition temperature of the resulting compound (No. 2.108) was as follows.

Phase transition temperature: C 88.0 $S_A$ 155.4 Iso.

The chemical shift δ (ppm) of $^1$H-NMR analysis was indicated below, and the resulting compound was identified as 3,5,2'-trifluoro-4"-propyl-4-(3,3,3-trifluoropropenyl)-[1,1'; 4',1"]terphenyl. The solvent for measurement was $CDCl_3$.

Chemical shift δ (ppm); 7.53 (d, 2H), 7.50-7.46 (m, 2H), 7.42-7.40 (m, 1H), 7.29 (d, 2H), 7.26-7.22 (m, 3H), 6.66-6.58 (m, 1H), 2.65 (t, 2H), 1.73-1.65 (m, 2H), and 0.98 (t, 3H).

Example 6

A liquid crystal composition D consisting of the mother liquid crystals A (85% by mass) and 3,5,2'-trifluoro-4"-propyl-4-(3,3,3-trifluoropropenyl)- [1,1'; 4',1"]terphenyl (No. 2.108; 15% by mass) obtained in Example 5 was prepared. The physical property-values of the resulting liquid crystal composition D were measured, and the extrapolated values of the physical properties of the liquid crystal compound (No. 2.108) were calculated by extrapolating the measured values. The values were as follows.

Maximum temperature ($T_{NI}$)=99.7° C.; optical anisotropy (Δn)=0.270; dielectric anisotropy (Δε)=30.3.

This proved that the liquid crystal compound (No. 2.108) is a compound having a high maximum temperature ($T_{NI}$), a large optical anisotropy (Δn), and a large dielectric anisotropy (Δε).

Example 7

Synthesis of 3,2'-difluoro-4"-propyl-4-(3,3,3-trifluoropropenyl)-[1,1'; 4',1"]terphenyl (No. 2.88)

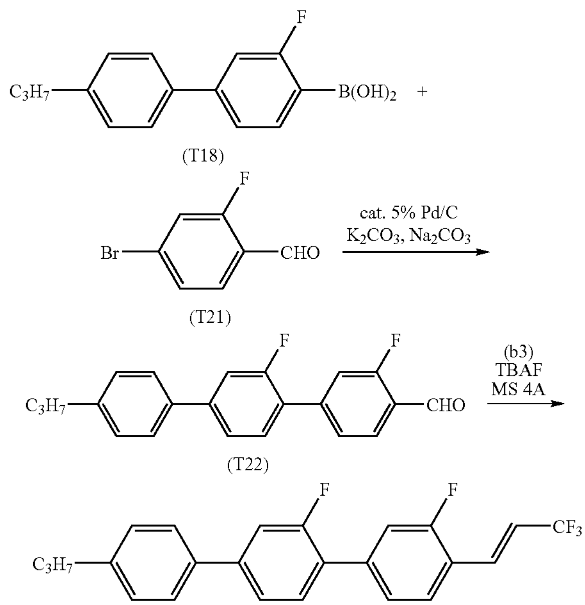

(No. 2.88)

First Step:

The phenylboronic acid derivative (T18; 22.9 g), 4-bromo-2-fluorobenzaldehyde (T21; 15.0 g), potassium carbonate (5.1 g), sodium carbonate (11.8 g), 5% Pd/C (0.3 g), toluene (60 ml), and isopropyl alcohol (IPA; 60 ml) were put into a reaction vessel under an atmosphere of nitrogen, and heated under reflux for 9 hours. After the reaction mixture had been cooled to 25° C., the solution was poured into a mixture of toluene (100 ml) and water (100 ml), and mixed. Then, the solution was allowed to stand to be separated into two layers of an organic layer and an aqueous layer. Extraction into an organic layer was carried out and the resulting organic layer was fractionated. The extracts were washed with water, and dried over anhydrous magnesium sulfate. The resulting solution was concentrated under reduced pressure, and the residue was purified by means of fraction-collecting column chromatography using toluene as the eluent and silica gel as the stationary phase powder. The solution was further purified by recrystallization from a mixed solvent of THF and heptane (volume ratio of THF:heptane=1:2) and then dried, whereby 19.9 g of 3,2'-difluoro-4'-propyl-[1,1'; 4',1"]terphenyl-4-carboaldehyde (T22) was obtained. The yield based on the compound (T21) was 80.1%.

Second Step:

Molecular sieves 4A (MS 4A; 22.0 g) and a tetrabutylammonium fluoride solution (TBAF; 1.0 M in THF; 44.0 ml) were put into a reaction vessel under an atmosphere of nitrogen, and stirred at room temperature for 13 hours. Then, a THF solution (50 ml) in which the compound (T22; 5.0 g) and the compound (b3; 5.1 g) were dissolved was added dropwise in the temperature range of 20° C. to 25° C., and the stirring was continued at room temperature for additional 1 hour. The MS 4A was removed by filtration from the resulting reaction mixture, and water (200 ml) and toluene (200 ml) were added to the filtrate and mixed. The mixture was then allowed to stand to be separated into two layers of an organic layer and an aqueous layer. Extraction into an organic layer was carried cut and the resulting organic layer was fractionated. The extracts were washed with water, with a saturated aqueous solution of sodium bicarbonate and with water, and dried over anhydrous magnesium sulfate. Subsequently, the solvent was distilled off under reduced pressure. The resulting residue was purified by means of fraction-collecting column chromatography using a mixed solvent of heptane and toluene (volume ratio ofheptane:toluene=4:1) as the eluent and silica gel as the stationary phase powder. The residue was further purified by recrystallization from a mixed solvent of Solmix A-11 and toluene (volume ratio of Solmix A-11: toluene=2:1) and then dried, whereby 1.7 g of 3,2'-difluoro-4"-propyl-4-(3,3,3-trifluoropropenyl)-[1,1'; 4',1"]terphenyl (No. 2.88) was obtained. The yield based on the compound (T22) was 28.8%.

The phase transition temperature of the resulting compound (No. 2.88) was as follows.

Phase transition temperature: C 76.9 $S_A$ 184.2 Iso.

The chemical shift δ (ppm) of $^1$H-NMR analysis was as indicated below, and the resulting compound was identified as 3,2'-difluoro-4"-propyl-4-(3,3,3-trifluoropropenyl)-[1,1'; 4',1"]terphenyl. The solvent for measurement was $CDCl_3$.

Chemical shift δ (ppm); 7.53-7.37 (m, 8H), 7.32-7.27 (m, 3H), 6.42-6.35 (m, 1H), 2.65 (t, 2H), 1.73-1.66 (m, 2H), and 0.98 (t, 3H).

Example 8

A liquid crystal composition E consisting of the mother liquid crystals A (85% by mass) and 3,2'-difluoro-4"-propyl-4-(3,3,3-trifluoropropenyl)-[1,1'; 4',1"]terphenyl (No. 2.88; 15% by mass) obtained in Example 7 was prepared. The physical property-values of the resulting liquid crystal composition E were measured, and the extrapolated values of the physical properties of the liquid crystal compound (No. 2.88) were calculated by extrapolating the measured values. The values were as follows.

Maximum temperature ($T_{NI}$)=101.7° C.; optical anisotropy (Δn)=0.277; dielectric anisotropy (Δϵ)=23.2.

This proved that the liquid crystal compound (No. 2.88) is a compound having a high maximum temperature ($T_{NI}$), a large optical anisotropy (Δn), and a large dielectric anisotropy (Δϵ).

Example 9

Synthesis of 3,5-difluoro-4'-propyl-4-(3,3,3-trifluoropropenyl)biphenyl (No. 1.63)

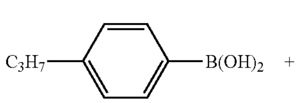

(T16)

-continued

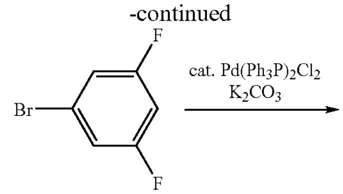

(T23)

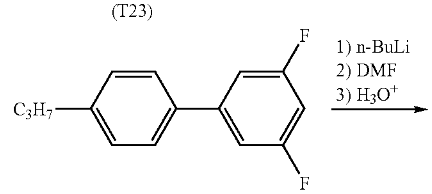

(T24)

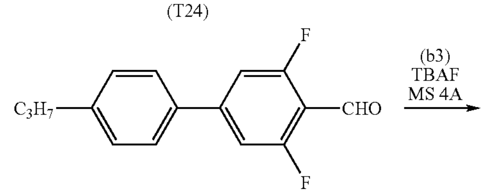

(T25)

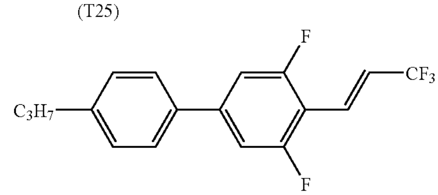

(No. 1.63)

First Step:

4-Propylphenylboronic acid (T16; 100.0 g), 1-bromo-2,3-difluorobenzene (T23; 98.1 g), potassium carbonate (140.4 g), $Pd(Ph_3P)_2Cl_2$ (3.6 g), toluene (300 ml), and Solmix A-11 (300 ml) were put into a reaction vessel under an atmosphere of nitrogen, and heated under reflux for 2 hours. After the reaction mixture had been cooled to 25° C., the solution was poured into water (1,000 ml) and toluene (500 ml) and mixed. The mixture was then allowed to stand to be separated into two layers of an organic layer and an aqueous layer. Extraction into an organic layer was carried out and the resulting organic layer was fractionated. The extracts were washed with water, and dried over anhydrous magnesium sulfate. The resulting solution was concentrated under reduced pressure, and the residue was purified by means of fraction-collecting column chromatography using heptane as the eluent and silica gel as the stationary phase powder and then dried, whereby 101.0 g of 3,5-difluoro-4'-propylbiphenyl (T24) was obtained. The yield based on the compound (T23) was 85.6%.

Second Step:

The compound (T24; 30.0 g) and THF (150 ml) was mixed under an atmosphere of nitrogen, and chilled to −70° C. Then, a n-butyl lithium solution (1.6 M in n-hexane; 84 ml) was added dropwise in the temperature range of −70° C. to −60° C., and the stirring was continued at −70° C. for additional 120 minutes. Subsequently, DMF (14.2 g) was added dropwise in the temperature range of −70° C. to −60° C., and the stirring was continued at −30° C. for additional 60 minutes. Then, the solution was poured into a mixture of 1 N-hydrochloric acid (300 ml) and toluene (200 ml) which had been chilled at 0° C. Then, the solution was allowed to stand to be separated into two layers of an organic layer and an aqueous layer. Extraction into an organic layer was carried out and the resulting organic layer was fractionated. The extracts were washed with a saturated aqueous solution of sodium bicarbonate and with water, and dried over anhydrous magnesium sulfate. The resulting solution was concentrated under reduced pressure, and the resulting residue was purified by recrystallization from heptane and then dried, whereby 31.8 g of 3,5-difluoro-4'-propyl biphenyl 4-carboaldehyde (T25) was obtained. The yield based on the compound (T24) was 94.8%.

Third Step:

Molecular sieves 4A (MS 4A; 50.0 g) and tetrabutylammonium fluoride solution (TBAF; 1.0 M in THF; 77 ml) were put into a reaction vessel under an atmosphere of nitrogen, and stirred at room temperature for 20 hours. Then, a THF solution (50 ml) in which the compound (T25; 5.0 g) and the compound (b3; 6.6 g) were dissolved was added dropwise in the temperature range of 20° C. to 25° C., and the stirring was continued at room temperature for additional 1 hour. The MS 4A was removed by filtration from the resulting reaction mixture, and water (200 ml) and ethyl acetate (200 ml) were added to the filtrate and mixed. The mixture was then allowed to stand to be separated into two layers of an organic layer and an aqueous layer. Extraction into an organic layer was carried out and the resulting organic layer was fractionated. The extracts were washed with water, with a saturated aqueous solution of sodium bicarbonate and with water, and dried over anhydrous magnesium sulfate. Subsequently, the solvent was distilled off under reduced pressure. The resulting residue was purified by means of fraction-collecting column chromatography using heptane as the eluent and silica gel as the stationary phase powder. The residue was further purified by recrystallization from Solmix A-11 and dried, whereby 3.9 g of 3,5-difluoro-4'-propyl-4-(3,3,3-trifluoropropenyl)biphenyl (No. 1.63) was obtained. The yield based on the compound (T25) was 61.6%.

The phase transition temperature of the resulting compound (No. 1.63) was as follows.

Phase transition temperature: C 40.6 Iso.

The chemical shift δ (ppm) of $^1$H-NMR analysis was as indicated below, and the resulting compound was identified as 3,5-difluoro-4'-propyl-4-(3,3,3-trifluoropropenyl)biphenyl. The solvent for measurement was $CDCl_3$.

Chemical shift δ (ppm); 7.47 (d, 2H), 7.28-7.22 (m, 3H), 7.19-7.15 (m, 2H), 6.61-6.54 (m, 1H), 2.64 (t, 2H), 1.72-1.64 (m, 2H), and 0.97 (t, 3H).

Example 10

A liquid crystal composition F consisting of the mother liquid crystals A (85% by mass) and 3,5-difluoro-4'-propyl-4-(3,3,3-trifluoropropenyl)biphenyl (No. 1.63; 15% by mass) obtained in Example 9 was prepared. The physical property-values of the resulting liquid crystal composition F were measured, and the extrapolated values of the physical properties of the liquid crystal compound (No. 1.63) were calculated by extrapolating the measured values. The values were as follows.

Maximum temperature ($T_{NI}$)=−22.3° C.; optical anisotropy (Δn)=0.157; dielectric anisotropy (Δε)=21.7.

This proved that the liquid crystal compound (No. 1.63) was a compound having a large dielectric anisotropy (Δε).

Example 11

Synthesis of 3,5,2'-trifluoro-4"-(trans-4-pentylcyclohexyl)-4-(3,3,3-trifluoropropenyl)-[1,1'; 4',1"]terphenyl (No. 3.13)

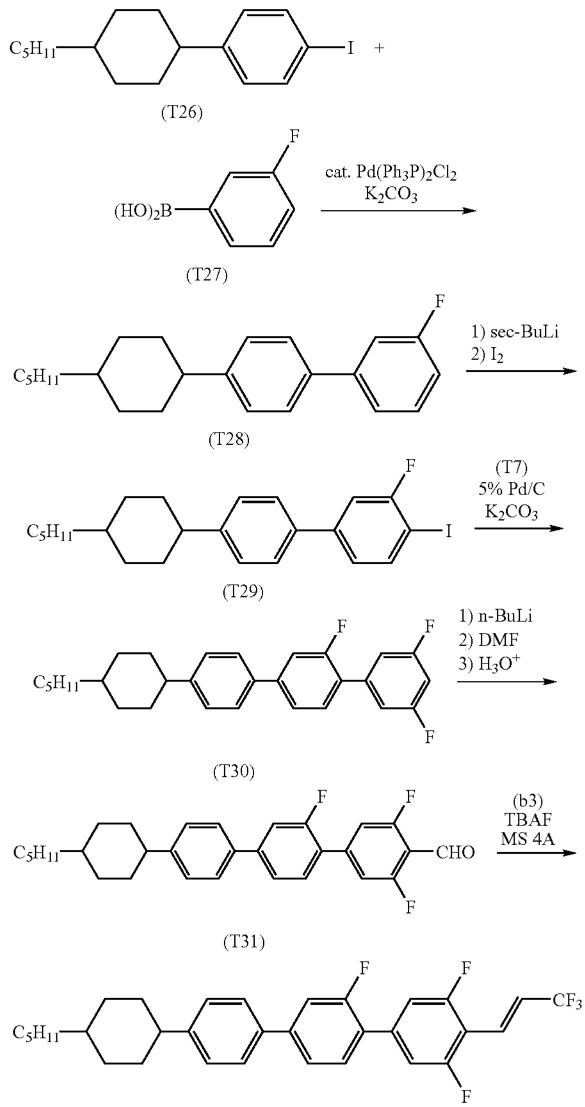

First Step:

Into a reaction vessel under an atmosphere of nitrogen, 1-iodo-4-(trans-4-pentylcyclohexyl)benzene (T26; 50.0 g), 3-fluorophenylboronic acid (T27; 21.5 g), potassium carbonate (58.0 g), Pd $(Ph_3P)_2Cl_2$ (2.95 g), water (200 ml), toluene (200 ml), and Solmix A-11 (200 ml) were put and heated under reflux for 8 hours. After the reaction mixture had been cooled to 25° C., the solution was poured into water (1,000 ml) and toluene (500 ml) and mixed. The mixture was then allowed to stand to be separated into two layers of an organic layer and an aqueous layer. Extraction into an organic layer was carried out and the resulting organic layer was fractionated. The extracts were washed with water, and dried over anhydrous magnesium sulfate. The resulting solution was concentrated under reduced pressure, and the residue was purified by means of fraction-collecting column chromatography using heptane as the eluent and silica gel as the stationary phase powder. The residue was further purified by recrystallization from a mixed solvent of ethyl acetate and Solmix A-11 (volume ratio of ethyl acetate Solmix A-11=1:1) and then dried, whereby 37.3 g of 3-fluoro-4'-(trans-4-pentylcyclohexyl)biphenyl (T28) was obtained. The yield based on the compound (T26) was 82.0%.

Second Step:

The compound (T28; 37.3 g) and THF (500 ml) were mixed under an atmosphere of nitrogen, and chilled to −70° C. Then, a sec-butyl lithium solution (1.02 M in cyclohexane; 135 ml) was added dropwise in the temperature range of −70° C. to −60° C., and the stirring was continued at −70° C. for additional 180 minutes. Subsequently, a THF solution (250 ml) in which iodine (37.8 g) was dissolved was added dropwise in the temperature range of −70° C. to −60° C., and the stirring was continued at −30° C. for additional 60 minutes. Then, the mixture was poured into a mixture of water (1,000 ml) and toluene (750 ml) which had been chilled at 0° C. The mixture was then allowed to stand to be separated into two layers of an organic layer and an aqueous layer. Extraction into an organic layer was carried out and the resulting organic layer was fractionated. The extracts were washed with a saturated aqueous solution of sodium thiosulfate and with water, and dried over anhydrous magnesium sulfate. The resulting solution was concentrated under reduced pressure, and the residue was purified by means of fraction-collecting column chromatography using a mixture of heptane and toluene (volume ratio of heptane:toluene=3:1) as the eluent and silica gel as the stationary phase powder. The residue was further purified by recrystallization from a mixed solvent of ethyl acetate and Solmix A-11 (volume ratio of ethyl acetate:Solmix A-11=1:1) and then dried, whereby 45.1 g of 3-fluoro-4-iodo-4'-(trans-4-pentylcyclohexyl)biphenyl (T29) was obtained. The yield from the compound (T28) was 87%.

Third Step:

The compound (T29; 30.0 g), the compound (T7; 11.6 g), potassium carbonate (27.6 g), 5% Pd/C (0.28 g), water (200 ml), toluene (200 ml), and Solmix A-11 (200 ml) were put into a reaction vessel under an atmosphere of nitrogen, and heated under reflux for 11 hours. After the reaction mixture had been cooled to 25° C., the solution was poured into water (1,000 ml) and toluene (500 ml), and mixed. The mixture was then allowed to stand to be separated into two layers of an organic layer and an aqueous layer. Extraction into an organic layer was carried out and the resulting organic layer was fractionated. The extracts were washed with water, and dried over anhydrous magnesium sulfate. The resulting solution was concentrated under reduced pressure, and the residue was purified by means of fraction-collecting column chromatography using heptane as the eluent and silica gel as the stationary phase powder. The residue was further purified by recrystallization from a mixed solvent of ethyl acetate and Solmix A-11 (volume ratio of ethyl acetate:Solmix A-11=1:1) and then dried, whereby 24.9 g of 3,5,2'-trifluoro-4"-trans-4-pentylcyclohexyl)-[1,1'; 4',1"]terphenyl (T30) was obtained. The yield based on the compound (T29) was 86%.

Fourth Step:

The compound (T30; 10.0 g) and THF (250 ml) were mixed under an atmosphere of nitrogen, and chilled to −70° C. Then, a n-butyl lithium solution (1.57 M in hexane; 16 ml) was added dropwise in the temperature range of −70° C. to −60° C., and the stirring was continued at −70° C. for additional 60 minutes. Subsequently, a THF solution (25 ml) in which DMF (3.4 g) was dissolved was added dropwise in the temperature range of −70° C. to −60° C., and the stirring was continued at −60° C. for additional 60 minutes. Then, the mixture was poured into a mixture of 1 N-hydrochloric acid (600 ml) and toluene (300 ml) which had been chilled at 0° C., and mixed. The mixture was then allowed to stand to be separated into two layers of an organic layer and an aqueous layer. Extraction into an organic layer was carried out and the resulting organic layer was fractionated. The extracts were washed with a saturated aqueous solution of sodium bicarbonate and with water, and dried over anhydrous magnesium sulfate. The resulting solution was concentrated under reduced pressure, and the residue was purified by means of fraction-collecting column chromatography using toluene as the eluent and silica gel as the stationary phase powder. The residue was further purified by recrystallization from a mixed solvent of toluene and heptane (volume ratio of toluene:heptane=1:1) and then dried, whereby 7.6 g of 3,5,2'-trifluoro-4"-(trans-4-pentylcyclohexyl)-[1,1'; 4',1"]terphenyl-4-carboaldehyde (T31) was obtained. The yield based on the compound (T30) was 72%.

Fifth Step:

Molecular sieves 4A (MS 4A; 94.4 g) and a tetrabutylammonium fluoride solution (TBAF; 1.0 M in THF; 118 ml) were put into a reaction vessel under an atmosphere of nitrogen, and stirred at room temperature for 20 hours. Then, a THF solution (200 ml) in which the compound (T31; 5.5 g) and the compound (b3; 5.1 g) were dissolved was added dropwise in the temperature range of 20° C. to 25° C., and the stirring was continued at room temperature for additional 1 hour. The MS 4A was removed by filtration from the resulting reaction mixture, and water (500 ml) and toluene (500 ml) were added to the filtrate and mixed. The mixture was then allowed to stand to be separated into two layers of an organic layer and an aqueous layer. Extraction into an organic layer was carried out and the resulting organic layer was fractionated. The extracts were washed with water, with a saturated aqueous solution of sodium bicarbonate and with water, and dried over anhydrous magnesium sulfate. Subsequently, the solvent was distilled off under reduced pressure. The resulting residue was purified by means of fraction-collecting column chromatography using heptane as the eluent and silica gel as the stationary phase powder. The residue was further purified by recrystallization from a mixed solvent of Solmix A-11 and heptane (volume ratio of Solmix A-11: heptane=1: 1) and then dried, whereby 2.6 g of 3,5,2'-trifluoro-4"-(trans-4-pentylcyclohexyl)-4-(3,3,3-trifluoropropenyl)-[1,1'; 4',1"] terphenyl (No. 3.13) was obtained. The yield based on the compound (T31) was 41%.

The phase transition temperature of the resulting compound (No. 3.13) was as follows.

Phase transition temperature: C 97.4 N 292.0 Iso.

The chemical shift δ (ppm) of $^1$H-NMR analysis was as indicated below, and the resulting compound was identified as 3,5,2'-trifluoro-4"-(trans-4-pentylcyclohexyl)-4-(3,3,3-trifluoropropenyl)-[1,1'; 4',1"]terphenyl. The solvent for measurement was $CDCl_3$.

Chemical shift δ (ppm); 7.54 (d, 2H), 7.50-7.46 (m, 2H), 7.40 (d, 1H), 7.32 (d, 2H), 7.29-7.23 (m, 3H), 6.66-6.58 (m, 1H), 2.52 (tt, 1H), (t, 4H), 1.53-1.46 (m, 2H), 1.33-1.22 (m, 9H), 1.09 (t, 2H), and (t, 3H).

Example 12

A liquid crystal composition G consisting of the mother liquid crystals A (85% by mass) and 3,5,2'-trifluoro-4"-(trans-4-pentylcyclohexyl)-4-(3,3,3-trifluoropropenyl)-[1,1'; 4',1"]terphenyl (No. 3.13; 15% by mass) obtained in Example 11 was prepared. The physical property-values of the resulting liquid crystal composition G were measured, and the extrapolated values of the physical properties of the liquid crystal compound (No. 3.13) were calculated by extrapolating the measured values. The values were as follows.

Maximum temperature ($T_{NI}$)=207.0° C.; optical anisotropy (Δn)=0.270; dielectric anisotropy (Δϵ)=17.7.

This proved that the liquid crystal compound (No. 3.13) is a compound having a very high maximum temperature ($T_{NI}$), a large optical anisotropy (Δn), and a large dielectric anisotropy (Δϵ).

Example 13

Synthesis of 3,5,2'-trifluoro-4"-propyl-4-(3,3,3-trifluoropropynyl)-[1,1'; 4',1"]terphenyl (No. 5.47)

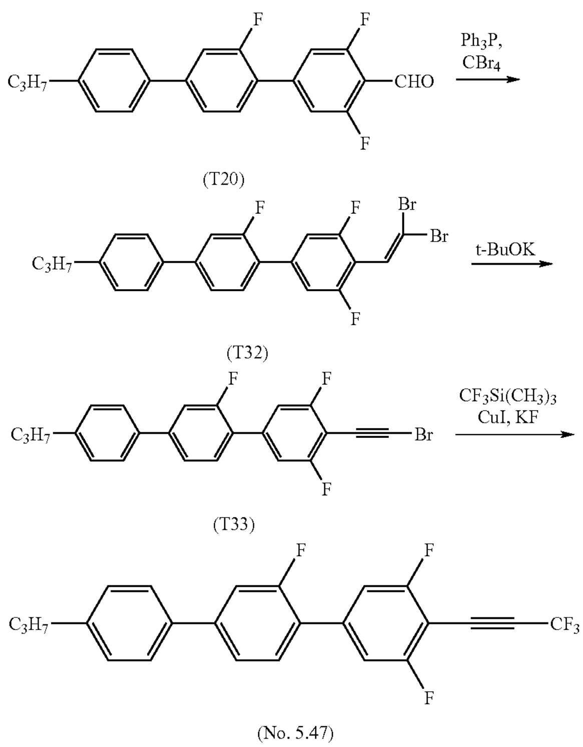

First Step:

The compound (T20; 13.0 g), triphenylphosphine (23.1 g), and EDC (130 ml) were put into a reaction vessel under an atmosphere of nitrogen, and stirred at 0° C. Carbon tetrabromide (14.6 g) dissolved in EDC (30 ml) was added dropwise thereto in the temperature range of 0° C. to 5° C., and the stirring was continued at 5° C. for additional 60 minutes. Subsequently, acetone (20 ml) was added dropwise in the temperature range of 0° C. to 10° C., and further water (200 ml) was added dropwise in the temperature range of 0° C. to 10° C. An organic layer was fractionated from the resulting reaction mixture, washed with a saturated aqueous solution of sodium bicarbonate and with water, and dried over anhydrous magnesium sulfate. The resulting solution was concentrated under reduced pressure, and the residue was purified by means of column fraction-collecting chromatography using a mixed solvent of heptane and toluene (volume ratio of heptane:toluene=1:1) as the eluent and silica gel as the stationary phase powder and then dried, whereby 16.9 g of 4-(2,2-dibromovinyl)-3,5,2'-trifluoro-4"-propyl-[1,1'; 4',1"]terphenyl (T32) was obtained. The yield based on the compound (T20) was 90.2%.

Second Step:

The compound (T32; 16.0 g), heptane (20 ml), and toluene (200 ml) were put into a reaction vessel under an atmosphere of nitrogen, and stirred at 0° C. Potassium t-butoxide (3.9 g), which was divided into three portions, was added thereto separately in the temperature range of 0° C. to 5° C., and the stirring was continued at 5° C. for additional 60 minutes. The resulting reaction mixture (200 ml) was poured into water at 0° C. and mixed. The mixture was then allowed to stand to be separated into an organic layer and an aqueous layer. Extraction was carried out and the resulting organic layer was fractionated. The extracts were washed with water, and dried over anhydrous magnesium sulfate. Then, the solvent was distilled off under reduced pressure, and the residue was purified by means of fraction-collecting column chromatography using a mixed solvent of heptane and toluene (volume ratio of heptane:toluene=1:1) as the eluent and silica gel as the stationary phase powder. The residue was further purified by recrystallization from a mixed solvent of Solmix A-11 and ethyl acetate (volume ratio of Solmix A-11: ethyl acetate=1:2) and then dried, whereby 11.4 g of 4-bromoethynyl-3,5,2'-trifluoro-4"-propyl-[1,1'; 4,1']terphenyl (T33) was obtained. The yield based on the compound (T32) was 84.7%.

Third Step:

Copper iodide (I) (6.0 g), potassium fluoride (1.5 g), and DMF (50 ml) were put into a reaction vessel under an atmosphere of nitrogen, and stirred at room temperature. Trimethyl(trifluoromethyl)silane (8.9 g) was added thereto, and the stirring was continued for additional 60 minutes. Subsequently, the compound (T33; 9.0 g) dissolved in NMP (50 ml) was added dropwise in the temperature range of 20° C. to 25° C., and the stirring was continued at room temperature for additional 20 hours. The resulting reaction mixture was poured into a mixture of water (300 ml) and toluene (300 ml) which had been chilled at 0° C., and mixed. The mixture was then allowed to stand to be separated into two layers of an organic layer and an aqueous layer. Extraction into an organic layer was carried out and the resulting organic layer was fractionated. The extracts were washed with an aqueous 5% ammonia solution, with water, 0.5 N-hydrochloric acid, with a saturated aqueous solution of sodium bicarbonate and with water, and dried over anhydrous magnesium sulfate. The solution was concentrated under reduced pressure and the residue was purified by means of fraction-collecting column chromatography using a mixed solvent of heptane and toluene (volume ratio of heptane:toluene=4:1) as the eluent and silica gel as the stationary phase powder. The residue was further purified by recrystallization from a mixed solvent of Solmix A-11 and ethyl acetate (volume ratio of Solmix A-11 ethyl acetate=1:2) and then dried, whereby 0.83 g of 3,5,2'- trifluoro-4"-propyl-4-(3,3,3-trifluoropropynyl)-[1,1'; 4',1"] terphenyl (No. 5.47) was obtained. The yield based on the compound (T33) was 9.5%.

The phase transition temperature of the resulting compound (No. 5.47) was as follows.

Phase transition temperature: C 119.5 $S_A$ 125.3 Iso.

The chemical shift δ (ppm) of $^1$H-NMR analysis was as indicated below, and the obtain compound was identified as 3,5,2'-trifluoro-4"-propyl-4-(3,3,3-trifluoropropynyl)-[1,1'; 4',1']terphenyl. The solvent for measurement was $CDCl_3$.

Chemical shift δ (ppm); 7.53 (d, 2H), 7.50-7.46 (m, 2H), 7.43-7.40 (m, 1H), 7.30-7.25 (m, 4H), 2.65 (m, 2H), 1.73-1.65 (m, 2H), and 0.98 (t, 3H).

Example 14

A liquid crystal composition H consisting of the mother liquid crystals A (95% by mass) and 3,5,2'-trifluoro-4"-propyl-4-(3,3,3-trifluoropropynyl)-[1,1'; 4',1"]terphenyl (No. 5.47; 5% by mass) obtained in Example 13 was prepared. The physical property-values of the resulting liquid crystal composition H were measured, and the extrapolated values of the physical properties of the liquid crystal compound (No. 5.47) were calculated by extrapolating the measured values. The values were as follows.

Maximum temperature ($T_{NI}$)=85.7° C.; optical anisotropy (Δn)=0.277; dielectric anisotropy (Δϵ)=31.6.

This proved that the liquid crystalcompound (No. 5.47) is a compound having a high maximum temperature ($T_{NI}$), a large optical anisotropy (Δn), and a large dielectric anisotropy (Δϵ).

Example 15

The compounds (No. 1.1) to (No. 1.124), (No. 2.1) to (No. 2.242), (No. 3.1) to (No. 3.126), (No. 4.1 to 4.112), (No. 5.1) to (No. 5.228), and (No. 6.1) to (No. 6.126) shown below can be synthesized according to methods similar to the synthetic methods as described in Examples 1, 3, 5, 7, 9, 11, and 13. Data described herein were values determined in accordance with the above-mentioned methods. Phase transition temperatures were described using the measured values of the compounds themselves. Maximum temperature ($T_{NI}$), dielectric anisotropy (Δ∈), and optical anisotropy (Δn) were described using extrapolated values calculated by extrapolating the measured values of samples which were prepared by mixing the compounds and the mother liquid crystals A in accordance with the extrapolation method as described in Examples 2, 4, 6, 8, 10, 12, and 14.

3,5,2'-Trifluoro-4"-pentyl-4-(3,3,3-trifluoropropenyl)-[1, 1'; 4',1"]terphenyl (No. 2.110) was synthesized according to the method described in Example 5, using 4-pentyl phenylboronic acid (T34) as a starting material instead of the compound (T16).

(T34)

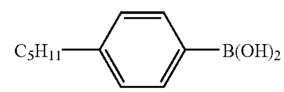

The chemical shift δ (ppm) of 1H-NMR analysis was as indicated below, and the resulting compound was identified as 3,5,2'-trifluoro-4"-pentyl-4-(3,3,3-trifluoropropenyl)-[1, 1'; 4',1"]terphenyl (No. 2.110). The solvent for measurement was $CDCl_3$.

Chemical shift δ (ppm); 7.53 (d, 2H), 7.50-7.45 (m, 2H), 7.42-7.39 (m, 1H), 7.28 (d, 2H), 7.25-7.22 (m, 3H), 6.65-6.58 (m, 1H), 2.66 (t, 2H), 1.69-1.63 (m, 2H), 1.40-1.32 (m, 4H), and 0.91 (t, 3H). 3,5,2',2"-Tetrafluoro-4"-(trans-4-pentylcyclohexyl)-4-(3,3,3-trifluoropropenyl)-[1,1'; 4',1"]terphenyl (No. 3.15) was synthesized according to the method described in Example 11, using 2-fluoro-1-iodo-4-(trans-4-pentylcyclohexyl)benzene (T35) as a starting material instead of the compound (T26).

(T35)

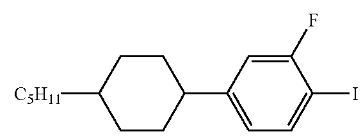

The chemical shift δ (ppm) of $^1$H-NMR analysis was as indicated below, and the resulting compound was identified as 3,5,2',2"-tetrafluoro-4"-(trans-4-pentylcyclohexyl)-4-(3, 3,3-trifluoropropenyl)-[1,1'; 4',1"]terphenyl (No. 3.15). The solvent for measurement was $CDCl_3$.

Chemical shift δ (ppm); 7.50-7.36 (m, 4H), 7.28-7.23 (m, 3H), 7.12 (d, 1H), 7.06 (d, 1H), 6.64-6.58 (m, 1H), 2.52 (tt, 1H), 1.92 (t, 4H), (m, 2H), 1.35-1.22 (m, 9H), 1.11-1.07 (m, 2H), and 0.90 (t, 3H).

No. 1.1

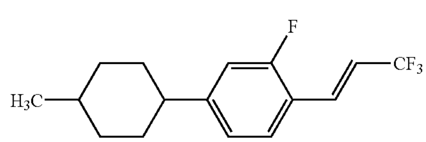

No. 1.2

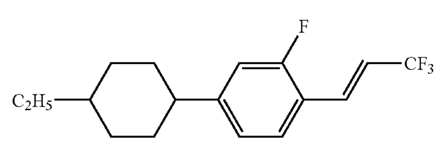

1.3

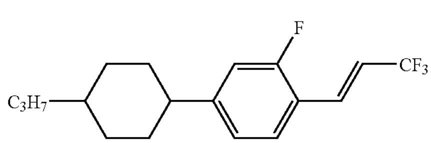

1.4

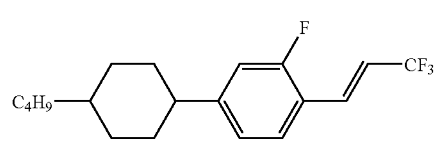

1.5

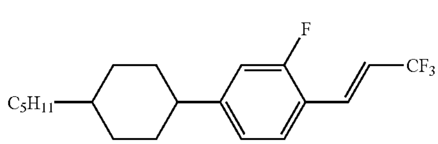

1.6

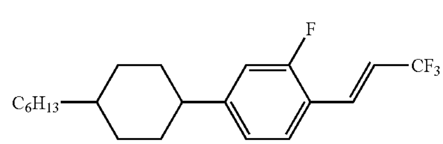

-continued
1.7
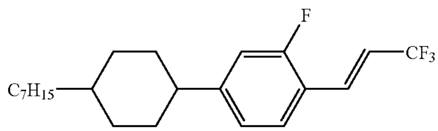
1.8
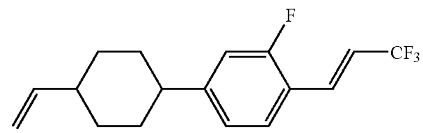
1.9
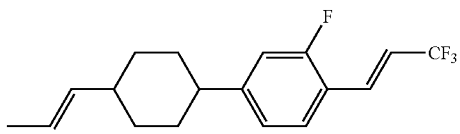
1.10
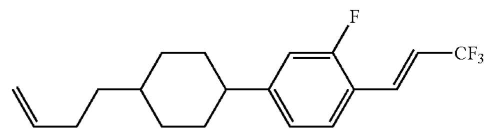
1.11
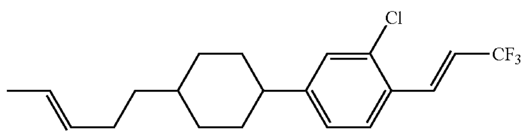
1.12
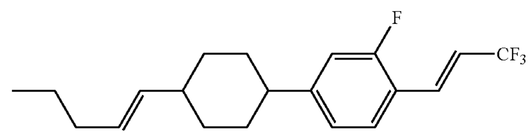
1.13
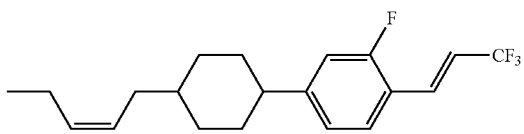
1.14
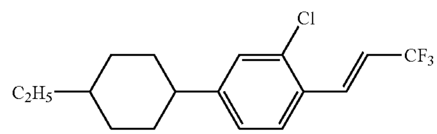
1.15
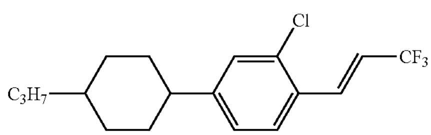
1.16
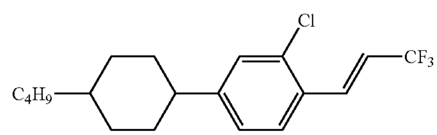
1.17
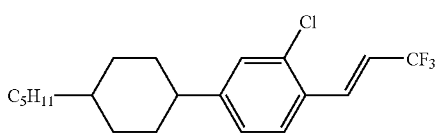
1.18
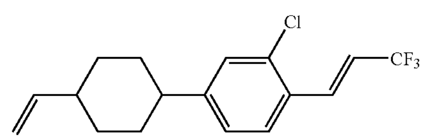
1.19
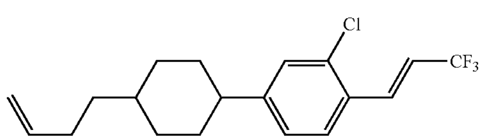
1.20
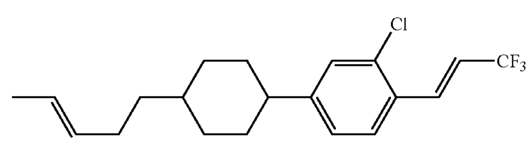
1.21
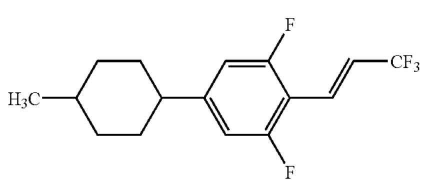
1.22
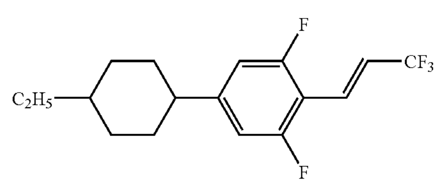
1.23
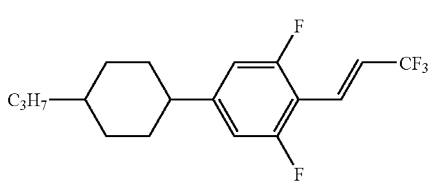
1.24
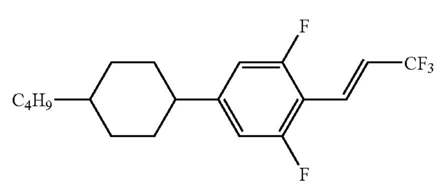
1.25
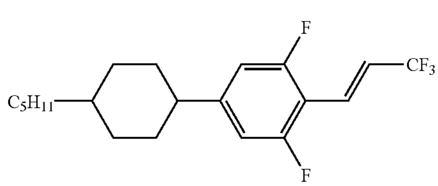
1.26
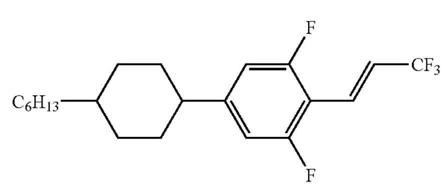

-continued
1.27
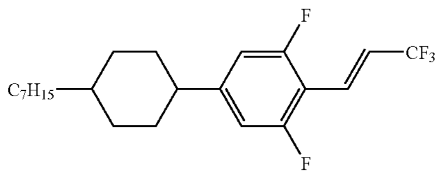
1.28
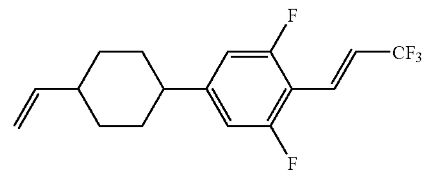
1.29
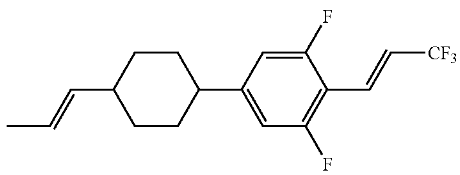
1.30
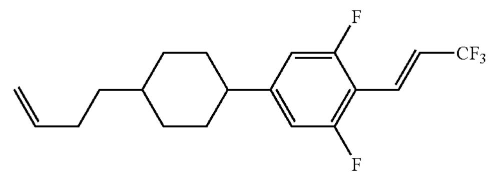
1.31
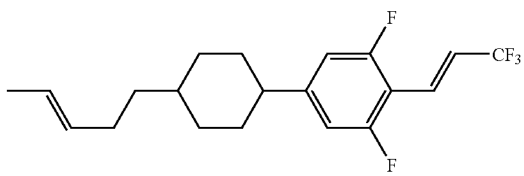
1.32
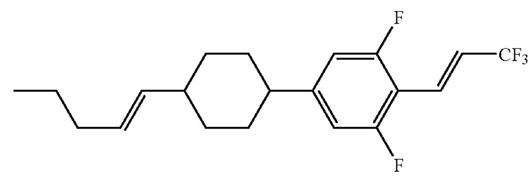
1.33
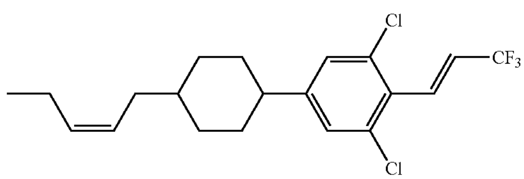
1.34
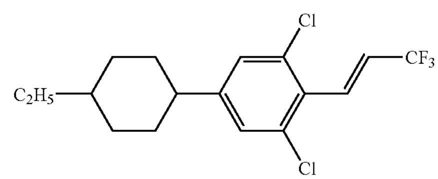
1.35
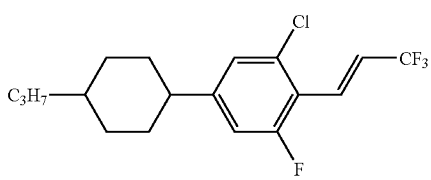
1.36
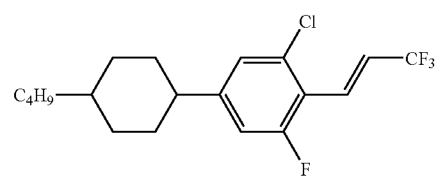
1.37
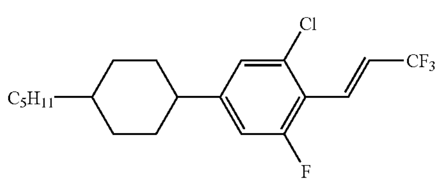
1.38
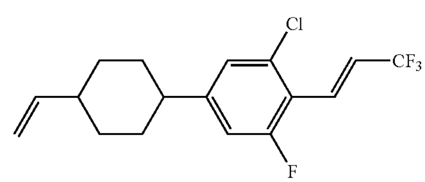
1.39
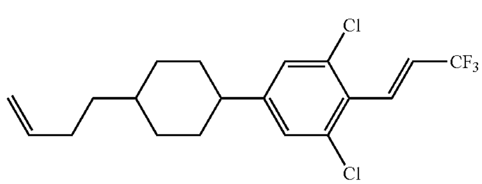
1.40
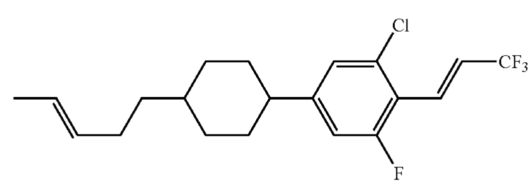
1.41
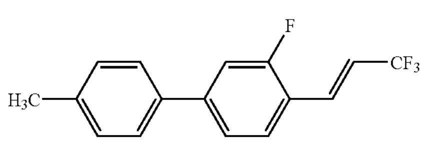
1.42
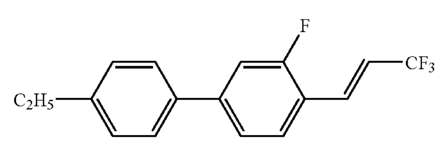
1.43
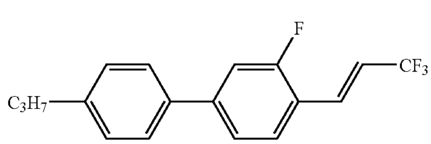
1.44
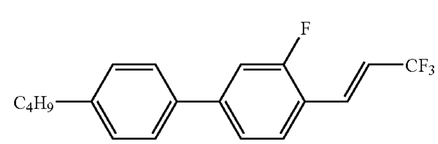

-continued
1.45
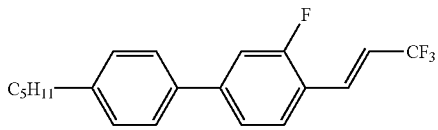
1.46
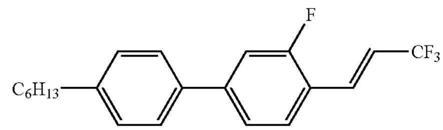
1.47
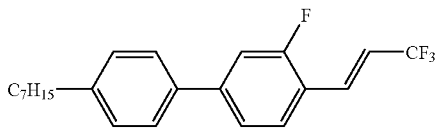
1.48
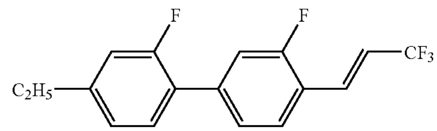
1.49
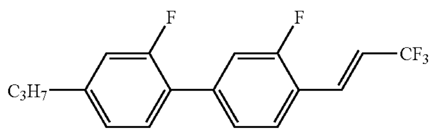
1.50
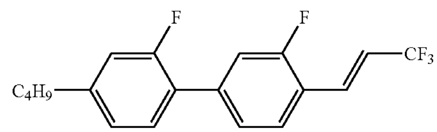
1.51
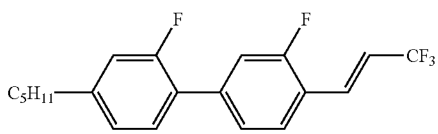
1.52
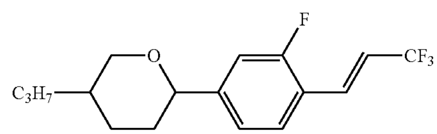
1.53
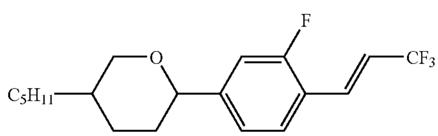
1.54
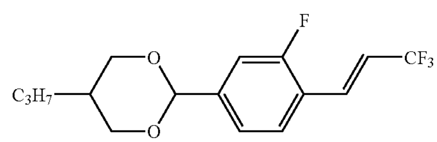
1.55
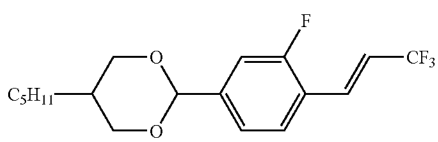
1.56
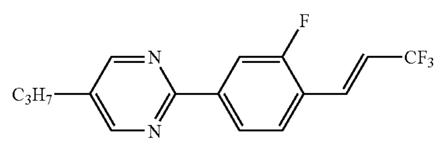
1.57
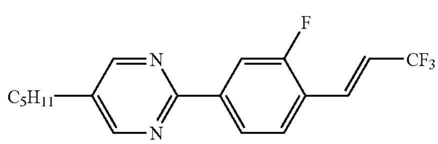
1.58
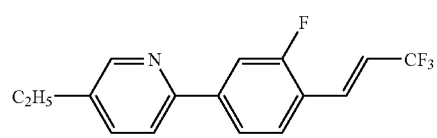
1.59
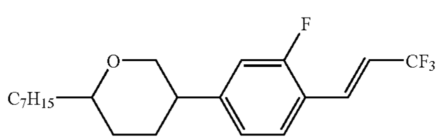
1.60
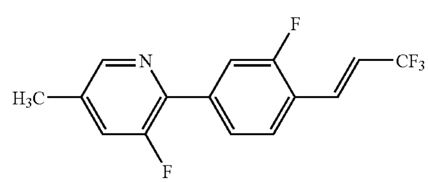
1.61
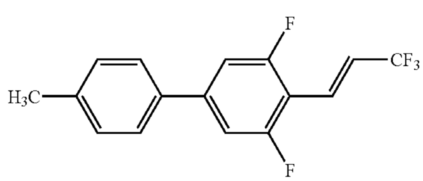
1.62
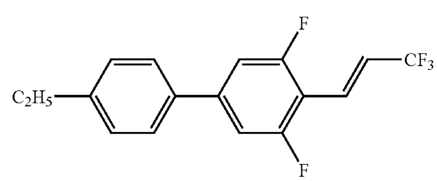
1.63
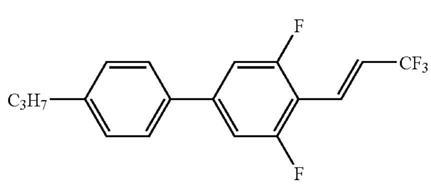
C 40.6 Iso
TN = -223° C., Δ ε = 21.7, Δ n = 0.157
1.64
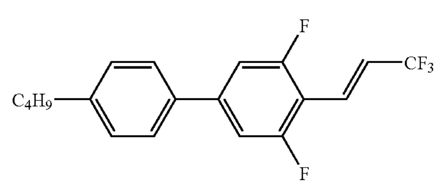

-continued
1.65
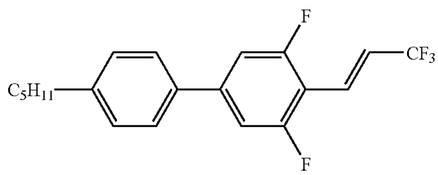
1.66
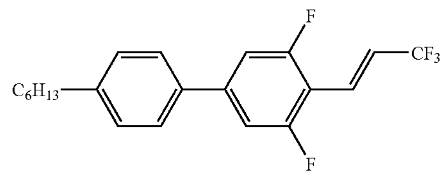
1.67
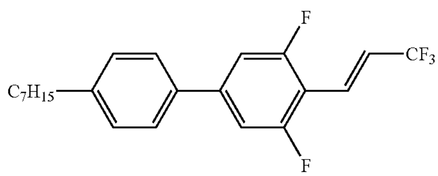
1.68
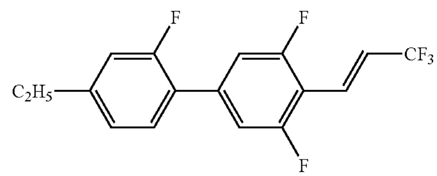
1.69
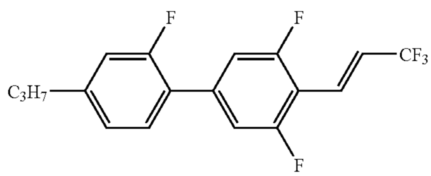
1.70
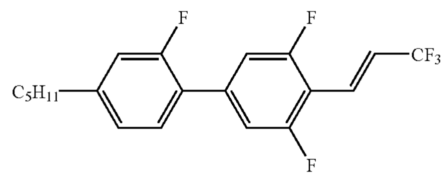
1.71
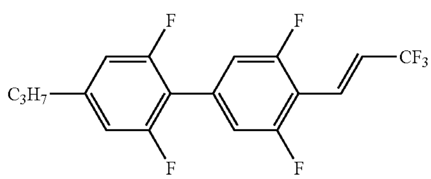
1.72
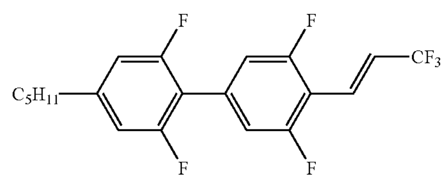
1.73
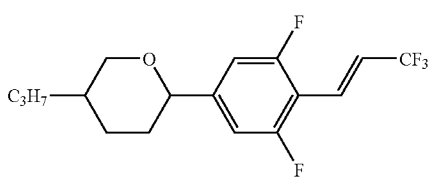
1.74
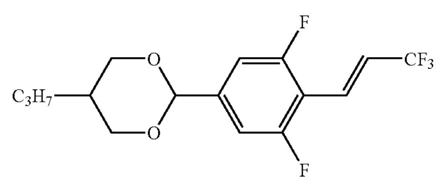
1.75
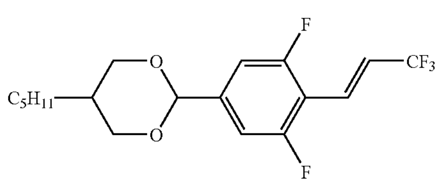
1.76
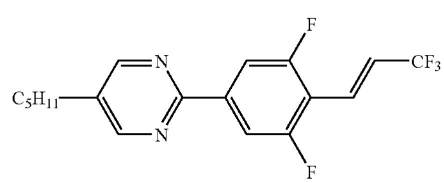
1.77
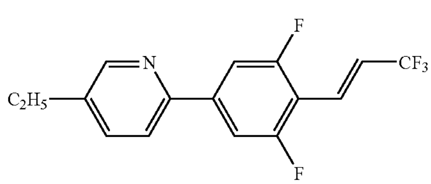
1.78
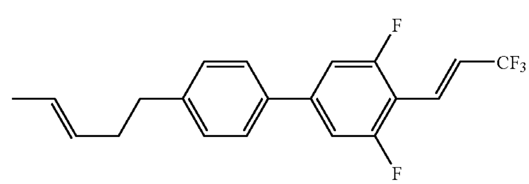
1.79
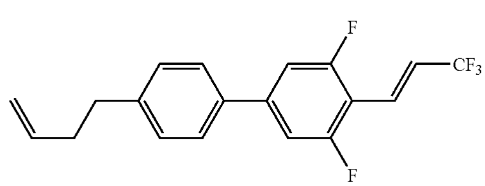
1.80
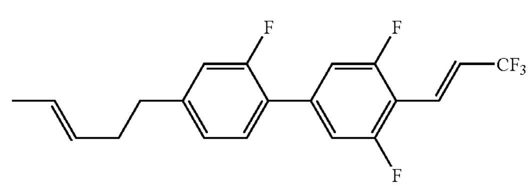

-continued
1.81
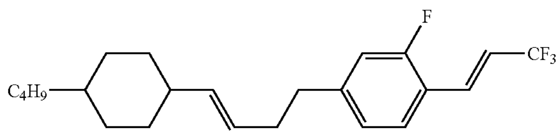
1.82
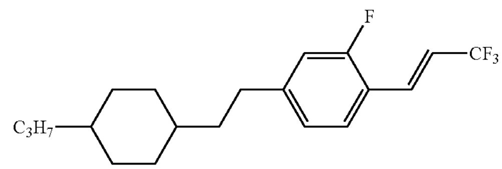
1.83
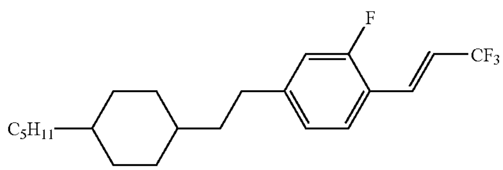
1.84
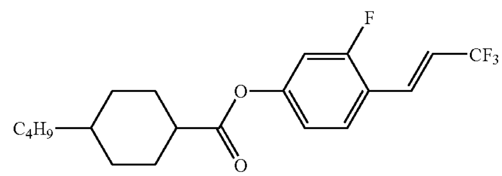
1.85
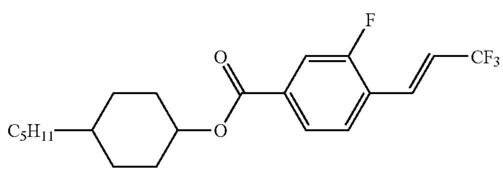
1.86
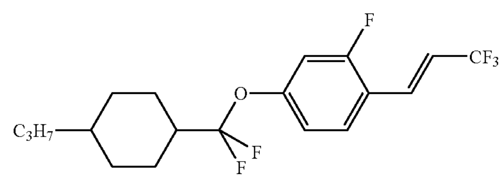
1.87
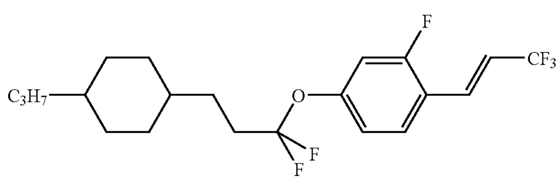
1.88
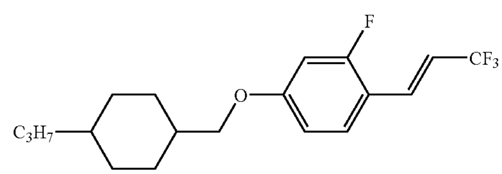
1.89
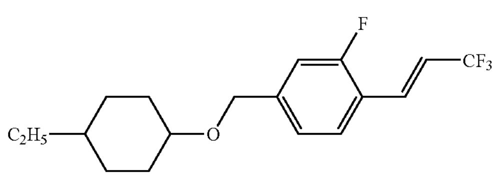
1.90
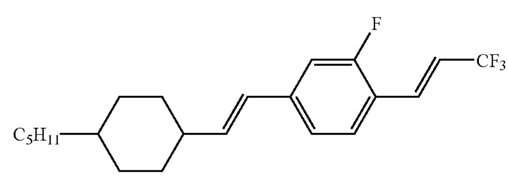
1.91
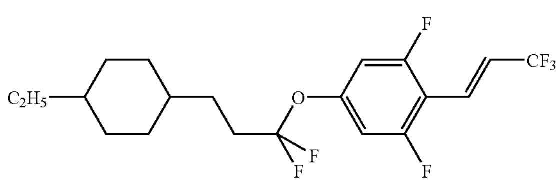
1.92
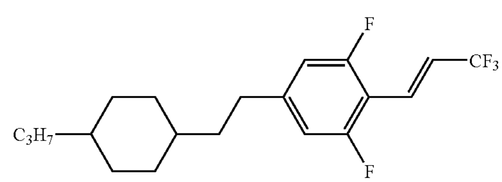
1.93
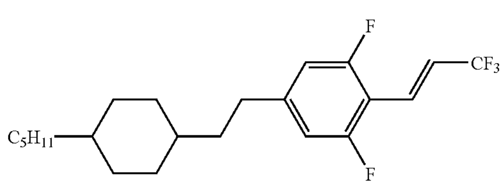
1.94
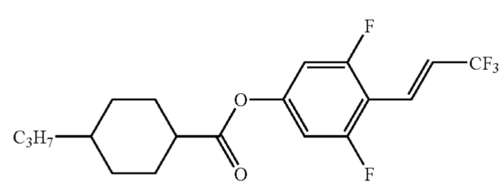
1.95
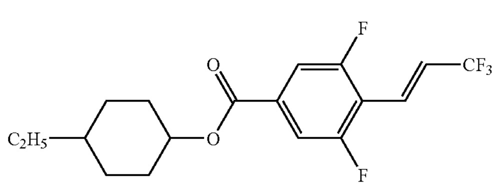
1.96
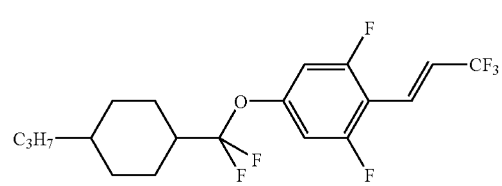

-continued
1.97
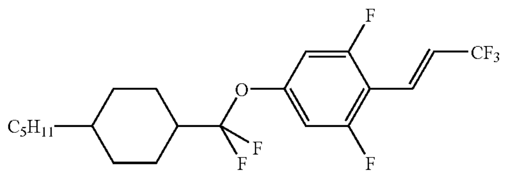
1.98
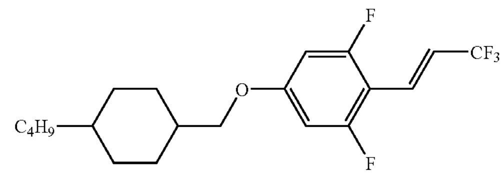
1.99
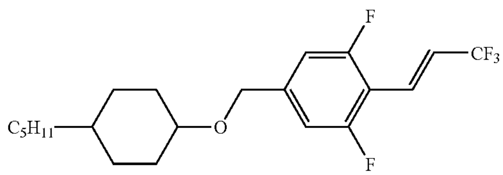
1.100
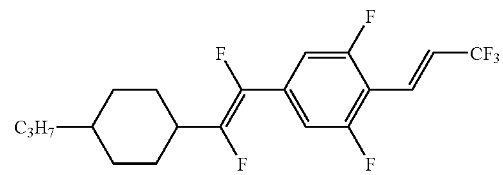
1.101
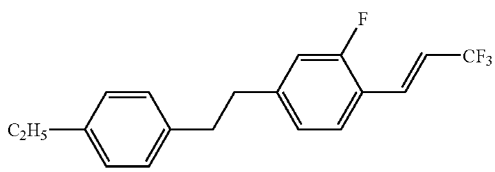
1.102
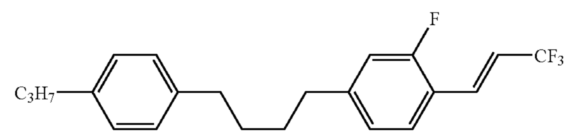
1.103
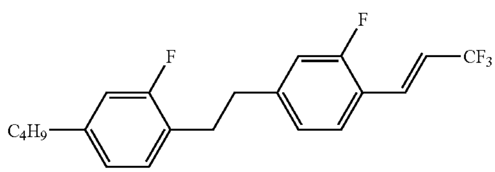
1.104
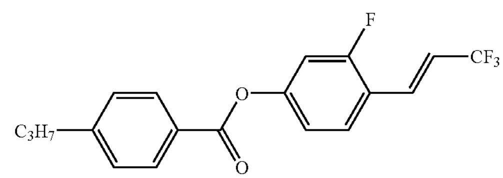
1.105
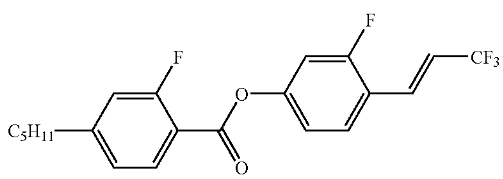
1.106
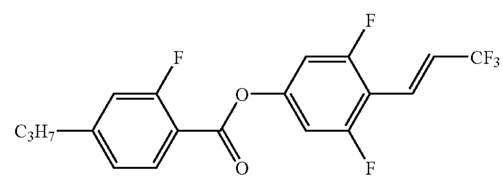
1.107
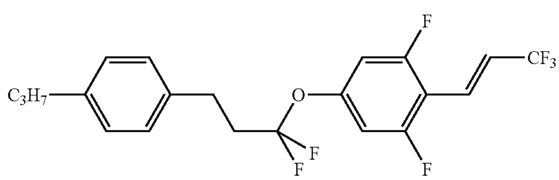
1.108
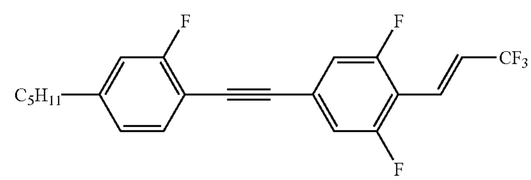
1.109
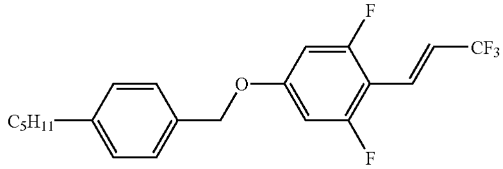
1.110
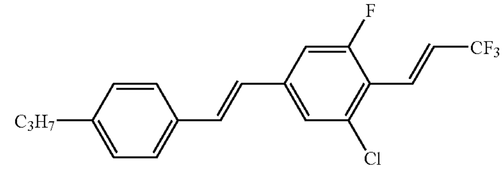
1.111
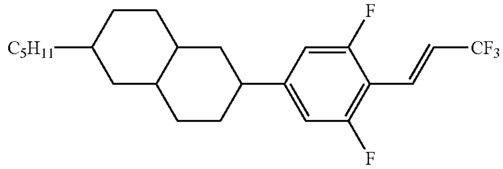
1.112
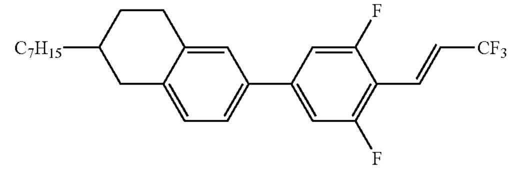

-continued
1.113
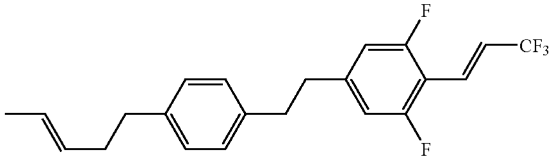
1.114
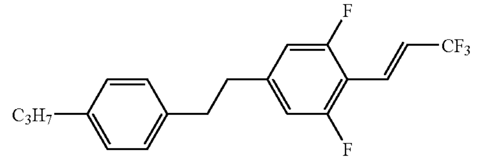
1.115
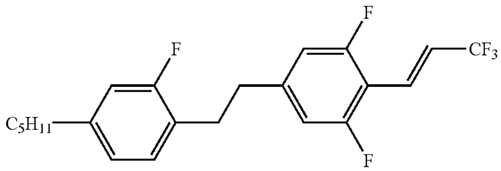
1.116
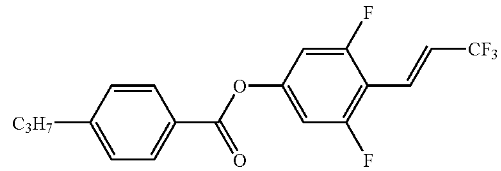
1.117
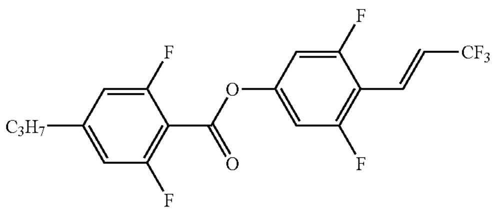
1.118
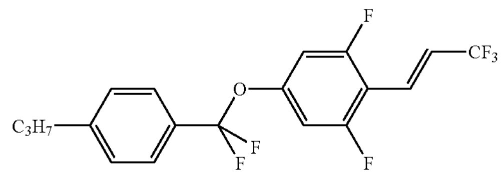
1.119
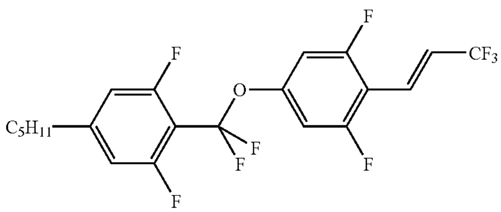
1.120
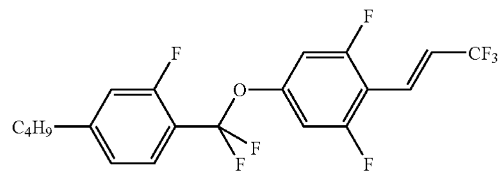
1.121
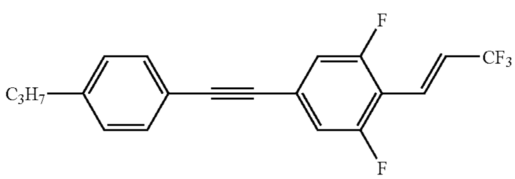
1.122
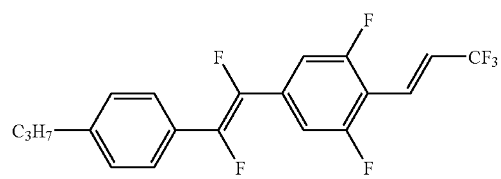
1.123
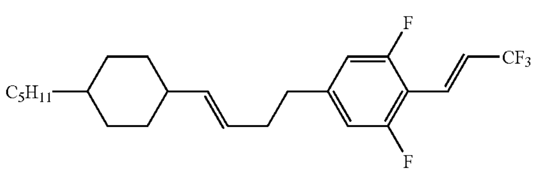
1.124
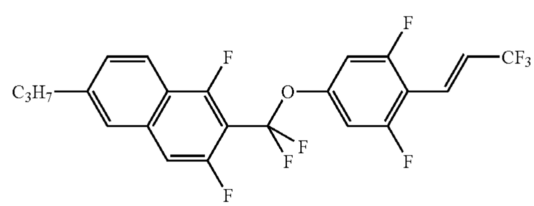
2.1
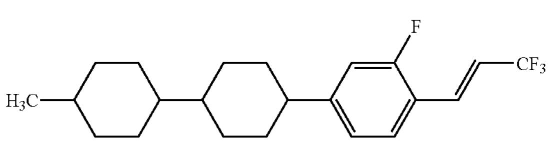
2.2
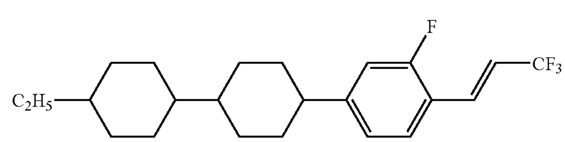
2.3
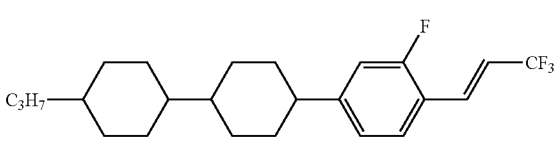
2.4
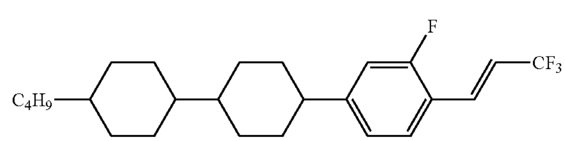

-continued
2.5
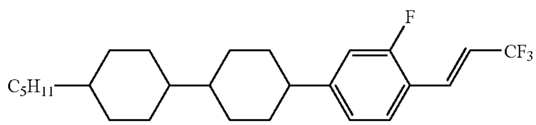
2.6
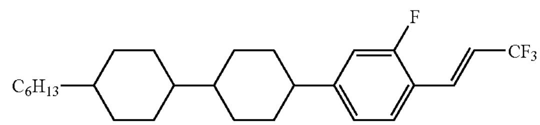
2.7
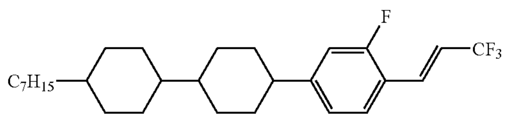
2.8
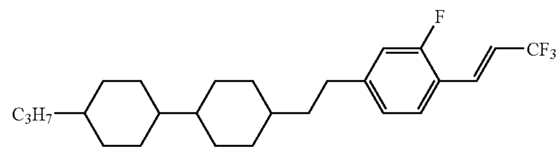
2.9
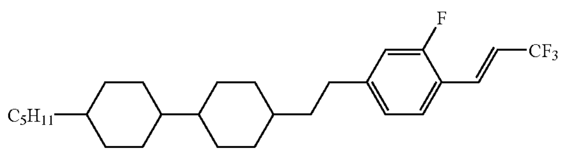
2.10
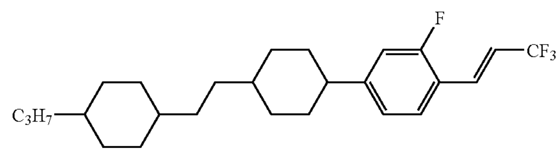
2.11
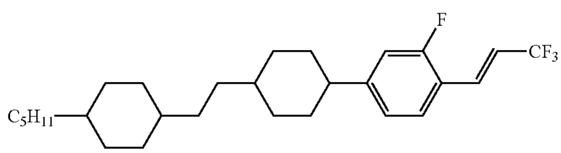
2.12
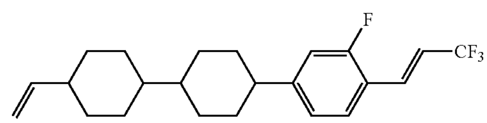
2.13
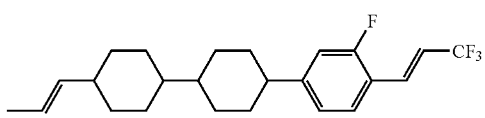
2.14
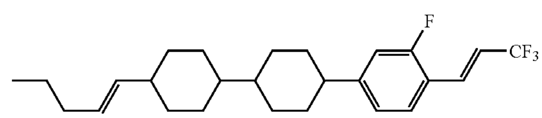
2.15
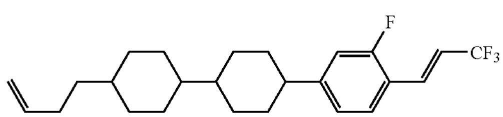
2.16
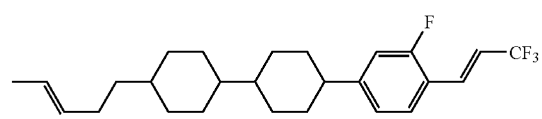
2.17
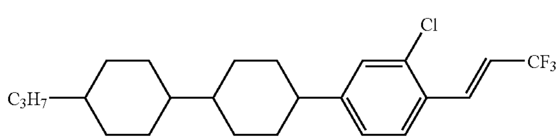
2.18
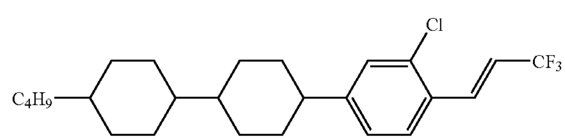
2.19
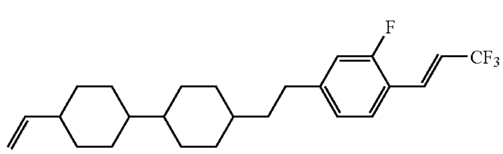
2.20
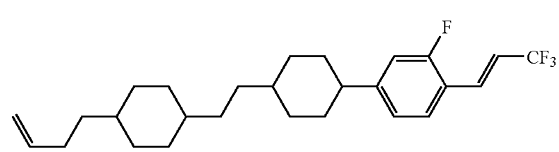
2.21
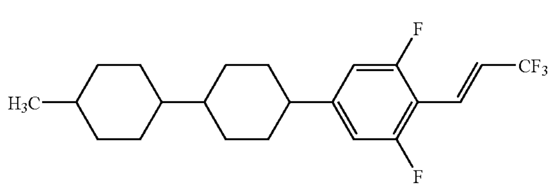
2.22
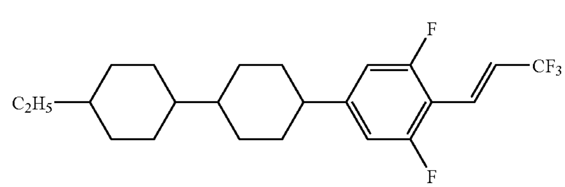

-continued
2.23
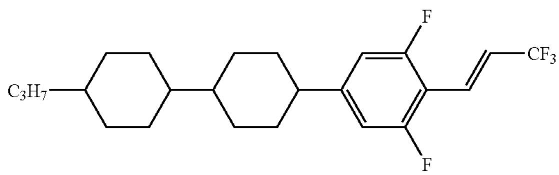
C 106.9 N 170.6 Iso
TN = 127.0° C., Δ ε = 19.4, Δ n = 0.150
2.24
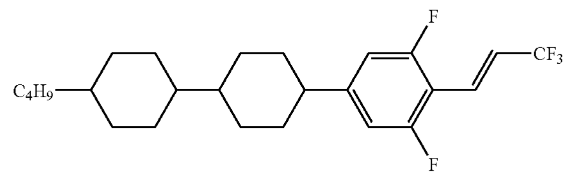
2.25
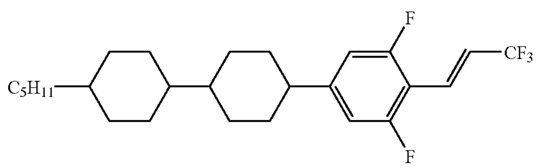
2.26
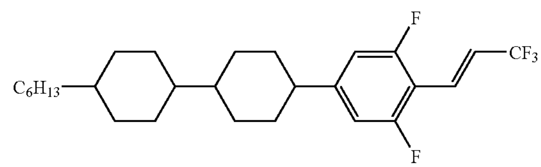
2.27
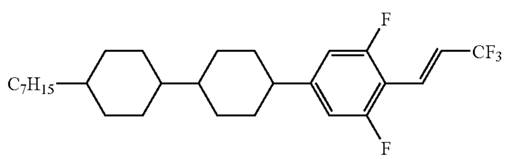
2.28
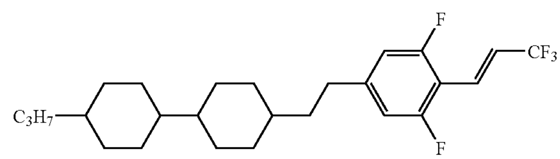
2.29
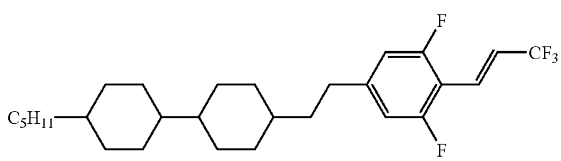
2.30
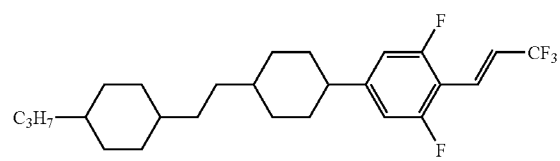
2.31
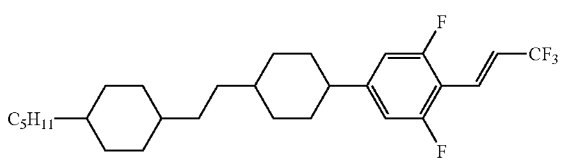
2.32
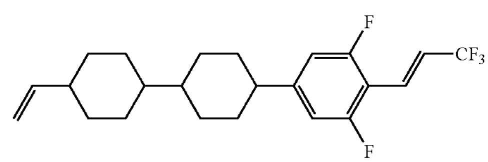
2.33
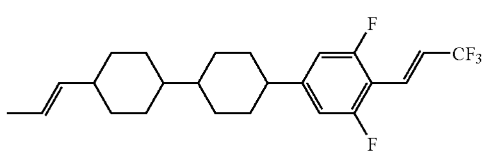
2.34
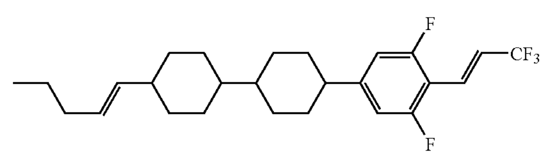
2.35
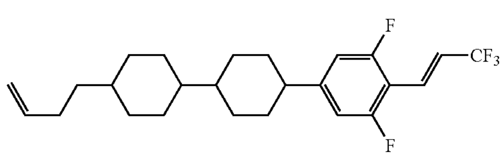
2.36
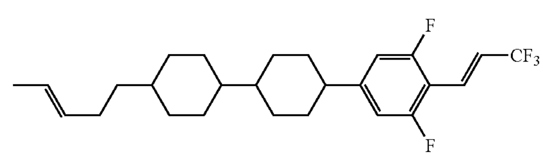
2.37
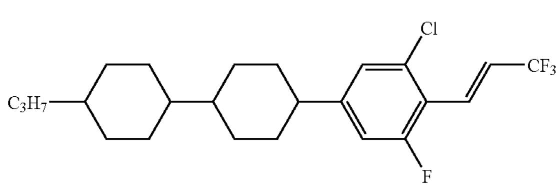
2.38
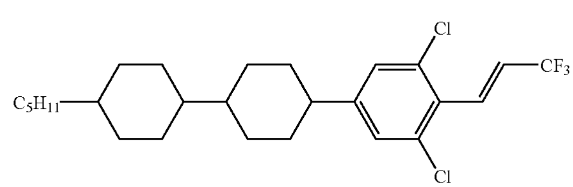

-continued
2.39
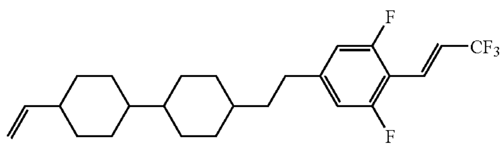
2.40
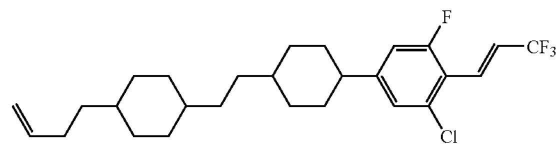
2.41
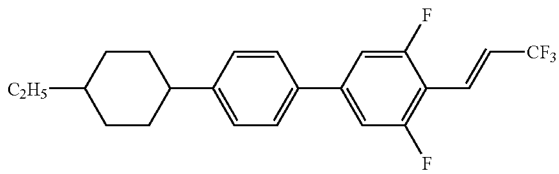
2.42
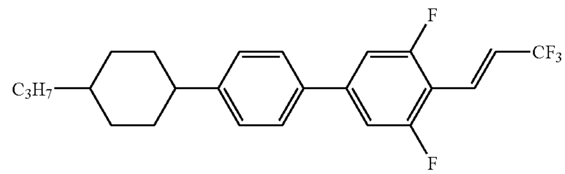
2.43
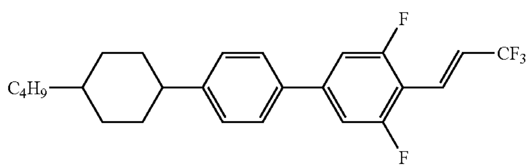
2.44
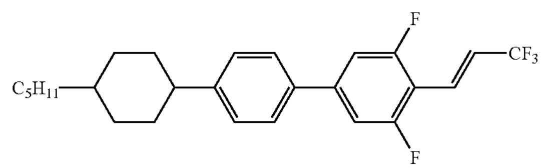
2.45
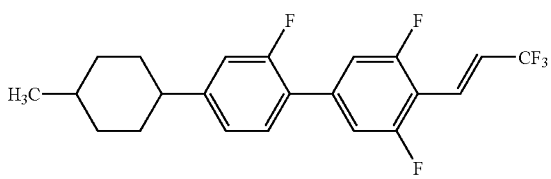
2.46
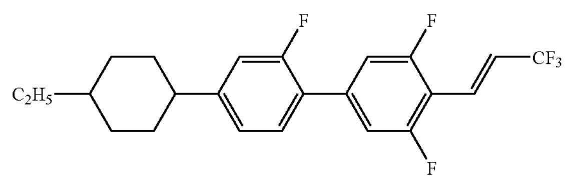
2.47
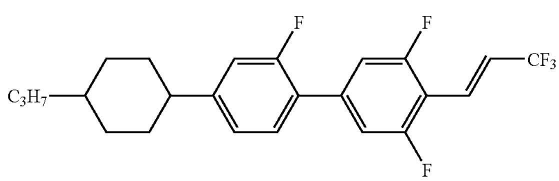
$C_1$ 45.8 $C_2$ 82.3 N 123.8 Iso
TN = 94.4° C., Δ ε = 24.3, Δ n = 0.190
2.48
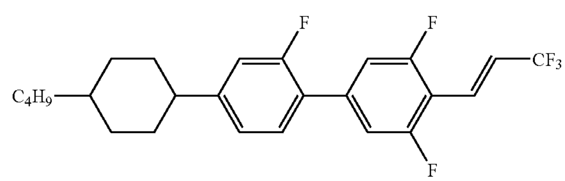
2.49
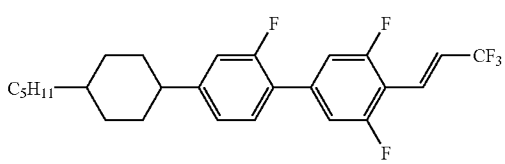
2.50
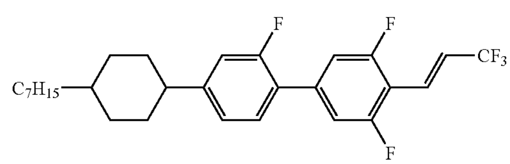
2.51
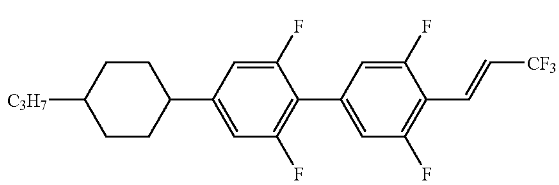
2.52
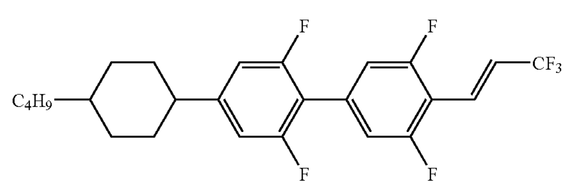
2.53
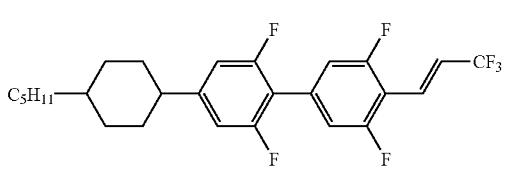
2.54
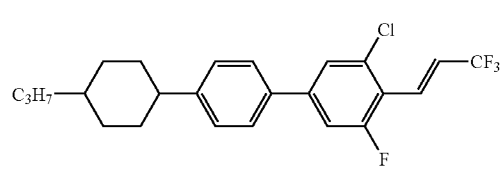

-continued
2.55
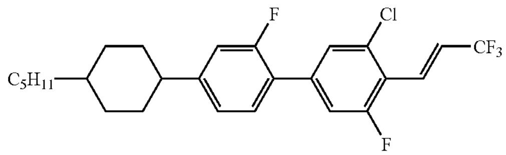
2.57
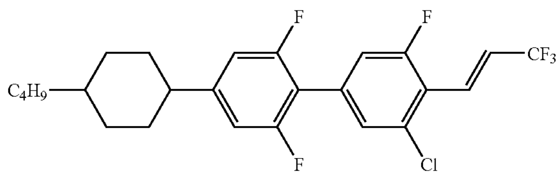
2.59
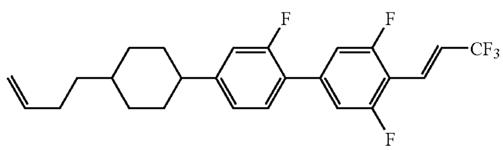
2.61
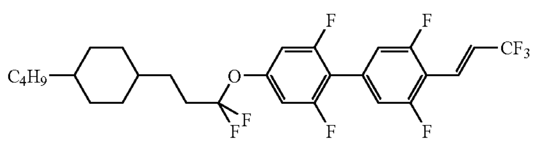
2.63
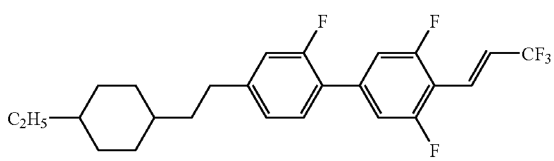
2.65
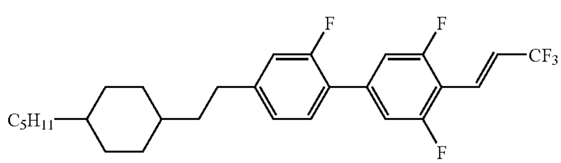
2.67
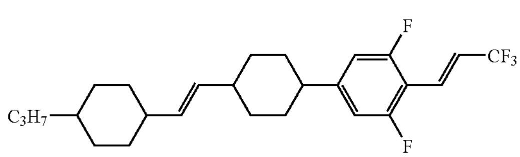
2.69
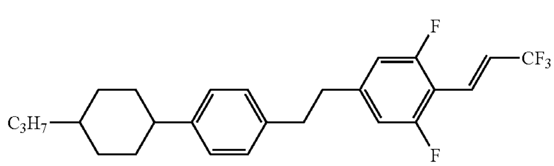
2.71
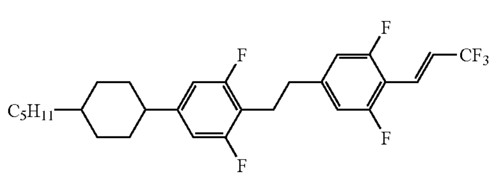
2.56
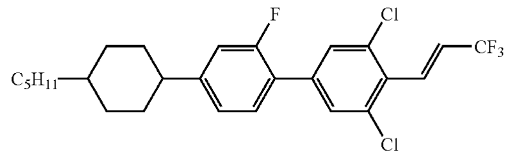
2.58
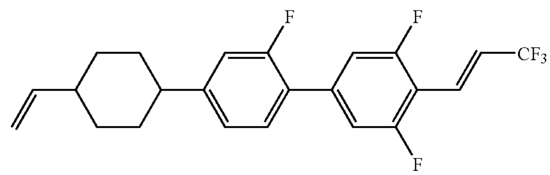
2.60
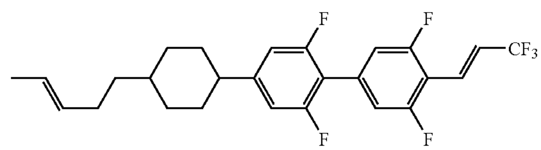
2.62
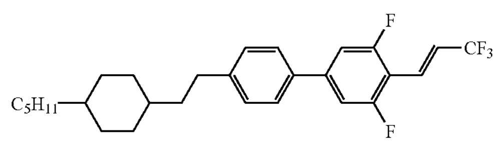
2.64
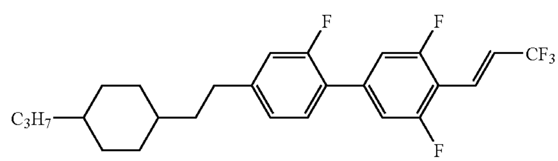
2.66
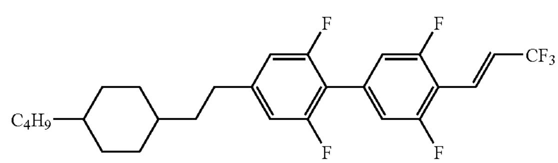
2.68
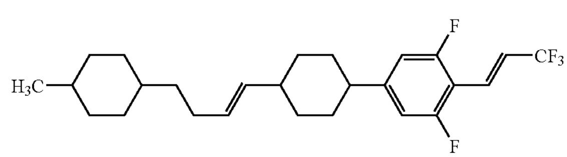
2.70
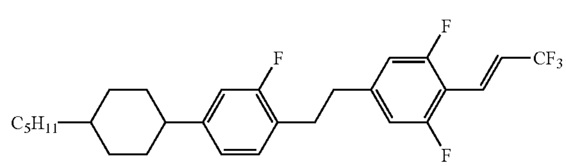
2.72
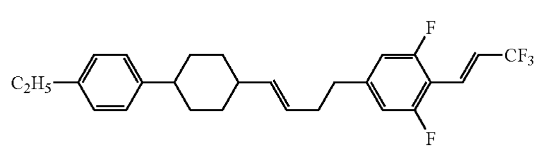

-continued
2.73
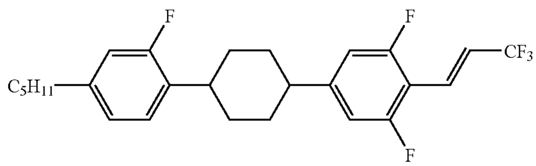
2.74
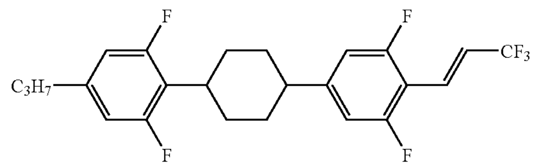
2.75
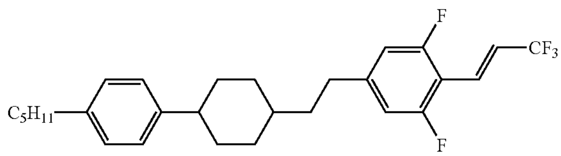
2.76
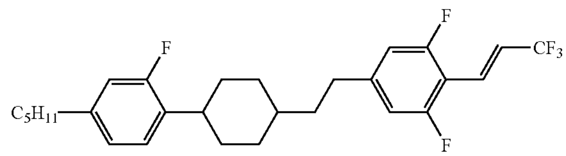
2.77
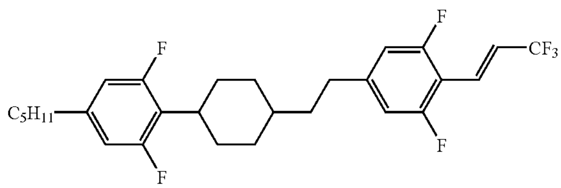
2.78
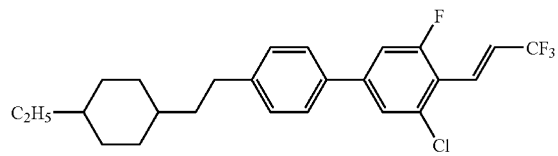
2.79
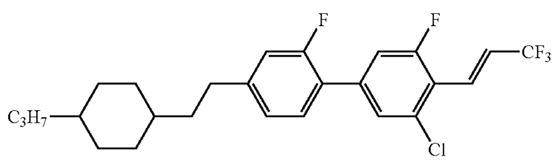
2.80
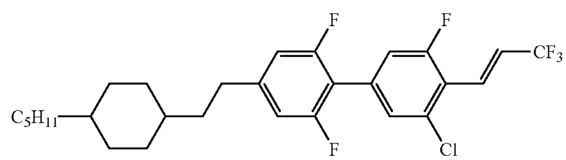
2.81
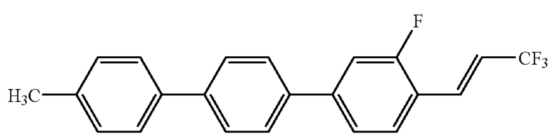
2.82
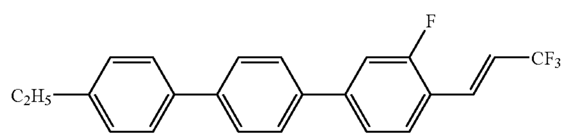
2.83
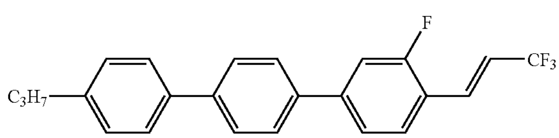
2.84
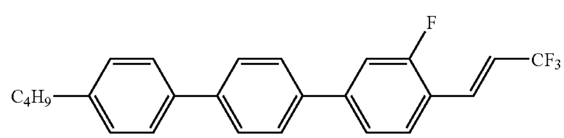
2.85
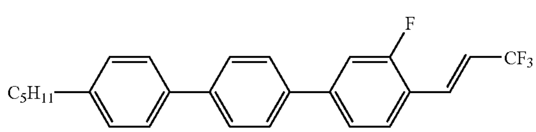
2.86
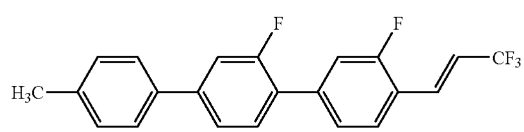
2.87
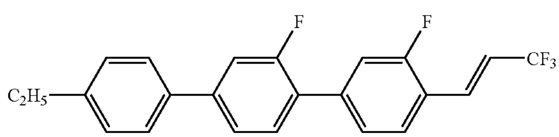
2.88
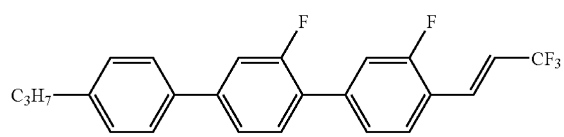
C 76.9 $S_A$ 184.2 Iso
TN = 101.7° C., Δ ε = 23.2, Δ n = 0.277
2.89
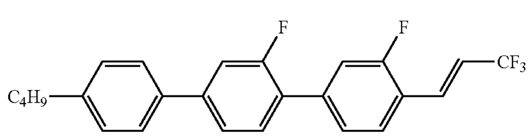
2.90
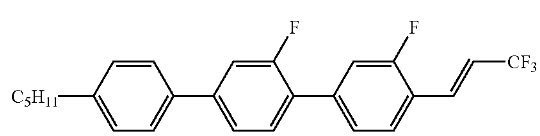

-continued
2.91
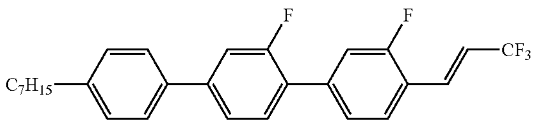
2.92
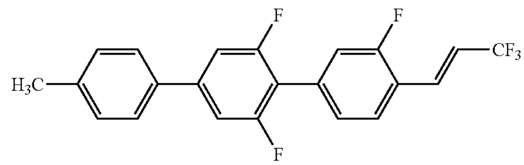
2.93
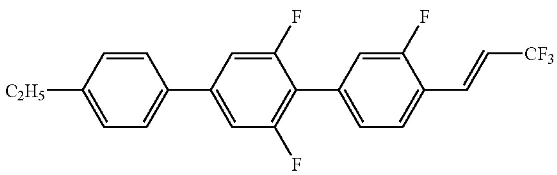
2.94
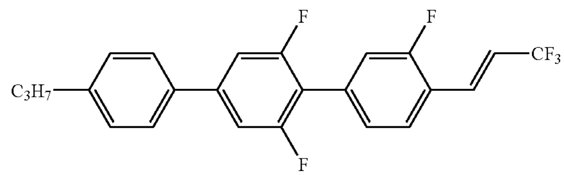
2.95
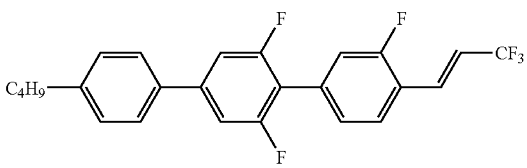
2.96
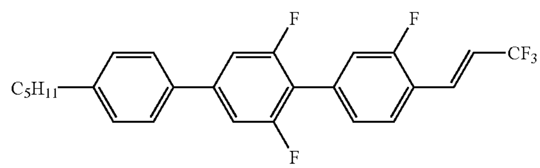
2.97
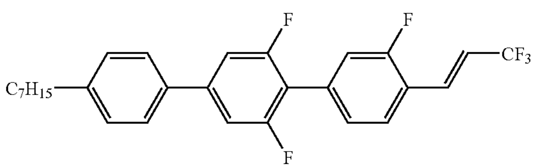
2.98
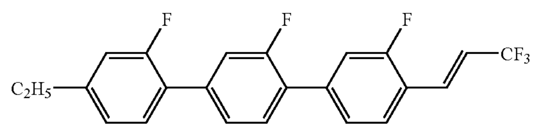
2.99
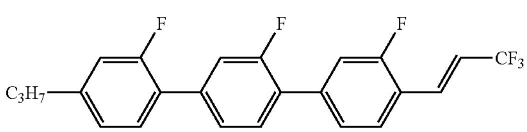
2.100
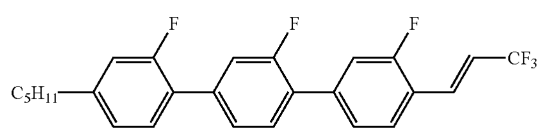
2.101
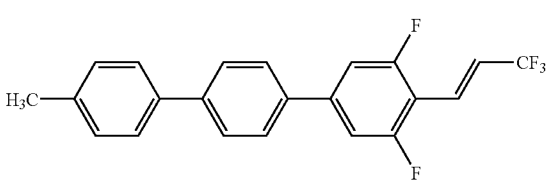
2.102
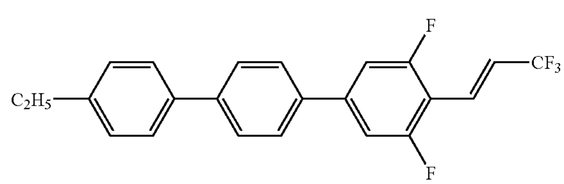
2.103
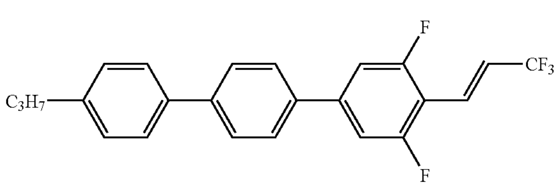
2.104
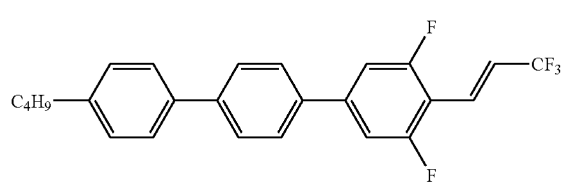
2.105
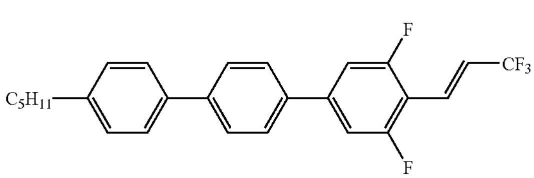
2.106
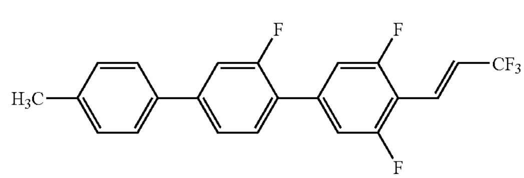

-continued
2.107
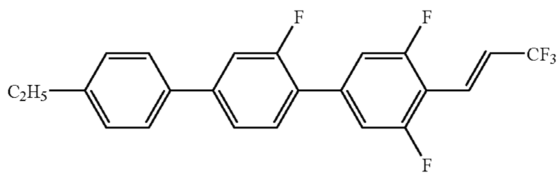
2.108
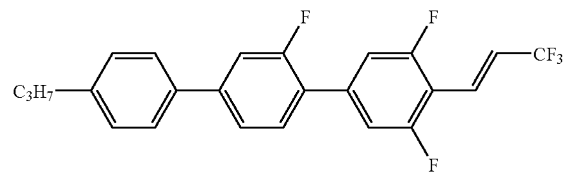
C 88.0 $S_A$ 155.4 Iso
TN = 99.7° C., $\Delta\varepsilon$ = 30.3, $\Delta n$ = 0.270
2.109
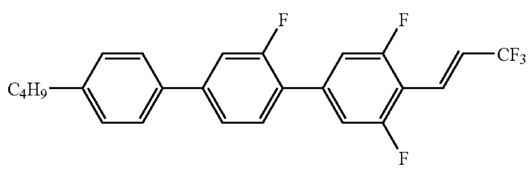
2.110
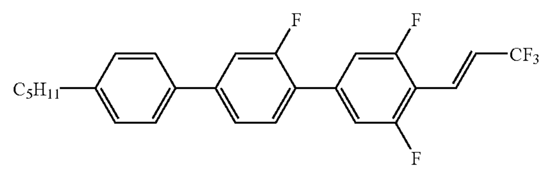
C 69.2 $S_A$ 142.9 Iso
TN = 101.0° C., $\Delta\varepsilon$ = 25.6, $\Delta n$ = 0.257
2.111
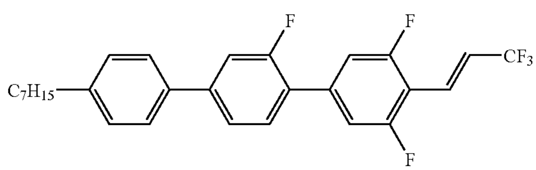
2.112
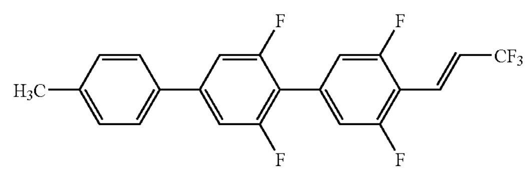
2.113
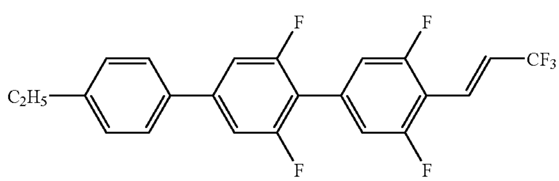
2.114
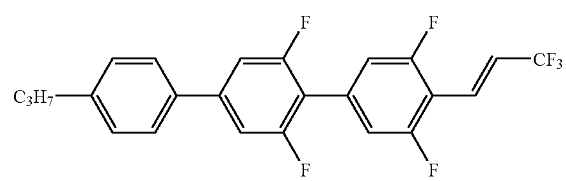
2.115
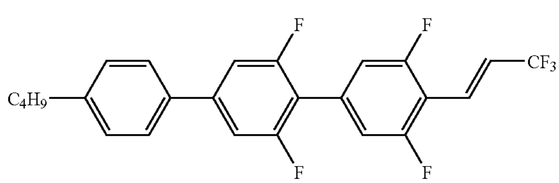
2.116
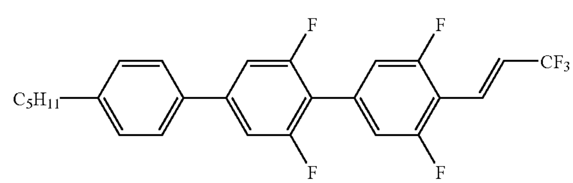
2.117
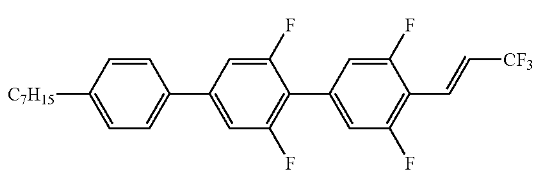
2.118
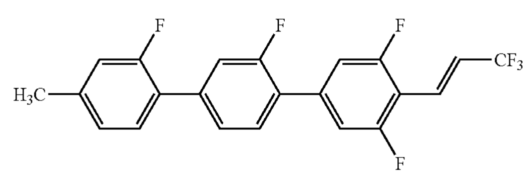
2.119
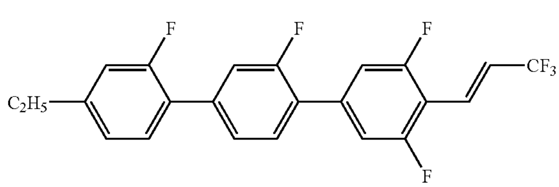
2.120
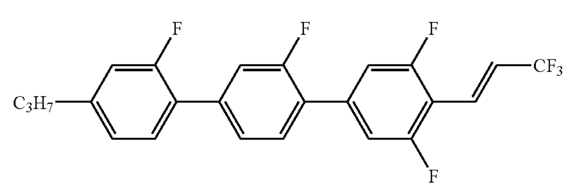

-continued
2.121
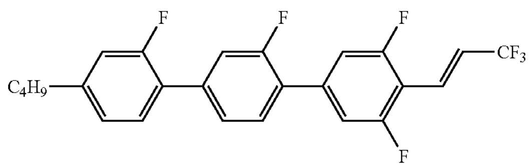
2.122
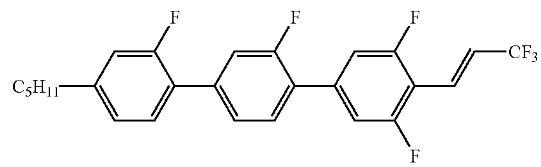
2.123
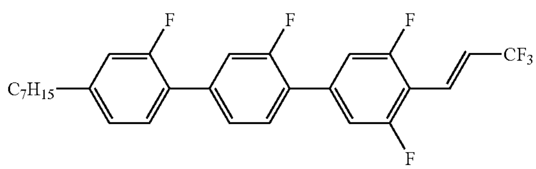
2.124
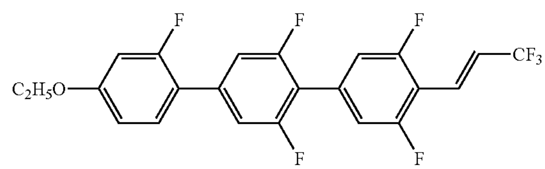
2.125
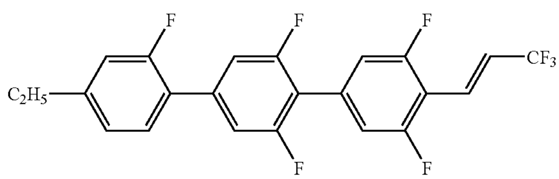
2.126
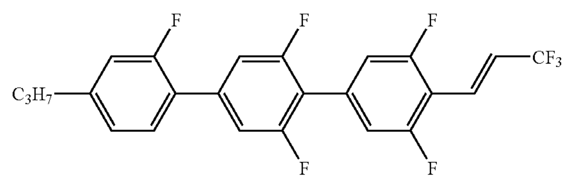
2.127
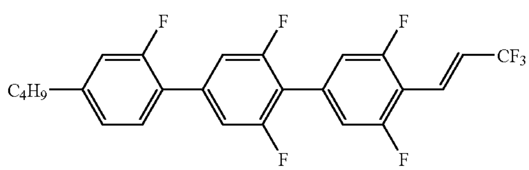
2.128
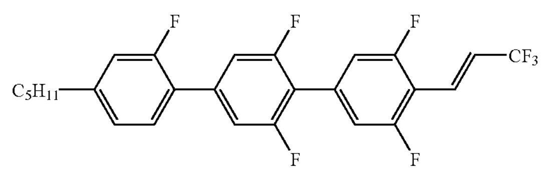
2.129
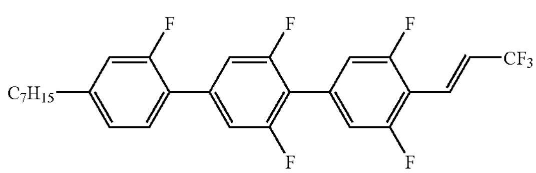
2.130
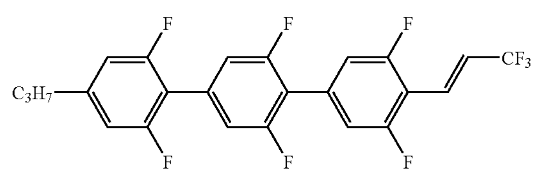
2.131
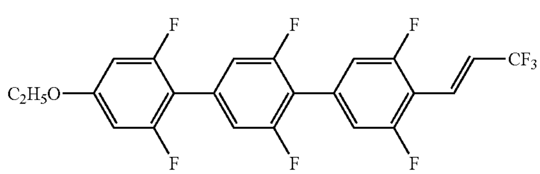
2.132
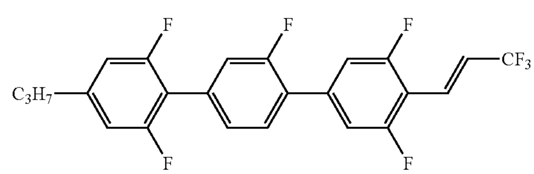
2.133
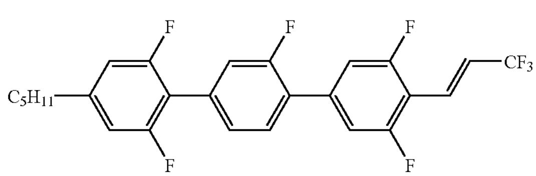
2.134
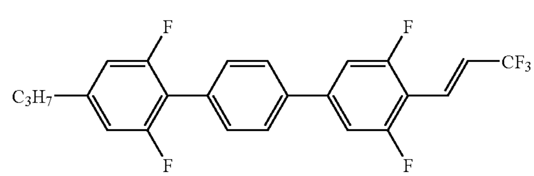
2.135
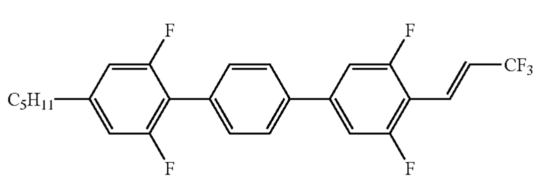
2.136
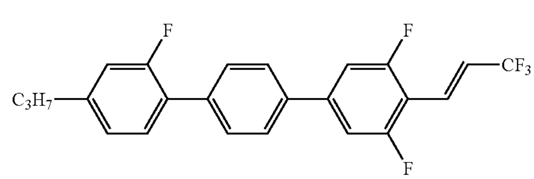

-continued
2.137
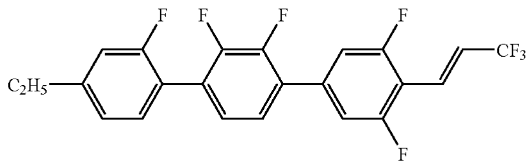
2.138
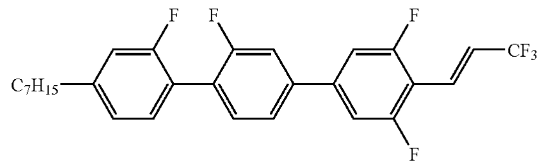
2.139
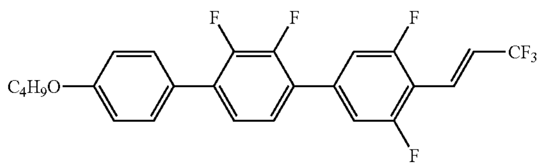
2.140
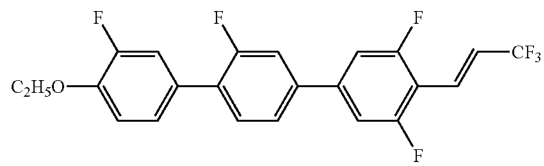
2.141
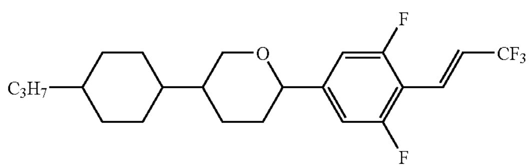
2.142
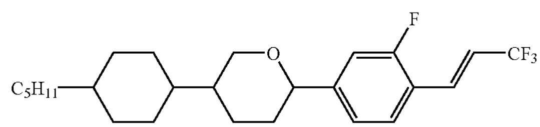
2.143
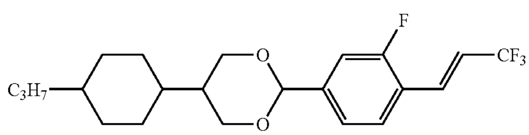
2.144
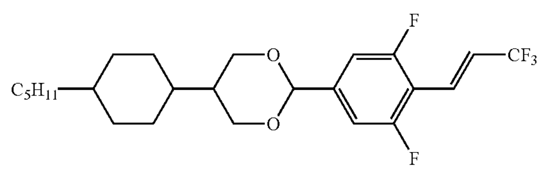
2.145
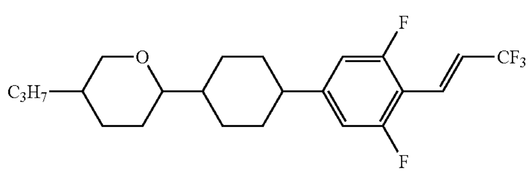
2.146
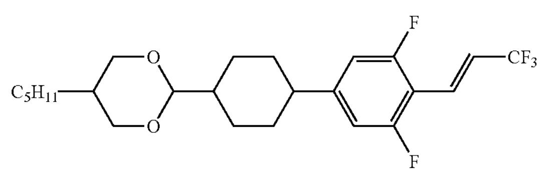
2.147
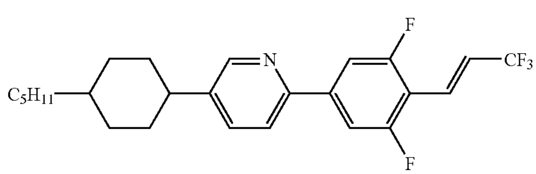
2.148
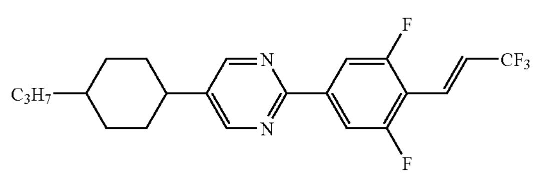
2.149
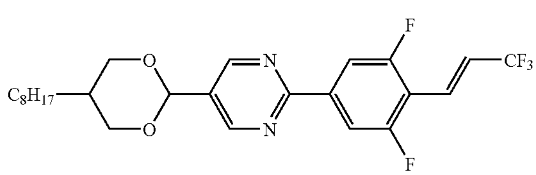
2.150
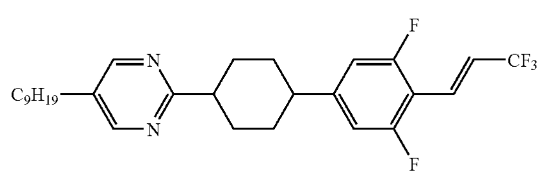
2.151
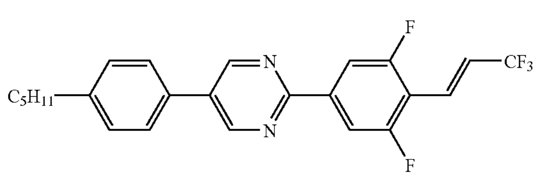
2.152
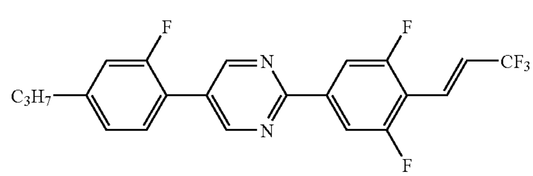

-continued
2.153
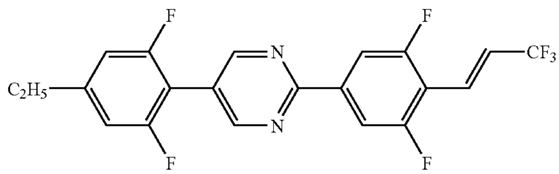
2.154
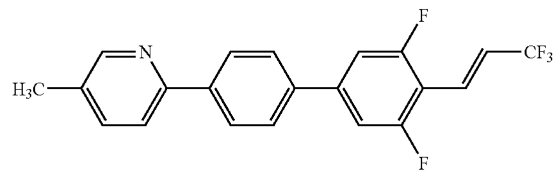
2.155
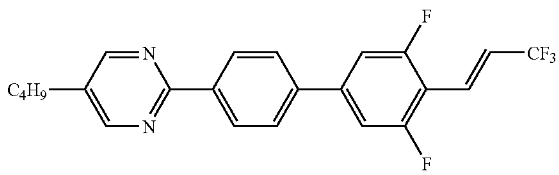
2.156
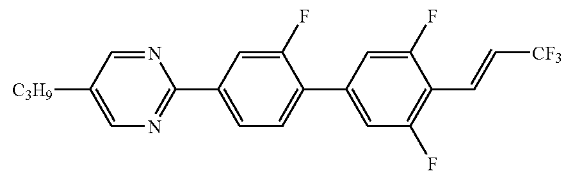
2.157
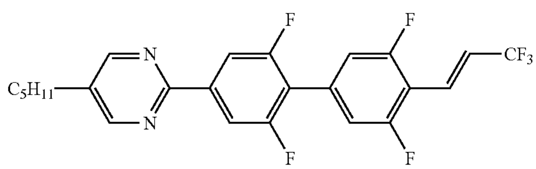
2.158
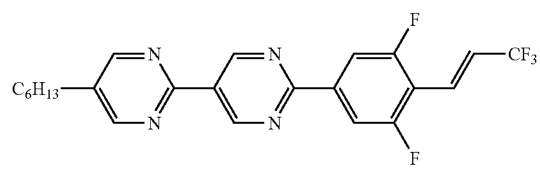
2.159
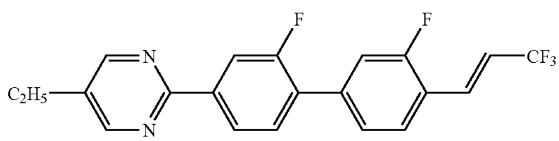
2.160
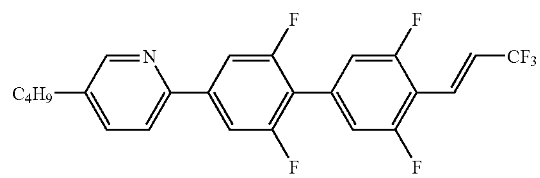
2.161
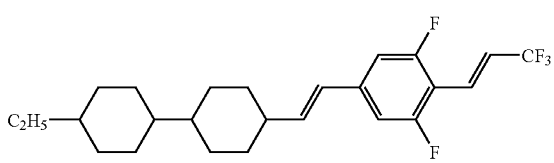
2.162
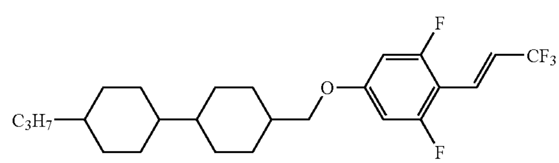
2.163
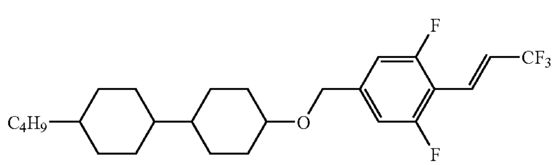
2.164
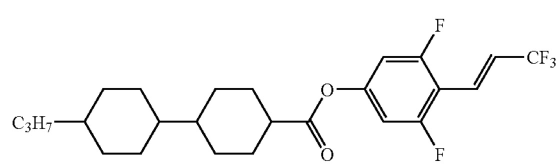
2.165
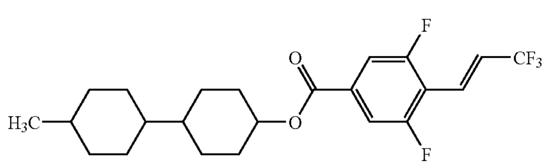
2.166
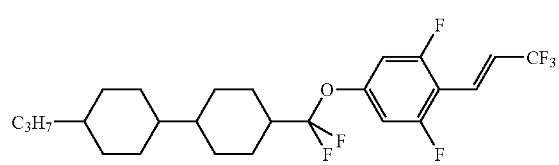
2.167
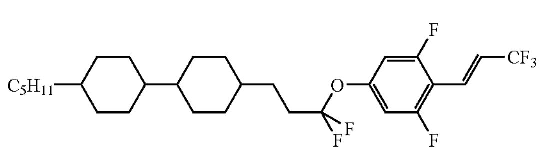
2.168
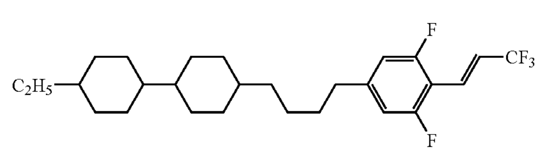

-continued
2.169
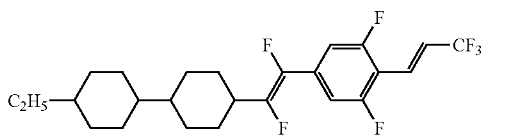
2.170
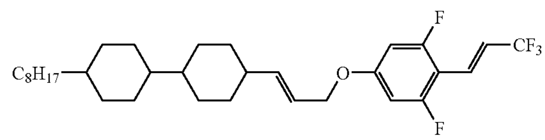
2.171
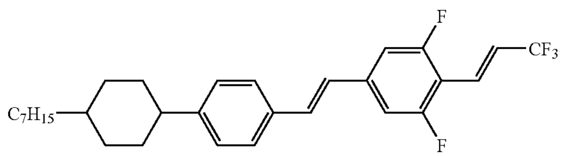
2.172
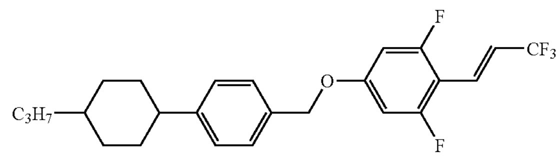
2.173
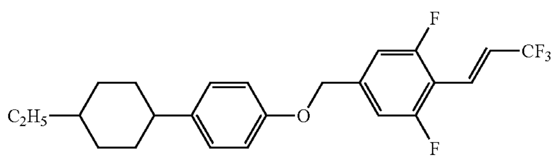
2.174
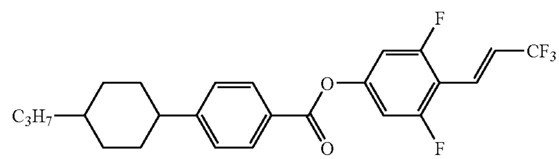
2.175
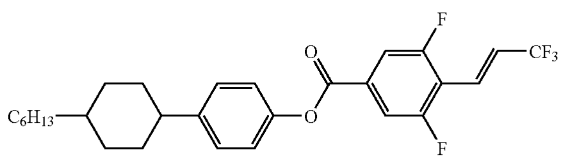
2.176
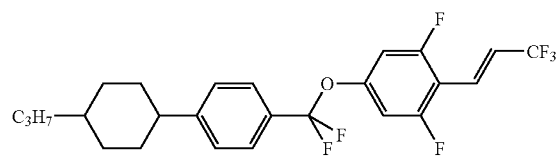
2.177
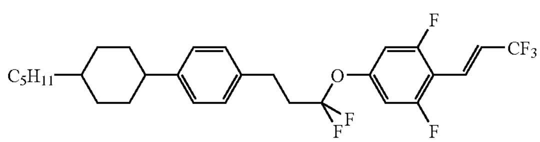
2.178
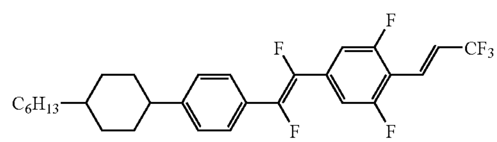
2.179
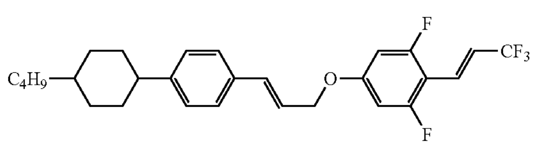
2.180
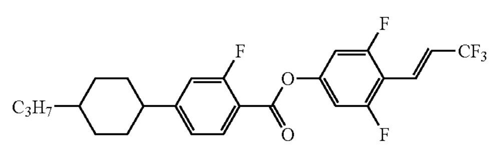
2.181
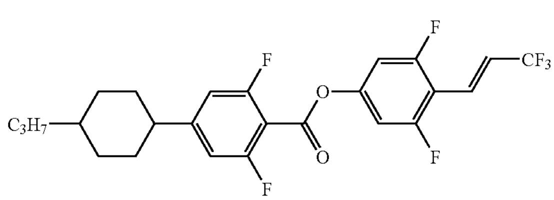
2.182
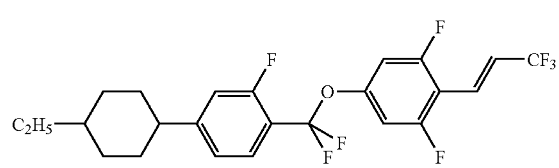
2.183
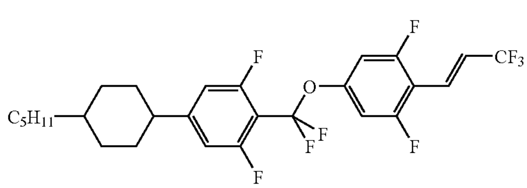
2.184
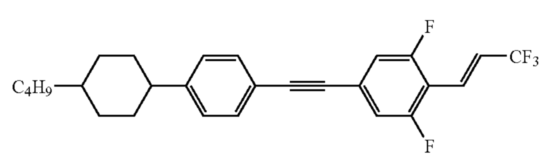
2.185
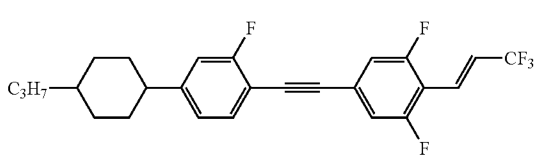
2.186
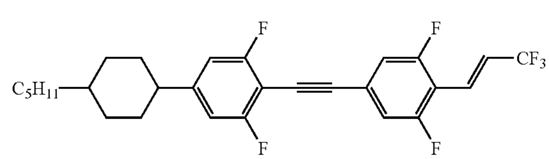

-continued
2.187
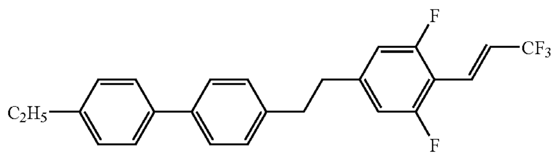
2.188
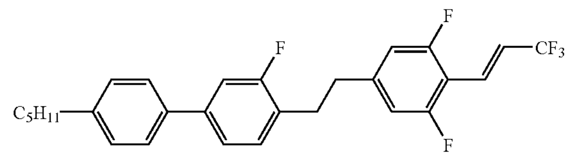
2.189
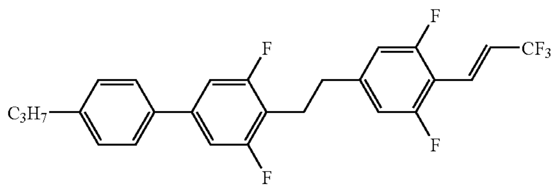
2.190
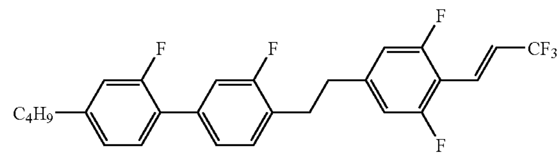
2.191
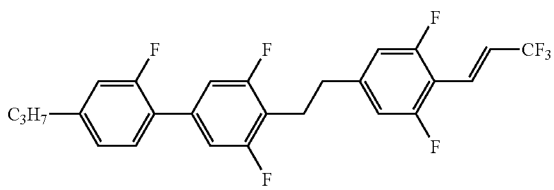
2.192
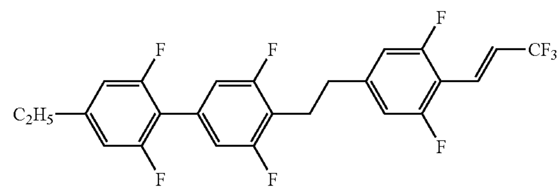
2.193
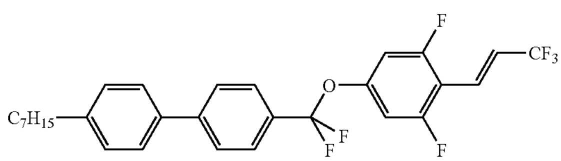
2.194
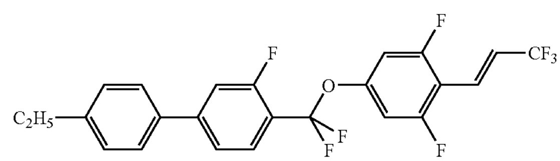
2.195
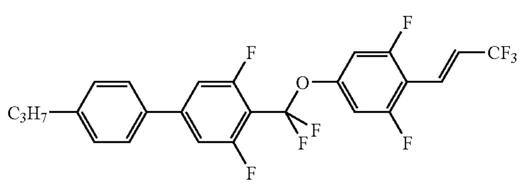
2.196
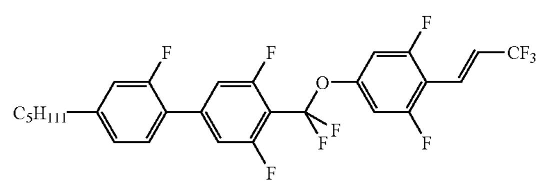
2.197
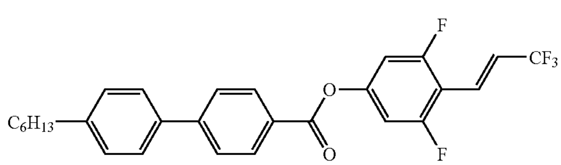
2.198
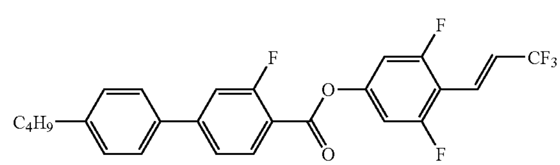
2.199
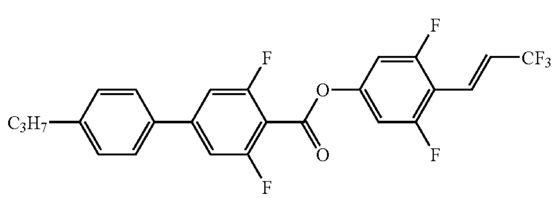
2.200
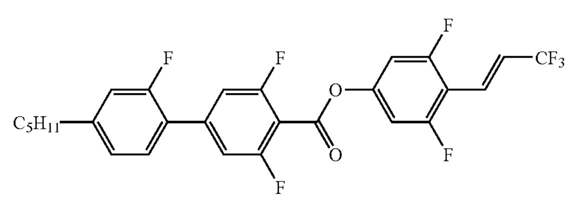
2.201
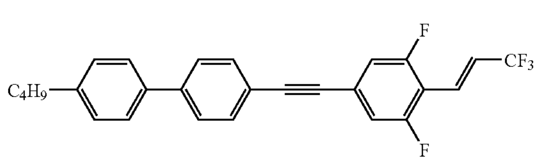
2.202
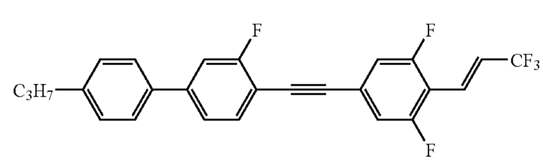

-continued
2.203
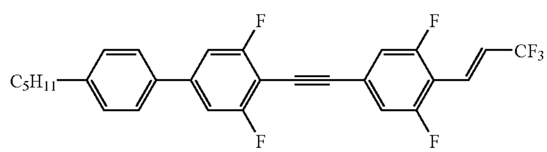
2.204
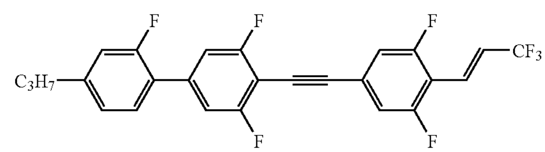
2.205
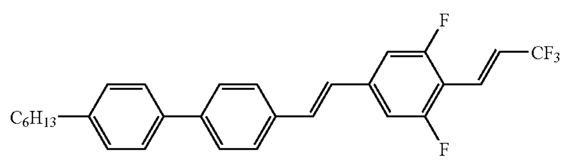
2.206
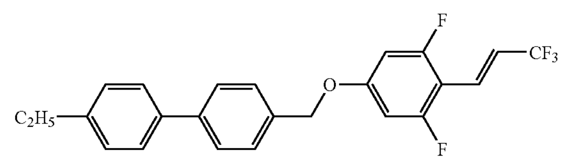
2.207
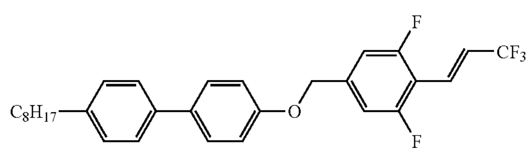
2.208
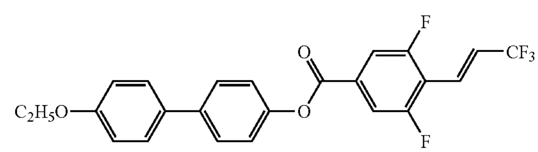
2.209
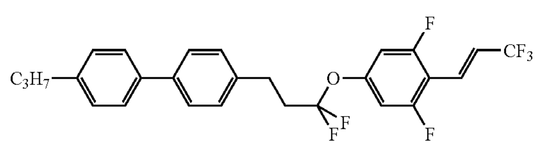
2.210
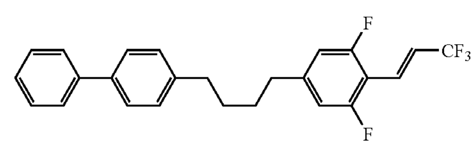
2.211
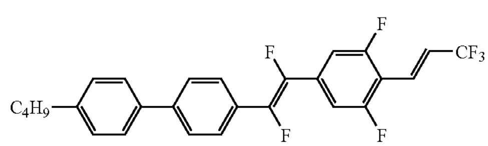
2.212
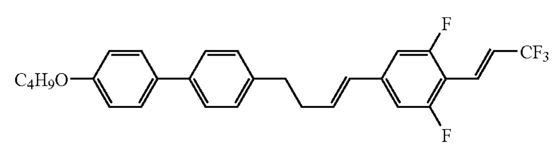
2.213
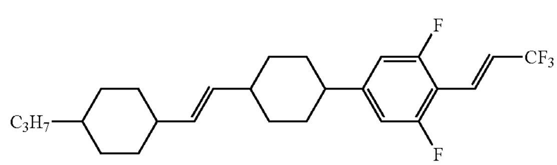
2.214
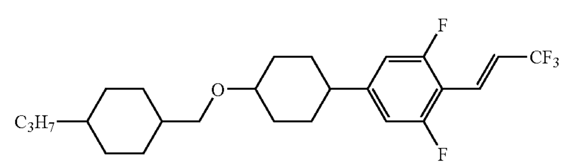
2.215
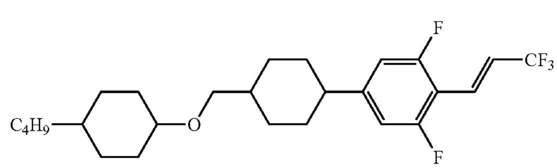
2.216
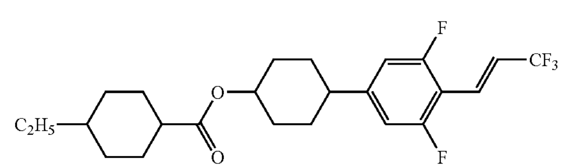
2.217
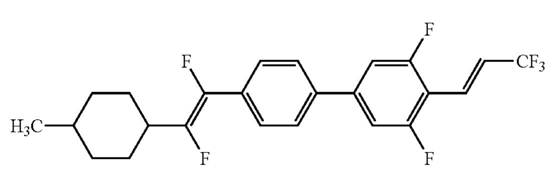
2.218
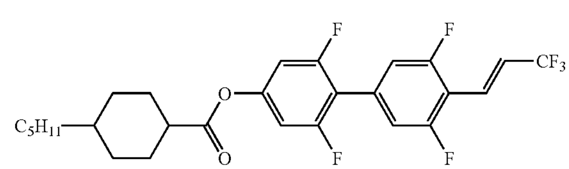
2.219
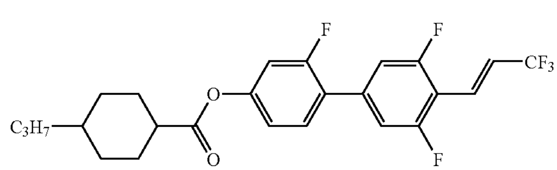
2.220
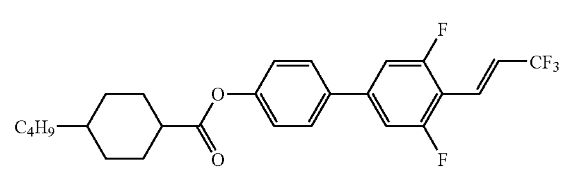

-continued
2.221
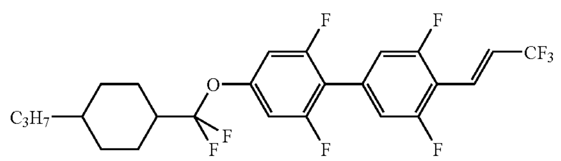
2.222
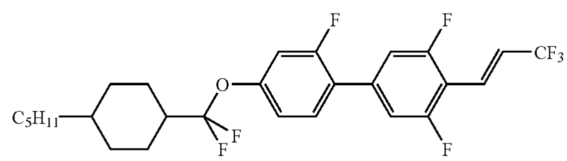
2.223
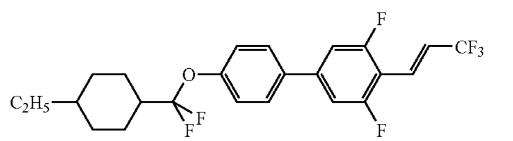
2.224
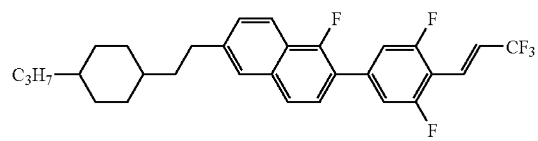
2.225
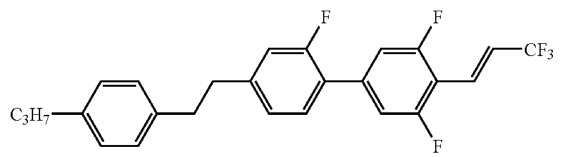
2.226
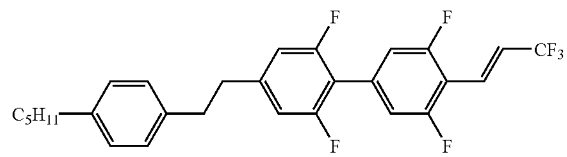
2.227
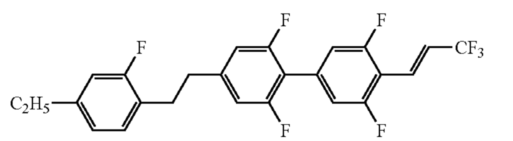
2.228
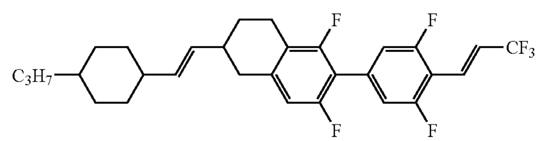
2.229
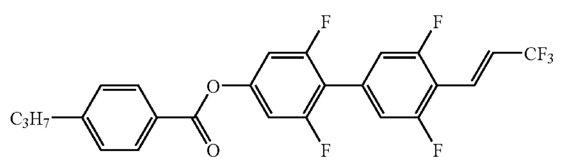
2.230
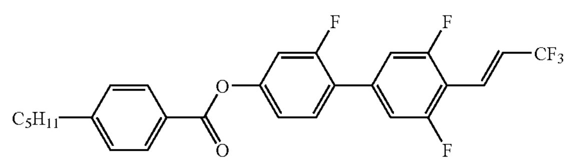
2.231
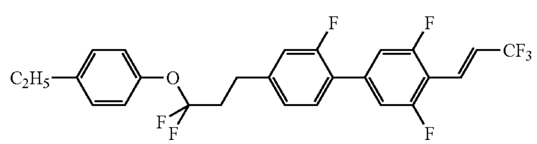
2.232
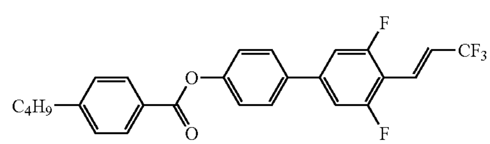
2.233
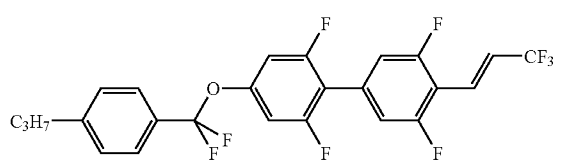
2.234
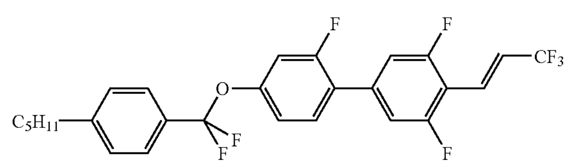
2.235
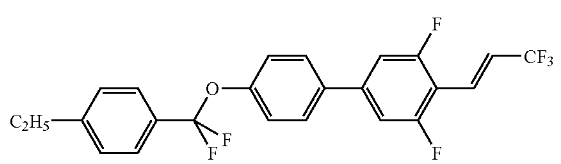
2.236
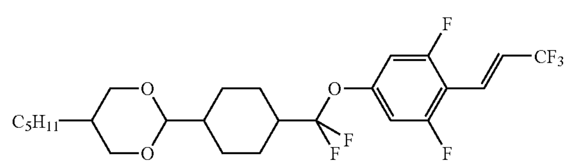
2.237
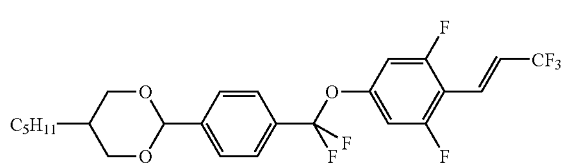
2.238
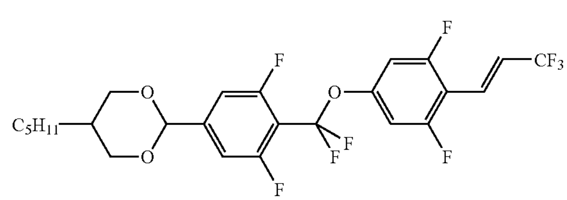

-continued
2.239
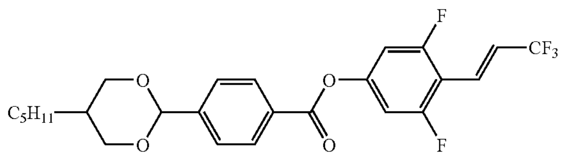
2.240
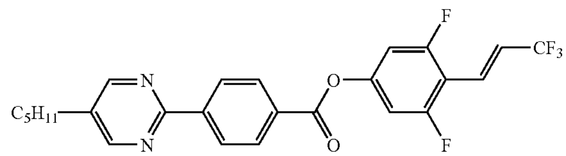
2.241
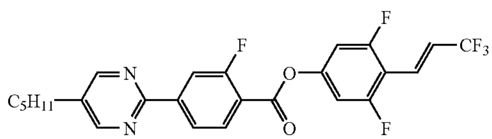
2.242
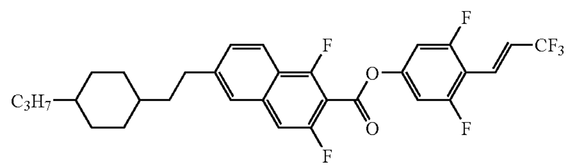
3.1
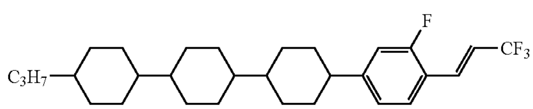
3.2
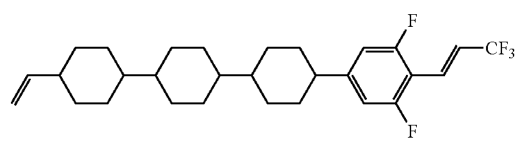
3.3
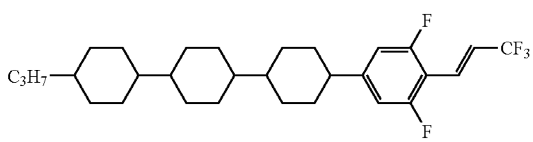
3.4
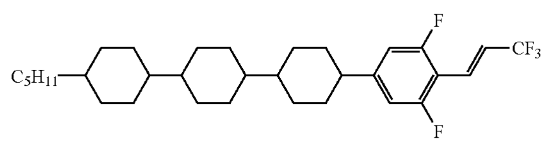
3.5
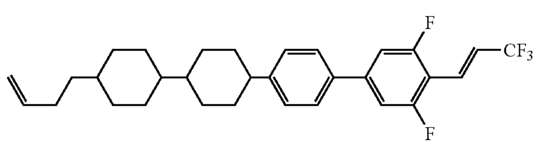
3.6
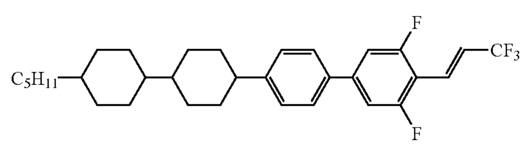
3.7
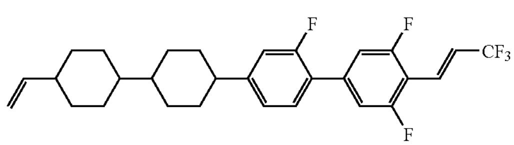
3.8
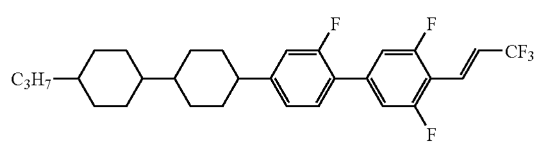
3.9
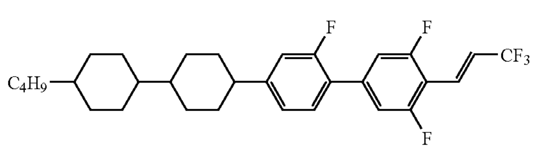
3.10
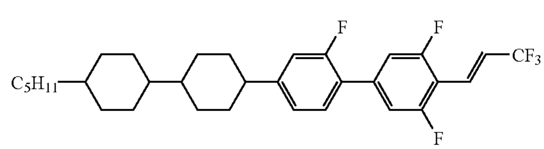
3.11
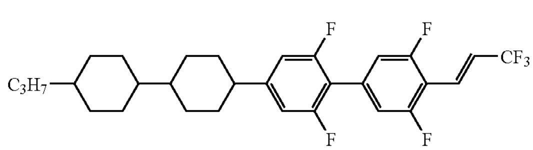
3.12
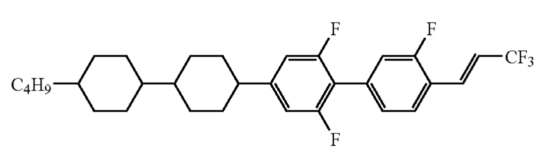
3.13
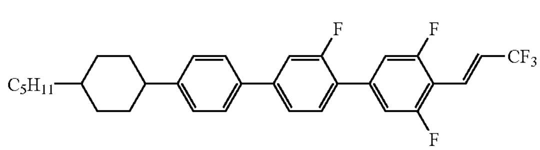
C 97.4 N 292.0 Iso
TN = 207.0° C., Δ ε = 17.7, Δ n = 0.270
3.14
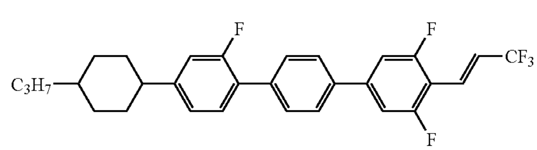

-continued
3.15
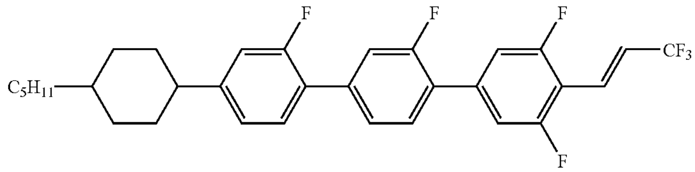
C 110.0 $S_A$ 188.0 N 279.0 Iso
TN = 181.0° C., $\Delta\varepsilon$ = 25.0, $\Delta n$ = 0.250
3.16
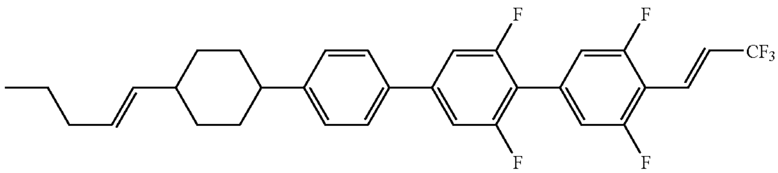
3.17
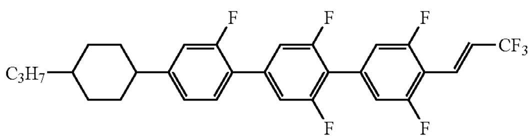
3.18
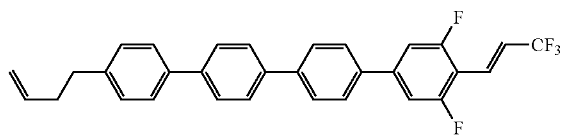
3.19
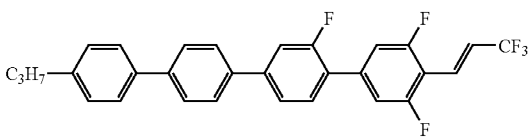
3.20
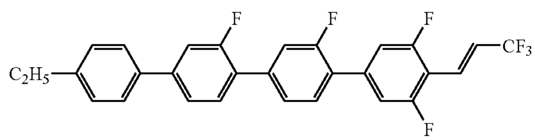
3.21
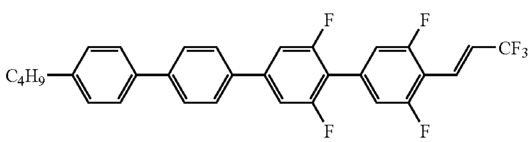
3.22
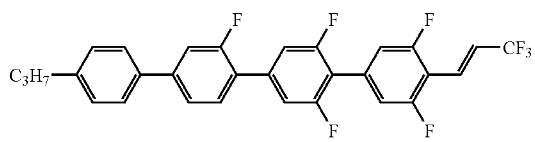
3.23
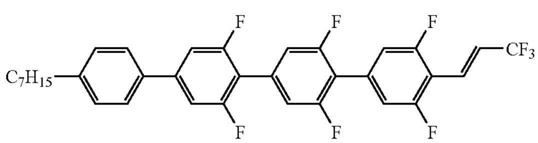
3.24
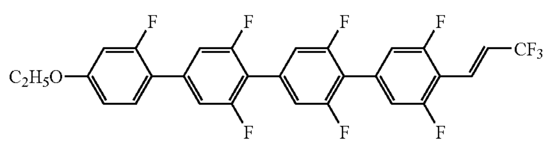
3.25
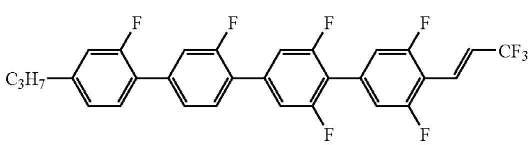
3.26
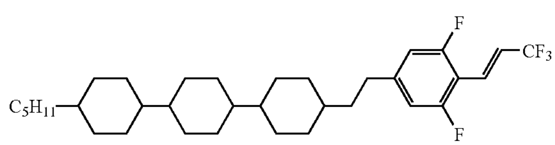
3.27
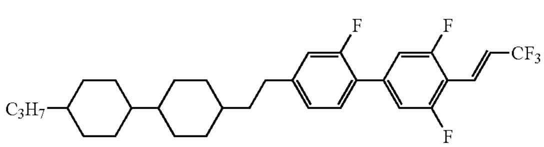
3.28
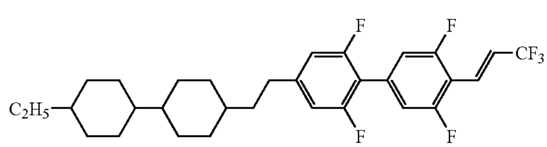
3.29
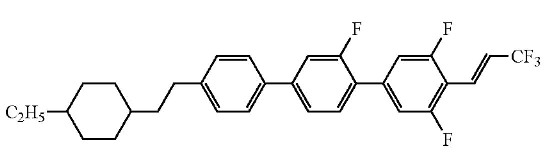
3.30
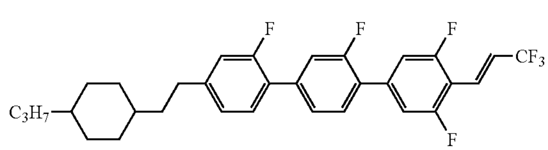

-continued
3.31
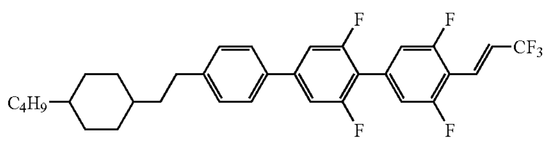
3.32
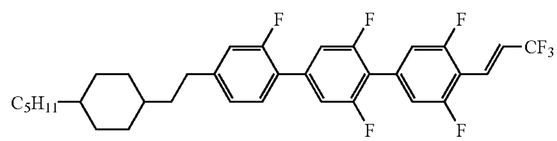
3.33
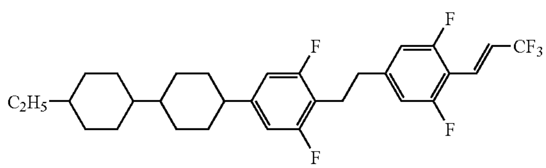
3.34
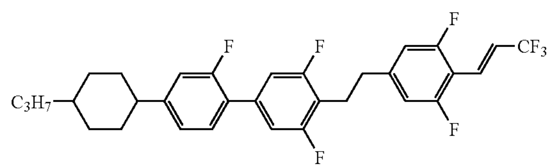
3.35
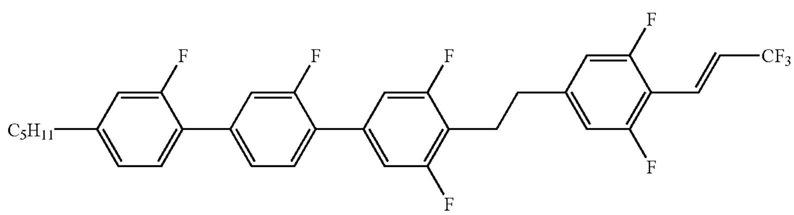
3.36
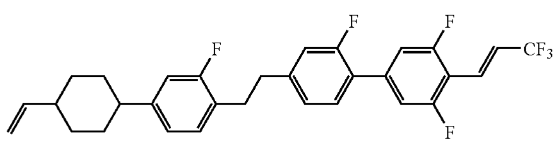
3.37
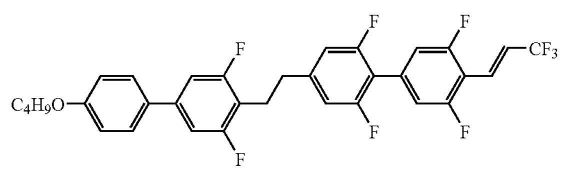
3.38
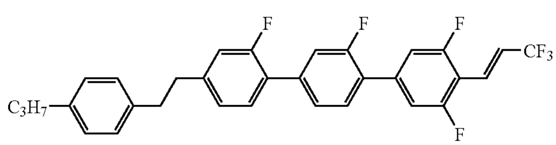
3.39
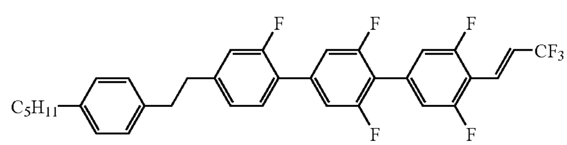
3.40
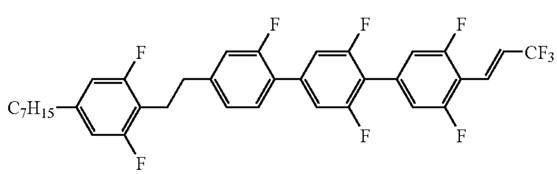
3.41
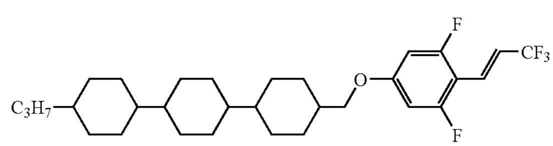
3.42
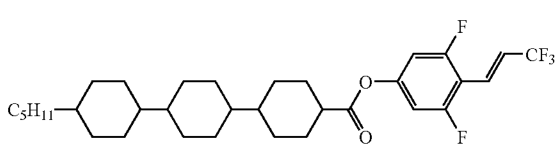
3.43
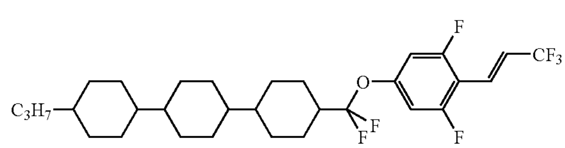
3.44
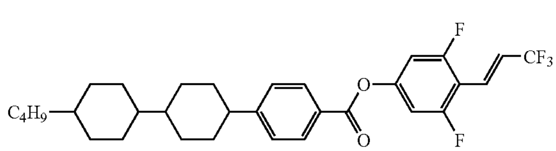
3.45
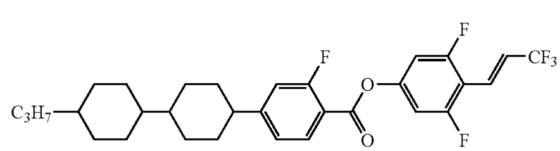

-continued
3.46
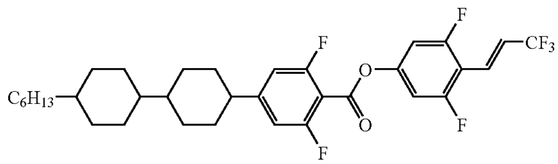
3.47
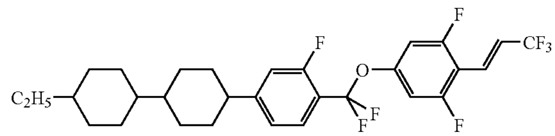
3.48
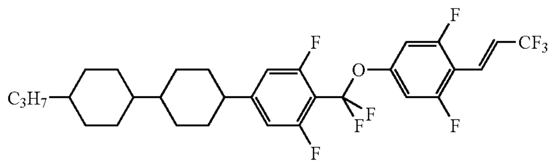
3.49
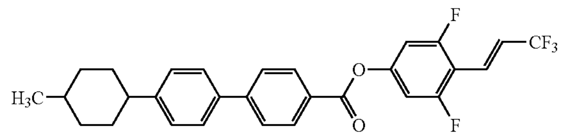
3.50
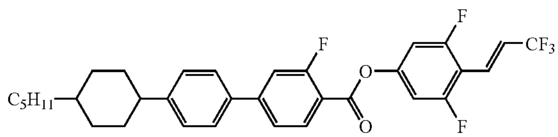
3.51
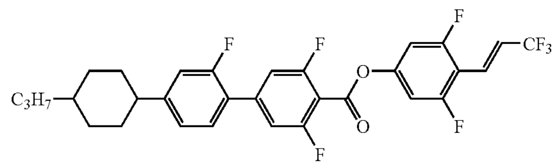
3.52
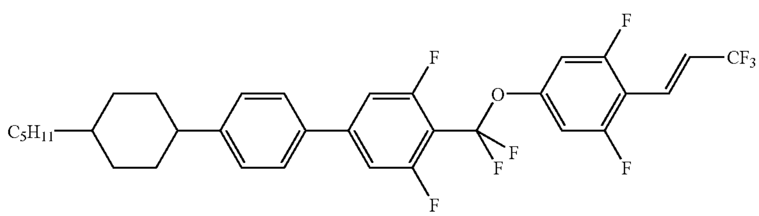
3.53
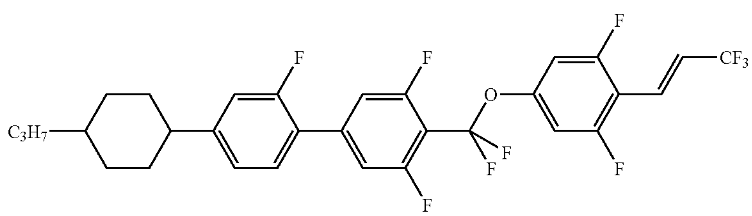
3.54
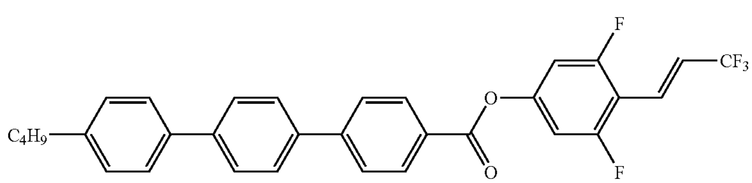
3.55
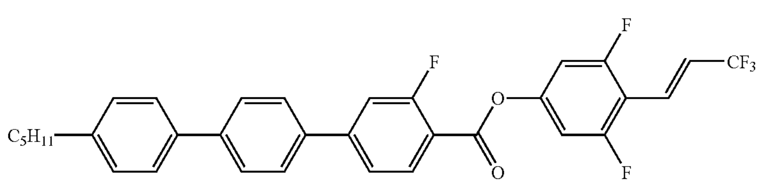
3.56
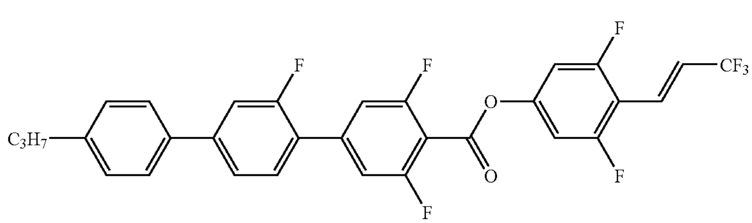

-continued
3.57
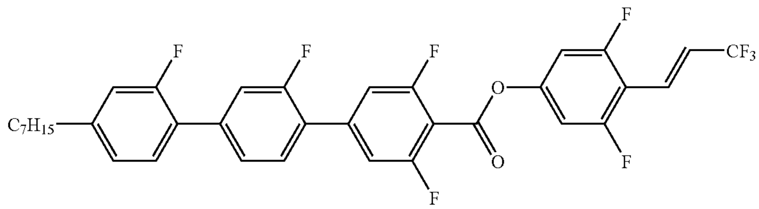
3.58
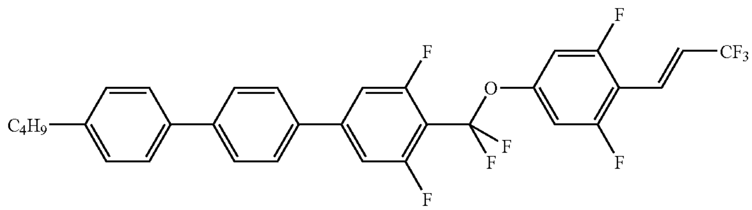
3.59
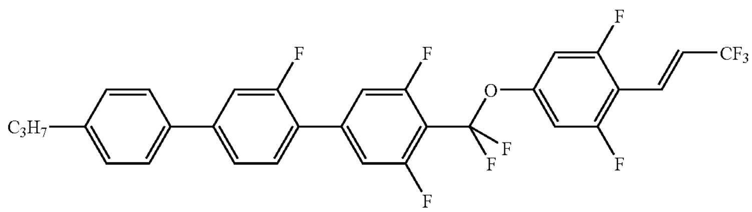
3.60
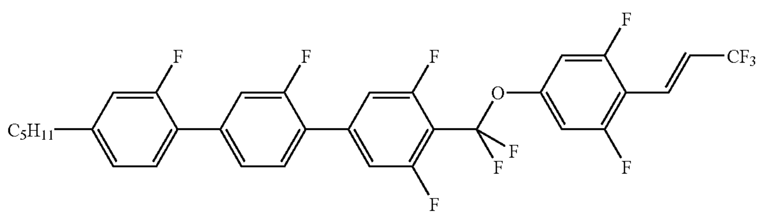
3.61
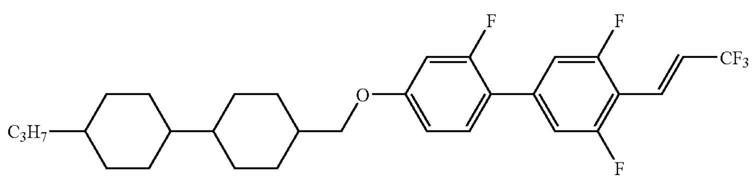
3.62
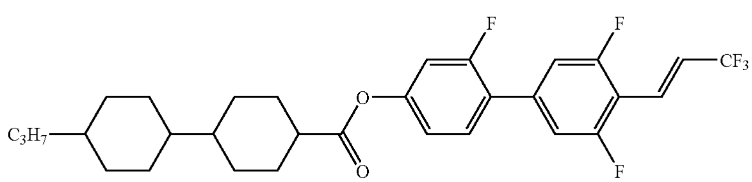
3.63
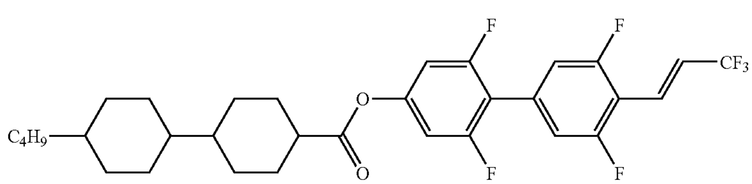
3.64
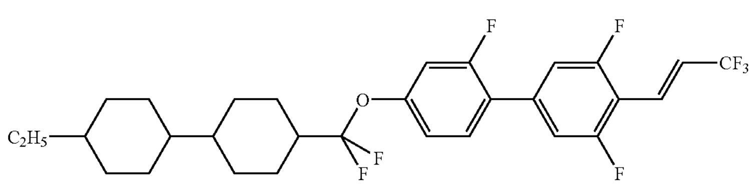

-continued
3.65
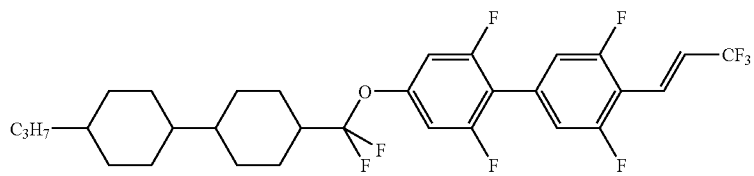
3.66
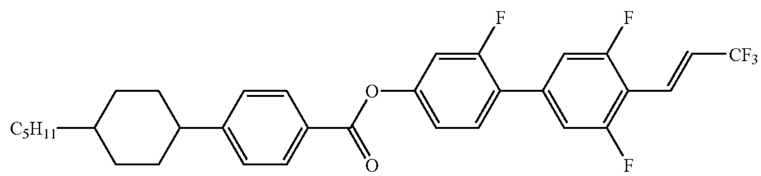
3.67
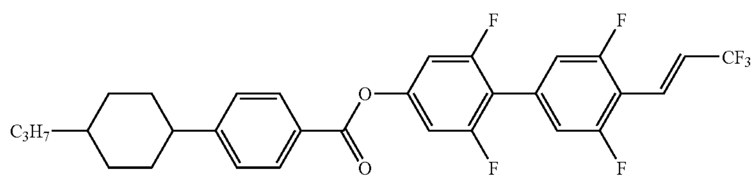
3.68
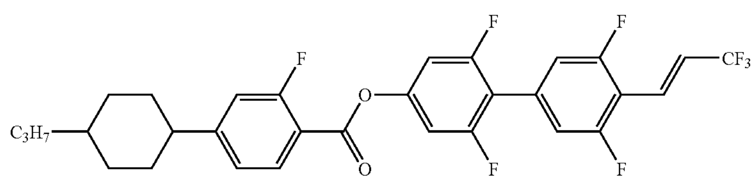
3.69
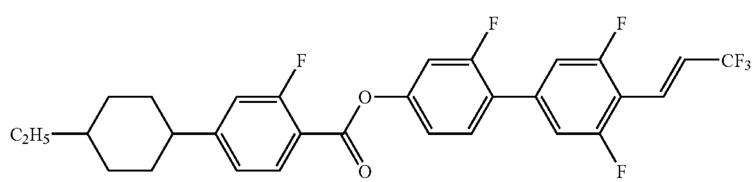
3.70
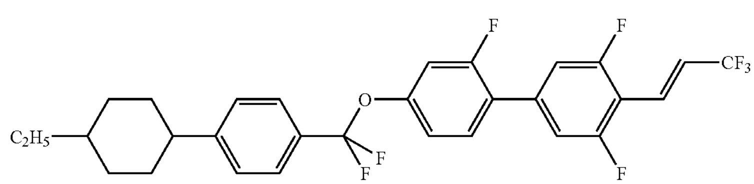
3.71
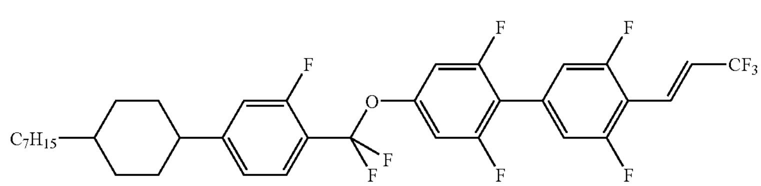
3.72
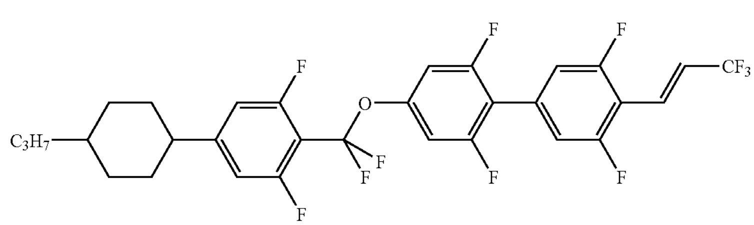

-continued
3.73
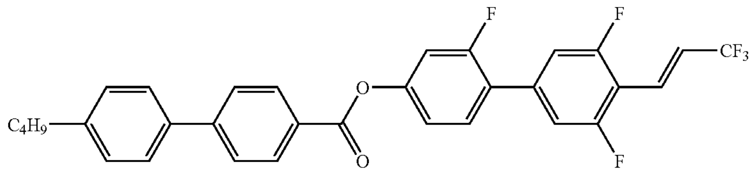
3.74
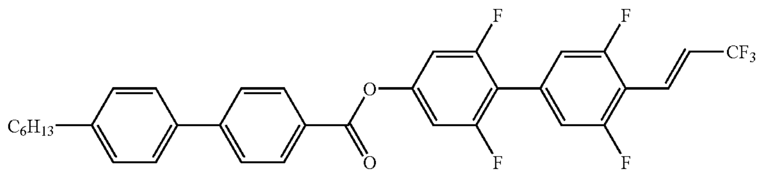
3.75
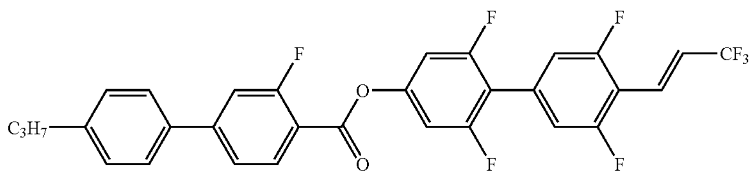
3.76
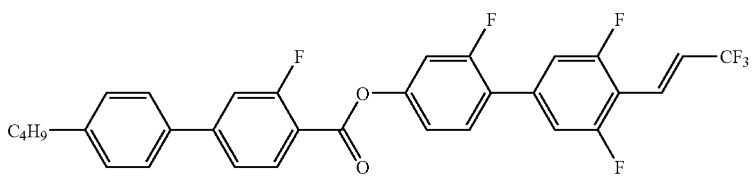
3.77
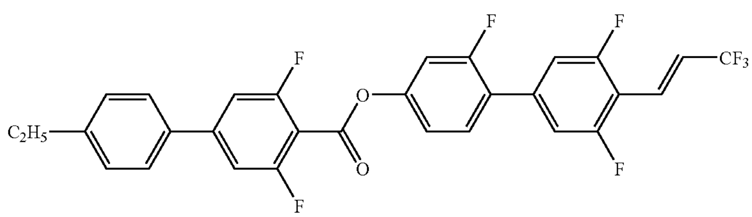
3.78
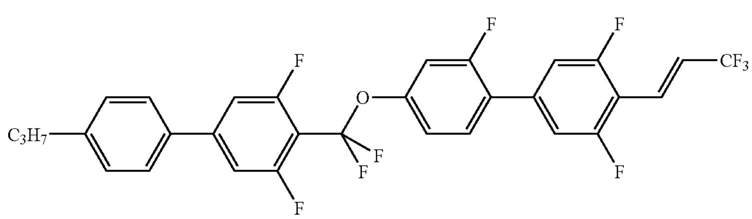
3.79
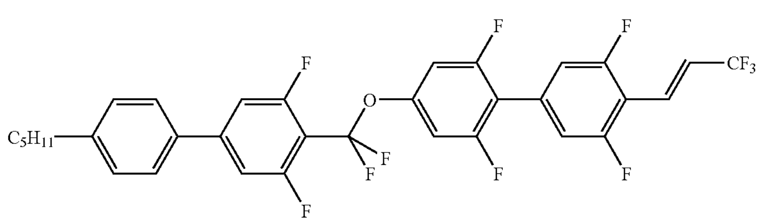
3.80
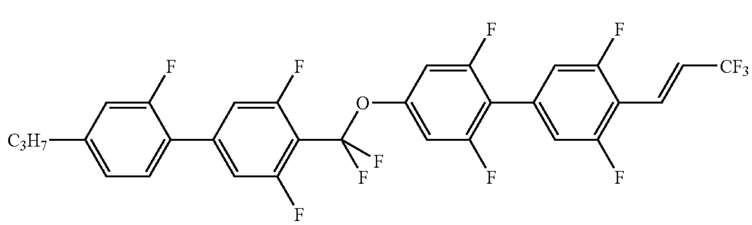

-continued
3.81
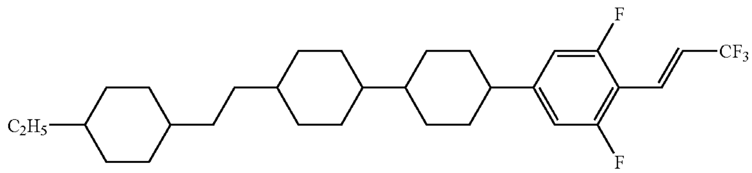
3.82
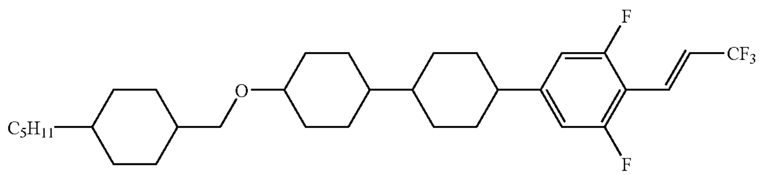
3.83
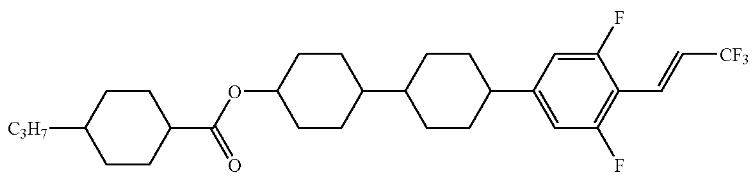
3.84
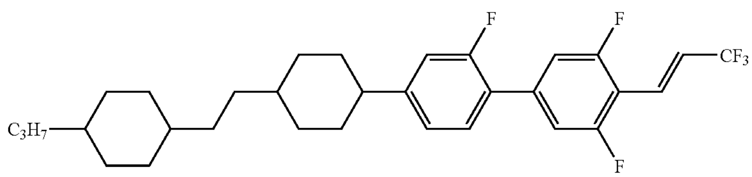
3.85
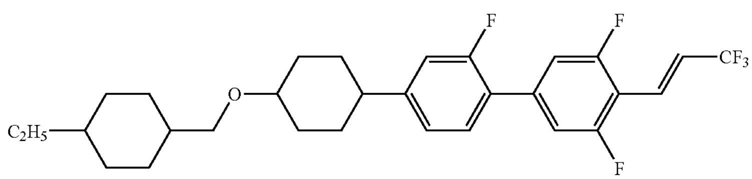
3.86
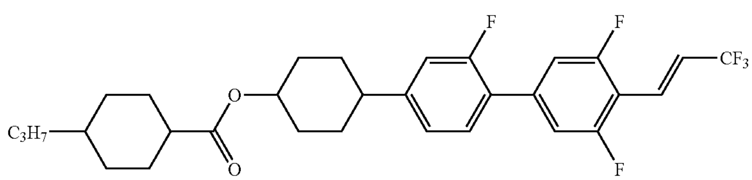
3.87
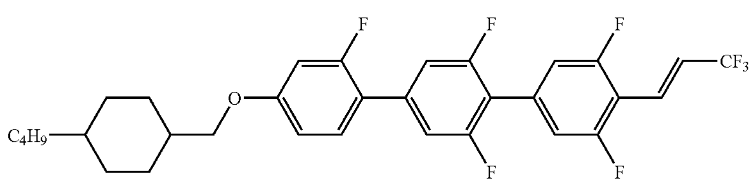
3.88
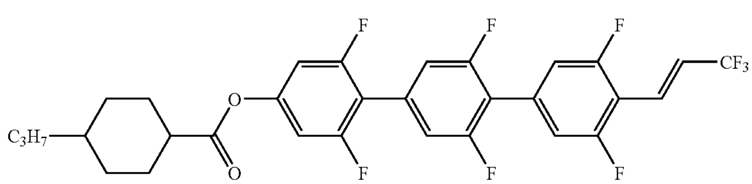
3.89
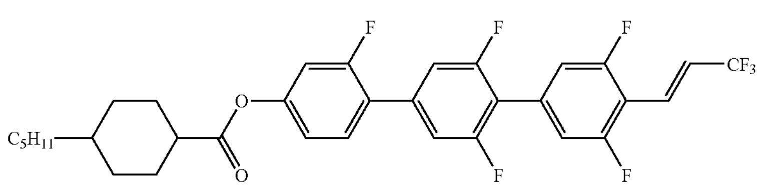

-continued
3.90
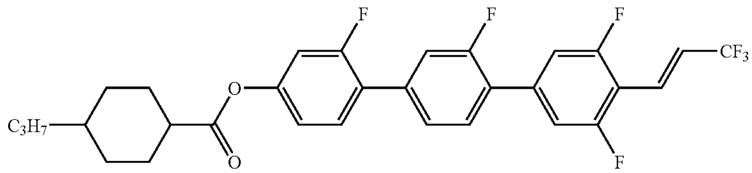
3.91
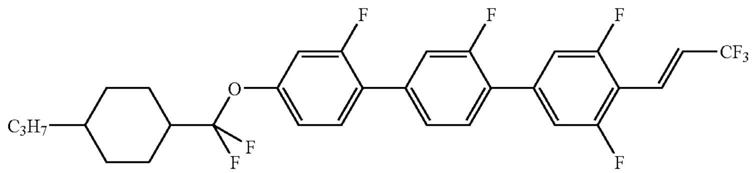
3.92
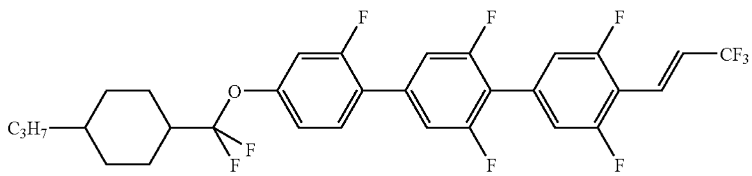
3.93
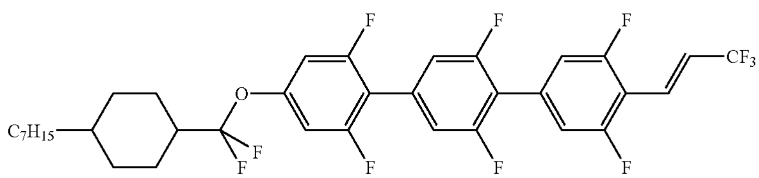
3.94
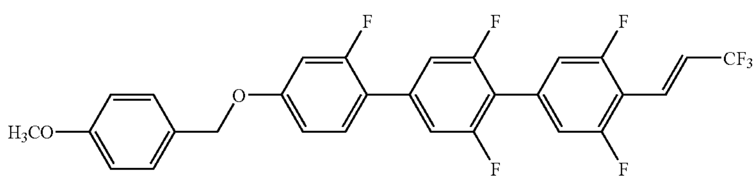
3.95
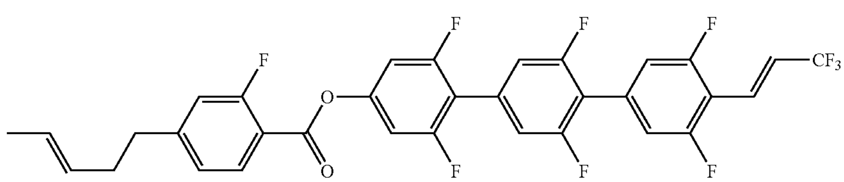
3.96
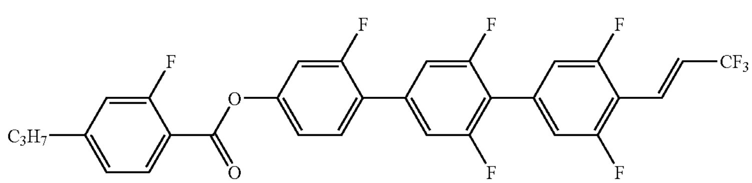
3.97
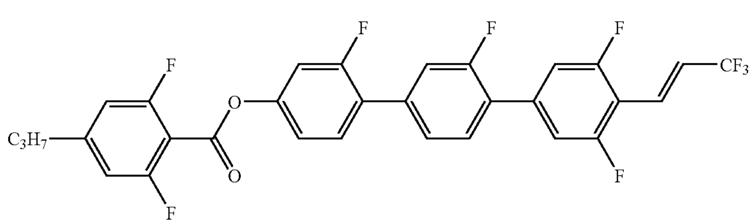

-continued
3.98
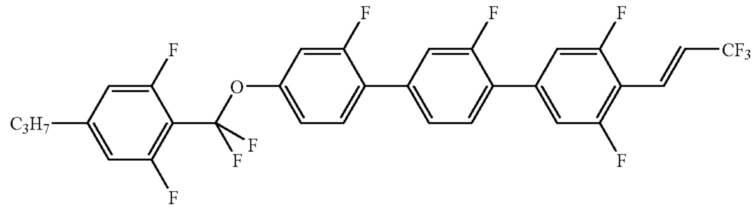
3.99
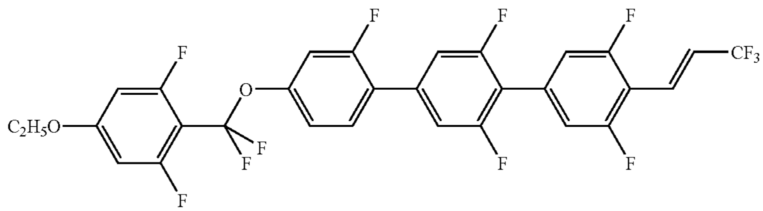
3.100
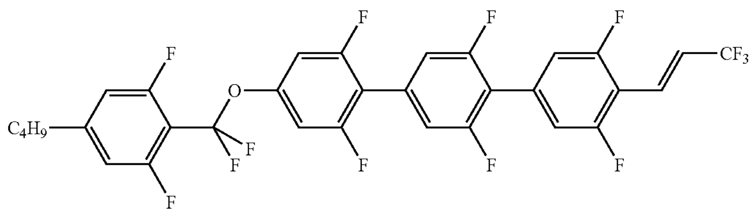
3.101
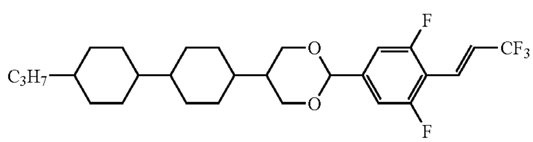
3.102
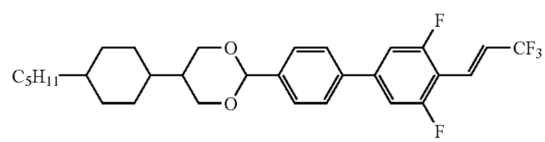
3.103
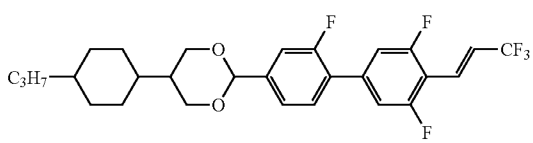
3.104
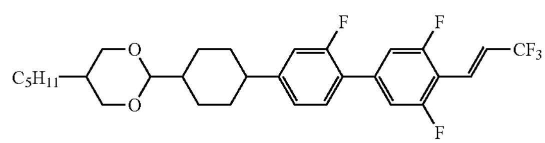
3.105
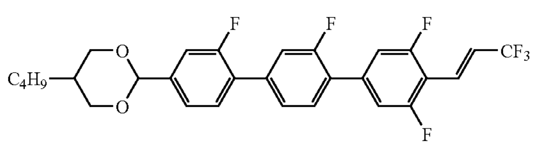
3.106
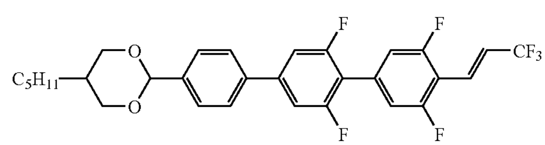
3.107
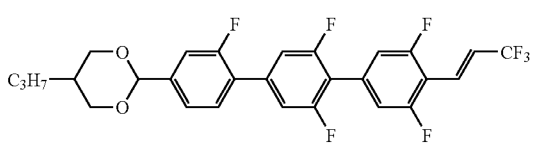
3.108
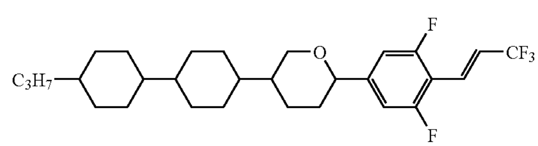
3.109
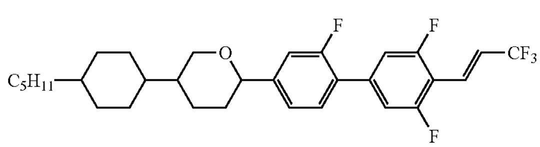
3.110
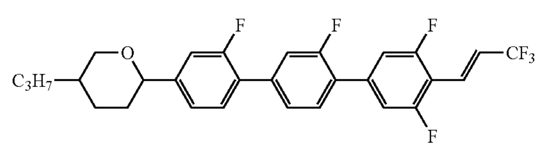

-continued
3.111
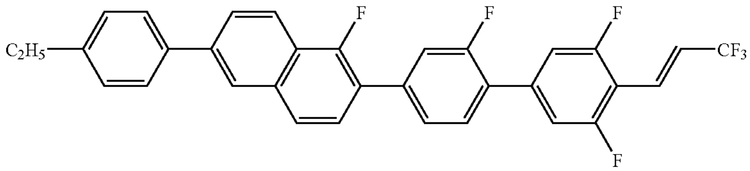
3.112
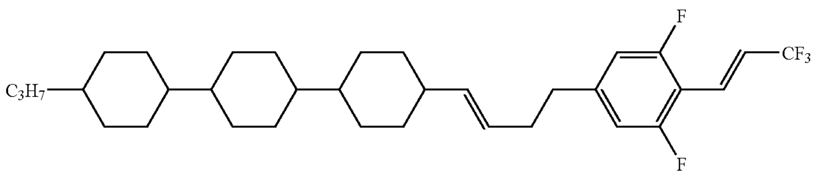
3.113
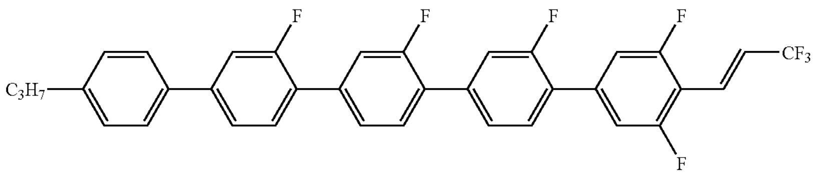
3.114
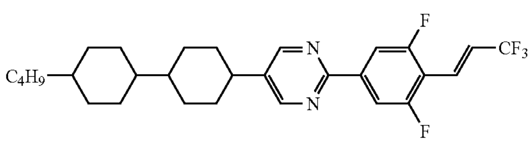
3.115
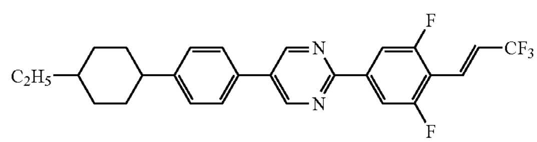
3.116
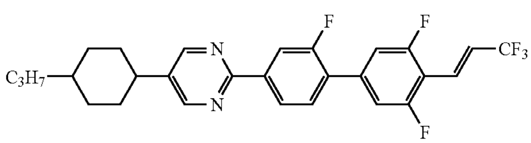
3.117
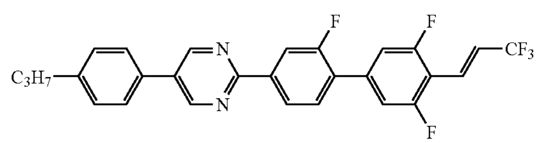
3.118
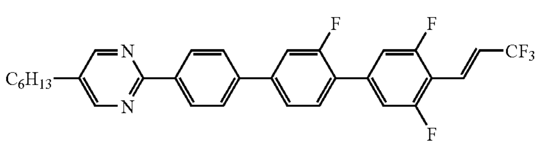
3.119
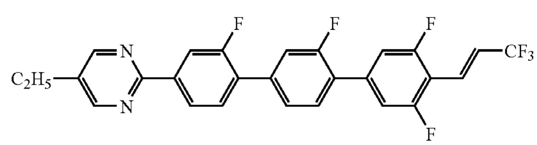
3.120
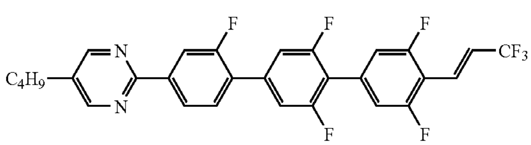
3.121
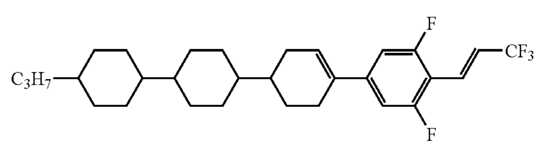
3.122
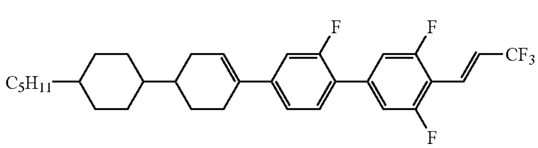
3.123
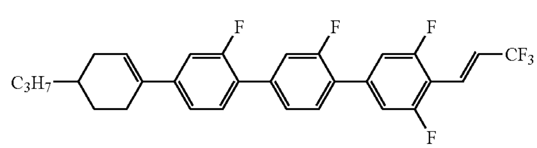
3.124
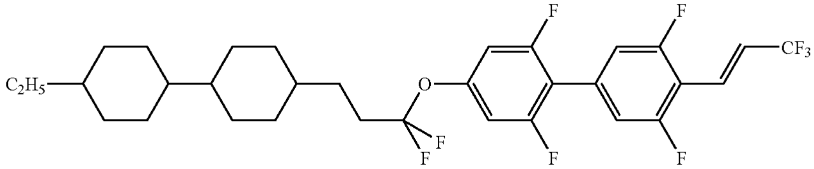

-continued
3.125
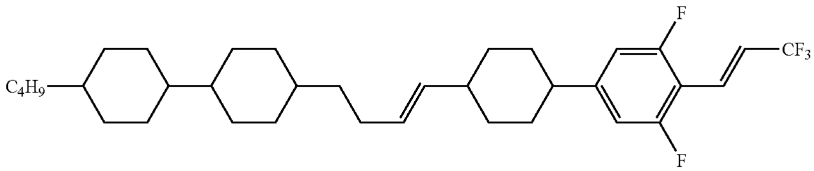
3.126
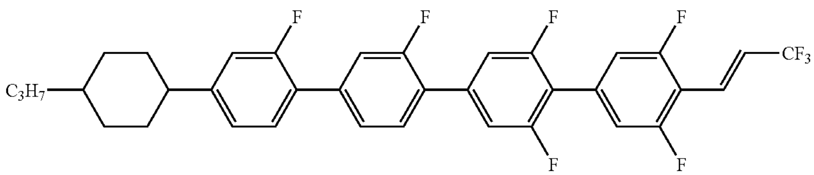
4.1
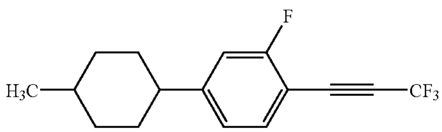
4.2
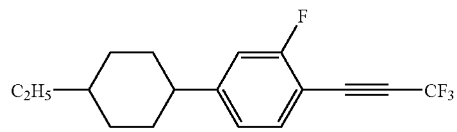
4.3
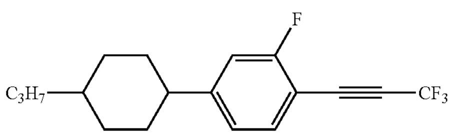
4.4
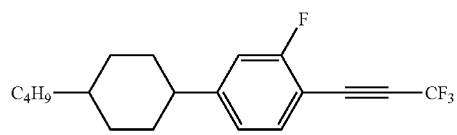
4.5
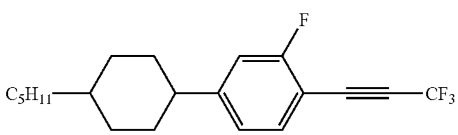
4.6
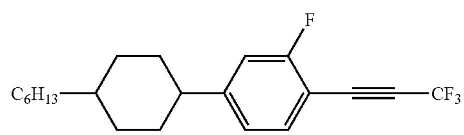
4.7
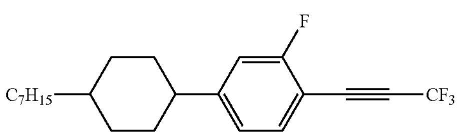
4.8
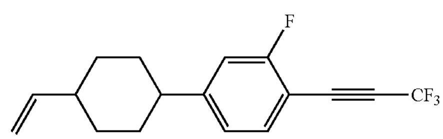
4.9
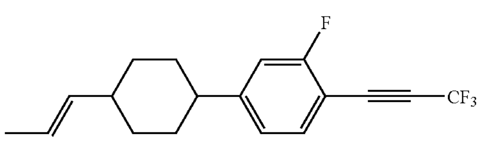
4.10
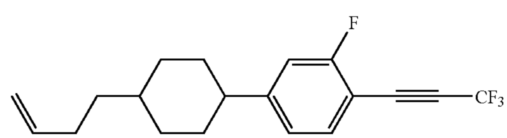
4.11
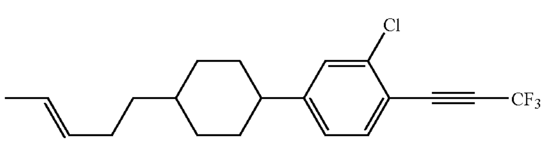
4.12
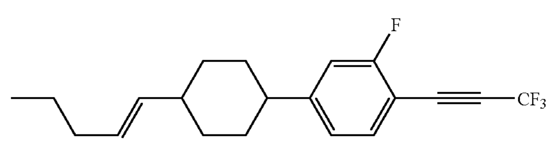
4.13
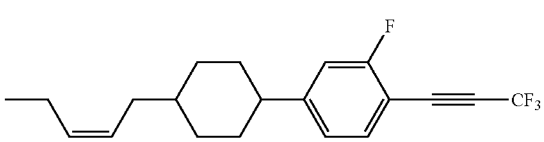
4.14
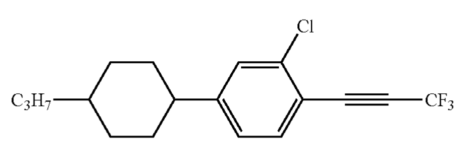
4.15
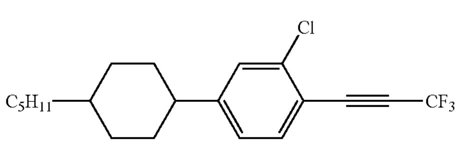
4.16
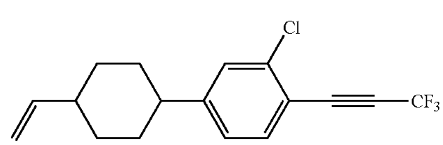

-continued
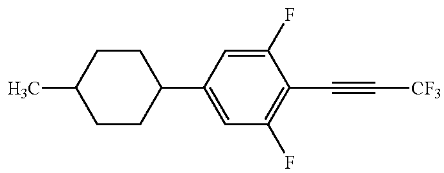
4.17
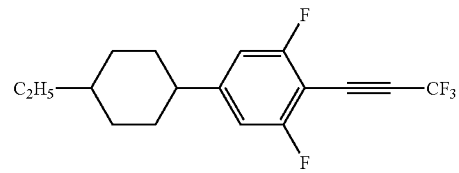
4.18
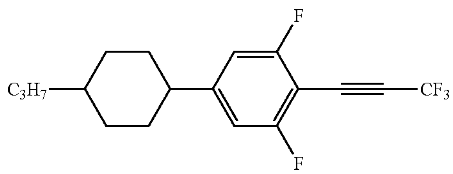
4.19
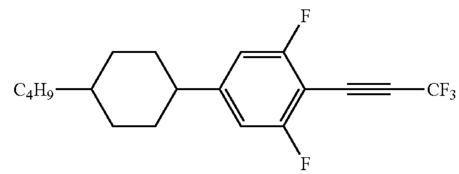
4.20
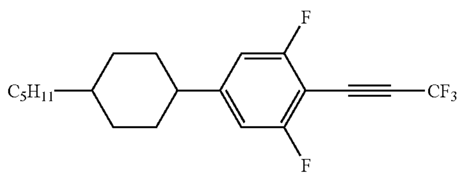
4.21
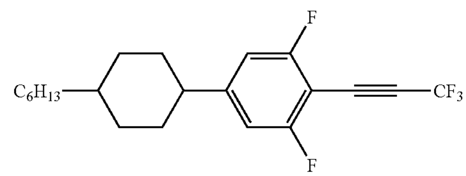
4.22
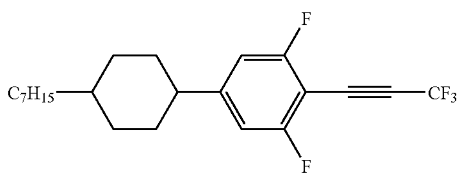
4.23
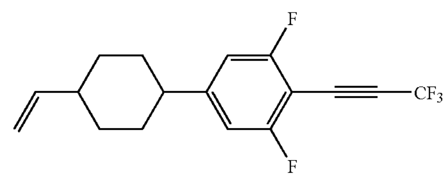
4.24
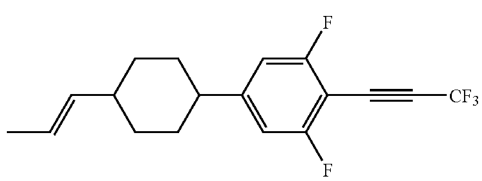
4.25
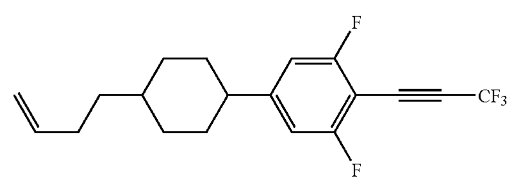
4.26
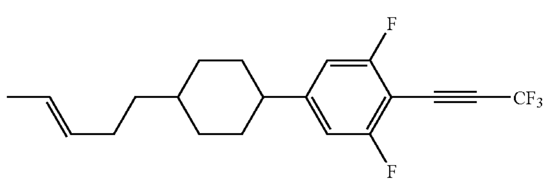
4.27
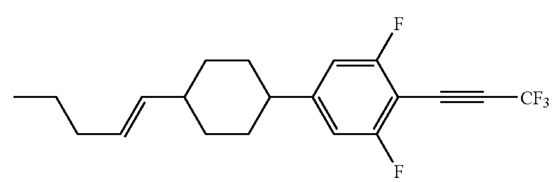
4.28
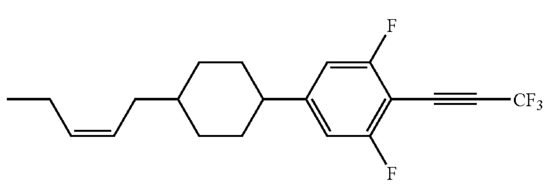
4.29
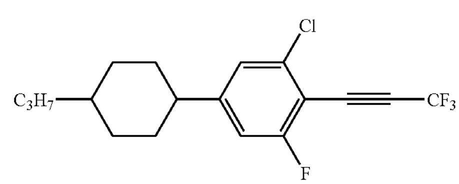
4.30
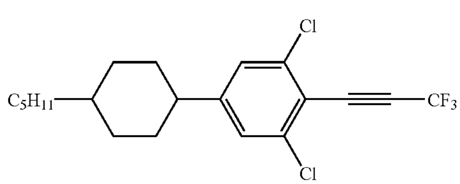
4.31
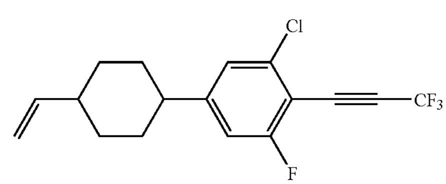
4.32

-continued
4.33
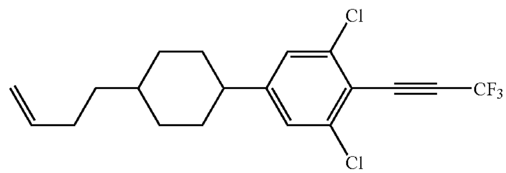
4.34
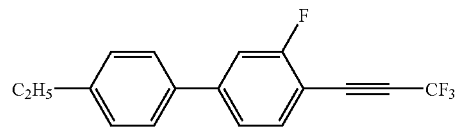
4.35
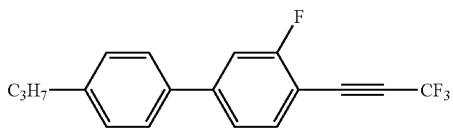
4.36
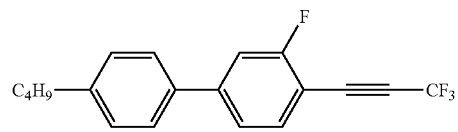
4.37
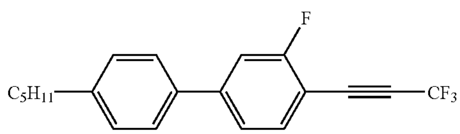
4.38
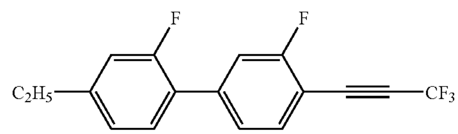
4.39
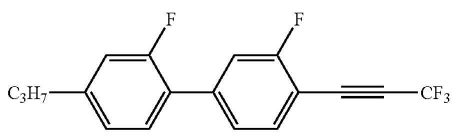
4.40
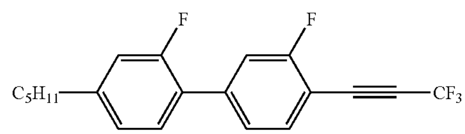
4.41
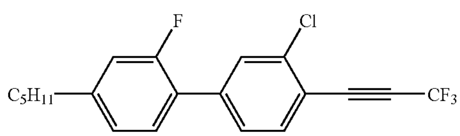
4.42
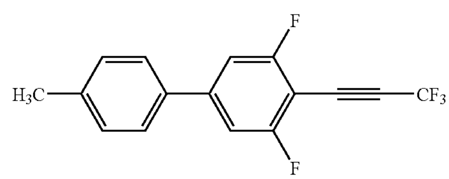
4.43
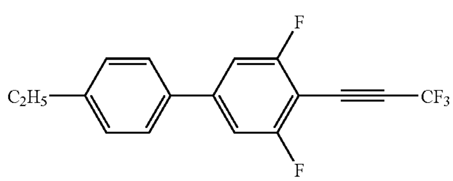
4.44
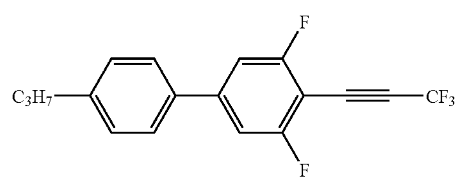
4.45
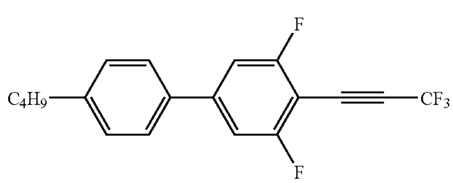
4.46
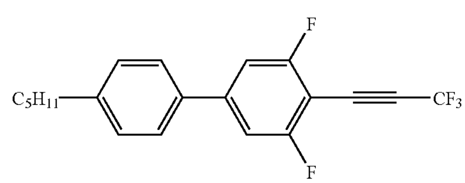
4.47
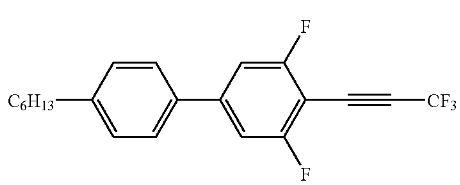
4.48
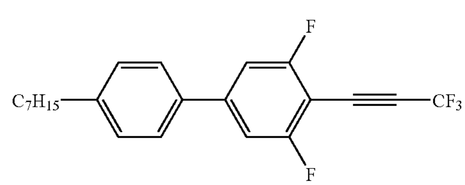
4.49
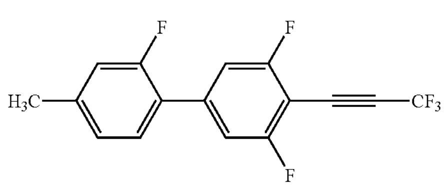
4.50
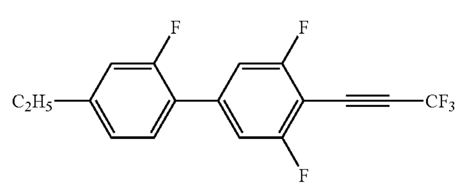

-continued
4.51
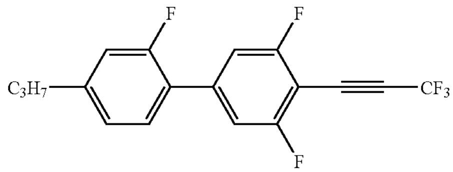
4.52
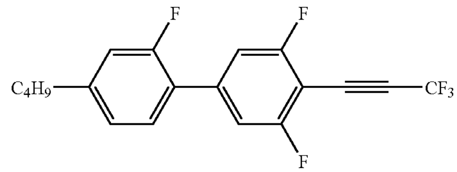
4.53
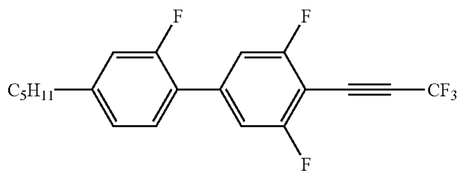
4.54
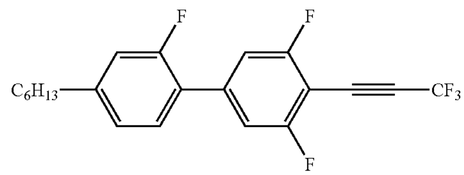
4.55
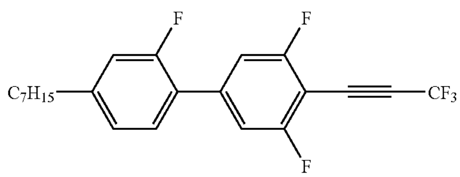
4.56
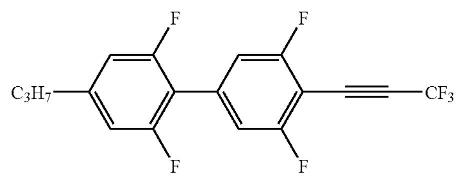
4.57
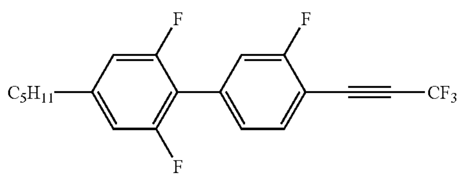
4.58
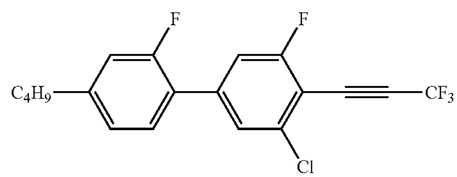
4.59
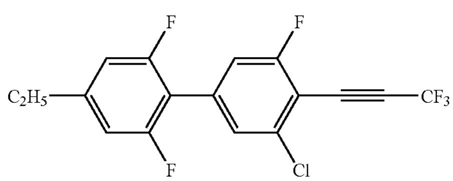
4.60
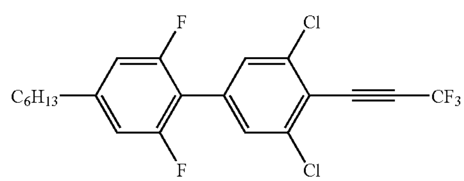
4.61
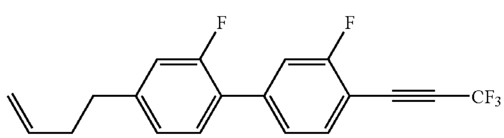
4.62
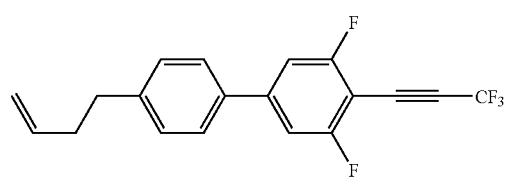
4.63
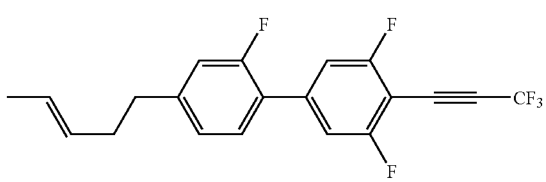
4.64
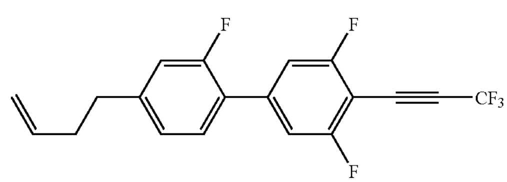
4.65
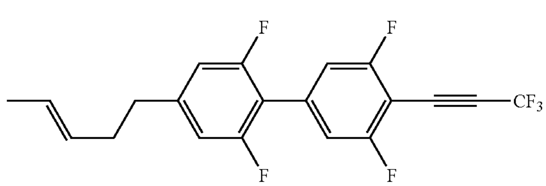
4.66
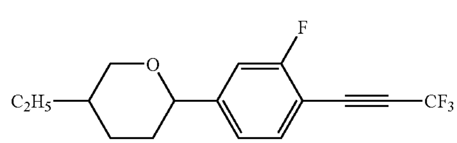

-continued
4.67
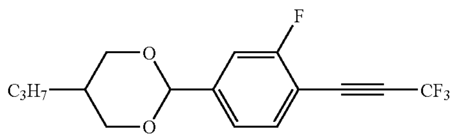
4.68
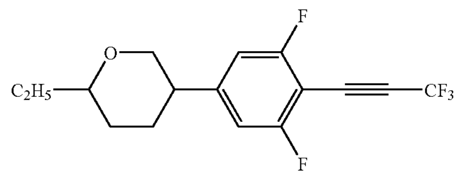
4.69
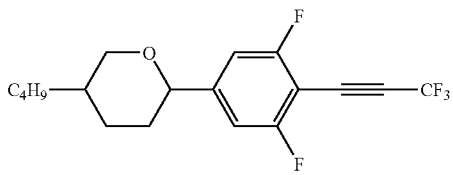
4.70
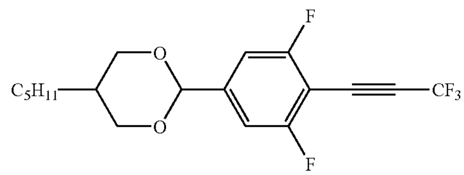
4.71
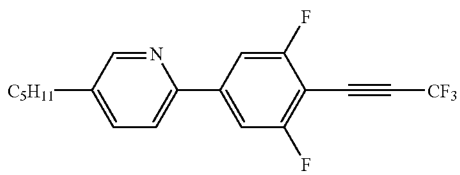
4.72
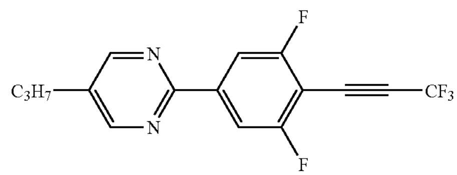
4.73
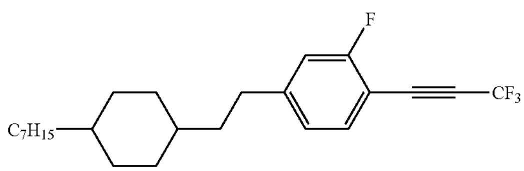
4.74
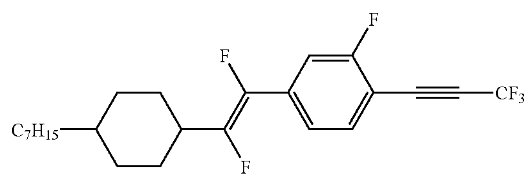
4.75
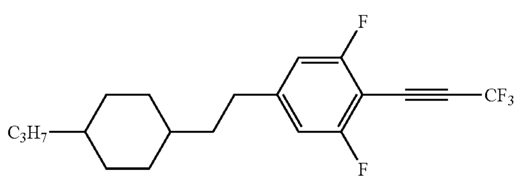
4.76
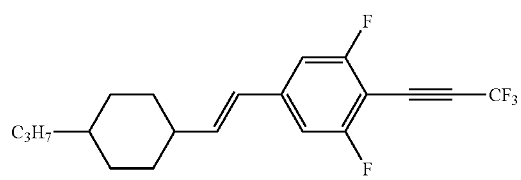
4.77
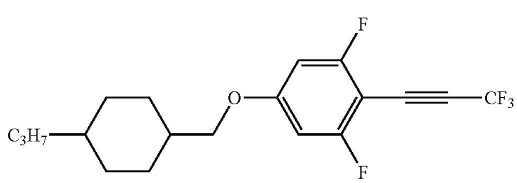
4.78
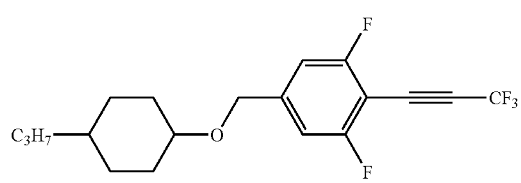
4.79
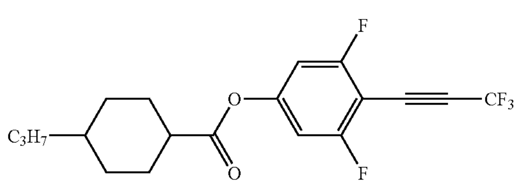
4.80
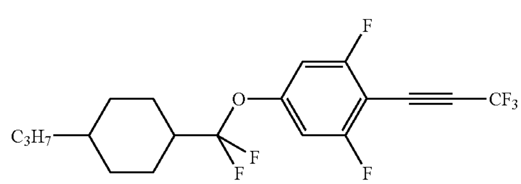
4.81
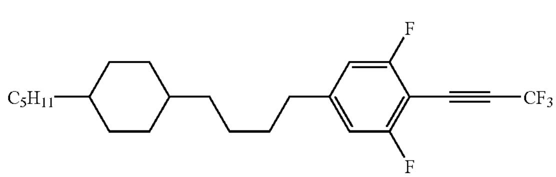
4.82
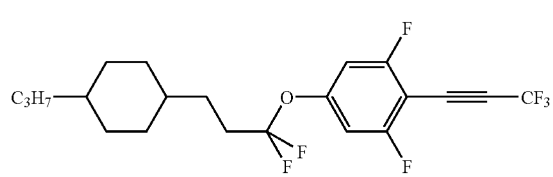

-continued
4.83
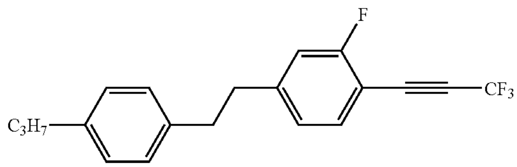
4.84
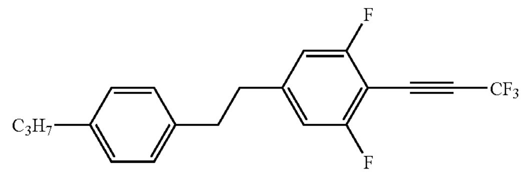
4.85
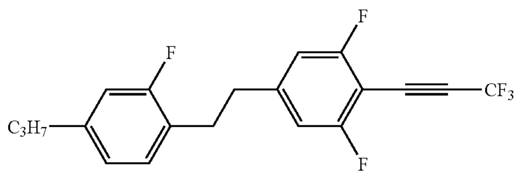
4.86
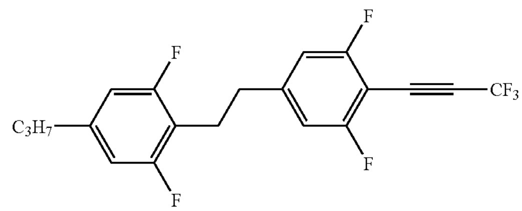
4.87
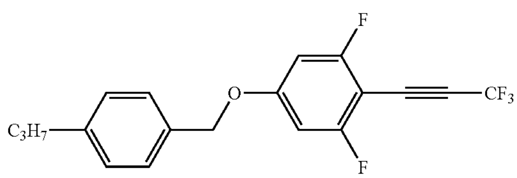
4.88
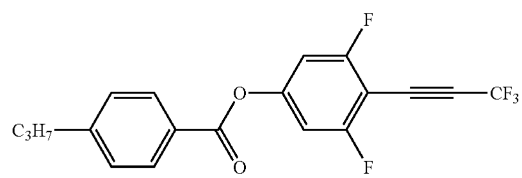
4.89
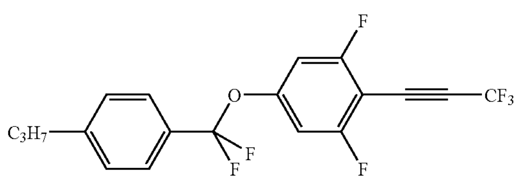
4.90
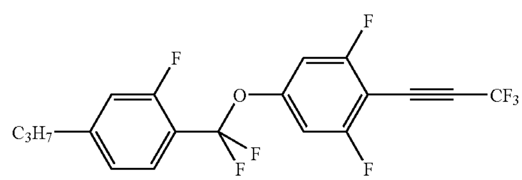
4.91
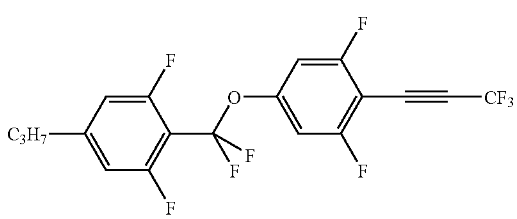
4.92
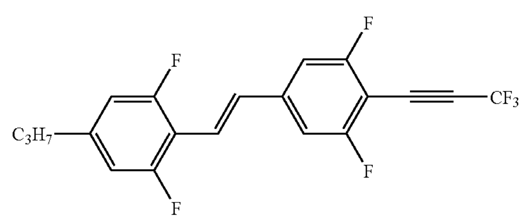
4.93
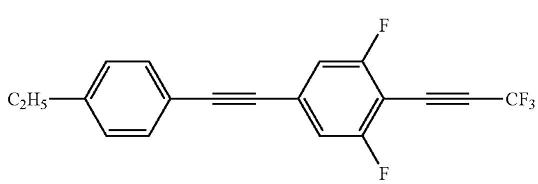
4.94
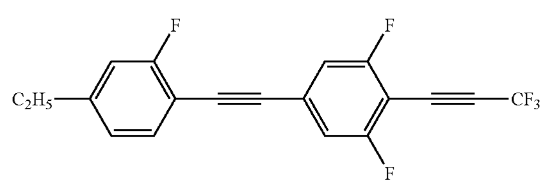
4.95
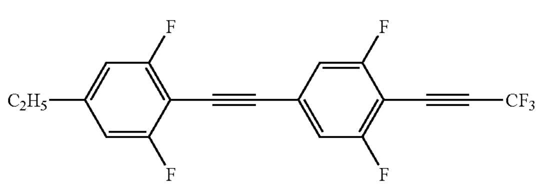
4.96
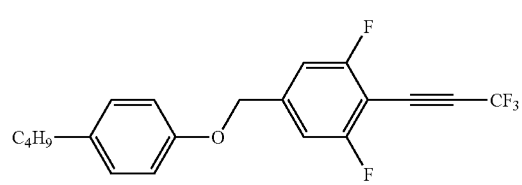
4.97
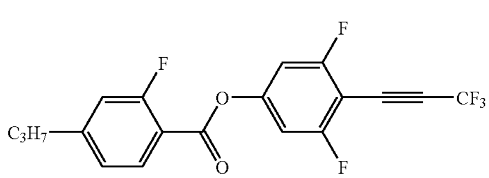
4.98
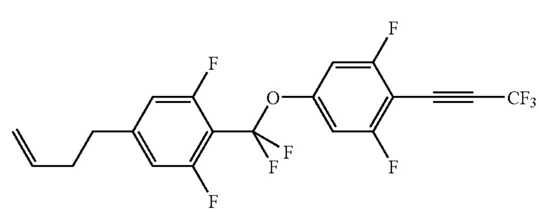

-continued
4.99
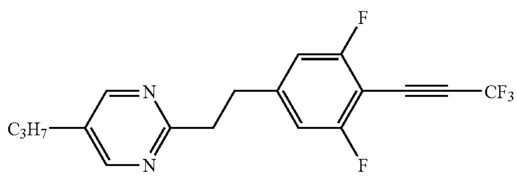
4.100
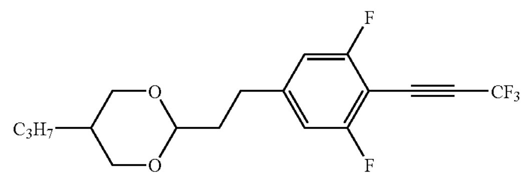
4.101
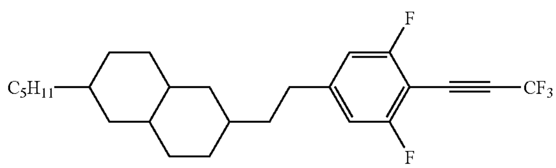
4.102
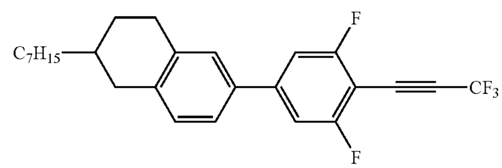
4.103
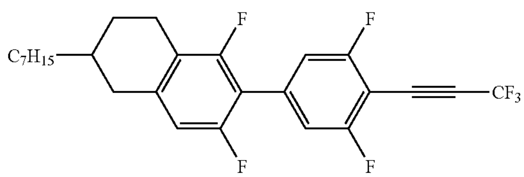
4.104
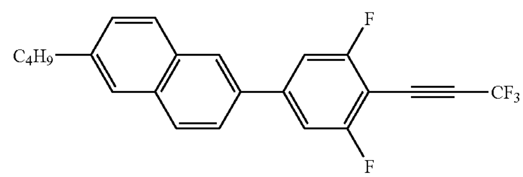
4.105
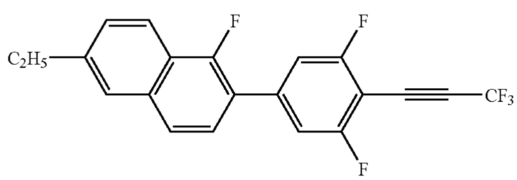
4.106
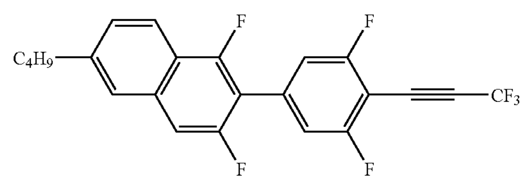
4.107
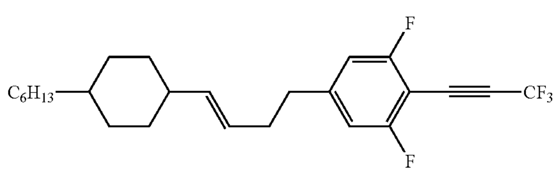
4.108
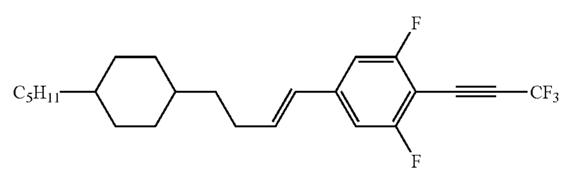
4.109
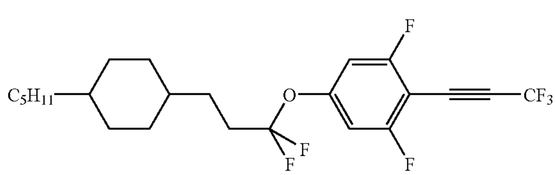
4.110
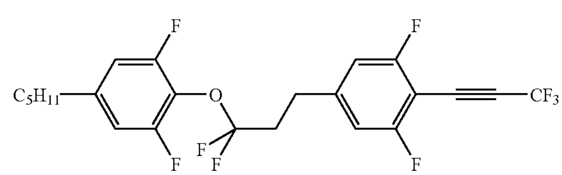
4.111
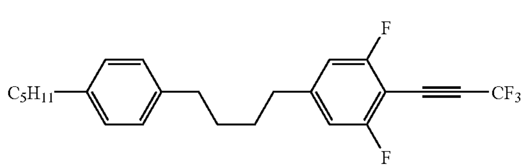
4.112
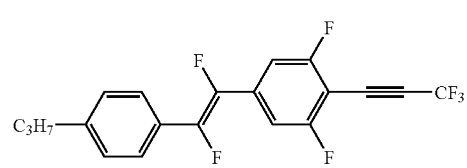
5.1
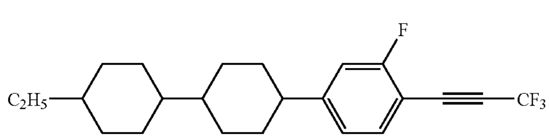
5.2
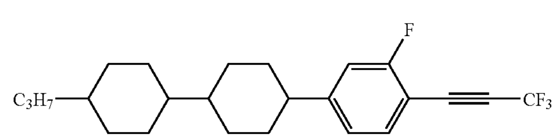

-continued
5.3
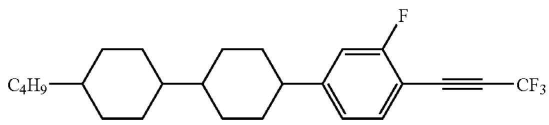
5.4
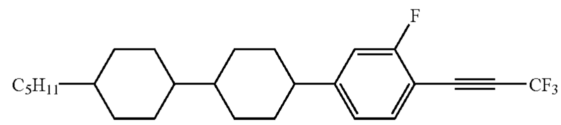
5.5
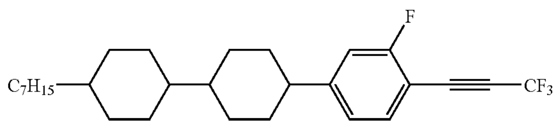
5.6
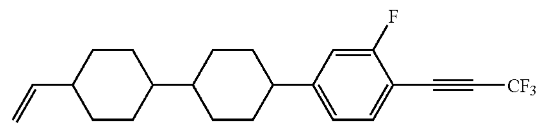
5.7
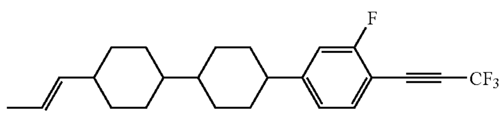
5.8
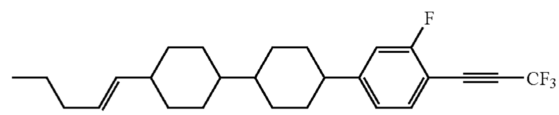
5.9
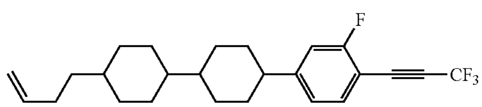
5.10
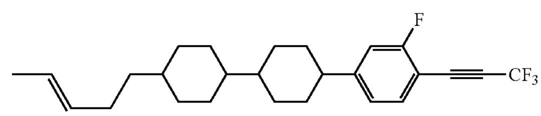
5.11
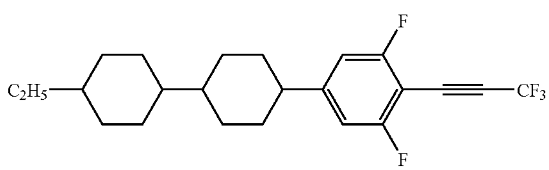
5.12
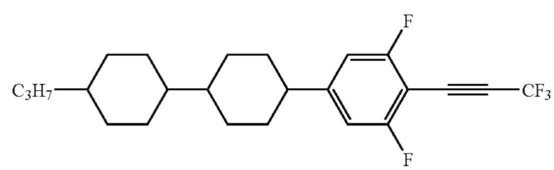
5.13
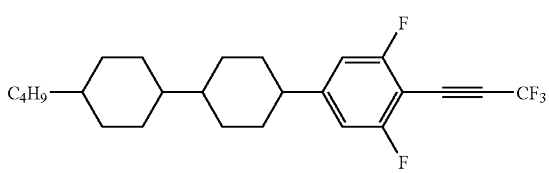
5.14
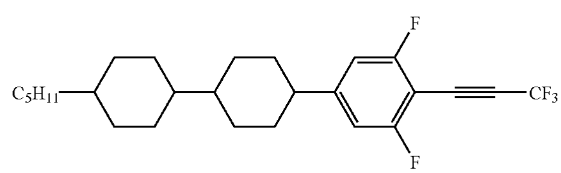
5.15
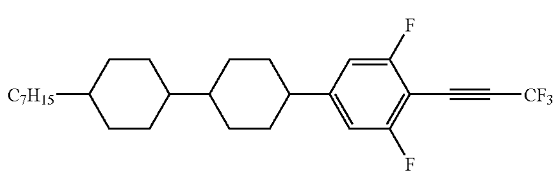
5.16
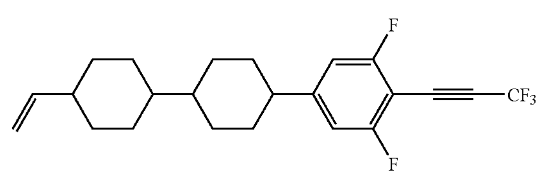
5.17
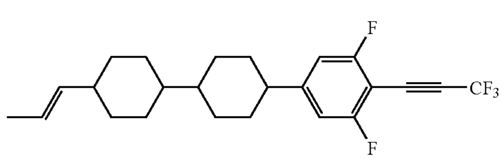
5.18
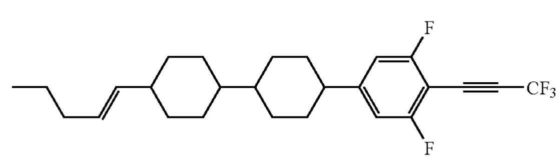
5.19
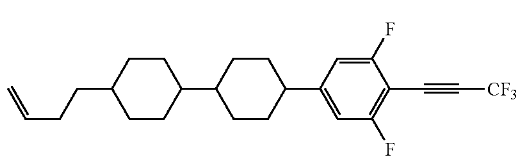
5.20
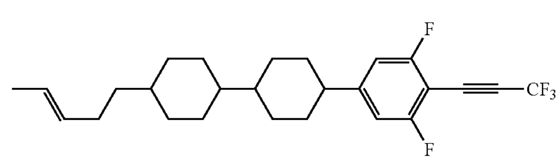

-continued
5.21
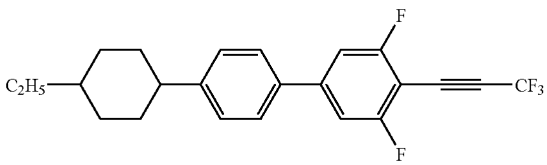
5.22
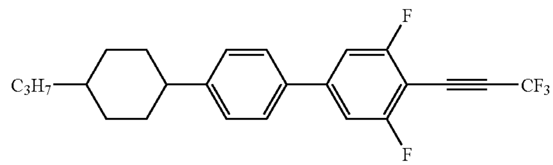
5.23
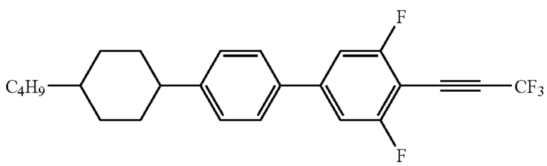
5.24
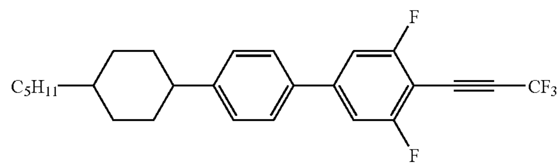
5.25
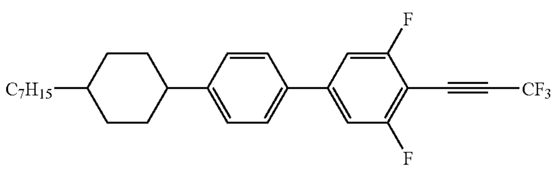
5.26
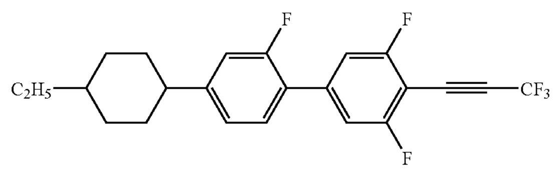
5.27
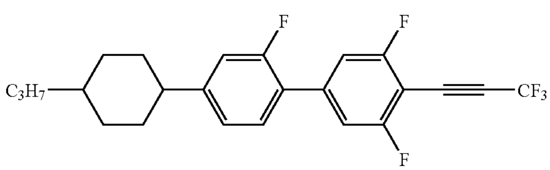
5.28
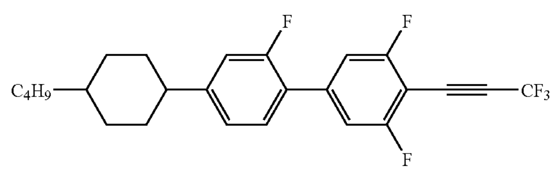
5.29
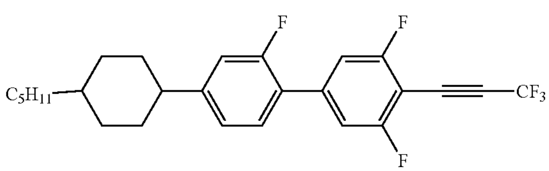
5.30
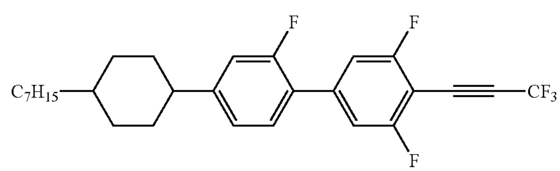
5.31
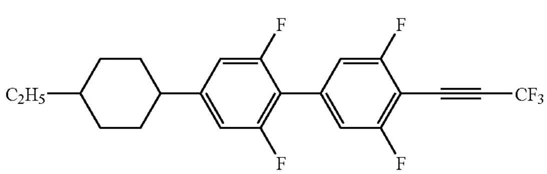
5.31
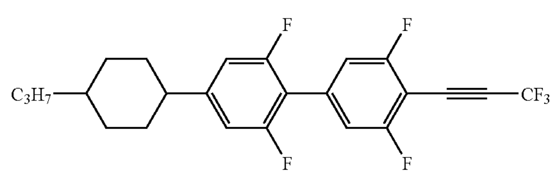
5.33
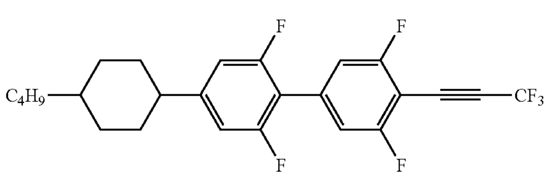
5.34
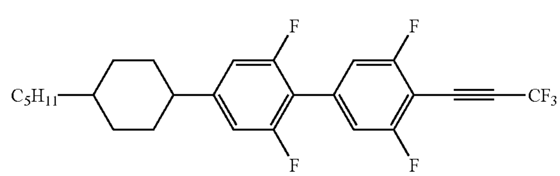
5.35
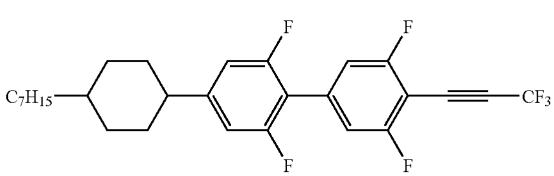
5.36
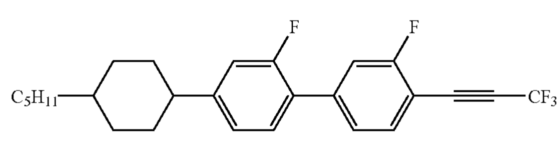

-continued
5.37
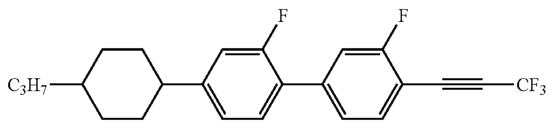
5.38
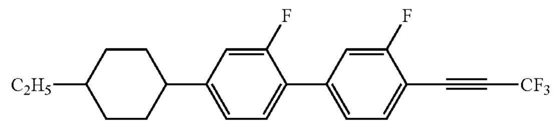
5.39
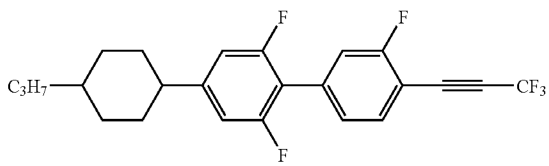
5.40
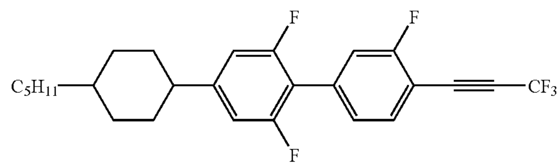
5.41
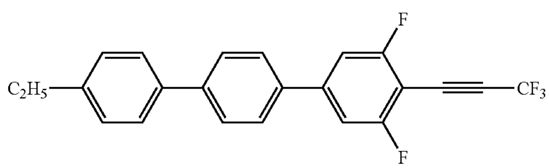
5.42
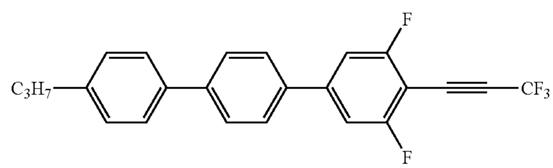
5.43
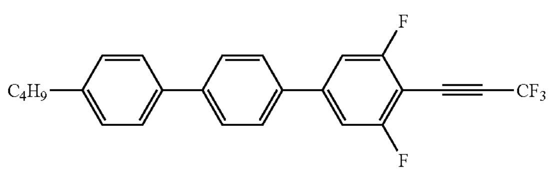
5.44
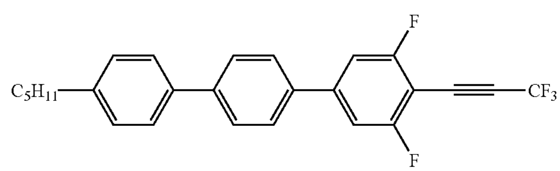
5.45
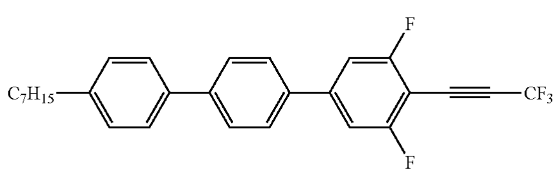
5.46
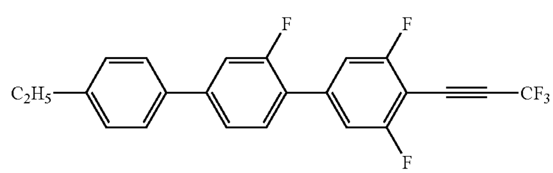
5.47
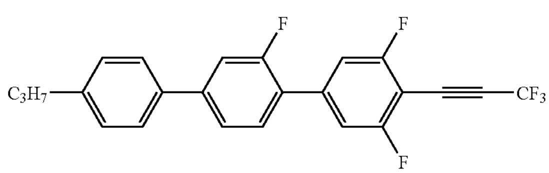
C 119.5 $S_A$ 125.3 Iso
TN = 85.7° C., $\Delta\varepsilon = 31.6$, $\Delta n = 0.277$
5.48
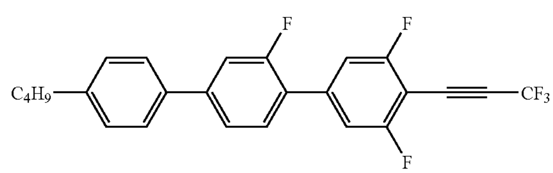
5.49
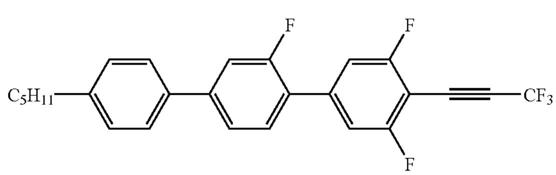
5.50
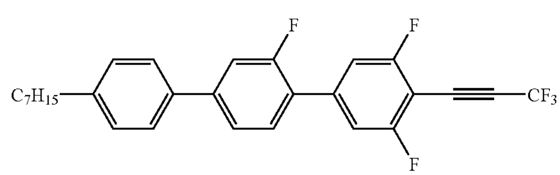
5.51
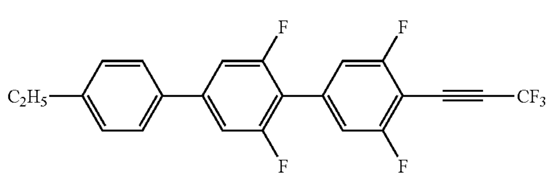
5.52
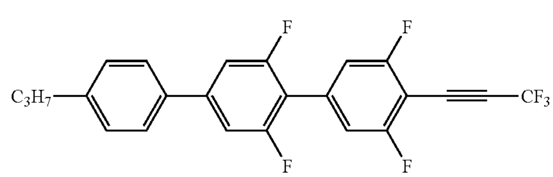

-continued
5.53
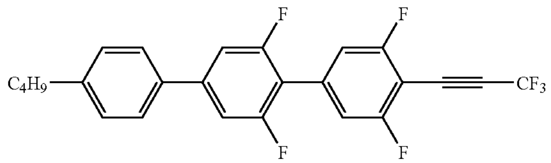
5.54
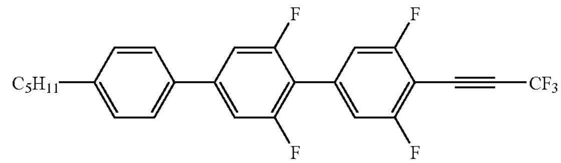
5.55
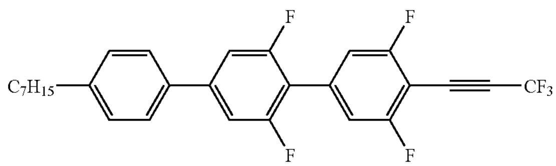
5.56
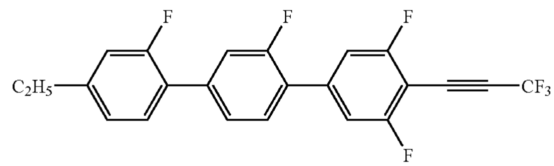
5.57
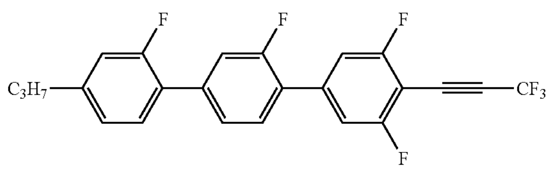
5.58
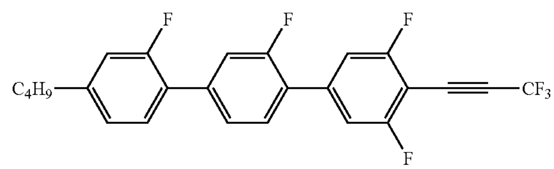
5.59
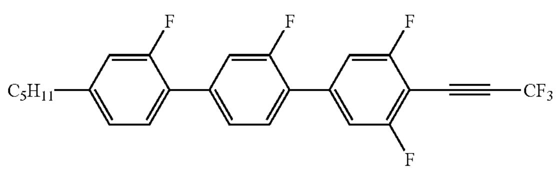
5.60
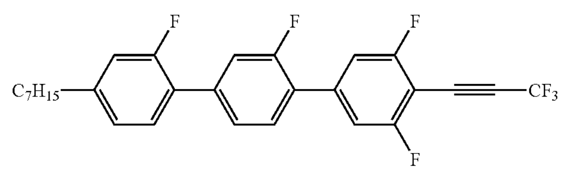
5.61
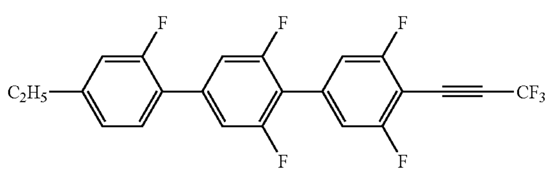
5.62
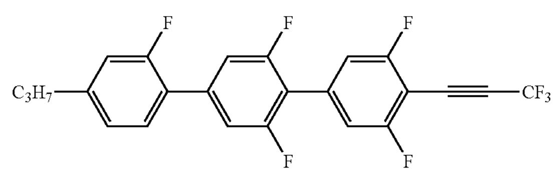
5.63
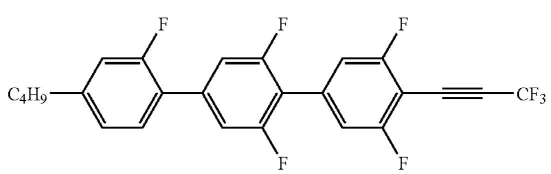
5.64
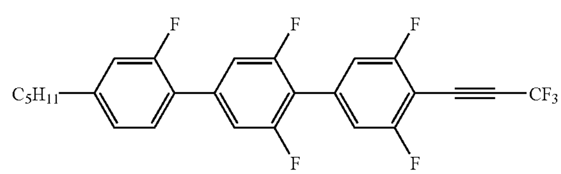
5.65
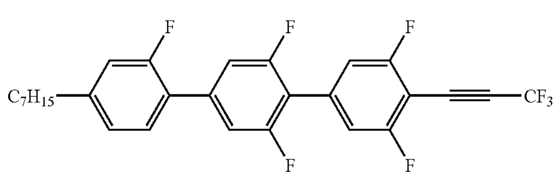
5.66
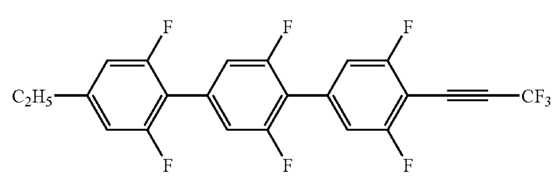
5.67
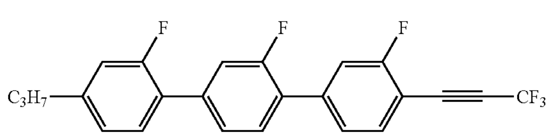
5.68
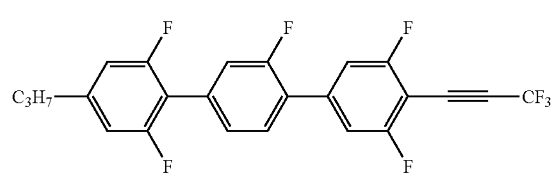

-continued
5.69
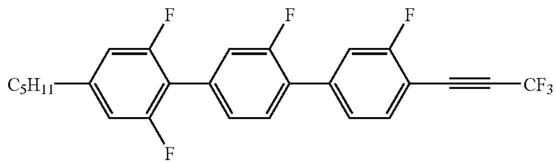
5.70
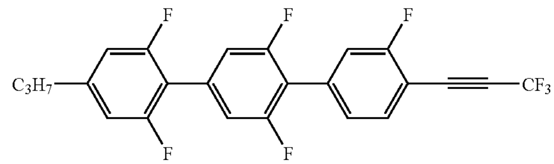
5.71
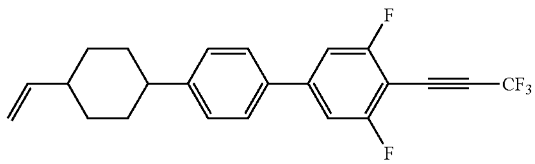
5.72
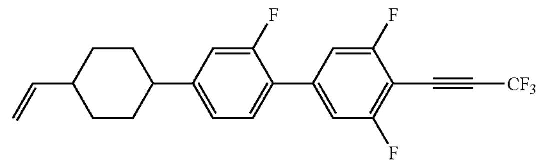
5.73
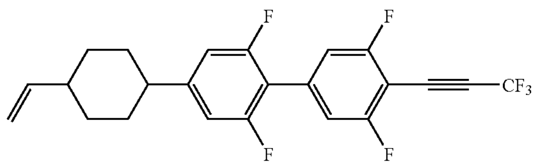
5.74
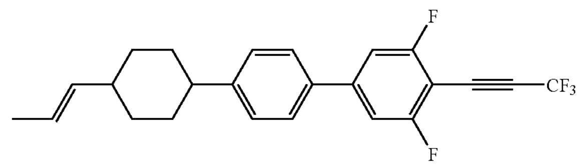
5.75
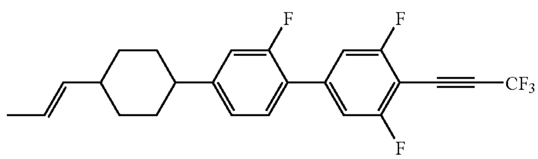
5.76
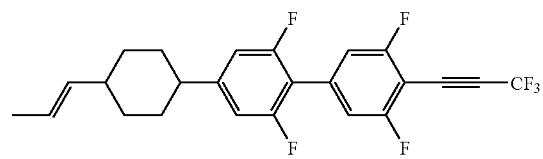
5.77
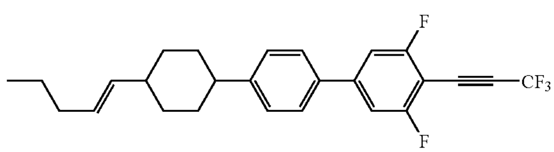
5.78
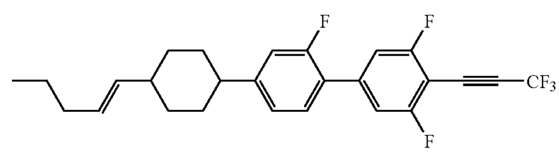
5.79
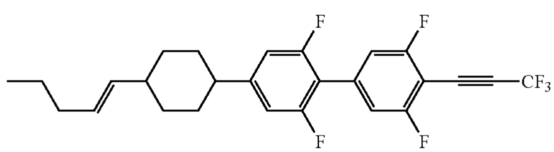
5.80
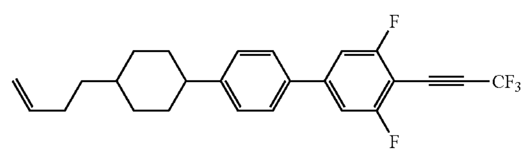
5.81
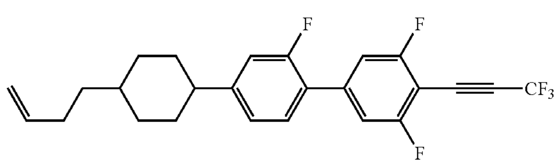
5.82
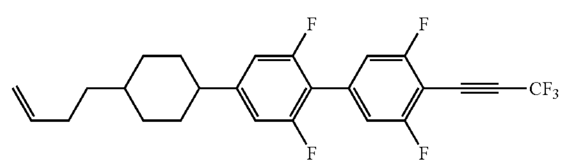
5.83
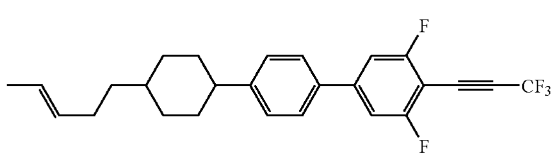
5.84
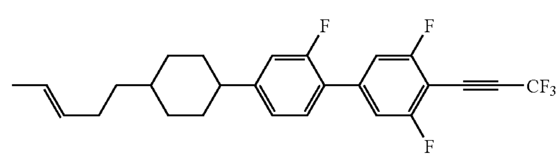
5.85
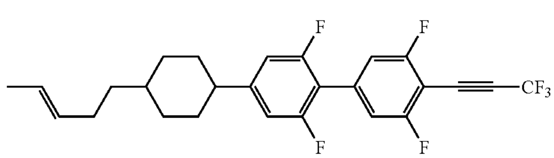
5.86
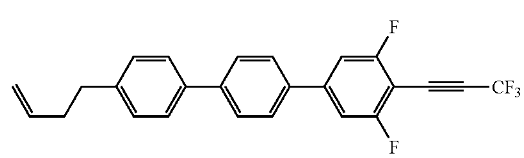

-continued
5.87
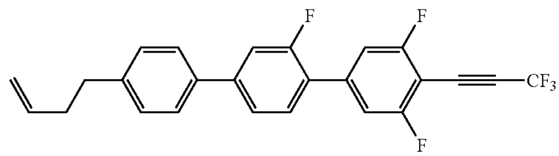
5.88
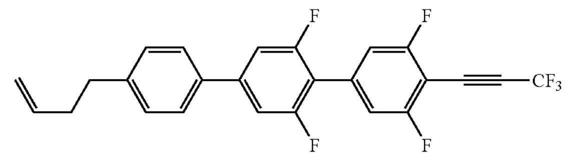
5.89
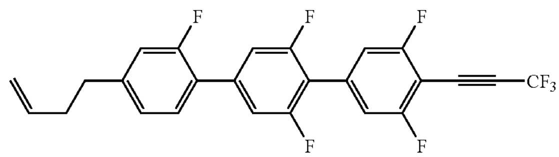
5.90
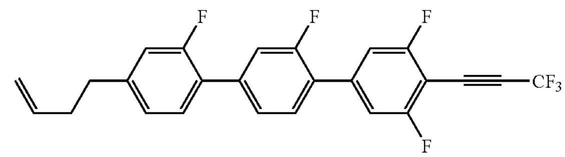
5.91
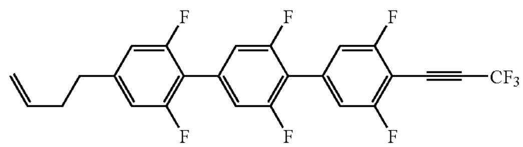
5.92
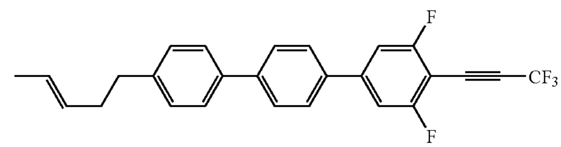
5.93
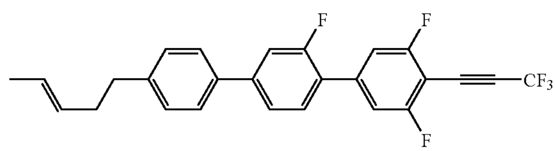
5.94
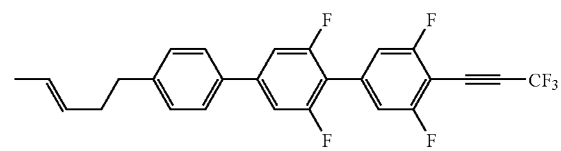
5.95
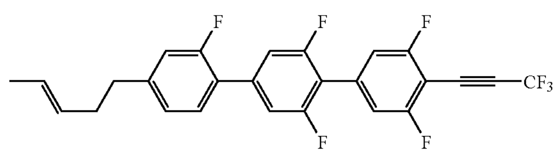
5.96
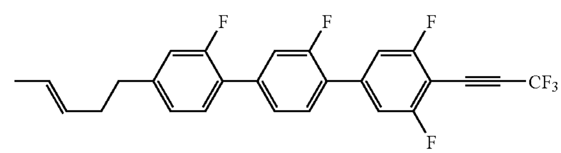
5.97
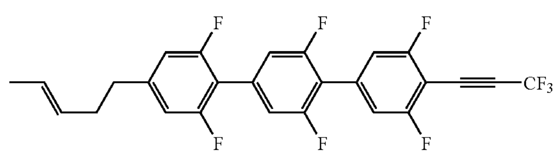
5.98
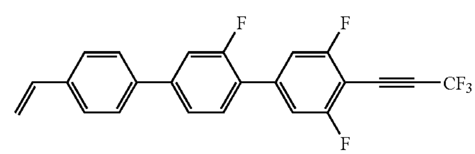
5.99
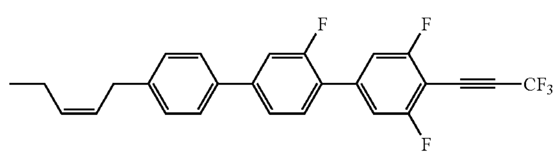
5.100
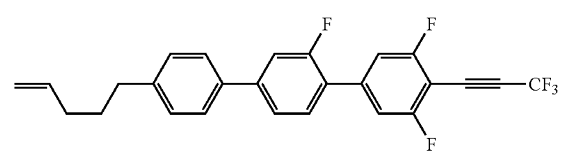
5.101
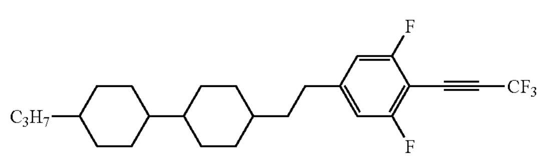
5.102
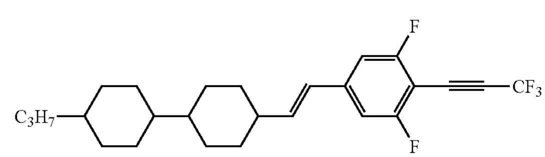
5.103
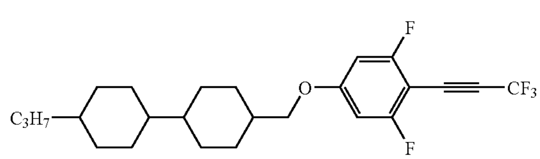
5.104
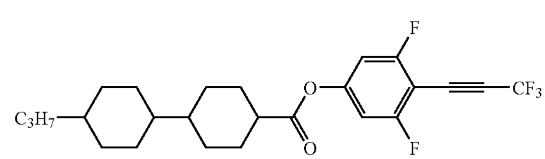

-continued
5.105
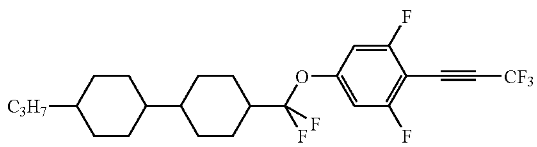
5.106
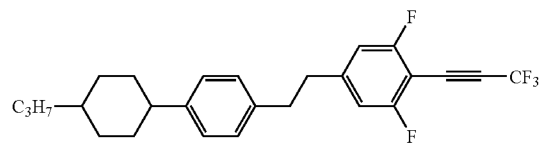
5.107
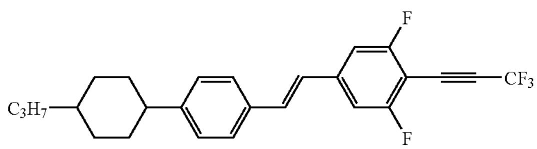
5.108
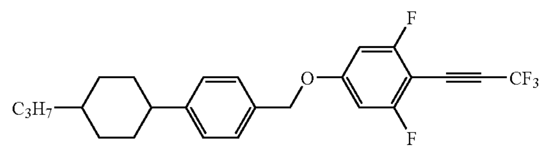
5.109
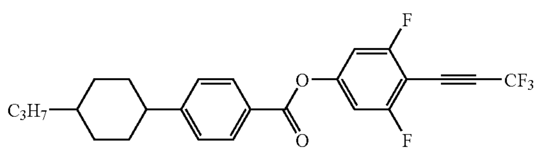
5.110
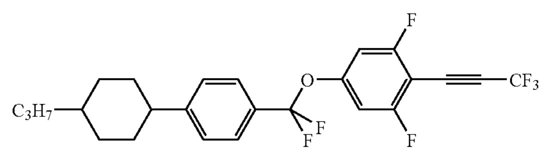
5.111
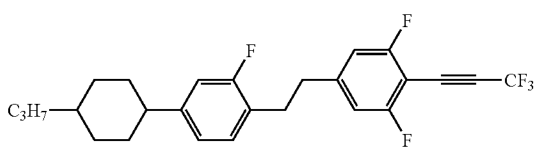
5.112
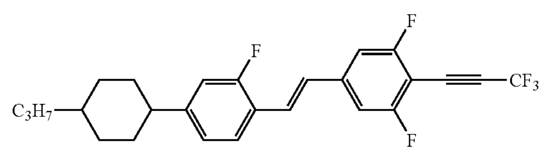
5.113
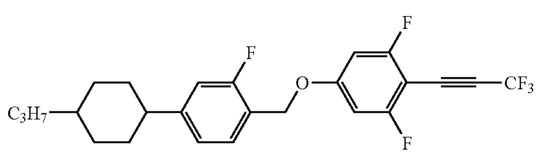
5.114
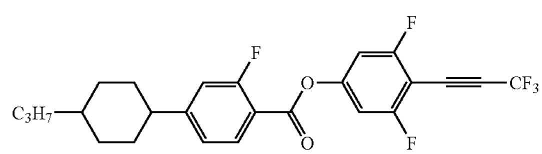
5.115
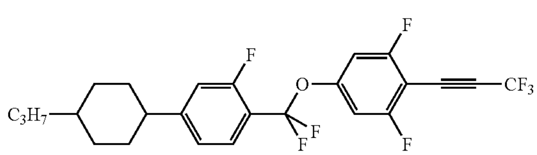
5.116
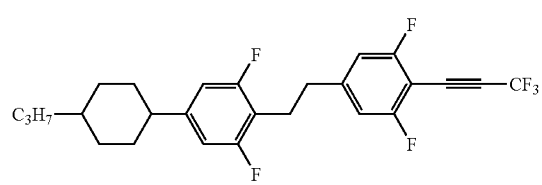
5.117
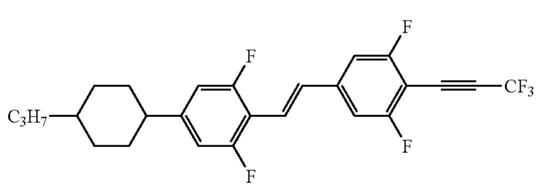
5.118
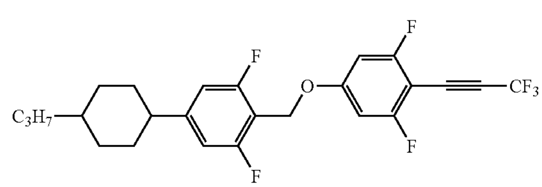
5.119
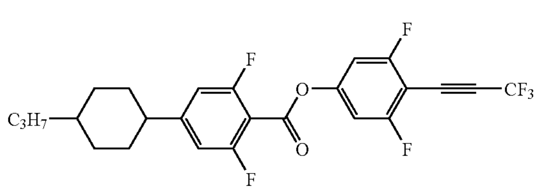
5.120
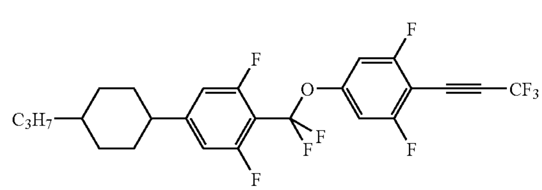

-continued
5.121
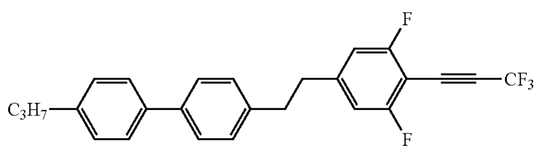
5.122
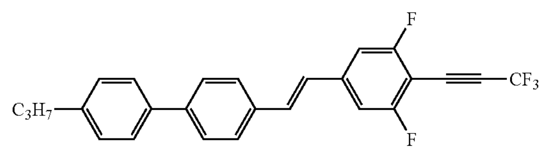
5.123
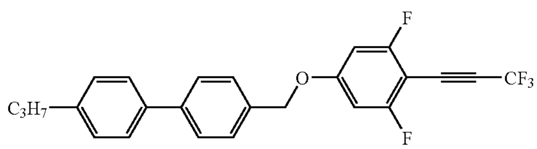
5.124
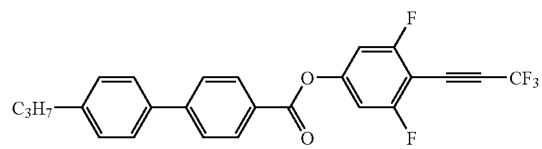
5.125
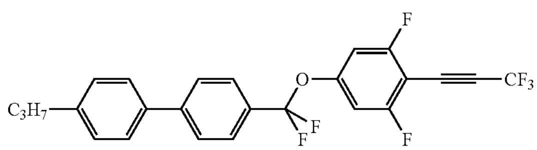
5.126
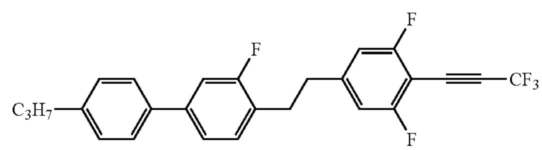
5.127
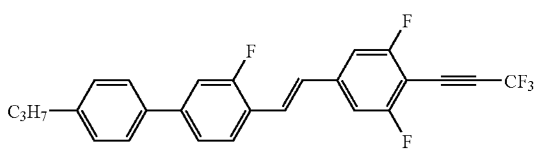
5.128
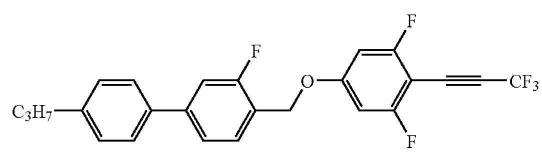
5.129
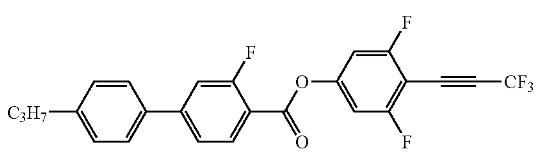
5.130
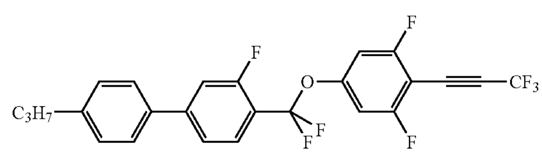
5.131
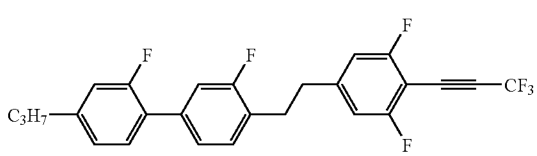
5.132
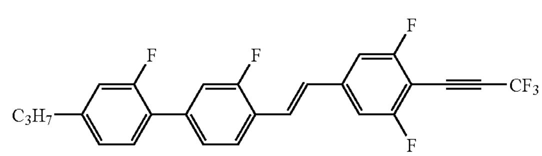
5.133
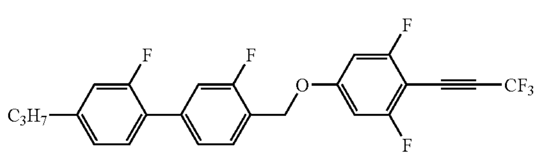
5.134
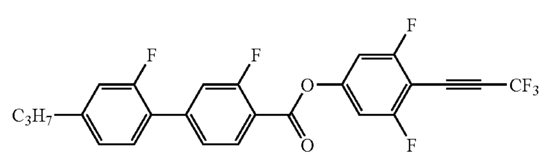
5.135
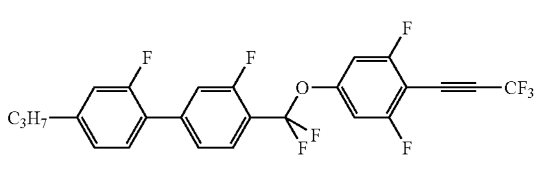
5.136
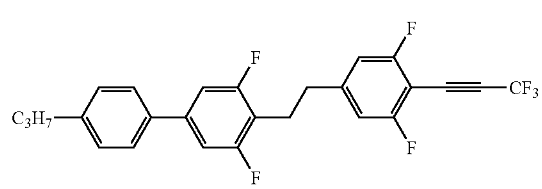
5.137
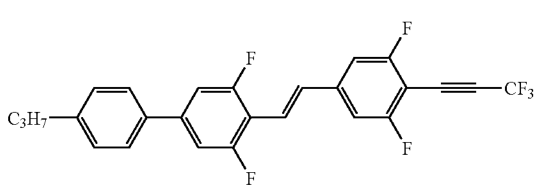
5.138
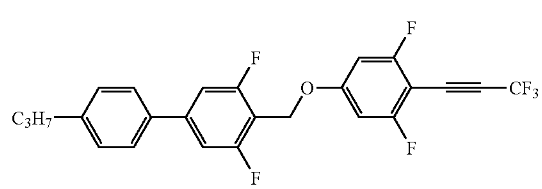

-continued
5.139
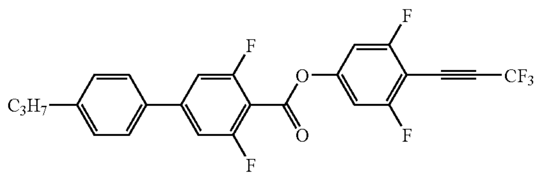
5.140
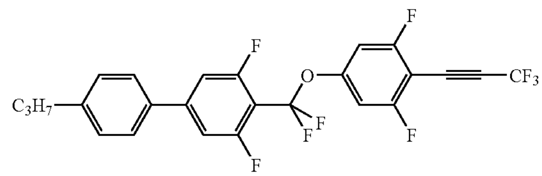
5.141
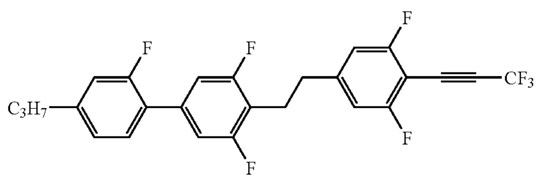
5.142
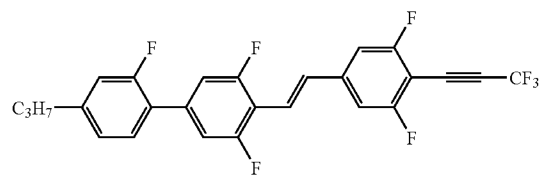
5.143
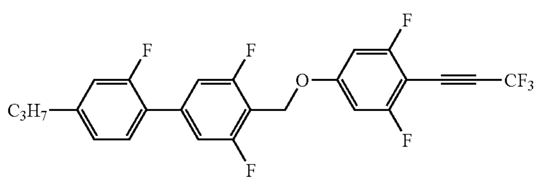
5.144
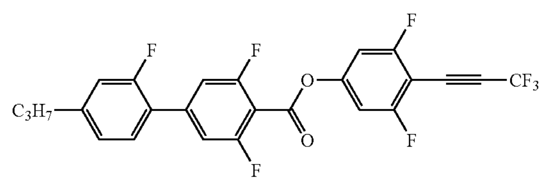
5.145
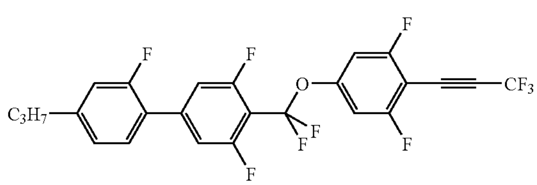
5.146
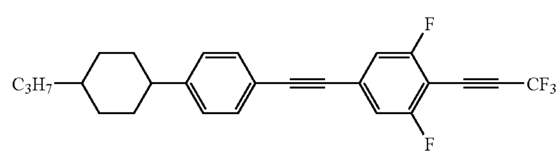
5.147
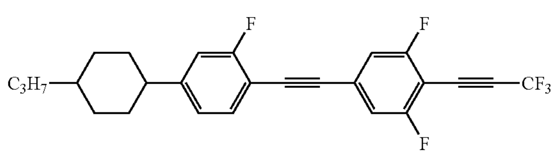
5.148
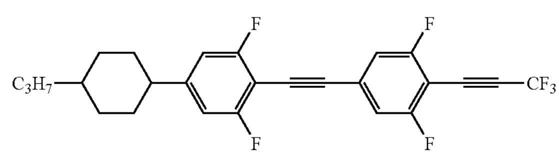
5.149
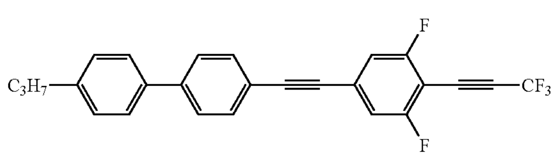
5.150
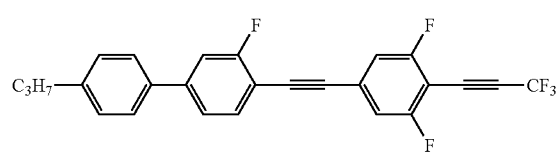
5.151
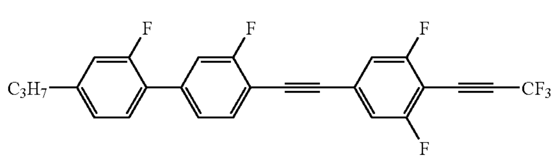
5.152
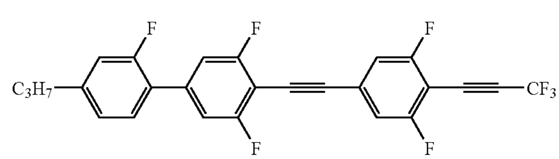
5.153
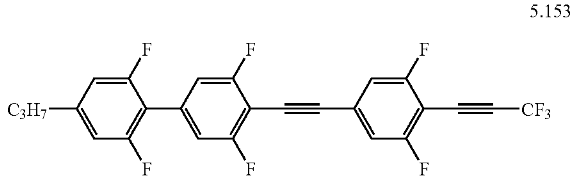
5.154
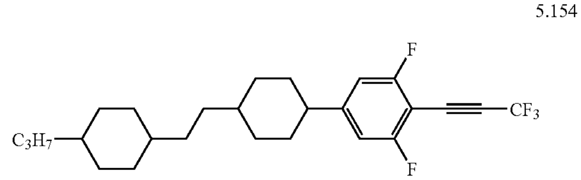

-continued
5.155
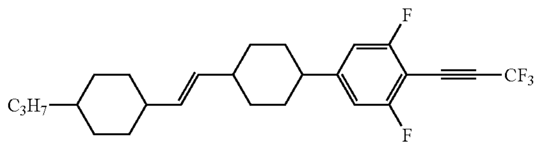
5.156
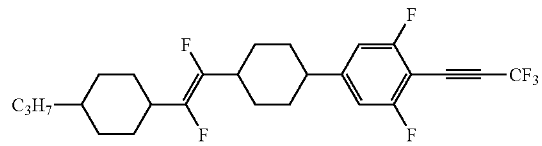
5.157
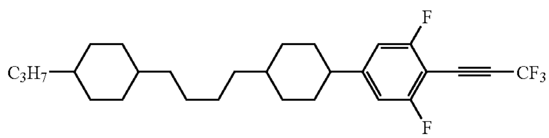
5.158
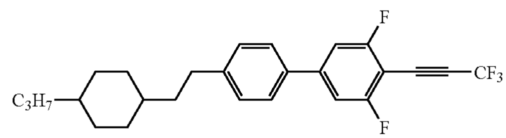
5.159
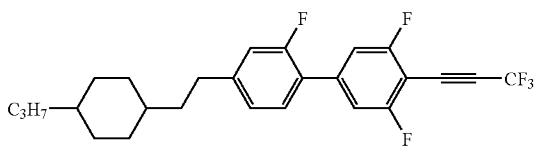
5.160
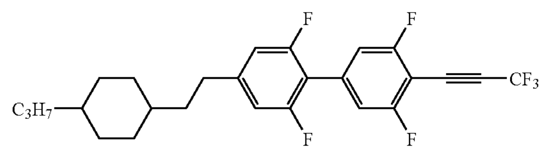
5.161
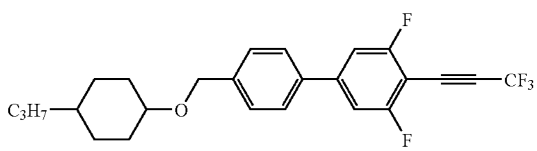
5.162
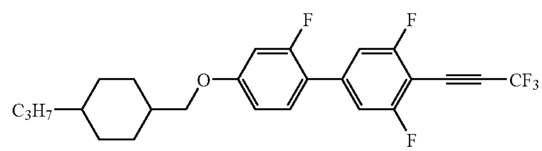
5.163
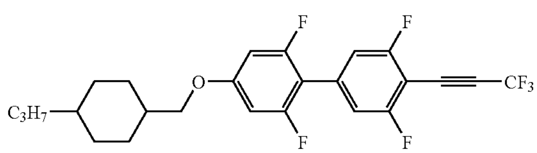
5.164
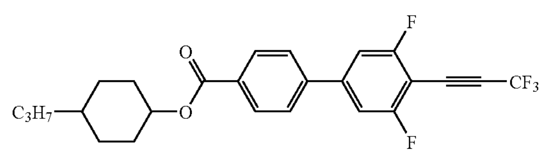
5.165
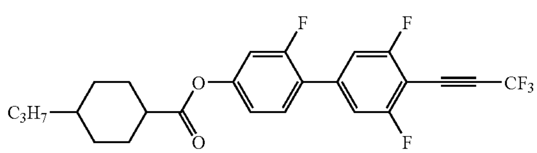
5.166
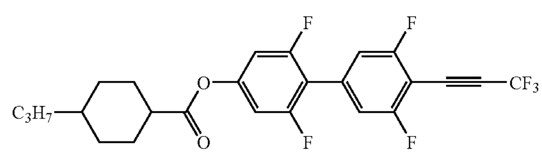
5.167
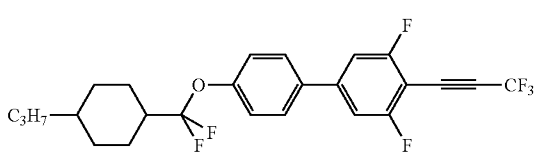
5.168
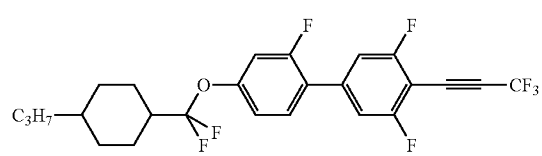
5.169
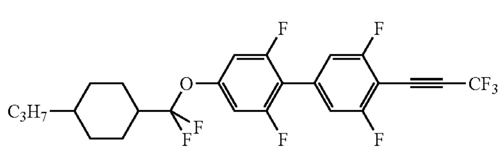
5.170
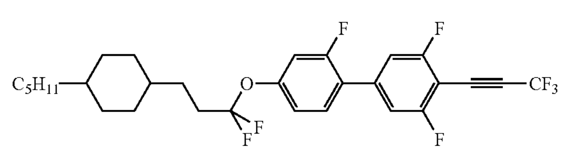
5.171
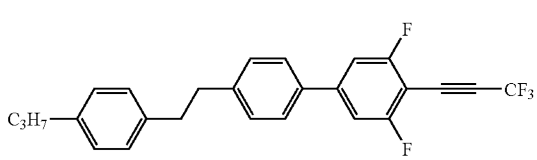
5.172
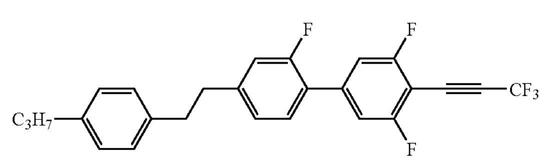

-continued
5.173
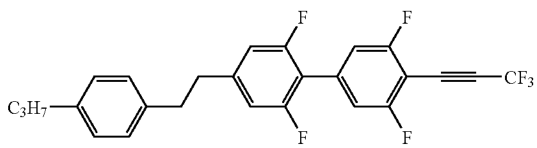
5.174
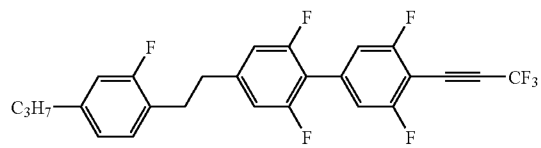
5.175
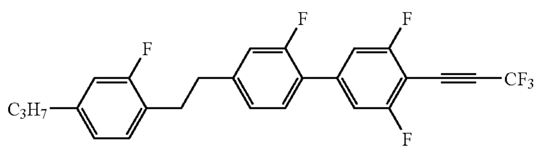
5.176
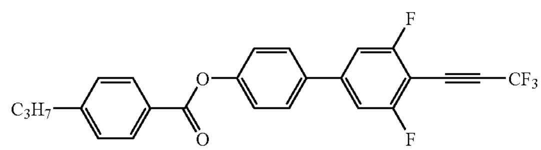
5.177
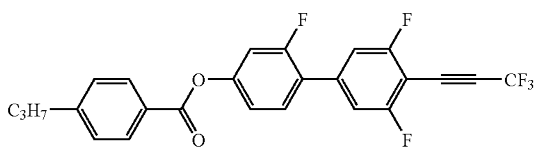
5.178
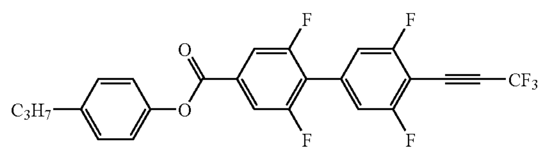
5.179
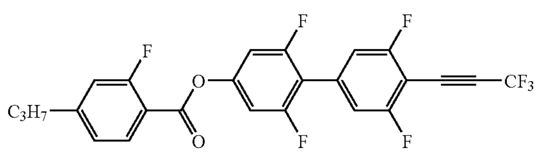
5.180
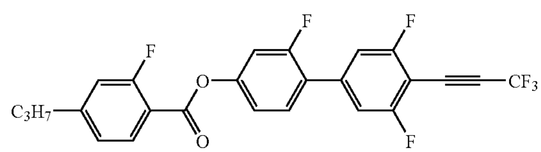
5.181
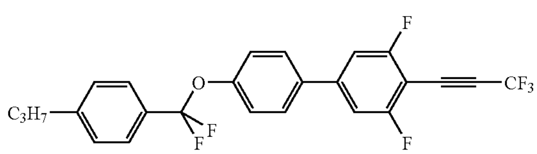
5.182
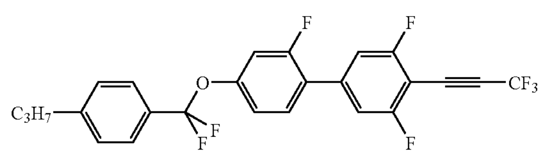
5.183
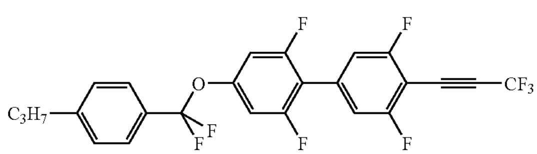
5.184
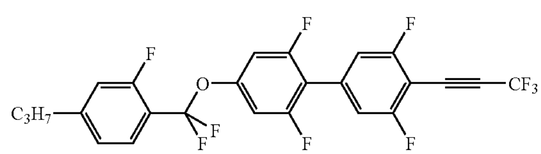
5.185
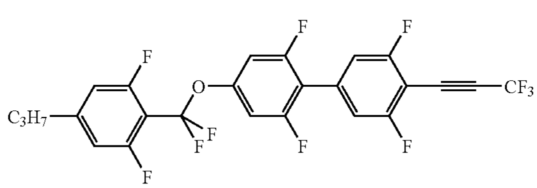
5.186
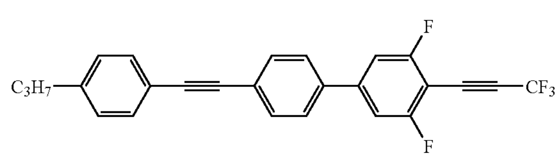
5.187
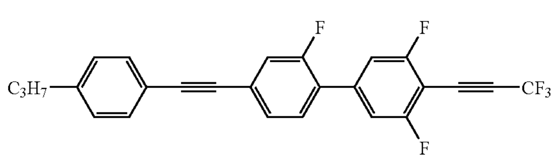
5.188
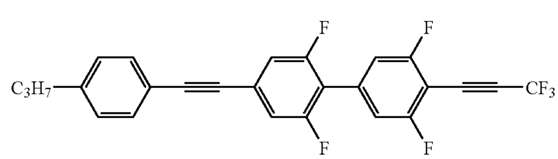
5.189
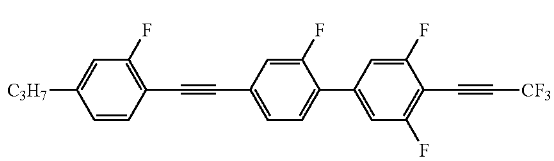
5.190
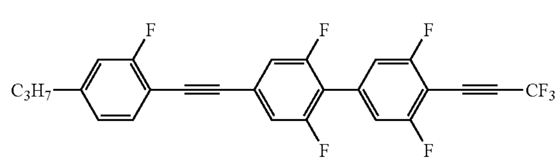

-continued
5.191
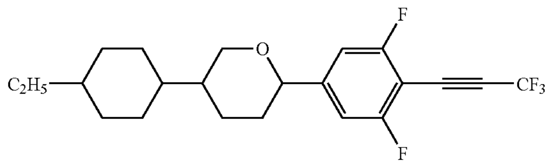
5.192
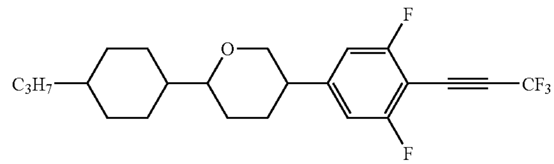
5.193
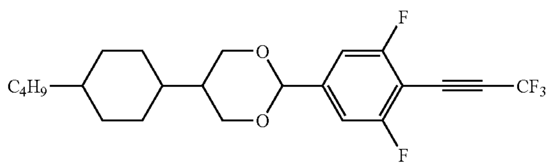
5.194
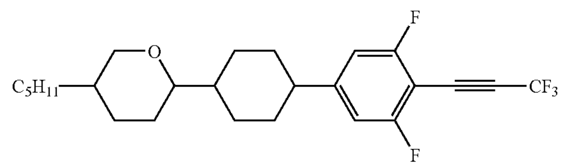
5.195
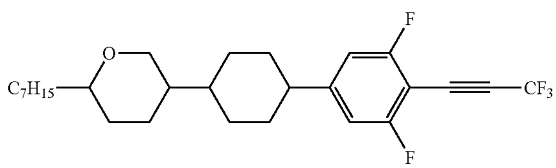
5.196
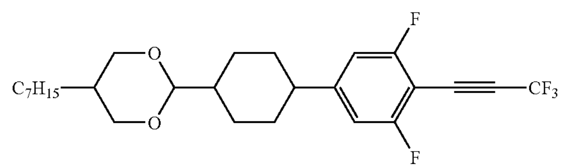
5.197
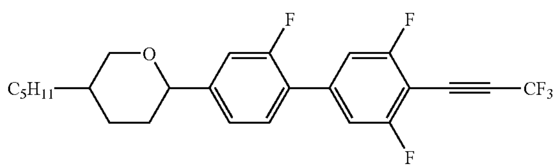
5.198
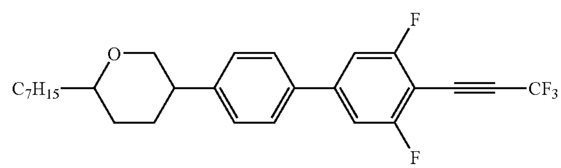
5.199
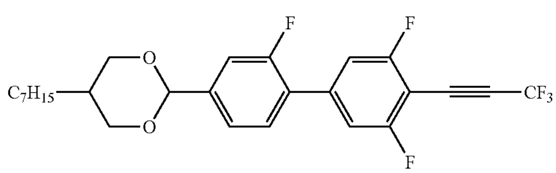
5.200
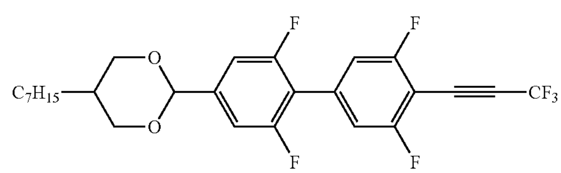
5.201
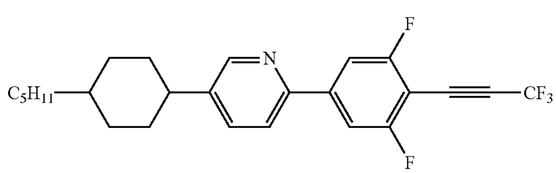
5.202
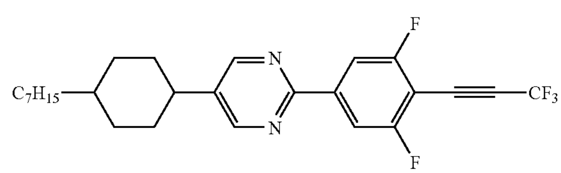
5.203
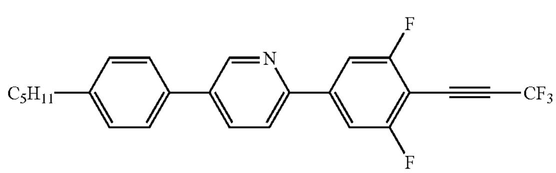
5.204
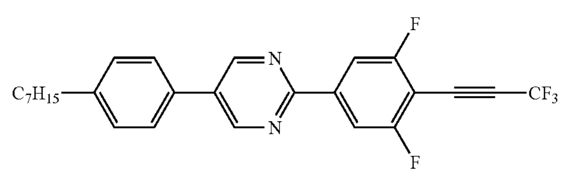
5.205
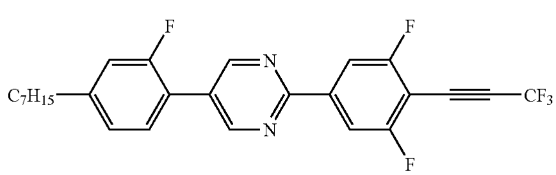
5.206
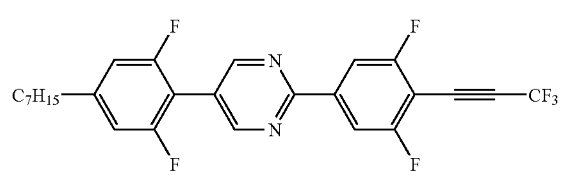

-continued
5.207
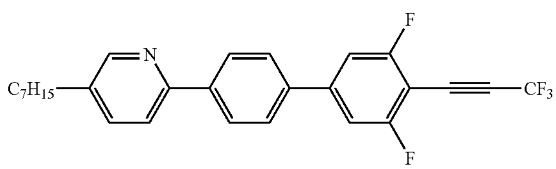
5.208
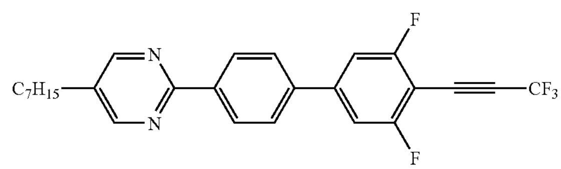
5.209
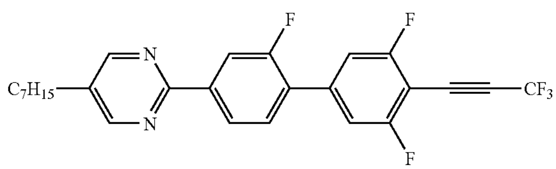
5.210
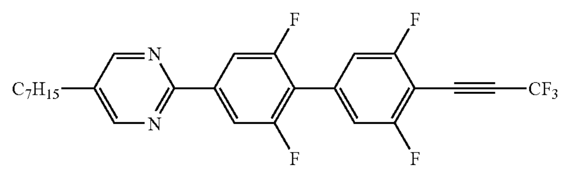
5.211
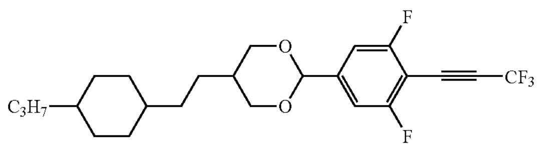
5.212
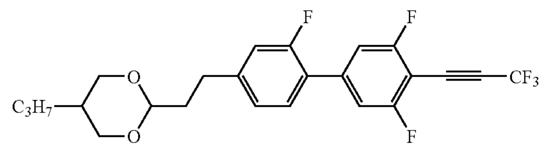
5.213
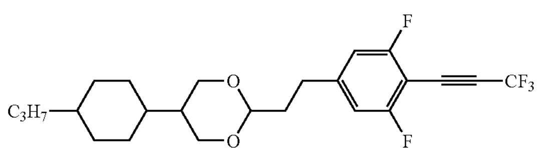
5.214
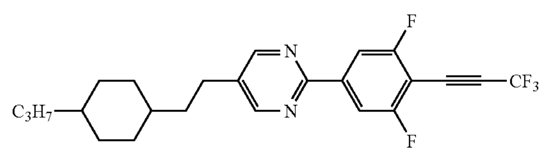
5.215
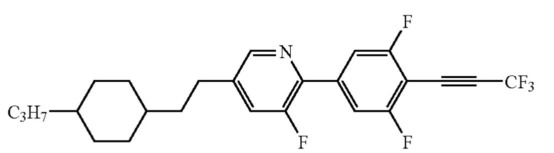
5.216
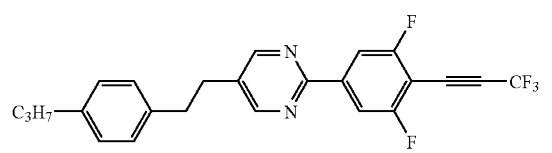
5.217
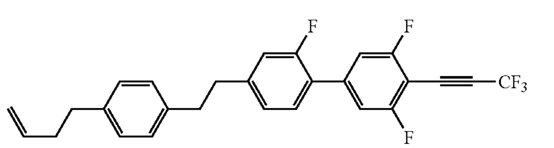
5.218
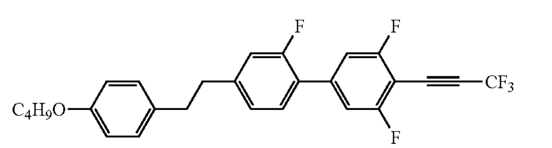
5.219
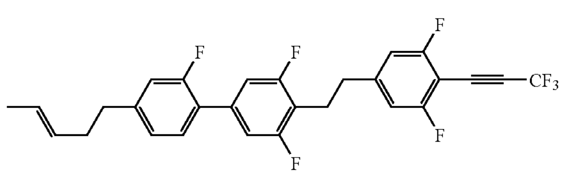
5.220
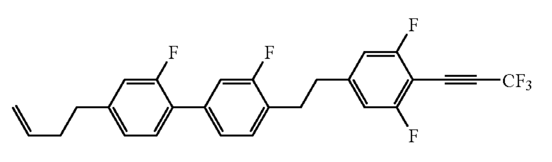
5.221
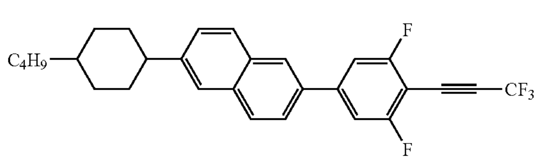
5.222
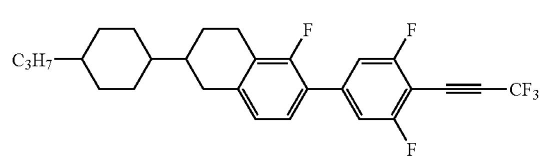
5.223
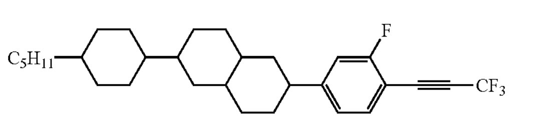
5.224
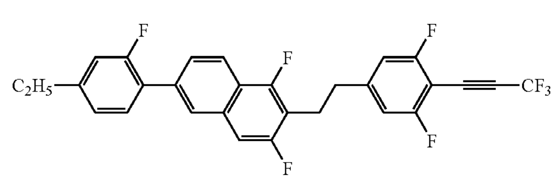

-continued
5.225
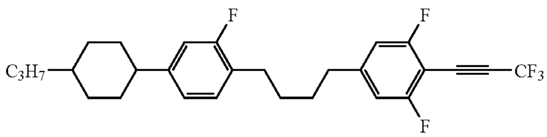
5.227
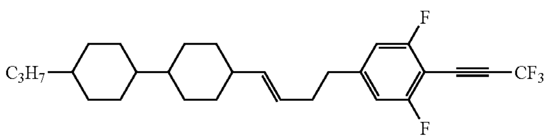
6.1
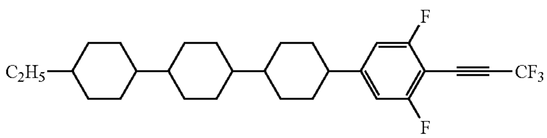
6.3
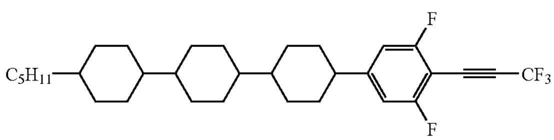
6.5
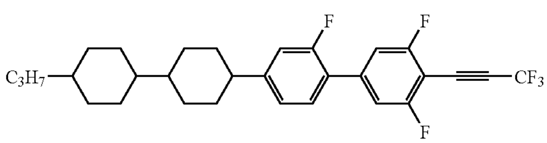
6.7
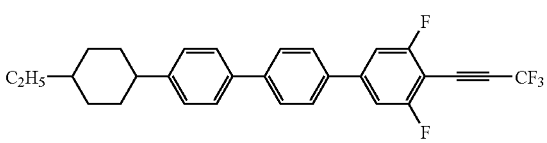
6.9
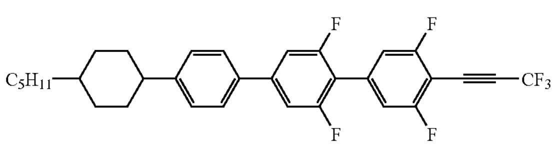
6.11
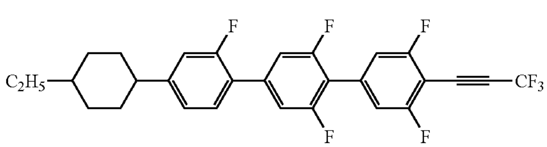
6.13
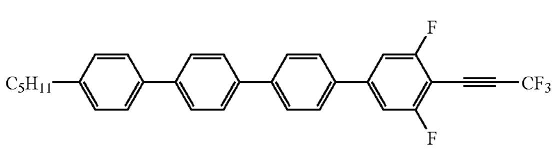
5.226
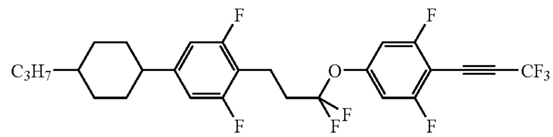
5.228
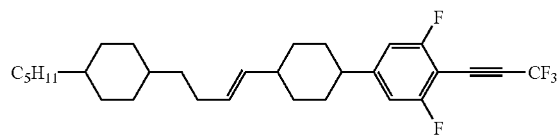
6.2
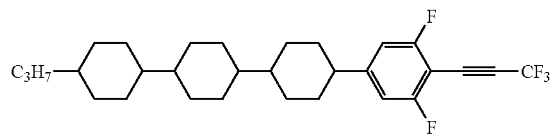
6.4
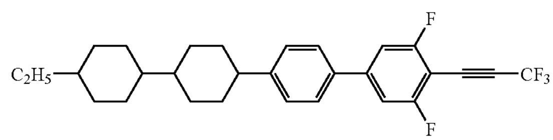
6.6
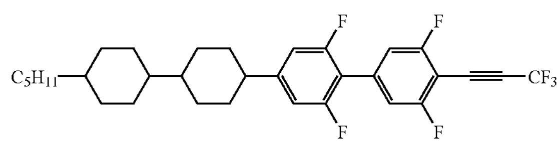
6.8
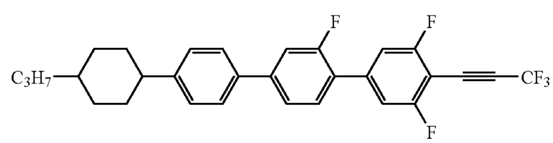
6.10
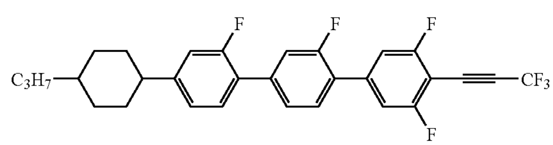
6.12
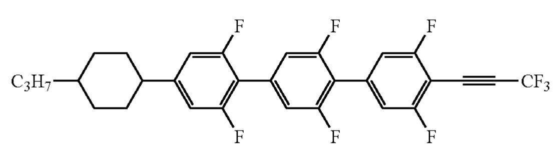
6.14
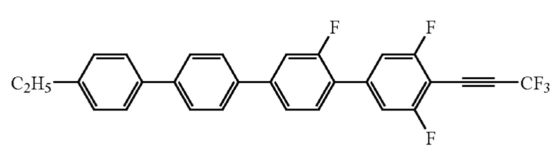

-continued
6.15
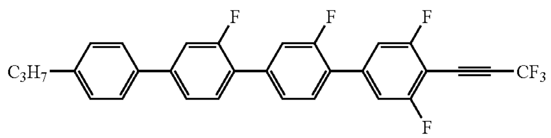
6.16
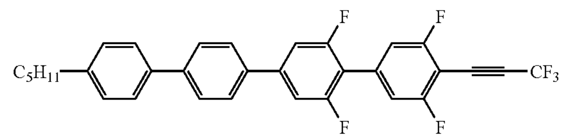
6.17
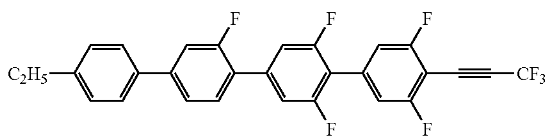
6.18
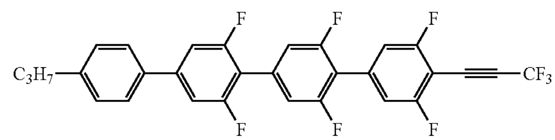
6.19
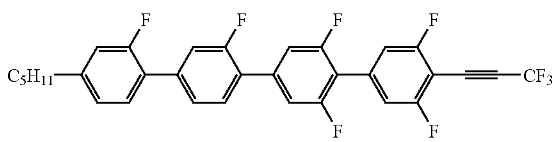
6.20
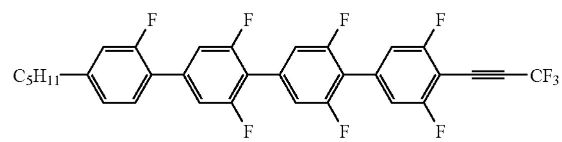
6.21
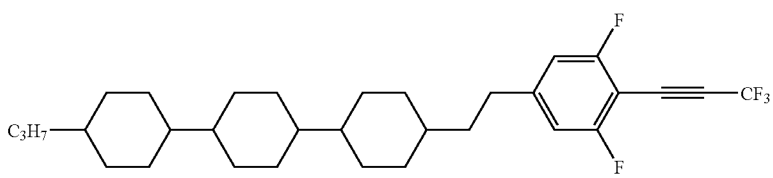
6.22
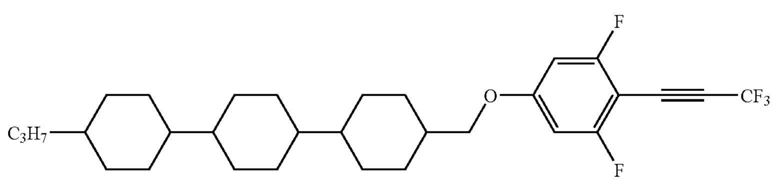
6.23
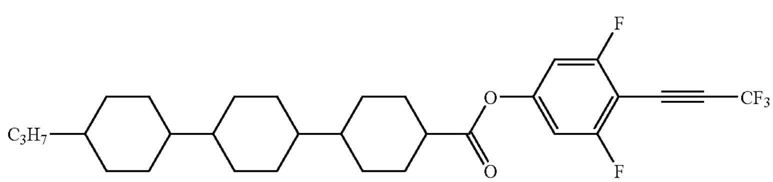
6.24
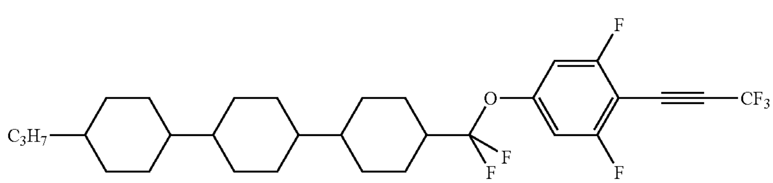
6.25
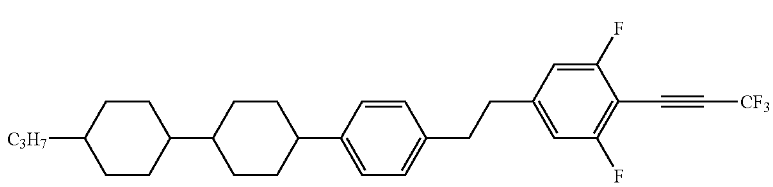
6.26
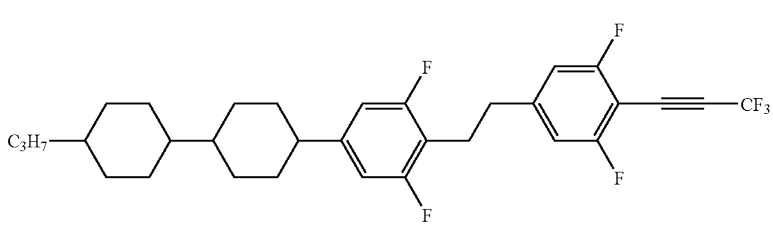

-continued
6.27
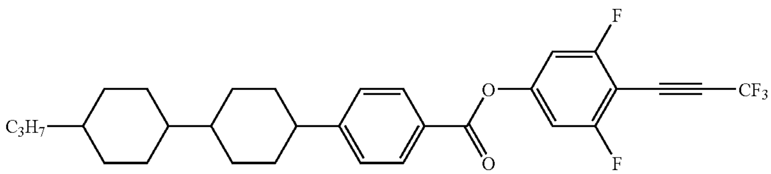
6.28
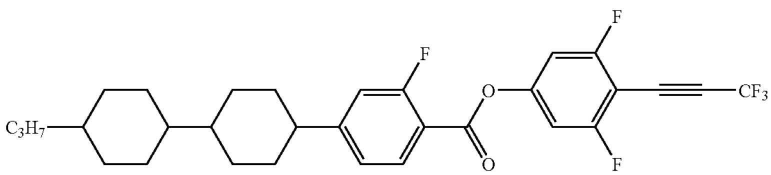
6.29
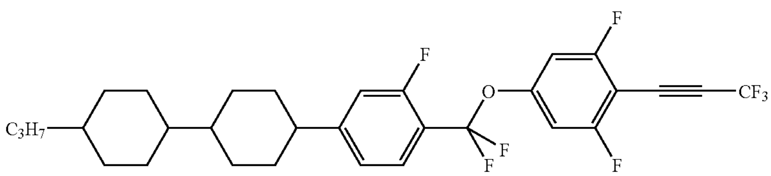
6.30
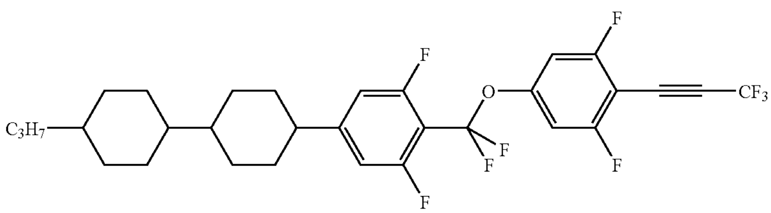
6.31
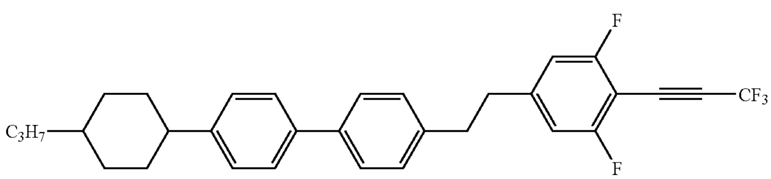
6.32
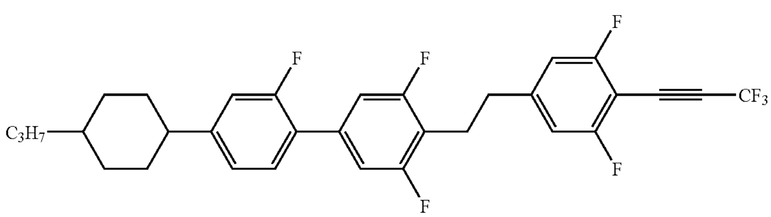
6.33
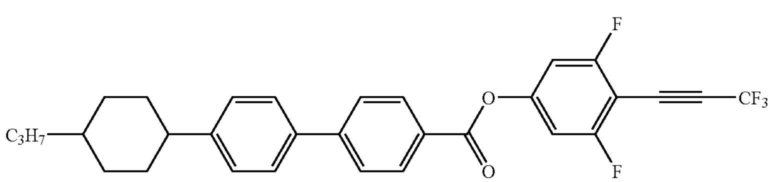
6.34
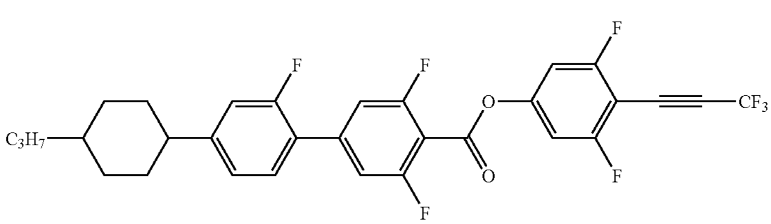

-continued
6.35
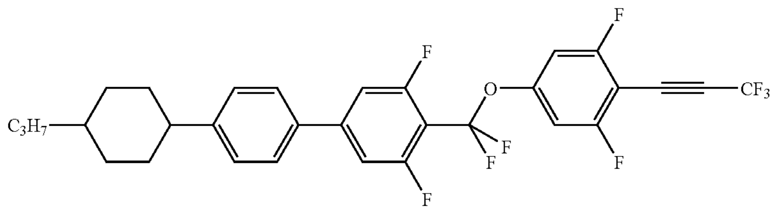
6.36
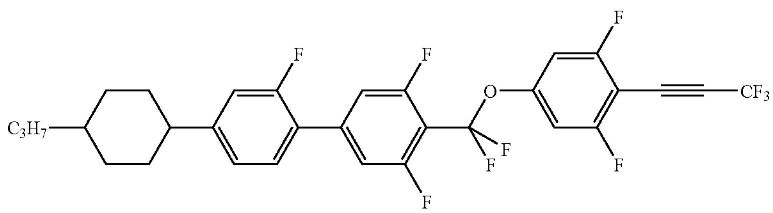
6.37
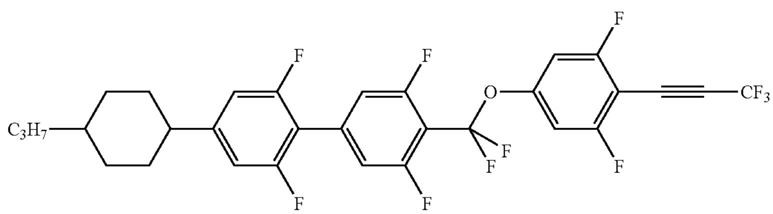
6.38
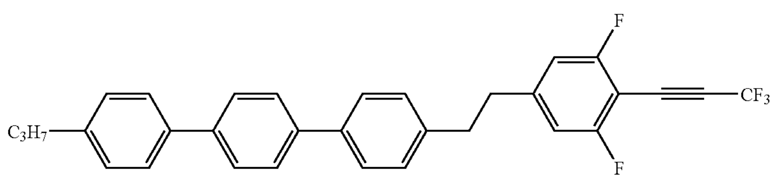
6.39
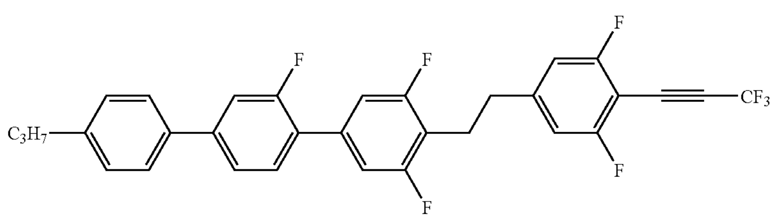
6.40
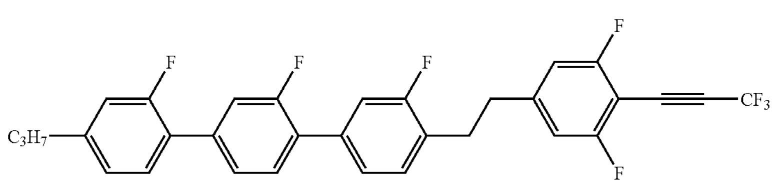
6.41
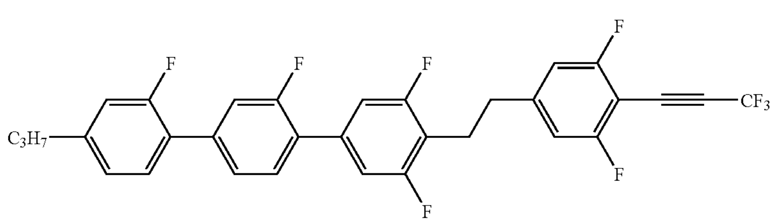

-continued
6.42
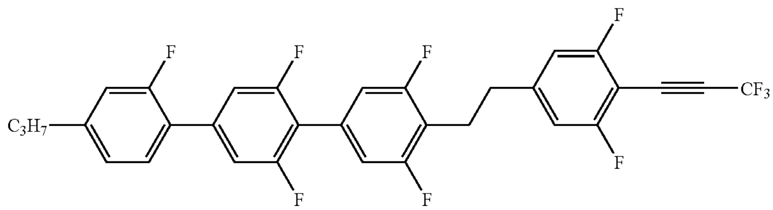
6.43
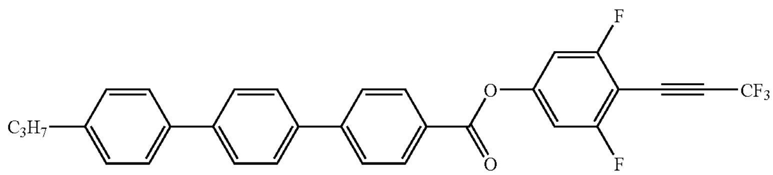
6.44
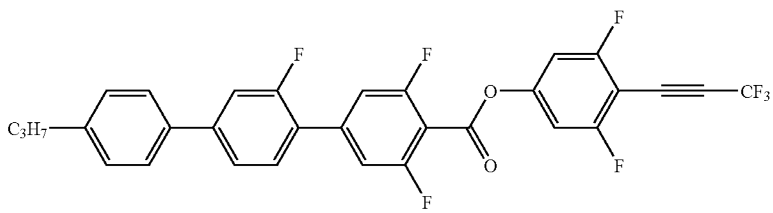
6.45
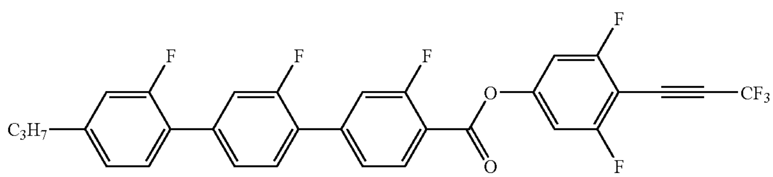
6.46
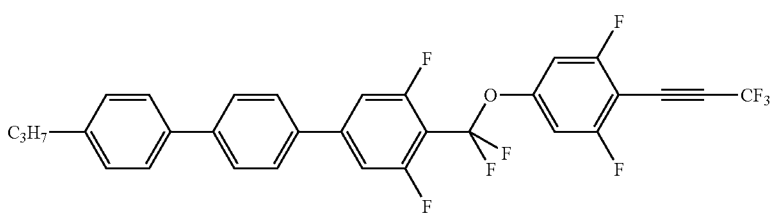
6.47
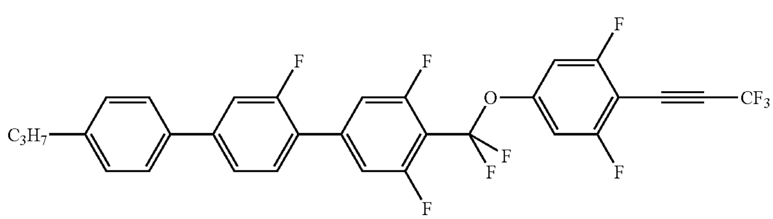
6.48
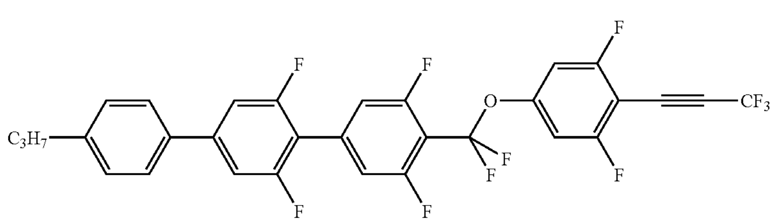

-continued
6.49
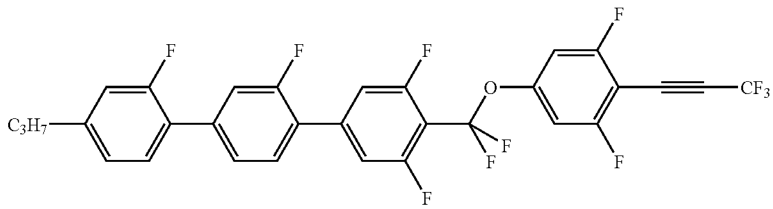
6.50
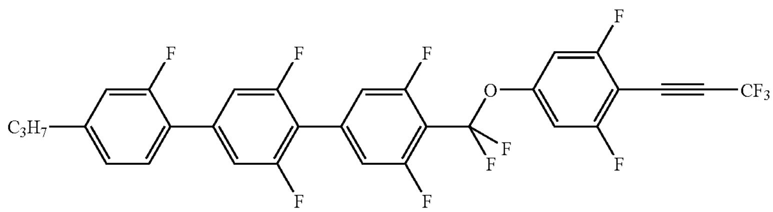
6.51
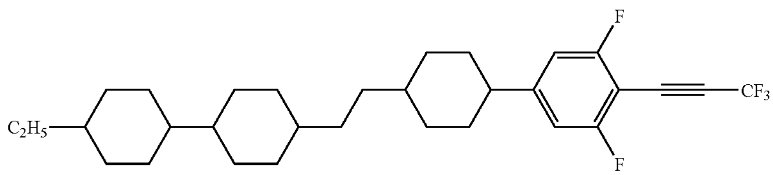
6.52
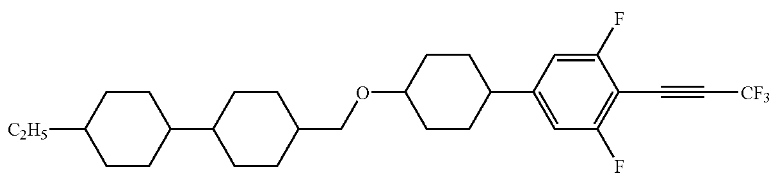
6.53
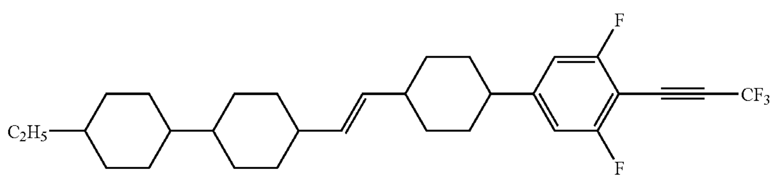
6.54
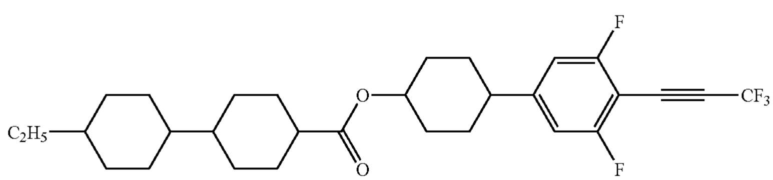
6.55
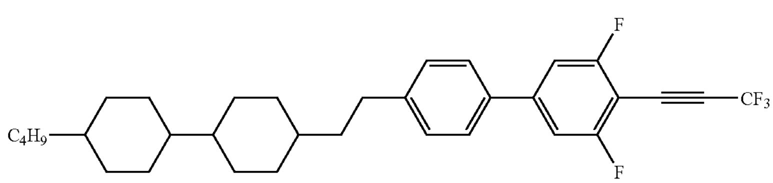
6.56
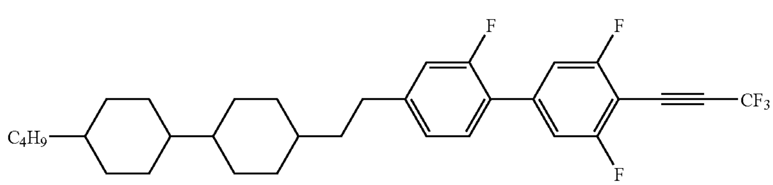

-continued
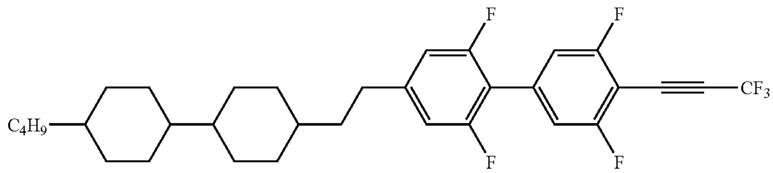
6.57
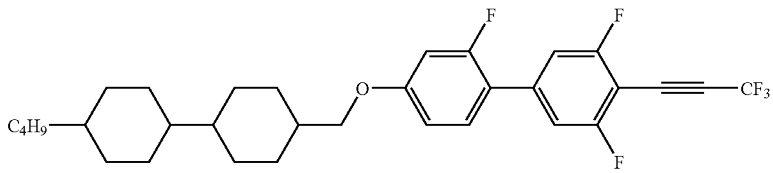
6.58
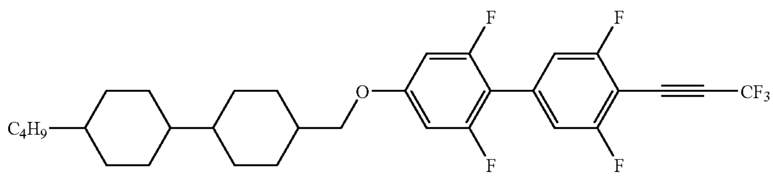
6.59
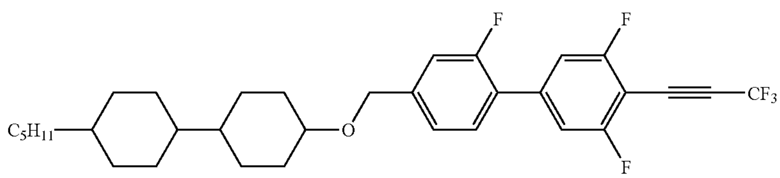
6.60
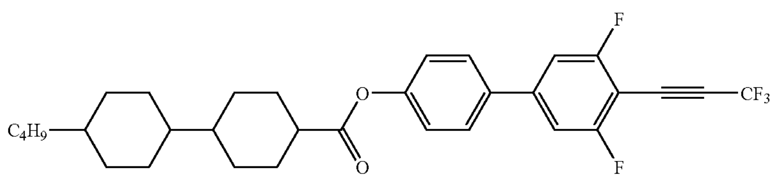
6.61
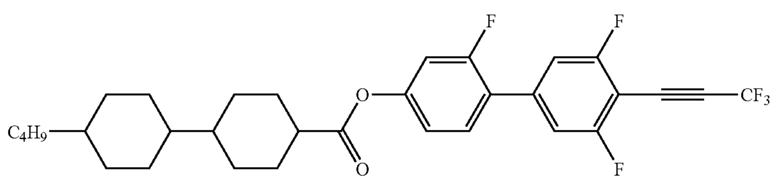
6.62
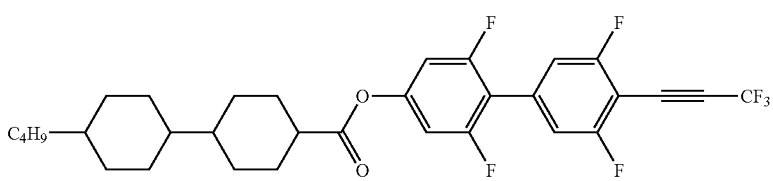
6.63
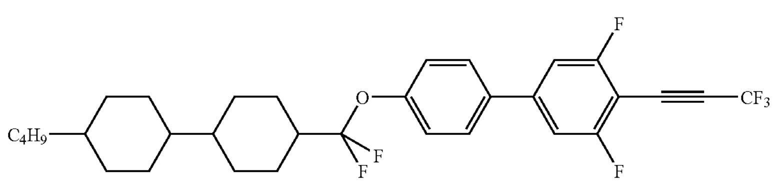
6.64
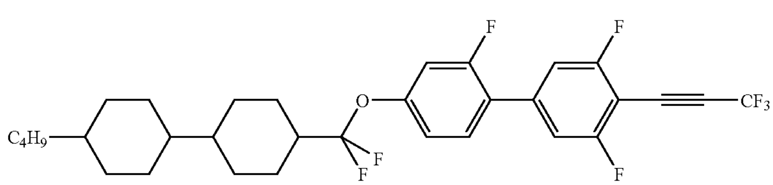
6.65

-continued
6.66
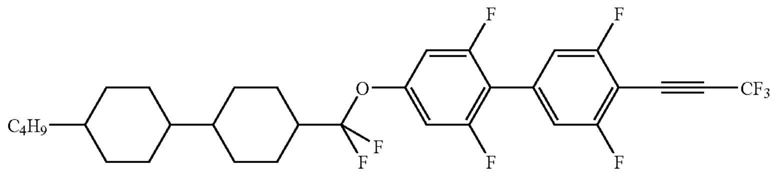
6.67
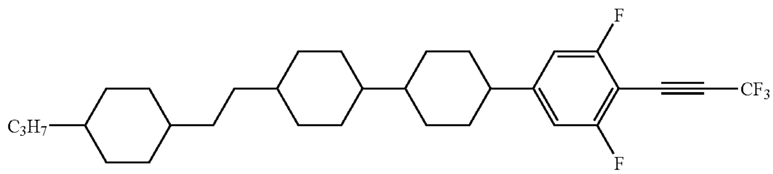
6.68
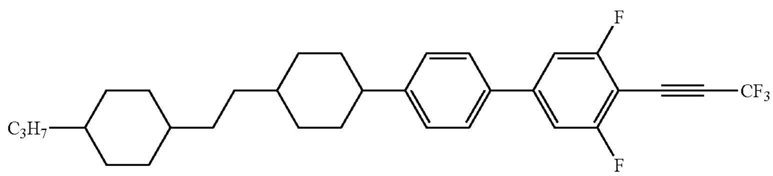
6.69
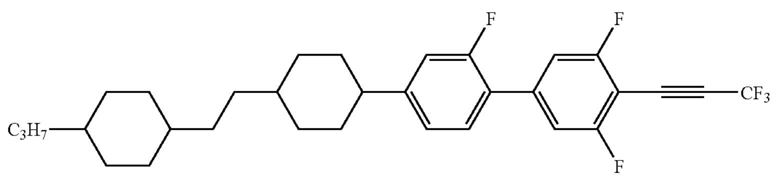
6.70
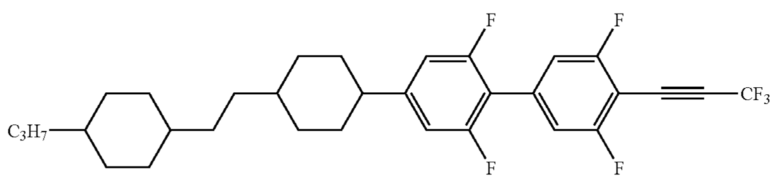
6.71
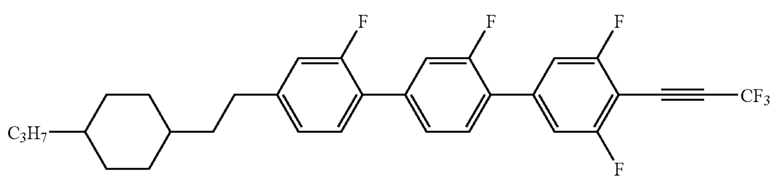
6.72
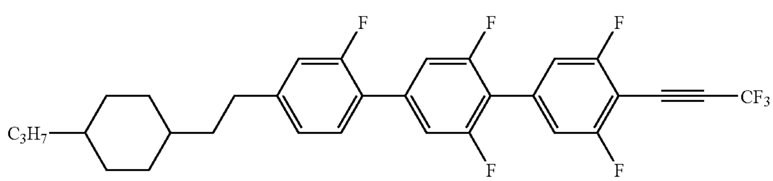
6.73
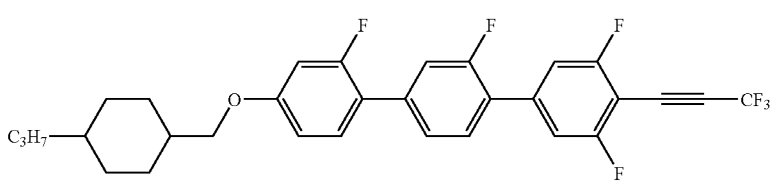
6.74
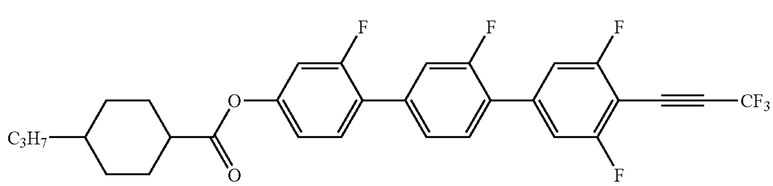

-continued
6.75
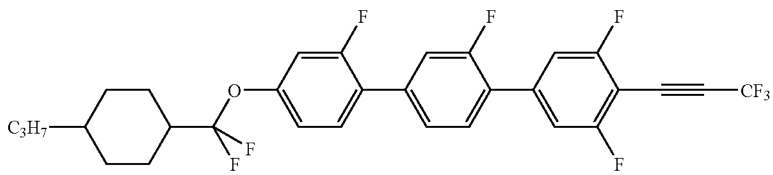
6.76
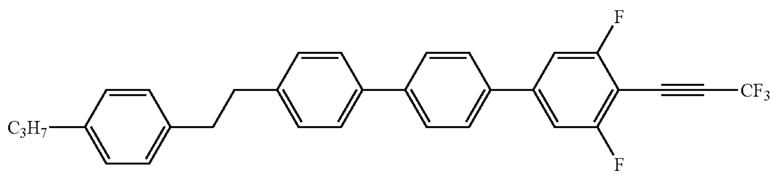
6.77
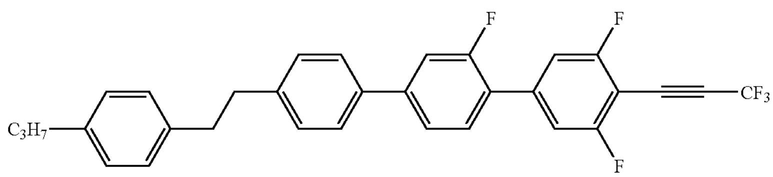
6.78
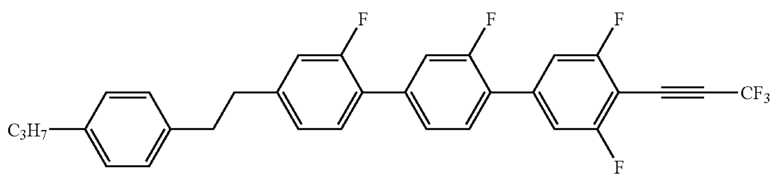
6.79
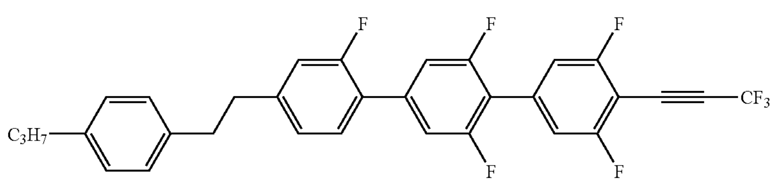
6.80
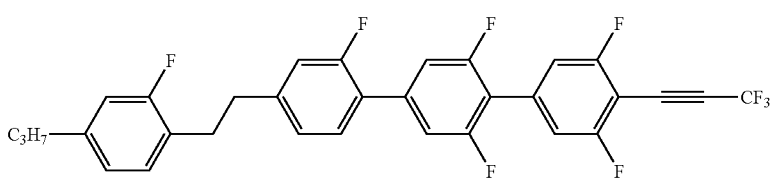
6.81
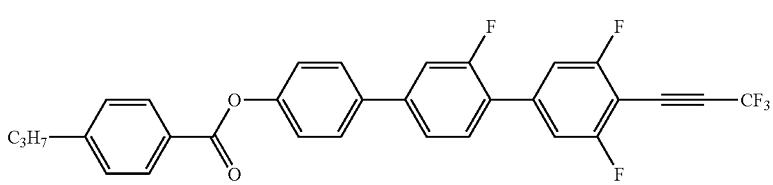
6.82
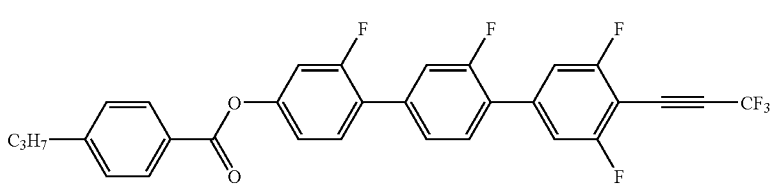

-continued
6.83
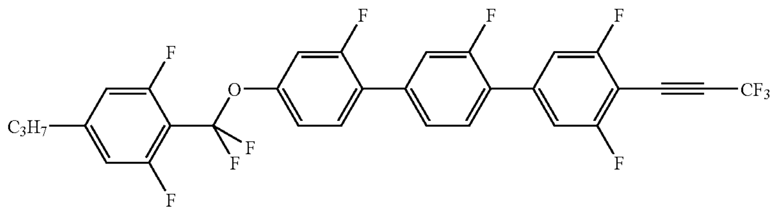
6.84
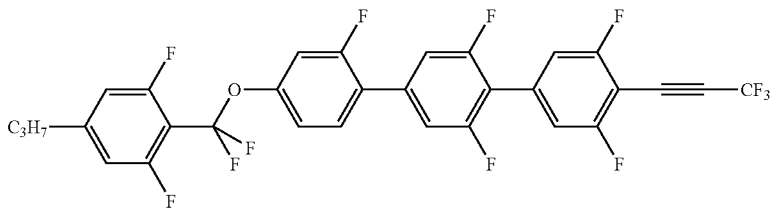
6.85
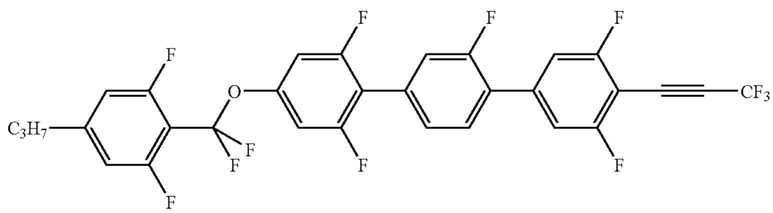
6.86
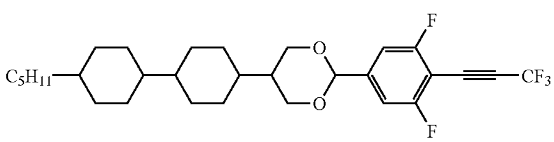
6.87
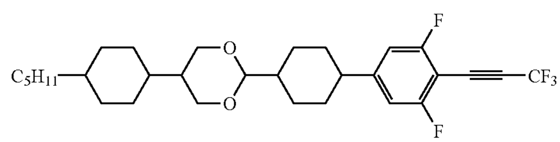
6.88
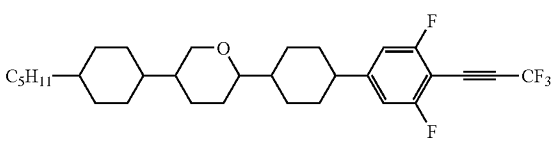
6.89
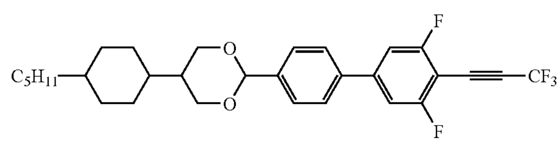
6.90
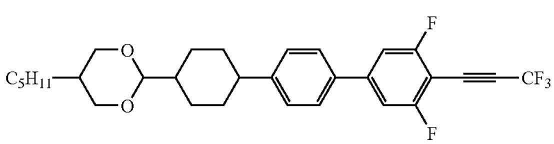
6.91
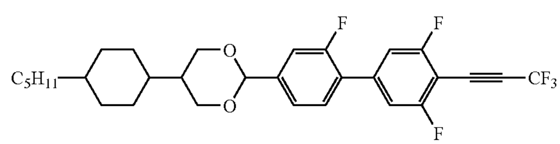
6.92
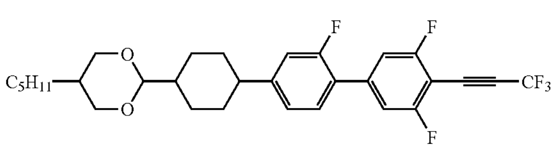
6.93
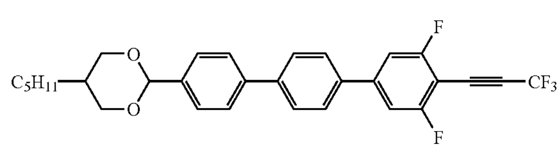
6.94
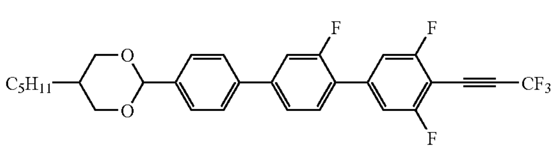
6.95
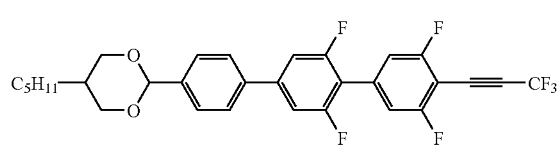

-continued
6.96
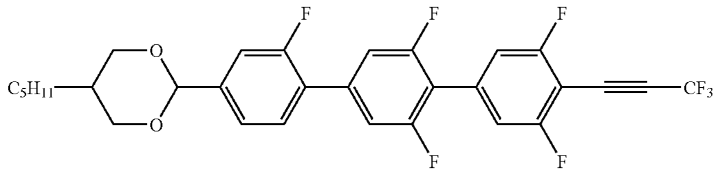
6.97
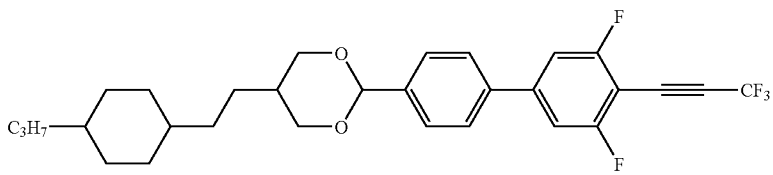
6.98
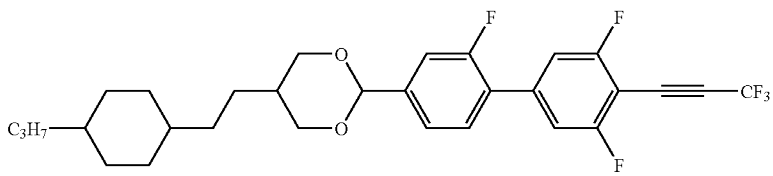
6.99
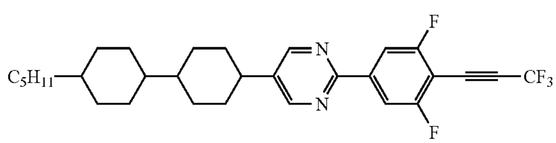
6.100
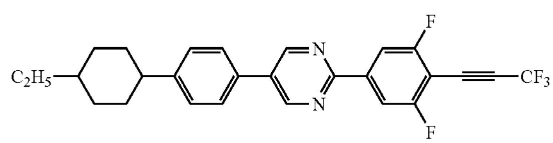
6.101
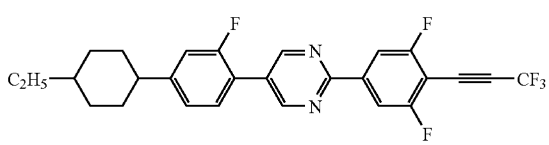
6.102
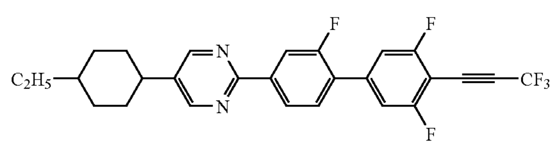
6.103
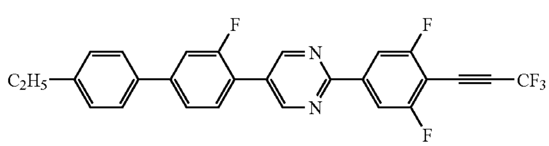
6.104
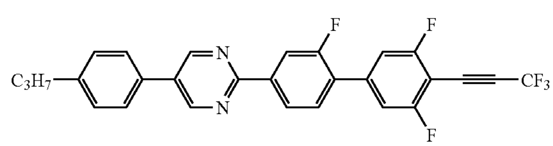
6.105
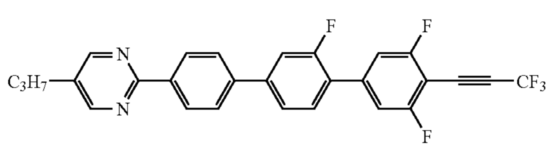
6.106
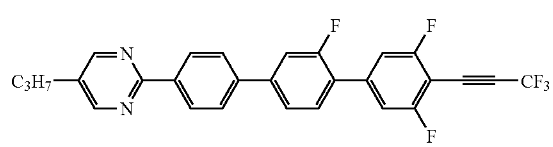
6.107
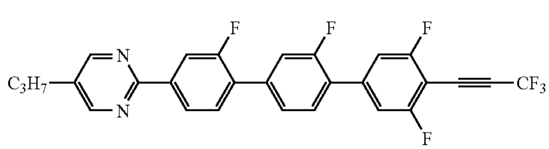
6.108
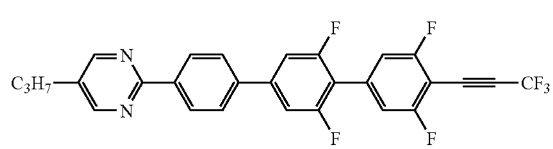
6.109
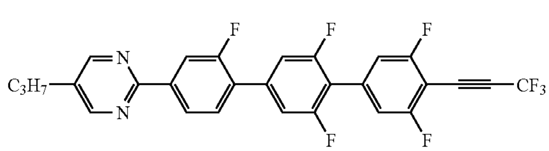
6.110
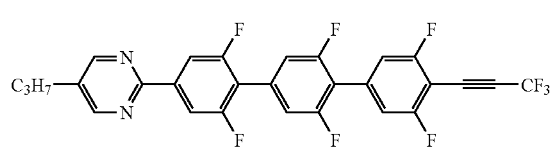

-continued
6.111
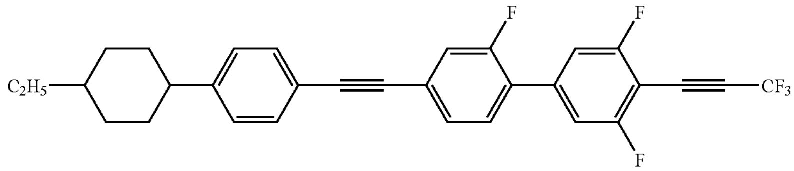
6.112
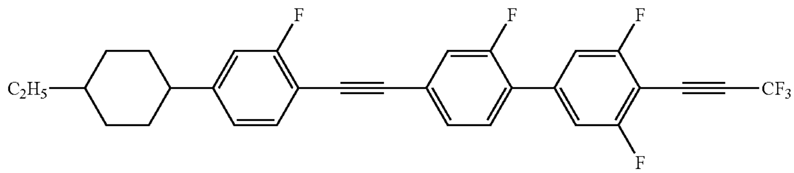
6.113
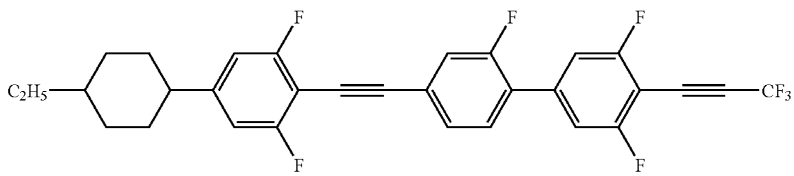
6.114
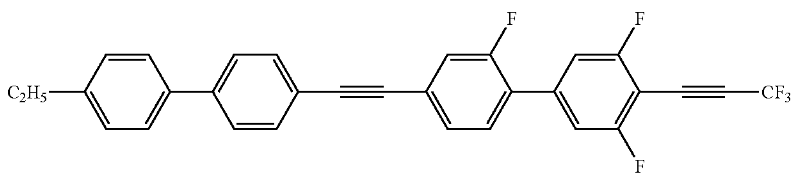
6.115
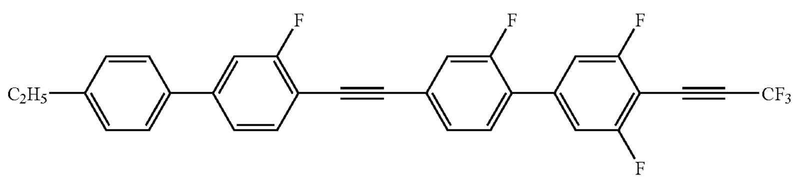
6.116
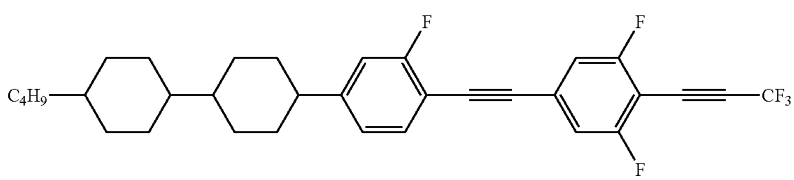
6.117
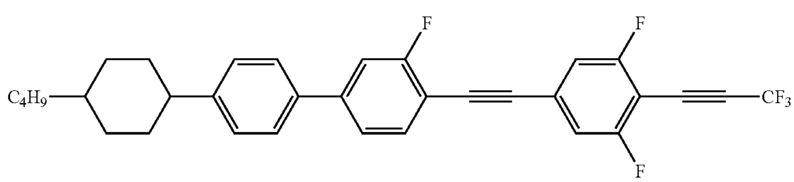
6.118
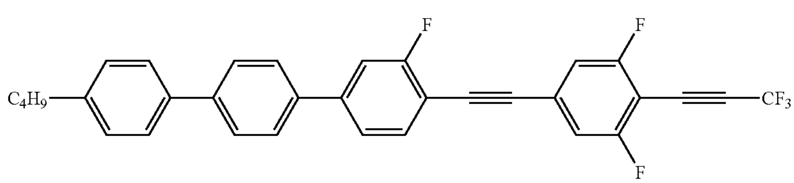
6.119
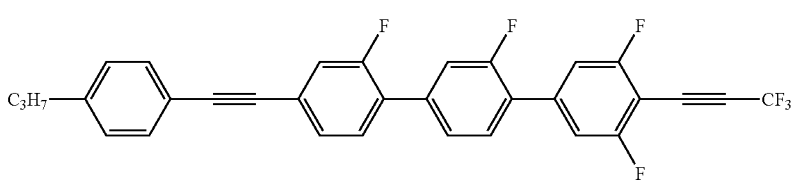

-continued
6.120
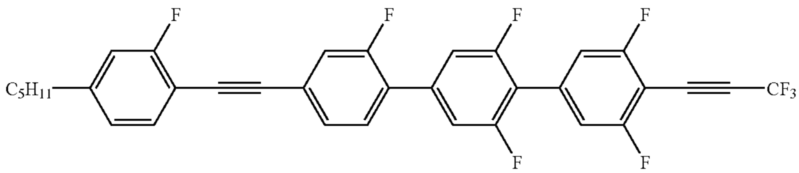
6.121
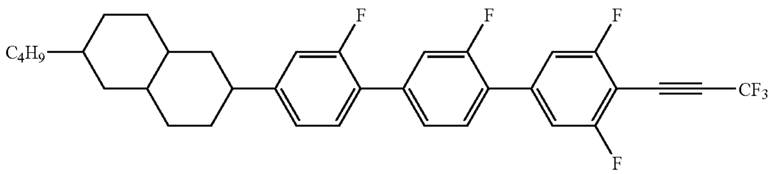
6.122
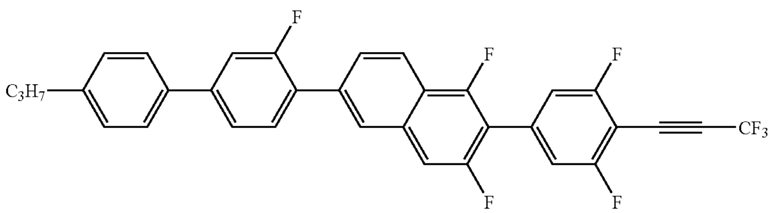
6.123
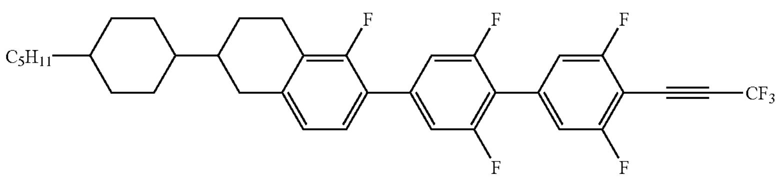
6.124
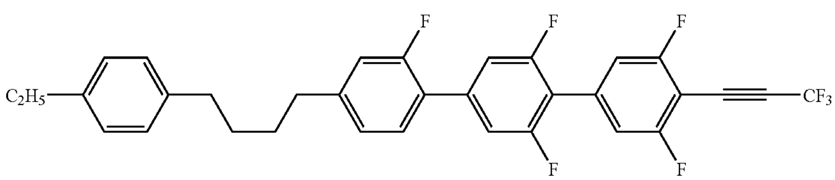
6.125
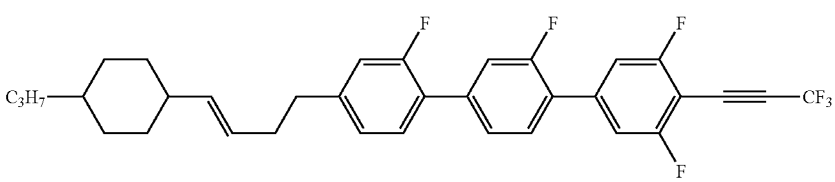
6.126
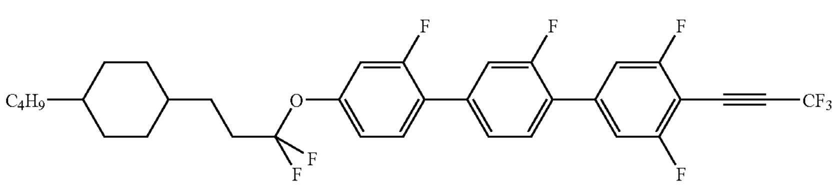

Comparative Example 1

As a comparative example, trans-4'-[3,5-difluoro-4-(3,3,3-trifluoropropyl)phenyl]-trans-4-propylbicyclohexyl (S-11) having a trifluoroalkyl group was synthesized.

(S-11)

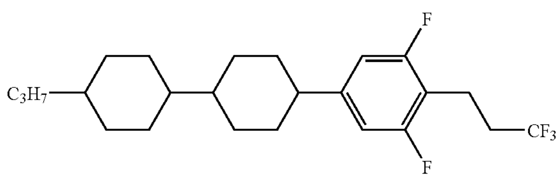

The phase transition temperature of the resulting comparative compound (S-11) was as follows.

Phase transition temperature: $C_1$ 49.6 $C_2$ 79.7 N 120.9 Iso.

A liquid crystal composition I consisting of the mother liquid crystals A (85% by mass) and the comparative compound (S-11; 15% by mass) was prepared. The physical property-values of the resulting liquid crystal composition I were measured, and the extrapolated values of the physical properties of the comparative compound (S-11) were calculated by extrapolating the measured values. The values were as follows.

Maximum temperature ($T_{NI}$)=91.0° C.; optical anisotropy (Δn)=0.090; dielectric anisotropy (Δ∈)=13.4.

The comparison of the comparative compound (S-11) with the liquid crystalline compound (No. 2.23) of the invention shown in Examples 1 and 2 revealed that the liquid crystal compound (No. 2.23) was excellent in view of having a wider temperature range of liquid crystal phases, a higher clearing point, a larger optical anisotropy, and a larger dielectric anisotropy.

Comparative Example 2

Trans-4'-(3,5-difluoro-4-pentafluoropropenylphenyl)-trans-4-propylbicyclohexyl (S-12) having a perfluoropropenyl group was synthesized as a comparative example.

(S-12)

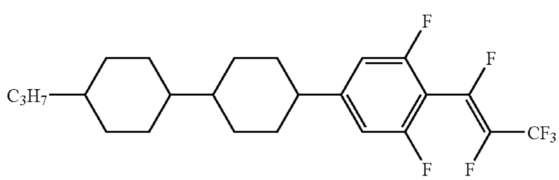

The phase transition temperature of the resulting comparative compound (S-12) was as follows.

Phase transition temperature: C 72.6 Sm 97.1 N 155.8 Iso.

A liquid crystal composition J consisting of the mother liquid crystals A (85% by mass) and the comparative compound (S-12; 15% by mass) was prepared. The physical property-values of the resulting liquid crystal composition J were measured, and the extrapolated values of the physical properties of the comparative compound (S-12) were calculated by extrapolating the measured values. The values were as follows.

Maximum temperature ($T_{NI}$)=103.0° C.; optical anisotropy (Δn)=0.110; dielectric anisotropy (Δ∈)=17.5.

The comparison of the comparative compound (S-12) with the liquid crystal compound (No. 2.23) of the invention shown in Examples 1 and 2 revealed that the liquid crystal compound (No. 2.23) was an excellent compound having a wider temperature range of a nematic phase, a higher clearing point, a larger optical anisotropy, and a larger dielectric anisotropy.

Comparative Example 3

Trans-4'-(3,4,5-trifluorophenyl)-trans-4-propylbicyclohexyl (S-8) which was a compound described in Patent documents 6 and 7 was synthesized as a comparative example.

(S-8)

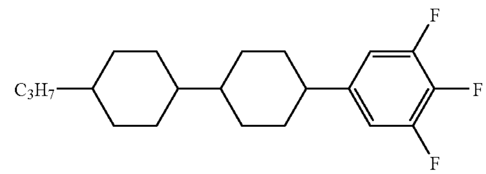

The phase transition temperature of the resulting comparative compound (S-8) was as follows.

Phase transition temperature: C 64.3 N 93.9 Iso.

A liquid crystal composition K consisting of the mother liquid crystals A (85% by mass) and the comparative compound (S-8; 15% by mass) was prepared. The physical property-values of the resulting liquid crystal composition K were measured, and the extrapolated values of the physical properties of the comparative compound (S-8) were calculated by extrapolating the measured values. The values were as follows.

Maximum temperature ($T_{NI}$)=76.4° C.; optical anisotropy (Δn)=0.079; dielectric anisotropy (Δ∈)=11.0.

The comparison of the comparative compound (S-8) with the liquid crystal compound (No. 2.23) of the invention shown in Examples 1 and 2 revealed that the liquid crystal compound (No. 2.23) was an excellent compound having a wider temperature range of liquid crystal phases, a higher clearing point, a larger optical anisotropy, and a larger dielectric anisotropy.

Comparative Example 4

Trans-4'-(3,5-difluorophenyl)-trans-4-propylbicyclohexyl (T5) having no substitution of a trifluoropropenyl group was synthesized as a comparative example.

(T5)

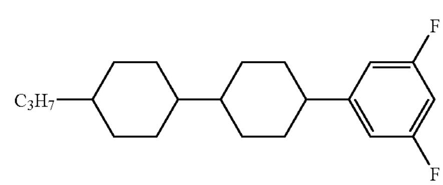

The phase transition temperature of the resulting comparative compound (T5) was as follows.

Phase transition temperature: C 58.2 N 87.5 Iso.

A liquid crystal composition L consisting of the mother liquid crystals A (85% by mass) and the comparative compound (T5; 15% by mass) was prepared. The physical property-values of the resulting liquid crystal composition L were measured, and the extrapolated values of the physical properties of the compound (T5) were calculated by extrapolating the measured values. The values were as follows.

Maximum temperature ($T_{NI}$)=69.7° C.; optical anisotropy (Δn)=0.084; dielectric anisotropy (Δ∈)=2.90.

The comparison of the comparative compound (T5) with the liquid crystal compound (No. 2.23) of the invention shown in Examples 1 and 2 revealed that the liquid crystal compound (No. 2.23) was an excellent compound having a wider temperature range of liquid crystal phases, a higher clearing point, a larger optical anisotropy, and a larger dielectric anisotropy.

Comparative Example 5

Trans-4-propyl-trans-4'-[(4-(3,3,3-trifluoropropenyl)phenyl)]-bicyclohexyl (S-13) having substitution of a trifluoropropenyl group but no substitution of fluorine in a lateral position was synthesized as a comparative example.

(S-13)

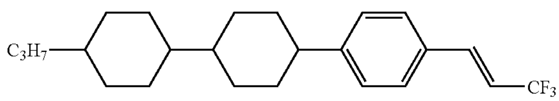

The phase transition temperature of the resulting comparative compound (S-13) was as follows.

Phase transition temperature: C 125.0 N 182.8 Iso.

A liquid crystal composition M consisting of the mother liquid crystals A (85% by mass) and the comparative compound (S-13; 15% by mass) was prepared. The physical property-values of the resulting liquid crystal composition M were measured, and the extrapolated values of the physical properties of the compound (S-13) were calculated by extrapolating the measured values. The values were as follows.

Optical anisotropy (Δn)=0.147; dielectric anisotropy (Δ∈)=10.7.

The comparison of the comparative compound (S-13) with the liquid crystal compound (No. 2.23) of the invention shown in Examples 1 and 2 revealed that the liquid crystal compound (No. 2.23) was excellent in view of having a wider temperature range of liquid crystal phases and a larger dielectric anisotropy.

Comparative Example 6

Trans-4-propyl-trans-4'-[(4-(3,3,3-trifluoropropyl)phenyl)]bicyclohexyl (S-14) which was a compound very similar to the compound (S-1) described in Patent document 1 was synthesized as a comparative example.

(S-14)

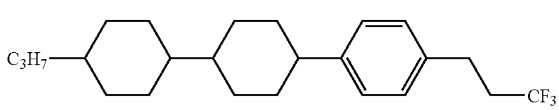

The phase transition temperature of the resulting comparative compound (S-14) was as follows, and the compound had only a smectic B phase.

Phase transition temperature: C 70.2 $S_B$ 179.0 Iso.

A liquid crystal composition N consisting of the mother liquid crystals A (85% by mass) and the comparative compound (S-14; 15% by mass) was prepared. The physical property-values of the resulting liquid crystal composition N were measured, and the extrapolated values of the physical properties of the comparative compound (S-14) were calculated by extrapolating the measured values. The values were as follows.

Maximum temperature ($T_{NI}$)=123.7° C.; optical anisotropy (Δn)=0.097; dielectric anisotropy (Δ∈)=5.0.

The comparison of the comparative compound (S-14) with the liquid crystal compound (No. 2.23) of the invention shown in Examples 1 and 2 revealed that the liquid crystal compound (No. 2.23) was excellent in view of having a nematic phase, a higher clearing point, a larger optical anisotropy, and a larger dielectric anisotropy.

Comparative Example 7

Trans-4'-(4-propenylphenyl)-trans-4-propylbicyclohexyl (S-15) which was a compound very similar to the compound (S-6) described in Patent document 4 was synthesized as a comparative example.

(S-15)

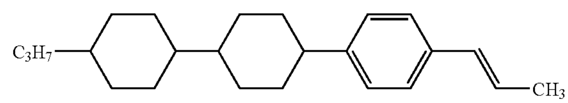

The phase transition temperature of the resulting comparative compound (S-15) was as follows.

Phase transition temperature: $C_1$ 64.0 $C_2$ 75.0 $C_3$ 87.3 $S_B$ 119.2 N 265.4 Iso.

A liquid crystal composition O consisting of the mother liquid crystals A (85% by mass) and the comparative compound (S-15; 15% by mass) was prepared. The physical property-values of the resulting liquid crystal composition O were measured, and the extrapolated values of the physical properties of the comparative compound (S-15) were calculated by extrapolating the measured values. The values were as follows.

Optical anisotropy (Δn)=0.177; dielectric anisotropy (Δ∈)=3.6.

The comparison of the comparative compound (S-15) with the liquid crystal compound (No. 2.23) of the invention shown in Examples 1 and 2 revealed that the liquid crystal compound (No. 2.23) was excellent in view of having a lower minimum temperature of the nematic phase and a larger dielectric anisotropy.

Comparative Example 8

3,5,2'-Trifluoro-4'-(trans-4-propylcyclohexyl)-4-(3,3,3-trifluoropropyl)biphenyl (S-16) having substitution of a trifluoroalkyl group was synthesized as a comparative example.

(S-16)

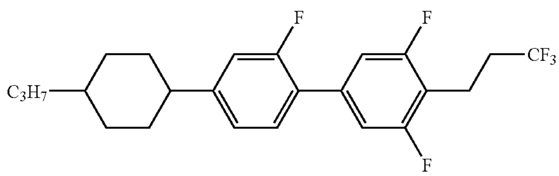

The phase transition temperature of the resulting comparative compound (S-16) was as follows.

Phase transition temperature: C 73.8 (N 69.7) Iso.

A liquid crystal composition P consisting of the mother liquid crystals A (85% by mass) and the comparative compound (S-16; 15% by mass) was prepared. The physical property-values of the resulting liquid crystal composition P were measured, and the extrapolated values of the physical properties of the comparative compound (S-16) were calculated by extrapolating the measured values. The value were as follows.

Maximum temperature ($T_{NI}$)=57.7° C.; optical anisotropy (Δn)=0.124; dielectric anisotropy (Δ∈)=16.9.

The comparison of the comparative compound (S-16) with the liquid crystal compound (No. 2.47) of the invention shown in Examples 3 and 4 revealed that the liquid crystal compound (No. 2.47) was excellent in view of having a wider temperature range of liquid crystal phases, a higher clearing point, a larger optical anisotropy, and a larger dielectric anisotropy.

Comparative Example 9

3,4,5,2'-Tetrafluoro-4'-(trans-4-propylcyclohexyl)biphenyl (S-9) which was a compound described in Patent documents 6 and 7 was synthesized as a comparative example.

(S-9)

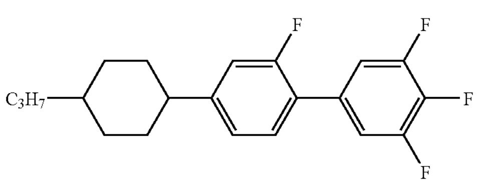

The phase transition temperature of the resulting comparative compound (S-9) was as follows.

Phase transition temperature: C 62.9 Iso.

A liquid crystal composition Q consisting of the mother liquid crystals A (85% by mass) and the comparative compound (S-9; 15% by mass) was prepared. The physical property-values of the resulting liquid crystal composition Q were measured, and the extrapolated values of the physical properties of the comparative compound (S-9) were calculated by extrapolating the measured values. The values were as follows.

Maximum temperature ($T_{NI}$)=28.4° C.; optical anisotropy (Δn)=0.110; dielectric anisotropy (Δ∈)=17.0.

The comparison of the comparative compound (S-9) with the liquid crystal compound (No. 2.47) of the invention shown in Examples 3 and 4 revealed that the liquid crystal compound (No. 2.47) was excellent in view of having a wider temperature range of liquid crystal phases, a higher clearing point, a larger optical anisotropy, and a larger dielectric anisotropy.

Comparative Example 10

2,3',5'trifluoro-4-(trans-4-propylcyclohexyl)biphenyl (T14) having no substitution of a trifluoropropenyl group was synthesized as a comparative example.

(T14)

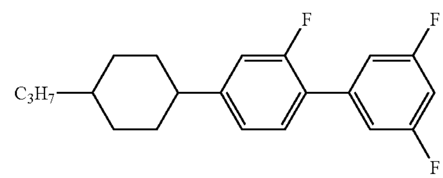

The phase transition temperature of the resulting comparative compound (T14) was as follows.

Phase transition temperature: C 60.2 Iso.

A liquid crystal composition R consisting of the mother liquid crystals A (85% by mass) and the comparative compound (T14; 15% by mass) was prepared. The physical property-values of the resulting liquid crystal composition R were measured, and the extrapolated values of the physical properties of the comparative compound (T14) were calculated by extrapolating the measured values. The values were as follows.

Maximum temperature ($T_{NI}$)=25.0° C.; optical anisotropy (Δn)=0.124; dielectric anisotropy (Δ∈)=6.9.

The comparison of the comparative compound (T14) with the liquid crystal compound (No. 2.47) of the invention shown in Examples 3 and 4 revealed that the liquid crystal compound (No. 2.47) was excellent in view of having a wider temperature range of liquid crystal phases, a higher clearing point, a larger optical anisotropy, and a larger dielectric anisotropy.

Comparative Example 11

3,5,2'-Trifluoro-4"-propyl-4-(3,3,3-trifluoropropyl)-[1,1';4',1"]terphenyl (S-17) having substitution of a trifluoroalkyl group was synthesized as a comparative example.

(S-17)

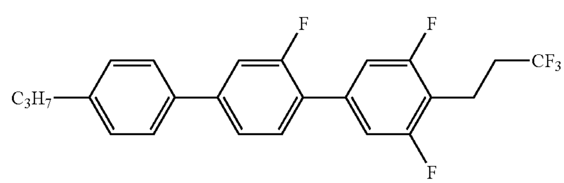

The phase transition temperature of the resulting comparative compound (S-17) was as follows.

Phase transition temperature: C 79.5 $S_A$ 125.8 Iso.

A liquid crystal composition S consisting of the mother liquid crystals A (85% by mass) and the comparative compound (S-17; 15% by mass) was prepared. The physical property-values of the resulting liquid crystal composition S were measured, and the extrapolated values of the physical properties of the comparative compound (S-17) were calculated by extrapolating the measured values. The values were as follows.

Maximum temperature ($T_{NI}$)=67.0° C.; optical anisotropy (Δn)=0.197; dielectric anisotropy (Δ∈) 21.6.

The comparison of the comparative compound (S-17) with the liquid crystal compounds (No. 2.108 and No. 5.47) of the invention shown in Examples 5, 6, 13, and 14 revealed that the liquid crystal compounds (No. 2.108 and No. 5.47) were excellent in view of having a higher clearing point, a larger optical anisotropy, and a larger dielectric anisotropy.

Comparative Example 12

3,4,5,2'-Tetrafluoro-4"-propyl-[1,1'; 4',1"]terphenyl (S-18) which was a compound described in Patent documents 6 and 7 was synthesized as a comparative example.

(S-18)

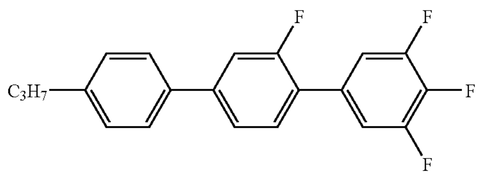

The phase transition temperature of the resulting comparative compound (S-18) was as follows.

Phase transition temperature: C 63.3 Tso.

A liquid crystal composition T consisting of the mother liquid crystals A (85% by mass) and the comparative compound (S-18; 15% by mass) was prepared. The physical property-values of the resulting liquid crystal composition T were measured, and the extrapolated values of the physical properties of the comparative compound (S-18) were calculated by extrapolating the measured values. The value were as follows.

Maximum temperature ($T_{NI}$)=37.0° C.; optical anisotropy (Δn)=0.184; dielectric anisotropy (Δ∈)=21.7.

The comparison of the comparative compound (S-18) with the liquid crystal compounds (No. 2.108 and No. 5.47) of the invention shown in Examples 5, 6, 13, and 14 revealed that the liquid crystal compounds (No. 2.108 and No. 5.47) were excellent in view of having a wider temperature range of liquid crystal phases, a higher clearing point, a larger optical anisotropy, and a larger dielectric anisotropy.

Comparative Example 13

3,5,2'-Trifluoro-4"-propyl-[1,1'; 4',1"]terphenyl (T19) having no substitution of a trifluoropropenyl or trifluoropropynyl group was synthesized as a comparative example.

(T19)

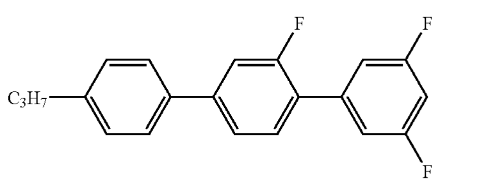

The phase transition temperature of the resulting comparative compound (T19) was as follows.

Phase transition temperature: C 57.7 $S_A$ 62.4 Iso.

A liquid crystal composition U consisting of the mother liquid crystals A (85% by mass) and the comparative compound (T19; 15% by mass) was prepared. The physical property-values of the resulting liquid crystal composition U were measured, and the extrapolated values of the physical properties of the comparative compound (T19) were calculated by extrapolating the measured values. The values was as follows.

Maximum temperature ($T_{NI}$)=27.0° C.; optical anisotropy (Δn)=0.197; dielectric anisotropy (Δ∈)=9.0.

The comparison of the comparative compound (T19) with the liquid crystal compounds (No. 2.108 and No. 5.47) of the present invention shown in Examples 5, 6, 13, and 14 revealed that the liquid crystal compounds (No. 2.108 and No. 5.47) were excellent in view of having a wider temperature range of liquid crystal phases, a higher clearing point, a larger optical anisotropy, and a larger dielectric anisotropy.

Comparative Example 14

2'-Fluoro-4"-propyl-4-(3,3,3-trifluoropropenyl)-[1,1'; 4',1"]terphenyl (S-19) having substitution of a trifluoropropenyl group but no substitution of fluorine in a lateral position was synthesized as a comparative example.

(S-19)

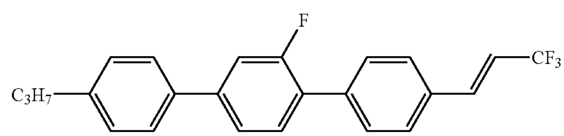

The phase transition temperature of the resulting comparative compound (S-19) was as follows.

Phase transition temperature: C 102.9 $S_E$ 129.8 $S_A$ 218.8 Iso.

A liquid crystal composition V consisting of the mother liquid crystals A (95% by mass) and the comparative compound (S-19; 5% by mass) was prepared. The physical property-values of the resulting liquid crystal composition V were measured, and the extrapolated values of the physical properties of the comparative compound (S-19) were calculated by extrapolating the measured values. The values were as follows.

Maximum temperature ($T_{NI}$)=117.7° C.; optical anisotropy (Δn)=0.277; dielectric anisotropy (Δ∈)=15.9.

The comparison of the comparative compound (S-19) with the liquid crystal compounds (No. 2.108 and No. 2.88) of the invention shown in Examples 5, 6, 7, and 8 revealed that the liquid crystal compounds (No. 2.108 and No. 2.88) were excellent in view of having a lower minimum temperature of liquid crystal phases and a larger dielectric anisotropy.

Comparative Example 15

3,5,2'-Trifluoro-4"-pentyl-4-propenyl-[1,1'; 4',1"]terphenyl (S-20) which is a compound having substitution of a propenyl group was synthesized as a comparative example.

(S-20)

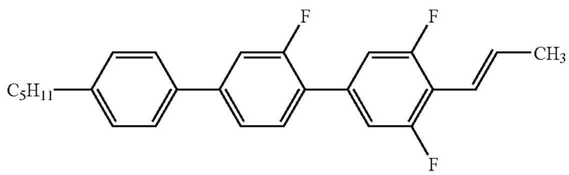

A liquid crystal composition W consisting of the mother liquid crystals A (85% by mass) and the comparative compound (S-20; 15% by mass) was prepared. The physical property-value of the resulting liquid crystal composition W was measured, and the extrapolated value of the physical properties of the compound (S-20) was calculated by extrapolating the measured value. The value was as follows.

Dielectric anisotropy ($\Delta\epsilon$)=7.6.

The comparison of the comparative compound (S-20) with the liquid crystal compound (No. 2.110) of the invention shown in Example 15 revealed that the liquid crystal compound (No. 2.110) was excellent in view of having a larger dielectric anisotropy.

Example 16

For confirming low-temperature compatibility, samples were prepared by mixing the mother liquid crystals A and the liquid crystal compound (No. 2.88) such that the amount of liquid crystal compound (No. 2.88) became 15% by mass, 10% by mass, 5% by mass and 3% by mass, and the samples were put into glass vials. After the glass vials had been kept in a freezer at −20° C. for 30 days, it was observed whether or not crystals or a smectic phase was deposited. As a result, the sample mixed at 15% by mass deposited crystals, and the sample mixed at 10% by mass still remained in a nematic phase without crystal deposition.

Example 17

For confirming low-temperature compatibility, samples were prepared by mixing the mother liquid crystals A and the liquid crystal compound (No. 2.108) such that the amount of the liquid crystal compound (No. 2.108) became 15% by mass, 10% by mass, 5% by mass and 3% by mass, and the samples were put into glass vials. After the glass vials had been kept in a freezer at −20° C. for 30 days, it was observed whether or not crystals or a smectic phase was deposited. As a result, the sample mixed at 15% by mass still remained in a nematic phase without crystal deposition.

Comparative Example 16

For confirming low-temperature compatibility, samples were prepared by mixing the mother liquid crystals A and the comparative compound (S-19) such that the amount of comparative compound (S-19) became 15% by mass, 10% by mass, 5% by mass and 3% by mass, and the samples were put into glass vials. After the glass vials had been kept in a freezer at −20° C. for 30 days, it was observed whether or not crystals or a smectic phase was deposited. As a result, the sample mixed at 5% by mass deposited crystals, and the sample mixed at 3% by mass still remained in a nematic phase without crystal deposition.

The comparison of the comparative compound (S-19) with the liquid crystal compounds (No. 2.88 and No. 108) of the invention shown in Examples 16 and 17 revealed that the liquid crystal compounds (No. 2.88 and No.108) were excellent in view of the low-temperature compatibility.

Example 18

Further, the representative compositions of the invention were summarized in Composition Examples 1-14. First, compounds as the components of a composition, and their amounts (% by mass) were shown. The compounds were indicated by symbols of left-terminal groups, bonding groups, ring structures, and right-terminal groups in accordance with the definition in Table 1. The configurations of 1,4-cyclohexylene and 1,3-dioxane-2,5-diyl are trans. When there is no symbol of terminal groups, the terminal groups mean hydrogen. Next, the physical property-values of the compositions were shown. The physical property-values are measured values as they are.

TABLE 1

Method of Description of Compound using Symbols
$R\text{-}(A_1)\text{-}Z_1\text{-} \ldots \text{-}Z_n\text{-}(A_n)\text{-}R'$

| 1) Left Terminal Group R— | Symbol |
|---|---|
| $C_nH_{2n+1}$— | n- |
| $C_nH_{2n+1}O$— | nO— |
| $C_mH_{2m+1}OC_nH_{2n}$— | mOn- |
| $CH_2$═CH— | V— |
| $C_nH_{2n+1}$—CH═CH— | nV— |
| $CH_2$═CH—$C_nH_{2n}$— | Vn- |
| $C_mH_{2m+1}$—CH═CH—$C_nH_{2n}$— | mVn- |
| $CF_2$═CH— | VFF— |
| $CF_2$═CH—$C_nH_{2n}$— | VFFn- |
| **2) Ring Structure -$A_n$-** | **Symbol** |
| 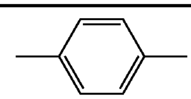 | B |
| 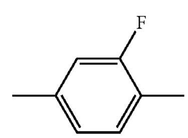 | B(F) |
| 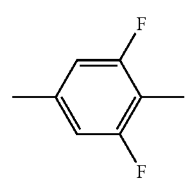 | B(F,F) |
| 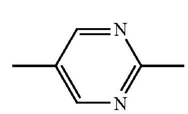 | Py |
| 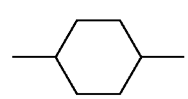 | H |
| 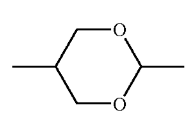 | G |

TABLE 1-continued

| | |
|---|---|
| 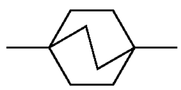 | Bi |
| 3) Bonding group -$Z_n$- | Symbol |
| —$C_2H_4$— | 2 |
| —$C_4H_8$— | 4 |
| —CH═CH— | V |
| —$CF_2O$— | X |
| —COO— | E |
| —C≡C— | T |
| 4) Right Terminal Group —R' | Symbol |
| —$C_nH_{2n+1}$ | -n |
| —$OC_nH_{2n+1}$ | —On |
| —CH═$CH_2$ | —V |
| —CH═CH—$C_nH_{2n+1}$ | —Vn |
| —$C_nH_{2n}$—CH═$CH_2$ | -nV |
| —$C_nH_{2n+1}$—CH═CH—$C_mH_{2m}$— | -nVm |
| —CH═$CF_2$ | —VFF |
| —$COOCH_3$ | -EMe |
| —F | —F |
| —Cl | —CL |
| —CN | —C |
| —$OCF_2H$ | —OCF2H |
| —$OCF_3$ | —OCF3 |
| —$CF_3$ | —CF3 |
| —CH═$CHCF_3$ | —VCF3 |
| —C≡CCF3 | -TCF3 |
| 5) Example of Description | |

Example 1 3-BB(F)B(F,F)—VCF3

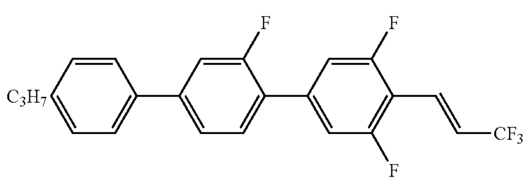

Example 2 5-HBB(F)B-3

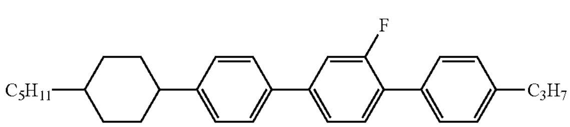

Example 3 3-BB(F,F)XB(F,F)—F

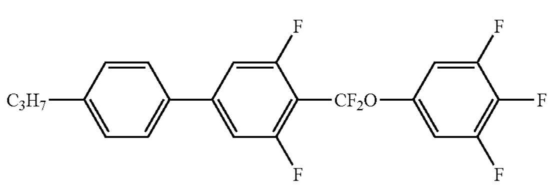

Physical property-values can be measured in accordance with methods described below. Most methods are described in the Standard of Electronic Industries Association of Japan, EIAJ•ED-2521A, or methods with some modifications. No TFT was attached to a TN device used for measurement.

Maximum temperature of nematic phase (NI; ° C.): A sample was placed on a hot plate in a melting point apparatus equipped with a polarizing microscope, and was heated at a rate of 1° C. per minute. Temperature was measured when part of sample began to change from a nematic phase into an isotropic liquid. The maximum temperature of the nematic phase may be abbreviated to "a maximum temperature".

Minimum temperature of nematic phase ($T_C$; ° C.): Samples having a nematic phase was kept in a freezer at 0° C., −10° C., −20° C., −30° C., and −40° C. for 10 days, and then liquid crystal phases were observed. For example, when a sample still remained in a nematic phase at −20° C. and changed into crystals (or a smectic phase) at −30° C., $T_C$ was expressed as ≦−20° C. The minimum temperature of the nematic phase may be abbreviated to "a minimum temperature".

Rotational viscosity (η; measured at 20° C.; mPa·s): An E-type viscometer was used for measurement.

Rotational viscosity (γ1; measured at 25° C.; mPa·s):

1) Sample having positive dielectric anisotropy: Rotational viscosity was measured in accordance with the method described in M. Imai, et al., Molecular Crystals and Liquid Crystals, Vol. 259, 37 (1995). A sample was put into a TN device in which a twist angle was 0 degrees and a distance (cell gap) of two glass plates was 5 micrometers. Voltage was applied to the TN device in the range of 16 V to 19.5 V step by step every 0.5 V. The application was repeated, after no application of 0.2 second, with only one type of rectangular wave (rectangular pulse; 0.2 second) and no application (2 seconds). The peak current and peak time of a transient current generated by the voltage application were measured. The value of the rotational viscosity was obtained using the measured values and the calculating formula (8) described in the article of M. Imai, et al, p. 40. The value of dielectric anisotropy necessary for the calculation was determined in a device used for measuring the rotational viscosity based on the method of measuring dielectric anisotropy to be described below.

2) Sample having negative dielectric anisotropy: Rotational viscosity was measured in accordance with the method described in M. Imai, et al., Molecular Crystals and Liquid Crystals, Vol. 259, 37 (1995). A sample was put into a VA device having a distance (cell gap) between two glass plates of 20 micrometers. Voltage was applied to the device in the range of 30 V to 50 V step by step every 1 V. The application was repeated, after no application of 0.2 second, with only one type of rectangular wave (rectangular pulse; 0.2 second) and no application (2 seconds). The peak current and the peak time of a transient current generated by the voltage application were measured. The value of the rotational viscosity was determined using the measured values and the calculating formula (8) described in the article by M. Imai, et al, p. 40. The value of dielectric anisotropy necessary for the calculation was obtained by means of the method described below.

2) Sample having negative dielectric anisotropy: Rotational viscosity was measured in accordance with the method described in M. Imai, et al., Molecular Crystals and Liquid Crystals, Vol. 259, 37 (1995) A sample was put into a VA element having a distance (cell gap) between two glass plates of 20 micrometers. Voltage was applied to the element in the range of 30 V to 50 V step by step every 1 V. The application was repeated, after no application of 0.2 second, with only one type of rectangular wave (rectangular pulse; 0.2 second) and no application (2 seconds). The peak current and the peak time of a transient current generated by the voltage application were measured. The value of the rotational viscosity was determined using the measured values and the calculating formula (8) described in the article by M. Imai, et al, p. 40. The value of dielectric anisotropy necessary for the calculation was obtained by means of the method described below.

Optical anisotropy (refractive index anisotropy; Δn; measured at 25° C.): Measurement was made by means of an Abbe refractometer equipped with a polarizing plate on an ocular, using light at a wavelength of 589 nm. The surface of a main prism was rubbed in one direction, and then a sample was dropped on the main prism. Refractive index (n||) was measured when the direction of polarized light was parallel to the direction of the rubbing. Refractive index (n⊥) was measured when the direction of polarized light was perpendicular to the direction of the rubbing. The value of optical anisotropy was calculated based on the equation: Δn=n||−n⊥. When a sample was a composition, optical anisotropy was measured based on this method. When a sample was a compound, optical anisotropy was measured after mixing the compound into a suitable composition. The optical anisotropy of the compound was described with an extrapolated value.

Dielectric anisotropy (Δ∈; measured at 25° C.): When a sample was a compound, dielectric anisotropy was measured after mixing the compound into a suitable composition. The dielectric anisotropy of the compound was described with an extrapolated value.

1) Composition having a positive dielectric anisotropy: A sample was put into a liquid crystal cell having a distance (gap) between two glass plates of about 9 micrometers and a twist angle of 80 degrees. A voltage of 20 V was applied to the cell, and a dielectric constant (∈⊥) in the major axis direction of liquid crystal molecules was measured. A voltage of 0.5 V was applied to the cell, and a dielectric constant (∈⊥) in the minor axis direction of liquid crystal molecules was measured. The value of dielectric anisotropy was calculated based on the equation: Δ∈=∈||−∈⊥.

2) Composition having a negative dielectric anisotropy: A sample was put into a liquid crystal cell treated into a homeotropic orientation, and a voltage of 0.5 V was applied to measure a dielectric constant (∈||) A sample was put into a liquid crystal cell treated into a homogeneous orientation, and a voltage of 0.5 V was applied to measure a dielectric constant (∈⊥). The dielectric anisotropy value was calculated based on the equation: Δ∈−∈||−∈⊥.

Threshold voltage (Vth; measured at 25° C.; V) : When a sample was a compound, threshold voltage was measured after mixing the compound into a suitable composition. The threshold voltage of the compound was described with a extrapolated value. 1) Composition having a negative dielectric anisotropy: A sample was put into a liquid crystal display device of a normally white mode having a distance (gap) between two glass plates of (0.5/Δn) micrometer, and a twist angle of 80 degrees. The Δn was a value of optical anisotropy measured according to the above method. A rectangular wave having a frequency of 32 Hz was applied to the device. The voltage of the rectangular wave was increased, and the value of voltage was measured when the transmittance of light passing through the device became 90%.

2) Composition having a negative dielectric anisotropy: A sample was put into a liquid crystal display device of a normally black mode having a distance (gap) between two glass plates of about 9 micrometers and treated into a homeotropic orientation. A rectangular wave having a frequency of 32 Hz was applied to the device. The voltage of the rectangular wave was increased and the value of voltage was measured when the transmittance of light passing through the device became 10%.

Voltage holding ratio (VHR; measured at 25° C.; %): A TN device used for measurement had a polyimide-alignment film and a distance (cell gap) between two glass plates of 6 micrometers. A sample was put into the device, and then the device was sealed with an adhesive polymerizable by ultraviolet light irradiation. A pulse voltage (60 microseconds at 5 V) was applied to charge the TN device. Decreasing voltage was measured for 16.7 milliseconds with a High Speed Voltmeter, and an area A between a voltage curve and a horizontal axis in a unit cycle was determined An area B was an area when the voltage did not decrease. A voltage holding ratio was expressed by a percentage of the area A to the area B.

Helical pitch (μm; measured at 20° C.): The Cano's wedge cell method was used for measuring a helical pitch. A sample was poured into Cano's wedge cell and a distance (a; μm) between disclination lines observed on the cell was measured. The helical pitch (P) was calculated based on the equation: P=2·a·tan θ. The symbol θ is an angle between two glass plates in the wedge cell.

The ratio (percentage) of components or a liquid crystal compound is a percentage by mass (% by mass) based on the total mass of liquid crystal compounds. The mass of components such as liquid crystal compounds is measured, and then a composition is prepared by mixing the components. Therefore, the % by mass of components is easily calculated.

Composition Example 1

| | |
|---|---|
| 3-HHB(F,F)—VCF3 | 5% |
| 3-HB(F)B(F,F)—VCF3 | 5% |
| 2-BEB(F)—C | 5% |
| 3-BEB(F)—C | 4% |
| 4-BEB(F)—C | 12% |
| 1V2-BEB(F,F)—C | 13% |
| 3-HB—O2 | 7% |
| 3-HH-4 | 3% |
| 3-HHB—F | 3% |
| 3-HHB-1 | 4% |
| 3-HHB—O1 | 4% |
| 3-HBEB—F | 4% |
| 3-HHEB—F | 7% |
| 5-HHEB—F | 7% |
| 3-H2BTB-2 | 4% |
| 3-H2BTB-3 | 4% |
| 3-H2BTB-4 | 4% |
| 3-HB(F)TB-2 | 5% |

NI = 92.9° C.; Δn = 0.149; Δϵ = 28.1; Vth = 1.09 V.

Composition Example 2

| | |
|---|---|
| 3-BB(F)B(F,F)—VCF3 | 4% |
| 5-BB(F)B(F,F)—VCF3 | 4% |
| 2-HB—C | 5% |
| 3-HB—C | 12% |
| 3-HB—O2 | 15% |
| 2-BTB-1 | 3% |
| 3-HHB—F | 4% |
| 3-HHB-1 | 8% |
| 3-HHB—O1 | 5% |
| 3-HHB-3 | 6% |
| 3-HHEB—F | 4% |
| 5-HHEB—F | 4% |
| 2-HHB(F)—F | 7% |
| 3-HHB(F)—F | 7% |
| 5-HHB(F)—F | 7% |
| 3-HHB(F,F)—F | 5% |

NI = 96.8° C.; Δn = 0.113; Δϵ = 6.9; Vth = 2.14 V.

Composition Example 3

| | |
|---|---|
| 3-BB(F)B(F,F)-TCF3 | 3% |
| 5-BB(F)B(F,F)-TCF3 | 5% |
| 3-BEB(F)—C | 8% |
| 3-HB—C | 8% |
| V—HB—C | 8% |
| 1V—HB—C | 8% |
| 3-HB—O2 | 3% |
| 3-HH—2V | 13% |
| 3-HH—2V1 | 7% |
| V2-HHB-1 | 8% |
| 3-HHB-1 | 5% |
| 3-HHEB—F | 7% |
| 3-H2BTB-2 | 6% |
| 3-H2BTB-3 | 6% |
| 3-H2BTB-4 | 5% |

NI = 93.8° C.; Δn = 0.146; Δϵ = 10.7; Vth = 1.68 V.

Composition Example 4

| | |
|---|---|
| 3-B(F)B(F)B(F,F)—VCF3 | 6% |
| 5-BEB(F)—C | 5% |
| V—HB—C | 11% |
| 5-PyB—C | 6% |
| 4-BB-3 | 6% |
| 3-HH—2V | 10% |
| 5-HH—V | 11% |
| V—HHB-1 | 7% |
| V2-HHB-1 | 14% |
| 3-HHB-1 | 9% |
| 1V2-HBB-2 | 10% |
| 3-HHEBH-3 | 5% |

Composition Example 5

| | |
|---|---|
| 3-BB(F,F)B(F,F)—VCF3 | 4% |
| 3-B(F)B(F,F)B(F,F)—VCF3 | 4% |
| 1V2-BEB(F,F)—C | 6% |
| 3-HB—C | 18% |
| 2-BTB-1 | 10% |
| 5-HH—VFF | 22% |
| 3-HHB-1 | 4% |
| VFF—HHB-1 | 8% |
| VFF2-HHB-1 | 11% |
| 3-H2BTB-2 | 5% |
| 3-H2BTB-3 | 4% |
| 3-H2BTB-4 | 4% |

Composition Example 6

| | |
|---|---|
| 3-HB(F)B(F,F)—VCF3 | 4% |
| 3-BB(F)B(F,F)—VCF3 | 4% |
| 5-HB—CL | 16% |
| 3-HH-4 | 12% |
| 3-HH-5 | 4% |
| 3-HHB—F | 4% |
| 3-HHB—CL | 3% |
| 4-HHB—CL | 4% |
| 3-HHB(F)—F | 7% |
| 4-HHB(F)—F | 7% |
| 5-HHB(F)—F | 7% |
| 7-HHB(F)—F | 7% |
| 5-HBB(F)—F | 4% |
| 1O1-HBBH-5 | 3% |
| 3-HHBB(F,F)—F | 2% |
| 4-HHBB(F,F)—F | 3% |
| 5-HHBB(F,F)—F | 3% |
| 3-HH2BB(F,F)—F | 3% |
| 4-HH2BB(F,F)—F | 3% |

NI = 114.3° C.; Δn = 0.103; Δϵ = 5.4; Vth = 2.19 V.

A pitch was 60.5 micrometers when 0.25 mass part of the optically active compound (Op-05) was added to 100 mass part of the composition of Example 6.

Composition Example 7

| | |
|---|---|
| 3-HB(F,F)—VCF3 | 8% |
| 3-BB(F,F)—VCF3 | 7% |
| 3-HHB(F,F)—F | 9% |
| 3-H2HB(F,F)—F | 8% |
| 4-H2HB(F,F)—F | 8% |
| 5-H2HB(F,F)—F | 8% |
| 3-HBB(F,F)—F | 16% |
| 5-HBB(F,F)—F | 15% |
| 3-H2BB(F,F)—F | 5% |
| 5-HHBB(F,F)—F | 3% |
| 5-HHEBB—F | 3% |
| 3-HH2BB(F,F)—F | 2% |
| 1O1-HBBH-4 | 4% |
| 1O1-HBBH-5 | 4% |

Composition Example 8

| | |
|---|---|
| 3-HHB(F,F)-TCF3 | 5% |
| 3-HB(F)B(F,F)-TCF3 | 5% |
| 5-HB—F | 12% |
| 6-HB—F | 9% |
| 7-HB—F | 7% |
| 2-HHB—OCF3 | 7% |
| 3-HHB—OCF3 | 7% |
| 4-HHB—OCF3 | 7% |
| 5-HHB—OCF3 | 5% |
| 3-HH2B—OCF3 | 4% |
| 5-HH2B—OCF3 | 4% |
| 3-HHB(F,F)—OCF2H | 4% |
| 3-HHB(F,F)—OCF3 | 5% |
| 3-HH2B(F)—F | 3% |
| 3-HBB(F)—F | 5% |
| 5-HBB(F)—F | 5% |
| 5-HBBH-3 | 3% |
| 3-HB(F)BH-3 | 3% |

Composition Example 9

| | |
|---|---|
| 3-BB(F,F)2B(F,F)—VCF3 | 15% |
| 5-HB—CL | 11% |
| 3-HH-4 | 8% |
| 3-HHB-1 | 5% |
| 3-HHB(F,F)—F | 8% |

-continued

| | |
|---|---|
| 3-HBB(F,F)—F | 10% |
| 5-HBB(F,F)—F | 10% |
| 3-HHEB(F,F)—F | 10% |
| 4-HHEB(F,F)—F | 3% |
| 5-HHEB(F,F)—F | 3% |
| 2-HBEB(F,F)—F | 3% |
| 3-HBEB(F,F)—F | 5% |
| 5-HBEB(F,F)—F | 3% |
| 3-HHBB(F,F)—F | 6% |

Composition Example 10

| | |
|---|---|
| 3-BB(F,F)XB(F,F)—VCF3 | 15% |
| 3-HB—CL | 6% |
| 5-HB—CL | 4% |
| 3-HHB—OCF3 | 5% |
| 3-H2HB—OCF3 | 5% |
| 5-H4HB—OCF3 | 5% |
| V—HHB(F)—F | 5% |
| 3-HHB(F)—F | 5% |
| 5-HHB(F)—F | 5% |
| 3-H4HB(F,F)—CF3 | 8% |
| 5-H4HB(F,F)—CF3 | 10% |
| 5-H2HB(F,F)—F | 5% |
| 5-H4HB(F,F)—F | 7% |
| 2-H2BB(F)—F | 5% |
| 3-H2BB(F)—F | 5% |
| 3-HBEB(F,F)—F | 5% |

Composition Example 11

| | |
|---|---|
| 3-BB(F,F)EB(F,F)—VCF3 | 10% |
| 5-HB—CL | 17% |
| 7-HB(F,F)—F | 3% |
| 3-HH-4 | 10% |
| 3-HH-5 | 5% |
| 3-HB—O2 | 6% |
| 3-HHB-1 | 8% |
| 3-HHB—O1 | 5% |
| 2-HHB(F)—F | 7% |
| 3-HHB(F)—F | 7% |
| 5-HHB(F)—F | 7% |
| 3-HHB(F,F)—F | 5% |
| 3-H2HB(F,F)—F | 5% |
| 4-H2HB(F,F)—F | 5% |

Composition Example 12

| | |
|---|---|
| 5-HBB(F)B(F,F)—VCF3 | 4% |
| 5-BB(F)B(F)B(F,F)—VCF3 | 4% |
| 5-HB—CL | 3% |
| 7-HB(F)—F | 7% |
| 3-HH-4 | 9% |
| 3-HH-EMe | 15% |
| 3-HHEB—F | 8% |
| 5-HHEB—F | 8% |
| 3-HHEB(F,F)—F | 10% |
| 4-HHEB(F,F)—F | 5% |
| 4-HGB(F,F)—F | 5% |
| 5-HGB(F,F)—F | 6% |
| 2-H2GB(F,F)—F | 4% |
| 3-H2GB(F,F)—F | 5% |
| 5-GHB(F,F)—F | 7% |

Composition Example 13

| | |
|---|---|
| 3-HB(F,F)—VCF3 | 5% |
| 3-HB(F)B(F,F)—VCF3 | 5% |
| 5-HBB(F)B(F,F)—VCF3 | 5% |
| 3-HH-4 | 8% |
| 3-HHB-1 | 6% |
| 3-HHB(F,F)—F | 10% |
| 3-H2HB(F,F)—F | 9% |
| 3-HBB(F,F)—F | 15% |
| 3-BB(F,F)XB(F,F)—F | 20% |
| 1O1-HBBH-5 | 7% |
| 2-HHBB(F,F)—F | 3% |
| 3-HHBB(F,F)—F | 3% |
| 3-HH2BB(F,F)—F | 4% |

Composition Example 14

| | |
|---|---|
| 3-BB(F)B(F,F)—VCF3 | 4% |
| 5-BB(F)B(F,F)-TCF3 | 4% |
| 5-HB—CL | 13% |
| 3-HB—O2 | 10% |
| 3-PyB(F)—F | 8% |
| 5-PyB(F)—F | 10% |
| 3-HBB(F,F)—F | 7% |
| 3-PyBB—F | 8% |
| 4-PyBB—F | 8% |
| 5-PyBB—F | 8% |
| 5-HBB(F)B-2 | 10% |
| 5-HBB(F)B-3 | 10% |

What is claimed is:

1. A compound represented by formula (1):

(1)

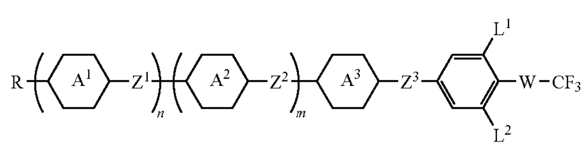

wherein R is hydrogen, alkyl having 1 to 12 carbons, alkenyl having 2 to 12 carbons, alkoxy having 1 to 11 carbons, or alkenyloxy having 2 to 11 carbons;

ring $A^1$, ring $A^2$, and ring $A^3$ are each independently 1,4-cyclohexylene, 1,4-phenylene, 1,4-cyclohexenylene, 1,3-dioxane-2,5-diyl, tetrahydropyran-2,5-diyl, pyrimidine-2,5-diyl, naphthalene-2,6-diyl, decahydronaphthalene-2,6-diyl, or 1,2,3,4-tetrahydronaphthalene-2,6-diyl, and in these rings, hydrogen may be replaced by halogen;

$Z^1$, $Z^2$, and $Z^3$ are each independently a single bond, —$CH_2CH_2$—, —CH═CH—, —C≡C—, —COO—, —OCO—, —$CF_2O$—, —$OCF_2$—, —$CH_2O$—, —$OCH_2$—, —CF═CF—, —$(CH_2)_4$—, —$(CH_2)_2CF_2O$—, —$OCF_2(CH_2)_2$—, —CH═CH$(CH_2)_2$—, or —$(CH_2)_2$CH═CH—;

$L^1$ and $L^2$ are each independently hydrogen or halogen, and at least one of $L^1$ and $L^2$ is halogen;

W is —CH═CH— or —C≡C—, wherein both $L^1$ and $L^2$ are halogen when W is —CH═CH—; and n and m are each independently an integer of 0 to 2, and the sum of n and m is an integer of 0 to 3.

2. The compound according to claim 1, wherein ring $A^1$, ring $A^2$, and ring $A^3$ are each independently 1,4-cyclohexylene, 1,4-phenylene, 1,4-cyclohexenylene, 1,3-dioxane-2,5-diyl, tetrahydropyran-2,5-diyl, pyrimidine-2,5-diyl, or 1,4-phenylene in which arbitrary hydrogen is replaced by fluorine.

3. The compound according to claim 2, wherein $Z^1$, $Z^2$, and $Z^3$ are each independently a single bond, —$CH_2CH_2$—, —CH═CH—, —C≡C—, —COO—, —OCO—, —$CF_2O$—, —$OCF_2$—, —$CH_2O$—, —$OCH_2$—, or —CF═CF—.

4. A compound represented by formula (1-1):

(1-1)

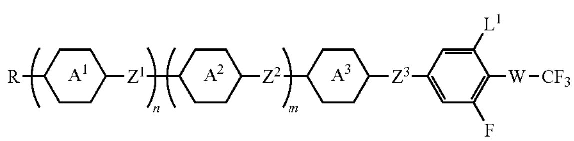

wherein R is hydrogen, alkyl having 1 to 12 carbons, alkenyl having 2 to 12 carbons, or alkoxy having 1 to 11 carbons;

ring $A^1$, ring $A^2$, and ring $A^3$ are each independently, 1,4-cyclohexylene, 1,4-phenylene, 1,4-cyclohexenylene, 1,3-dioxane-2,5-diyl, tetrahydropyran-2,5-diyl, pyrimidine-2,5-diyl, or 1,4-phenylene in which arbitrary hydrogen is replaced by fluorine;

$Z^1$, $Z^2$, and $Z^3$ are each independently a single bond, —$CH_2CH_2$—, —CH═CH—, —C≡C—, —COO—, —OCO—, —$CF_2O$—, —$OCF_2$—, —$CH_2O$—, —$OCH_2$—, or —CF═CF—;

W is —CH═CH— or —C≡C—;

$L^1$ is hydrogen, fluorine, or chlorine; and n and m are each independently an integer of 0 to 2, and the sum of n and m is an integer of 0 to 3.

5. The compound according to claim 4, wherein ring $A^1$, ring $A^2$, and ring $A^3$ are each independently 1,4-cyclohexylene, 1,4-phenylene, or 1,4-phenylene in which arbitrary hydrogen is replaced by fluorine.

6. The compound according to claim 4, wherein at least one of ring $A^1$, ring $A^2$, and ring $A^3$ is 1,3-dioxane-2,5-diyl.

7. The compound according to claim 4, wherein at least one of ring $A^1$, ring $A^2$, and ring $A^3$ is tetrahydropyran-2,5-diyl.

8. The compound according to claim 4, wherein at least one of ring $A^1$, ring $A^2$, and ring $A^3$ is pyrimidine-2,5-diyl.

9. The compound according to claim 5, wherein $Z^1$, $Z^2$, and $Z^3$ are each independently a single bond, —$CH_2CH_2$—, —CH═CH—, —C≡C—, —COO—, —$CF_2O$—, or —$CH_2O$—.

10. The compound according to claim 5, wherein $Z^1$, $Z^2$, and $Z^3$ are a single bond.

11. A compound represented by any one of formulas (1-2) to (1-10):

(1-2)

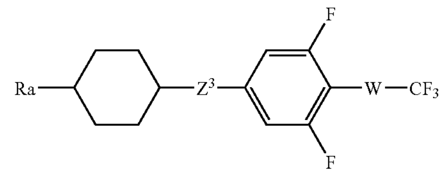

(1-3)

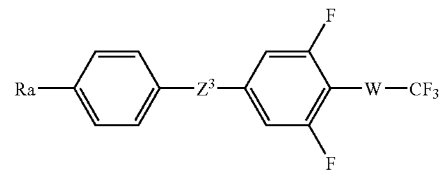

(1-4)

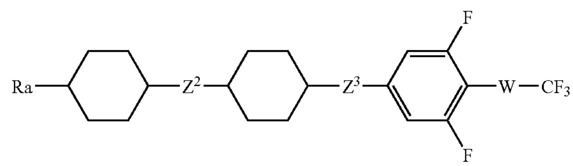

(1-5)

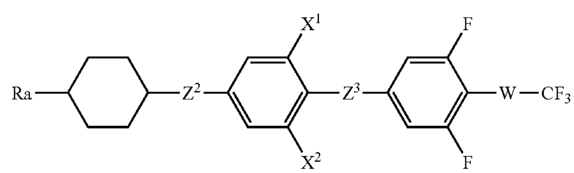

(1-6)

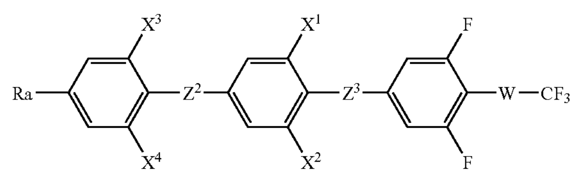

(1-7)

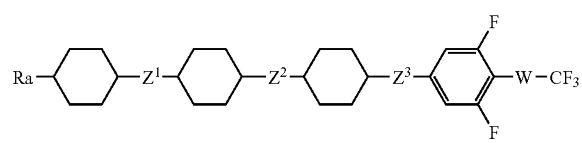

(1-8)

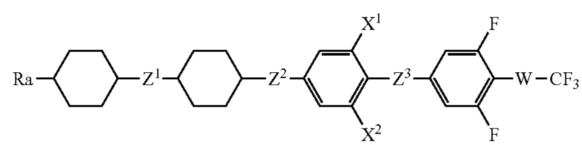

(1-9)

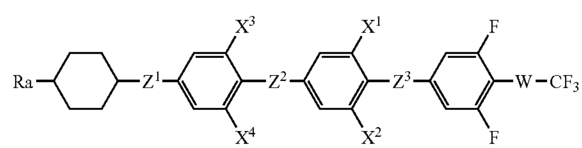

(1-10)

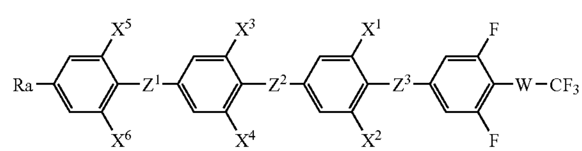

wherein Ra is independently hydrogen, alkyl having 1 to 12 carbons, alkenyl having 2 to 12 carbons, or alkoxy having 1 to 11 carbons;

$Z^1$, $Z^2$, and $Z^3$ are each independently a single bond, —$CH_2CH_2$—, —CH═CH—, —COO—, or —$CF_2O$—;

$X^1$, $X^2$, $X^3$, $X^4$, $X^5$, and $X^6$ are each independently hydrogen or fluorine; and W is independently —CH═CH— or —C≡C—.

12. The compound according to claim 11, wherein $Z^1$, $Z^2$, and $Z^3$ are a single bond in formulas (1-2) to (1-10).

13. The compound according to claim 12, wherein $X^1$ is fluorine, and $X^2$, $X^3$, $X^4$, $X^5$, and $X^6$ are hydrogen in formulas (1-2) to (1-10).

14. The compound according to claim 12, wherein $X^1$ and $X^2$ are fluorine, and $X^3$, $X^4$, $X^5$, and $X^6$ are hydrogen in formulas (1-2) to (1-10).

15. The compound according to claim 12, wherein $X^1$ and $X^3$ are fluorine, and $X^2$, $X^4$, $X^5$, and $X^6$ are hydrogen in formulas (1-2) to (1-10).

16. The compound according to claim 12, wherein $X^1$, $X^2$, and $X^3$ are fluorine, and $X^4$, $X^5$, and $X^6$ are hydrogen in formulas (1-2) to (1-10).

17. The compound according to claim 12, wherein W is —CH═CH— in formulas (1-2) to (1-10).

18. A liquid crystal composition comprising at least one compound according to claim 4.

19. The liquid crystal composition according to claim 18, further comprising at least one compound selected from the group of compounds each represented by formulas (2), (3), and (4):

(2)

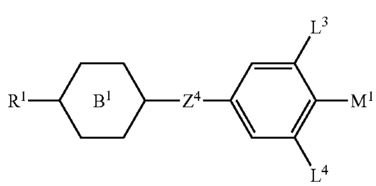

(3)

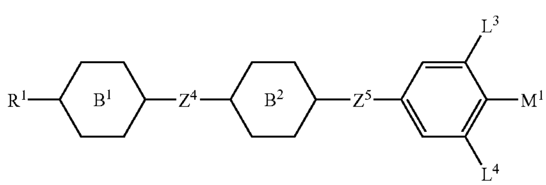

(4)

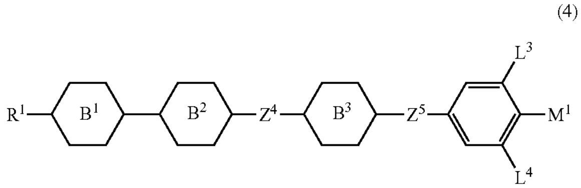

wherein $R^1$ is independently alkyl having 1 to 10 carbons or alkenyl having 2 to 10 carbons, and in the alkyl and alkenyl, arbitrary hydrogen may be replaced by fluorine, and arbitrary —CH2- may be replaced by —O—;

$M^1$ is independently fluorine, chlorine, —$OCF_3$, —$OCHF_2$, —$CF_3$, —$CHF_2$, —$CH_2F$, —$OCF_2CHF_2$, or —$OCF_2CHFCF_3$;

ring $B^1$, ring $B^2$, and ring $B^3$ are each independently 1,4-cyclohexylene, 1,4-phenylene, 1,3-dioxane-2,5-diyl, pyrimidine-2,5-diyl, tetrahydropyran-2,5-diyl, or 1,4-phenylene in which arbitrary hydrogen is replaced by fluorine;

$Z^4$ and $Z^5$ are each independently —$(CH_2)_2$—, —$(CH_2)_4$—, —COO—, —$CF_2O$—, —$OCF_2$—, —CH═CH—, or a single bond; and $L^3$ and $L^4$ are each independently hydrogen or fluorine.

20. The liquid crystal composition according to claim 18, further comprising at least one compound selected from the group of compounds represented by formula (5):

(5)

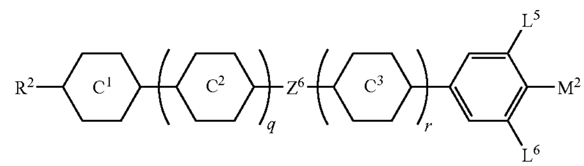

wherein $R^2$ is alkyl having 1 to 10 carbons or alkenyl having 2 to 10 carbons, and in the alkyl and alkenyl, arbitrary hydrogen may be replaced by fluorine, and arbitrary —$CH_2$— may be replaced by —O—;

$M^2$ is —C≡N or —C≡C—C≡N;

ring $C^1$, ring $C^2$, and ring $C^3$ are each independently 1,4-cyclohexylene, 1,4-phenylene, 1,3-dioxane-2,5-diyl, pyrimidine-2,5-diyl, tetrahydropyran-2,5-diyl, or 1,4-phenylene in which arbitrary hydrogen is replaced by fluorine;

$Z^6$ is —$(CH_2)_2$—, —COO—, —$CF_2O$—, —$OCF_2$—, —C≡C—, —$CH_2O$—, or a single bond;

$L^5$ and $L^6$ are each independently hydrogen or fluorine; and q is an integer of 0 to 2 and r is 0 or 1.

21. The liquid crystal composition according to claim 18, further comprising at least one compound selected from the group of compounds each represented by formulas (6), (7), (8), (9), and (10):

(6)

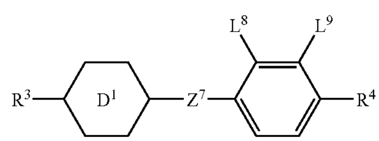

(7)

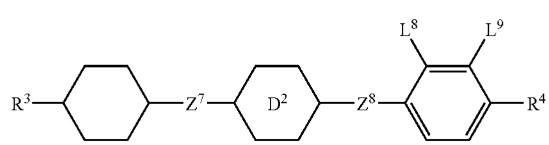

(8)

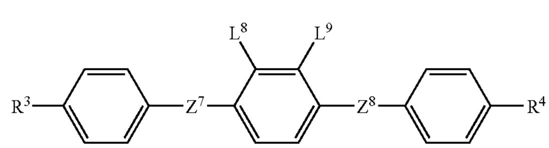

(9)

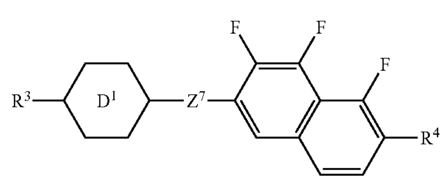

-continued (10)

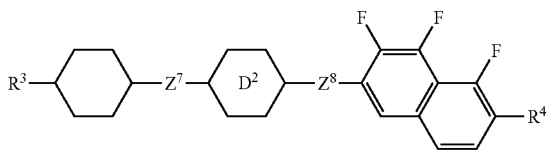

wherein $R^3$ and $R^4$ are each independently alkyl having 1 to 10 carbons or alkenyl having 2 to 10 carbons, and in the alkyl and alkenyl, arbitrary hydrogen may be replaced by fluorine, and arbitrary —$CH_2$— may be replaced by —O—;

ring $D^1$ and ring $D^2$ are each independently 1,4-cyclohexylene, 1,4-phenylene, 1,4-cyclohexenylene, tetrahydropyran-2,5-diyl, decahydronaphthalene-2,6-diyl, or 1,4-phenylene in which arbitrary hydrogen is replaced by fluorine;

$Z^7$ and $Z^8$ are each independently —$(CH_2)_2$—, —COO—, —$CH_2O$—, —$OCH_2$—, —$CF_2O$—, —$OCF_2$—, —$(CH_2)_2CF_2O$—, —$OCF_2(CH_2)_2$—, or a single bond; and $L^8$ and $L^9$ are each independently chlorine or fluorine.

22. The liquid crystal composition according to claim 18, further comprising at least one compound selected from the group of compounds each represented by formulas (11), (12), and (13):

(11)

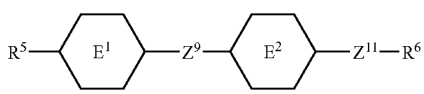

(12)

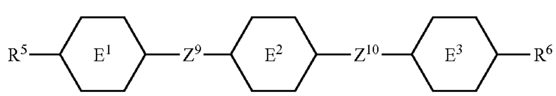

(13)

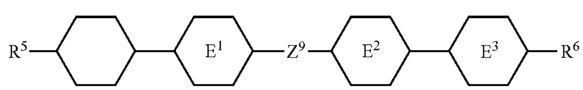

wherein $R^5$ and $R^6$ are each independently alkyl having 1 to 10 carbons or alkenyl having 2 to 10 carbons, and in the alkyl, arbitrary hydrogen may be replaced by fluorine, and arbitrary —$CH_2$— may be replaced by —O—;

ring $E^1$, ring $E^2$, and ring $E^3$ are each independently 1,4-cyclohexylene, pyrimidine-2,5-diyl, 1,4-phenylene, 2-fluoro-1,4-phenylene, 3-fluoro-1,4-phenylene, or 2,5-difluoro-1,4-phenylene; and $Z^9$ and $Z^{10}$ are each independently —C≡C—, —COO—, —$(CH_2)_2$—, —CH═CH—, or a single bond, and $Z^{11}$ is —COO— or a single bond.

23. The liquid crystal composition according to claim 20, further comprising at least one compound selected from the group of compounds each represented by formulas (11), (12), and (13):

(11)

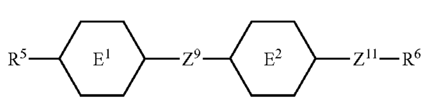

-continued (12)

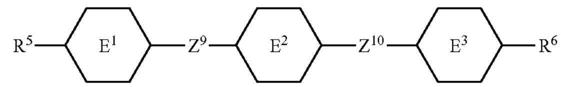

(13)

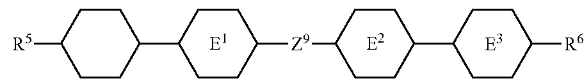

wherein $R^5$ and $R^6$ are each independently alkyl having 1 to 10 carbons or alkenyl having 2 to 10 carbons, and in the alkyl, arbitrary hydrogen may be replaced by fluorine, and arbitrary —$CH_2$— may be replaced by —O—;

ring $E^1$, ring $E^2$, and ring $E^3$ are each independently 1,4-cyclohexylene, pyrimidine-2,5-diyl, 1,4-phenylene, 2-fluoro-1,4-phenylene, 3-fluoro-1,4-phenylene, or 2,5-difluoro-1,4-phenylene; and $Z^9$ and $Z^{10}$ are each independently —C≡C—, —COO—, —$(CH_2)_2$—, —CH═CH—, or a single bond, and $Z^{11}$ is —COO— or a single bond.

24. The liquid crystal composition according to claim 21, further comprising at least one compound selected from the group of compounds each represented by formulas (11), (12), and (13):

(11)

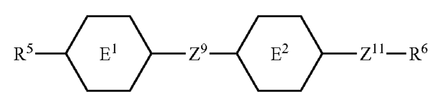

(12)

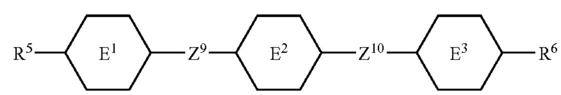

(13)

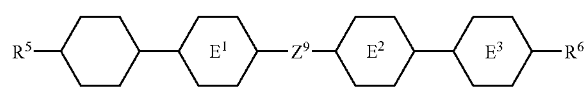

wherein $R^5$ and $R^6$ are each independently alkyl having 1 to 10 carbons or alkenyl having 2 to 10 carbons, and in the alkyl, arbitrary hydrogen may be replaced by fluorine, and arbitrary —$CH_2$— may be replaced by —O—;

ring $E^1$, ring $E^2$, and ring $E^3$ are each independently 1,4-cyclohexylene, pyrimidine-2,5-diyl, 1,4-phenylene, 2-fluoro-1,4-phenylene, 3-fluoro-1,4-phenylene, or 2,5-difluoro-1,4-phenylene; and $Z^9$ and $Z^{10}$ are each independently —C≡C—, —COO—, —$(CH_2)_2$—, —CH═CH—, or a single bond, and $Z^{11}$ is —COO— or a single bond.

25. The liquid crystal composition according to claim 18, further comprising at least one optically active compound.

26. The liquid crystal composition according to claim 18, further comprising at least one antioxidant and/or ultraviolet absorber.

27. A liquid crystal display element comprising the liquid crystal composition according to claim 18.

28. The liquid crystal composition according to claim 19, further comprising at least one compound selected from the group of compounds represented by formula (5):

(5)

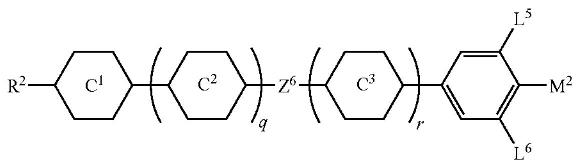

wherein $R^2$ is alkyl having 1 to 10 carbons or alkenyl having 2 to 10 carbons, and in the alkyl and alkenyl, arbitrary hydrogen may be replaced by fluorine, and arbitrary —$CH_2$— may be replaced by —O—;

$M^2$ is —C≡N or —C≡C—C≡N;

ring $C^1$, ring $C^2$, and ring $C^3$ are each independently 1,4-cyclohexylene, 1,4-phenylene, 1,3-dioxane-2,5-diyl, pyrimidine-2,5-diyl, tetrahydropyran-2,5-diyl, or 1,4-phenylene in which arbitrary hydrogen is replaced by fluorine;

$Z^6$ is —$(CH_2)_2$—, —COO—, —$CF_2O$—, —$OCF_2$—, —C≡C—, —$CH_2O$—, or a single bond;

$L^5$ and $L^6$ are each independently hydrogen or fluorine; and q is an integer of 0 to 2 and r is 0 or 1.

29. The liquid crystal composition according to claim 19, further comprising at least one compound selected from the group of compounds each represented by formulas (11), (12), and (13):

(11)

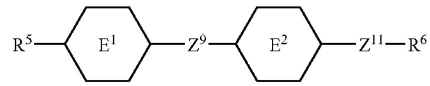

(12)

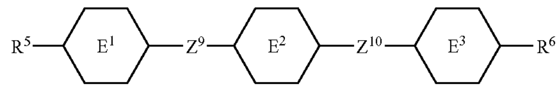

(13)

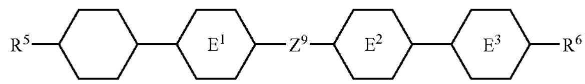

wherein $R^5$ and $R^6$ are each independently alkyl having 1 to 10 carbons or alkenyl having 2 to 10 carbons, and in the alkyl, arbitrary hydrogen may be replaced by fluorine, and arbitrary —$CH_2$— may be replaced by —O—;

ring $E^1$, ring $E^2$, and ring $E^3$ are each independently 1,4-cyclohexylene, pyrimidine-2,5-diyl, 1,4-phenylene, 2-fluoro-1,4-phenylene, 3-fluoro-1,4-phenylene, or 2,5-difluoro-1,4-phenylene; and $Z^9$ and $Z^{10}$ are each independently —C≡C—, —COO—, —$(CH_2)_2$—, —CH═CH—, or a single bond, and $Z^{11}$ is —COO— or a single bond.

* * * * *